United States Patent
Jones et al.

(10) Patent No.: US 11,449,633 B2
(45) Date of Patent: *Sep. 20, 2022

(54) DATA PROCESSING SYSTEMS AND METHODS FOR AUTOMATIC DISCOVERY AND ASSESSMENT OF MOBILE SOFTWARE DEVELOPMENT KITS

(71) Applicant: OneTrust, LLC, Atlanta, GA (US)

(72) Inventors: Kevin Jones, Atlanta, GA (US); Pratik Doshi, Atlanta, GA (US); Jonathan Blake Brannon, Smyrna, GA (US); Prabhu Kumar, Bangalore (IN)

(73) Assignee: OneTrust, LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/572,298

(22) Filed: Jan. 10, 2022

(65) Prior Publication Data

US 2022/0129581 A1    Apr. 28, 2022

Related U.S. Application Data

(63) Continuation of application No. 17/326,901, filed on May 21, 2021, now Pat. No. 11,222,139, which is a
(Continued)

(51) Int. Cl.
*G06F 9/44*      (2018.01)
*G06F 21/62*     (2013.01)
(Continued)

(52) U.S. Cl.
CPC ........ *G06F 21/6245* (2013.01); *G06F 16/901* (2019.01); *G06F 16/904* (2019.01); *G06F 16/9558* (2019.01)

(58) Field of Classification Search
None
See application file for complete search history.

(56) References Cited

U.S. PATENT DOCUMENTS

| 4,536,866 A | 8/1985 | Jerome et al. |
| 4,574,350 A | 3/1986 | Starr |

(Continued)

FOREIGN PATENT DOCUMENTS

| CN | 111496802 | 8/2020 |
| CN | 112115859 | 12/2020 |

(Continued)

OTHER PUBLICATIONS

International Search Report, dated Feb. 11, 2022, from corresponding International Application No. PCT/US2021/053518.
(Continued)

*Primary Examiner* — Anna C Deng
(74) *Attorney, Agent, or Firm* — Brient IP Law, LLC

(57) ABSTRACT

A mobile application privacy analysis system is described, where the system scans a mobile device to identify files associated with a particular SDK and generates a tokenized name for the SDK. The tokenized name includes tokens representing the SDK vendor and one or more functions of the SDK. Using the tokenized name, the system then determines corresponding categories for each functionality token and score for each such category. Based on the scores, the system determines the most significant category and assigns that category to the SDK for use in privacy analysis. The system may also, or instead, determine a vendor category using the vendor token and assign that category to the SDK. Weighting factors may be applied to the scores for the categories associated with the functionality tokens and vendor tokens.

17 Claims, 59 Drawing Sheets

Related U.S. Application Data continuation-in-part of application No. 17/163,701, filed on Feb. 1, 2021, now Pat. No. 11,113,416, which is a continuation of application No. 16/915,097, filed on Jun. 29, 2020, now Pat. No. 10,909,265, which is a continuation-in-part of application No. 16/895,278, filed on Jun. 8, 2020, now Pat. No. 11,200,341, which is a continuation of application No. 16/552,765, filed on Aug. 27, 2019, now Pat. No. 10,678,945, which is a continuation-in-part of application No. 16/277,568, filed on Feb. 15, 2019, now Pat. No. 10,440,062, which is a continuation-in-part of application No. 16/159,634, filed on Oct. 13, 2018, now Pat. No. 10,282,692, which is a continuation-in-part of application No. 16/055,083, filed on Aug. 4, 2018, now Pat. No. 10,289,870, which is a continuation-in-part of application No. 15/996,208, filed on Jun. 1, 2018, now Pat. No. 10,181,051, which is a continuation-in-part of application No. 15/853,674, filed on Dec. 22, 2017, now Pat. No. 10,019,597, which is a continuation-in-part of application No. 15/619,455, filed on Jun. 10, 2017, now Pat. No. 9,851,966, which is a continuation-in-part of application No. 15/254,901, filed on Sep. 1, 2016, now Pat. No. 9,729,583.

(60) Provisional application No. 63/028,149, filed on May 21, 2020, provisional application No. 62/868,373, filed on Jun. 28, 2019, provisional application No. 62/728,435, filed on Sep. 7, 2018, provisional application No. 62/631,684, filed on Feb. 17, 2018, provisional application No. 62/631,703, filed on Feb. 17, 2018, provisional application No. 62/572,096, filed on Oct. 13, 2017, provisional application No. 62/547,530, filed on Aug. 18, 2017, provisional application No. 62/541,613, filed on Aug. 14, 2017, provisional application No. 62/537,839, filed on Jul. 27, 2017, provisional application No. 62/360,123, filed on Jul. 8, 2016, provisional application No. 62/353,802, filed on Jun. 23, 2016, provisional application No. 62/348,695, filed on Jun. 10, 2016.

(51) Int. Cl.
*G06F 16/955* (2019.01)
*G06F 16/904* (2019.01)
*G06F 16/901* (2019.01)

(56) References Cited

U.S. PATENT DOCUMENTS

| | | | |
|---|---|---|---|
| 5,193,162 A | 3/1993 | Bordsen et al. |
| 5,276,735 A | 1/1994 | Boebert et al. |
| 5,329,447 A | 7/1994 | Leedom, Jr. |
| 5,404,299 A | 4/1995 | Tsurubayashi et al. |
| 5,535,393 A | 7/1996 | Reeve et al. |
| 5,560,005 A | 9/1996 | Hoover et al. |
| 5,668,986 A | 9/1997 | Nilsen et al. |
| 5,710,917 A | 1/1998 | Musa et al. |
| 5,761,529 A | 6/1998 | Raji |
| 5,764,906 A | 6/1998 | Edelstein et al. |
| 5,872,973 A | 2/1999 | Mitchell et al. |
| 5,913,041 A | 6/1999 | Ramanathan et al. |
| 5,913,214 A | 6/1999 | Madnick et al. |
| 6,016,394 A | 1/2000 | Walker |
| 6,122,627 A | 9/2000 | Carey et al. |
| 6,148,297 A | 11/2000 | Swor et al. |
| 6,148,342 A | 11/2000 | Ho |
| 6,240,416 B1 | 5/2001 | Immon et al. |
| 6,243,816 B1 | 6/2001 | Fang et al. |
| 6,253,203 B1 | 6/2001 | Oflaherty et al. |
| 6,263,335 B1 | 7/2001 | Paik et al. |
| 6,272,631 B1 | 8/2001 | Thomlinson et al. |
| 6,275,824 B1 | 8/2001 | Oflaherty et al. |
| 6,282,548 B1 | 8/2001 | Burner et al. |
| 6,330,562 B1 | 12/2001 | Boden et al. |
| 6,363,488 B1 | 3/2002 | Ginter et al. |
| 6,374,237 B1 | 4/2002 | Reese |
| 6,374,252 B1 | 4/2002 | Althoff et al. |
| 6,408,336 B1 | 6/2002 | Schneider et al. |
| 6,427,230 B1 | 7/2002 | Goiffon et al. |
| 6,442,688 B1 | 8/2002 | Moses et al. |
| 6,446,120 B1 | 9/2002 | Dantressangle |
| 6,463,488 B1 | 10/2002 | San Juan |
| 6,484,149 B1 | 11/2002 | Jammes et al. |
| 6,484,180 B1 | 11/2002 | Lyons et al. |
| 6,516,314 B1 | 2/2003 | Birkler et al. |
| 6,516,337 B1 | 2/2003 | Tripp et al. |
| 6,519,571 B1 | 2/2003 | Guheen et al. |
| 6,574,631 B1 | 6/2003 | Subramanian et al. |
| 6,591,272 B1 | 7/2003 | Williams |
| 6,601,233 B1 | 7/2003 | Underwood |
| 6,606,744 B1 | 8/2003 | Mikurak |
| 6,611,812 B2 | 8/2003 | Hurtado et al. |
| 6,625,602 B1 | 9/2003 | Meredith et al. |
| 6,629,081 B1 | 9/2003 | Cornelius et al. |
| 6,633,878 B1 | 10/2003 | Underwood |
| 6,662,192 B1 | 12/2003 | Rebane |
| 6,662,357 B1 | 12/2003 | Bowman-Amuah |
| 6,697,824 B1 | 2/2004 | Bowman-Amuah |
| 6,699,042 B2 | 3/2004 | Smith et al. |
| 6,701,314 B1 | 3/2004 | Conover et al. |
| 6,721,713 B1 | 4/2004 | Guheen et al. |
| 6,725,200 B1 | 4/2004 | Rost |
| 6,732,109 B2 | 5/2004 | Lindberg et al. |
| 6,754,665 B1 | 6/2004 | Futagami et al. |
| 6,755,344 B1 | 6/2004 | Mollett et al. |
| 6,757,685 B2 | 6/2004 | Raffaele et al. |
| 6,757,888 B1 | 6/2004 | Knutson et al. |
| 6,816,944 B2 | 11/2004 | Peng |
| 6,826,693 B1 | 11/2004 | Yoshida et al. |
| 6,850,252 B1 | 2/2005 | Hoffberg |
| 6,886,101 B2 | 4/2005 | Glazer et al. |
| 6,901,346 B2 | 5/2005 | Tracy et al. |
| 6,904,417 B2 | 6/2005 | Clayton et al. |
| 6,909,897 B2 | 6/2005 | Kikuchi |
| 6,925,443 B1 | 8/2005 | Baggett, Jr. et al. |
| 6,938,041 B1 | 8/2005 | Brandow et al. |
| 6,956,845 B2 | 10/2005 | Baker et al. |
| 6,978,270 B1 | 12/2005 | Carty et al. |
| 6,980,927 B2 | 12/2005 | Tracy et al. |
| 6,980,987 B2 | 12/2005 | Kaminer |
| 6,983,221 B2 | 1/2006 | Tracy et al. |
| 6,985,887 B1 | 1/2006 | Sunstein et al. |
| 6,990,454 B2 | 1/2006 | McIntosh |
| 6,993,448 B2 | 1/2006 | Tracy et al. |
| 6,993,495 B2 | 1/2006 | Smith, Jr. et al. |
| 6,996,807 B1 | 2/2006 | Vardi et al. |
| 7,003,560 B1 | 2/2006 | Mullen et al. |
| 7,003,662 B2 | 2/2006 | Genty et al. |
| 7,013,290 B2 | 3/2006 | Ananian |
| 7,017,105 B2 | 3/2006 | Flanagin et al. |
| 7,023,979 B1 | 4/2006 | Wu et al. |
| 7,039,594 B1 | 5/2006 | Gersting |
| 7,039,654 B1 | 5/2006 | Eder |
| 7,047,517 B1 | 5/2006 | Brown et al. |
| 7,051,036 B2 | 5/2006 | Rosnow et al. |
| 7,051,038 B1 | 5/2006 | Yeh et al. |
| 7,058,970 B2 | 6/2006 | Shaw |
| 7,069,427 B2 | 6/2006 | Adler et al. |
| 7,076,558 B1 | 7/2006 | Dunn |
| 7,093,200 B2 | 8/2006 | Schreiber et al. |
| 7,095,854 B1 | 8/2006 | Ginter et al. |
| 7,100,195 B1 | 8/2006 | Underwood |
| 7,120,800 B2 | 10/2006 | Ginter et al. |
| 7,124,101 B1 | 10/2006 | Mikurak |
| 7,124,107 B1 | 10/2006 | Pishevar et al. |
| 7,127,705 B2 | 10/2006 | Christfort et al. |
| 7,127,741 B2 | 10/2006 | Bandini et al. |

(56) References Cited

U.S. PATENT DOCUMENTS

| | | |
|---|---|---|
| 7,133,845 B1 | 11/2006 | Ginter et al. |
| 7,139,999 B2 | 11/2006 | Bowman-Amuah |
| 7,143,091 B2 | 11/2006 | Charnock et al. |
| 7,149,698 B2 | 12/2006 | Guheen et al. |
| 7,165,041 B1 | 1/2007 | Guheen et al. |
| 7,167,842 B1 | 1/2007 | Josephson, II et al. |
| 7,167,844 B1 | 1/2007 | Leong et al. |
| 7,171,379 B2 | 1/2007 | Menninger et al. |
| 7,181,438 B1 | 2/2007 | Szabo |
| 7,203,929 B1 | 4/2007 | Vinodkrishnan et al. |
| 7,213,233 B1 | 5/2007 | Vinodkrishnan et al. |
| 7,216,340 B1 | 5/2007 | Vinodkrishnan et al. |
| 7,219,066 B2 | 5/2007 | Parks et al. |
| 7,223,234 B2 | 5/2007 | Stupp et al. |
| 7,225,460 B2 | 5/2007 | Barzilai et al. |
| 7,234,065 B2 | 6/2007 | Breslin et al. |
| 7,247,625 B2 | 7/2007 | Zhang et al. |
| 7,251,624 B1 | 7/2007 | Lee et al. |
| 7,260,830 B2 | 8/2007 | Sugimoto |
| 7,266,566 B1 | 9/2007 | Kennaley et al. |
| 7,272,818 B2 | 9/2007 | Ishimitsu et al. |
| 7,275,063 B2 | 9/2007 | Horn |
| 7,281,020 B2 | 10/2007 | Fine |
| 7,284,232 B1 | 10/2007 | Bates et al. |
| 7,284,271 B2 | 10/2007 | Lucovsky et al. |
| 7,287,280 B2 | 10/2007 | Young |
| 7,290,275 B2 | 10/2007 | Baudoin et al. |
| 7,293,119 B2 | 11/2007 | Beale |
| 7,299,299 B2 | 11/2007 | Hollenbeck et al. |
| 7,302,569 B2 | 11/2007 | Betz et al. |
| 7,313,575 B2 | 12/2007 | Carr et al. |
| 7,313,699 B2 | 12/2007 | Koga |
| 7,313,825 B2 | 12/2007 | Redlich et al. |
| 7,315,826 B1 | 1/2008 | Guheen et al. |
| 7,315,849 B2 | 1/2008 | Bakalash et al. |
| 7,322,047 B2 | 1/2008 | Redlich et al. |
| 7,330,850 B1 | 2/2008 | Seibel et al. |
| 7,340,447 B2 | 3/2008 | Ghatare |
| 7,340,776 B2 | 3/2008 | Zobel et al. |
| 7,343,434 B2 | 3/2008 | Kapoor et al. |
| 7,346,518 B1 | 3/2008 | Frank et al. |
| 7,353,204 B2 | 4/2008 | Liu |
| 7,356,559 B1 | 4/2008 | Jacobs et al. |
| 7,367,014 B2 | 4/2008 | Griffin |
| 7,370,025 B1 | 5/2008 | Pandit |
| 7,376,835 B2 | 5/2008 | Olkin et al. |
| 7,380,120 B1 | 5/2008 | Garcia |
| 7,382,903 B2 | 6/2008 | Ray |
| 7,383,570 B2 | 6/2008 | Pinkas et al. |
| 7,391,854 B2 | 6/2008 | Salonen et al. |
| 7,398,393 B2 | 7/2008 | Mont et al. |
| 7,401,235 B2 | 7/2008 | Mowers et al. |
| 7,403,942 B1 | 7/2008 | Bayliss |
| 7,409,354 B2 | 8/2008 | Putnam et al. |
| 7,412,402 B2 | 8/2008 | Cooper |
| 7,424,680 B2 | 9/2008 | Carpenter |
| 7,428,546 B2 | 9/2008 | Nori et al. |
| 7,430,585 B2 | 9/2008 | Sibert |
| 7,454,457 B1 | 11/2008 | Lowery et al. |
| 7,454,508 B2 | 11/2008 | Mathew et al. |
| 7,478,157 B2 | 1/2009 | Bohrer et al. |
| 7,480,755 B2 | 1/2009 | Herrell et al. |
| 7,487,170 B2 | 2/2009 | Stevens |
| 7,493,282 B2 | 2/2009 | Manly et al. |
| 7,512,987 B2 | 3/2009 | Williams |
| 7,516,882 B2 | 4/2009 | Cucinotta |
| 7,523,053 B2 | 4/2009 | Pudhukottai et al. |
| 7,529,836 B1 | 5/2009 | Bolen |
| 7,548,968 B1 | 6/2009 | Bura et al. |
| 7,552,480 B1 | 6/2009 | Voss |
| 7,562,339 B2 | 7/2009 | Racca et al. |
| 7,565,685 B2 | 7/2009 | Ross et al. |
| 7,567,541 B2 | 7/2009 | Karimi et al. |
| 7,584,505 B2 | 9/2009 | Mondri et al. |
| 7,584,508 B1 | 9/2009 | Kashchenko et al. |
| 7,587,749 B2 | 9/2009 | Leser et al. |
| 7,590,705 B2 | 9/2009 | Mathew et al. |
| 7,590,972 B2 | 9/2009 | Axelrod et al. |
| 7,603,356 B2 | 10/2009 | Schran et al. |
| 7,606,783 B1 | 10/2009 | Carter |
| 7,606,790 B2 | 10/2009 | Levy |
| 7,607,120 B2 | 10/2009 | Sanyal et al. |
| 7,613,700 B1 | 11/2009 | Lobo et al. |
| 7,617,136 B1 | 11/2009 | Lessing et al. |
| 7,617,167 B2 | 11/2009 | Griffis et al. |
| 7,620,644 B2 | 11/2009 | Cote et al. |
| 7,627,666 B1 | 12/2009 | Degiulio et al. |
| 7,630,874 B2 | 12/2009 | Fables et al. |
| 7,630,998 B2 | 12/2009 | Zhou et al. |
| 7,636,742 B1 | 12/2009 | Olavarrieta et al. |
| 7,640,322 B2 | 12/2009 | Wendkos et al. |
| 7,650,497 B2 | 1/2010 | Thornton et al. |
| 7,653,592 B1 | 1/2010 | Flaxman et al. |
| 7,657,476 B2 | 2/2010 | Barney |
| 7,657,694 B2 | 2/2010 | Mansell et al. |
| 7,665,073 B2 | 2/2010 | Meijer et al. |
| 7,665,125 B2 | 2/2010 | Heard et al. |
| 7,668,947 B2 | 2/2010 | Hutchinson et al. |
| 7,673,282 B2 | 3/2010 | Amaru et al. |
| 7,676,034 B1 | 3/2010 | Wu et al. |
| 7,681,034 B1 | 3/2010 | Lee et al. |
| 7,681,140 B2 | 3/2010 | Ebert |
| 7,685,561 B2 | 3/2010 | Deem et al. |
| 7,685,577 B2 | 3/2010 | Pace et al. |
| 7,693,593 B2 | 4/2010 | Ishibashi et al. |
| 7,698,398 B1 | 4/2010 | Lai |
| 7,702,639 B2 | 4/2010 | Stanley et al. |
| 7,707,224 B2 | 4/2010 | Chastagnol et al. |
| 7,712,029 B2 | 5/2010 | Ferreira et al. |
| 7,716,242 B2 | 5/2010 | Pae et al. |
| 7,725,474 B2 | 5/2010 | Tamai et al. |
| 7,725,875 B2 | 5/2010 | Waldrep |
| 7,729,940 B2 | 6/2010 | Harvey et al. |
| 7,730,142 B2 | 6/2010 | Levasseur et al. |
| 7,752,124 B2 | 7/2010 | Green et al. |
| 7,756,826 B2 | 7/2010 | Bots et al. |
| 7,756,987 B2 | 7/2010 | Wang et al. |
| 7,761,586 B2 | 7/2010 | Olenick et al. |
| 7,774,745 B2 | 8/2010 | Fildebrandt et al. |
| 7,788,212 B2 | 8/2010 | Beckmann et al. |
| 7,788,222 B2 | 8/2010 | Shah et al. |
| 7,788,632 B2 | 8/2010 | Kuester et al. |
| 7,788,726 B2 | 8/2010 | Teixeira |
| 7,801,758 B2 | 9/2010 | Gracie et al. |
| 7,801,826 B2 | 9/2010 | Labrou et al. |
| 7,801,912 B2 | 9/2010 | Ransil et al. |
| 7,802,305 B1 | 9/2010 | Leeds |
| 7,805,349 B2 | 9/2010 | Yu et al. |
| 7,805,451 B2 | 9/2010 | Hosokawa |
| 7,813,947 B2 | 10/2010 | Deangelis et al. |
| 7,822,620 B2 | 10/2010 | Dixon et al. |
| 7,827,523 B2 | 11/2010 | Ahmed et al. |
| 7,844,640 B2 | 11/2010 | Bender et al. |
| 7,849,143 B2 | 12/2010 | Vuong |
| 7,853,468 B2 | 12/2010 | Callahan et al. |
| 7,853,470 B2 | 12/2010 | Sonnleithner et al. |
| 7,853,925 B2 | 12/2010 | Kemmler |
| 7,860,816 B2 | 12/2010 | Fokoue-Nkoutche et al. |
| 7,870,540 B2 | 1/2011 | Zare et al. |
| 7,870,608 B2 | 1/2011 | Shraim et al. |
| 7,873,541 B1 | 1/2011 | Klar et al. |
| 7,877,327 B2 | 1/2011 | Gwiazda et al. |
| 7,877,812 B2 | 1/2011 | Koved et al. |
| 7,885,841 B2 | 2/2011 | King |
| 7,890,461 B2 | 2/2011 | Oeda et al. |
| 7,895,260 B2 | 2/2011 | Archer et al. |
| 7,904,478 B2 | 3/2011 | Yu et al. |
| 7,904,487 B2 | 3/2011 | Ghatare |
| 7,917,888 B2 | 3/2011 | Chong et al. |
| 7,917,963 B2 | 3/2011 | Goyal et al. |
| 7,921,152 B2 | 4/2011 | Ashley et al. |
| 7,930,197 B2 | 4/2011 | Ozzie et al. |
| 7,930,753 B2 | 4/2011 | Mellinger et al. |
| 7,953,725 B2 | 5/2011 | Burris et al. |

(56) References Cited

U.S. PATENT DOCUMENTS

| | | |
|---|---|---|
| 7,954,150 B2 | 5/2011 | Croft et al. |
| 7,958,087 B2 | 6/2011 | Blumenau |
| 7,958,494 B2 | 6/2011 | Chaar et al. |
| 7,962,900 B2 | 6/2011 | Barraclough et al. |
| 7,966,310 B2 | 6/2011 | Sullivan et al. |
| 7,966,599 B1 | 6/2011 | Malasky et al. |
| 7,966,663 B2 | 6/2011 | Strickland et al. |
| 7,974,992 B2 | 7/2011 | Fastabend et al. |
| 7,975,000 B2 | 7/2011 | Dixon et al. |
| 7,991,559 B2 | 8/2011 | Dzekunov et al. |
| 7,991,747 B1 | 8/2011 | Upadhyay et al. |
| 7,996,372 B2 | 8/2011 | Rubel, Jr. |
| 8,005,891 B2 | 8/2011 | Knowles et al. |
| 8,010,612 B2 | 8/2011 | Costea et al. |
| 8,010,720 B2 | 8/2011 | Iwaoka et al. |
| 8,019,881 B2 | 9/2011 | Sandhu et al. |
| 8,020,206 B2 | 9/2011 | Hubbard et al. |
| 8,024,384 B2 | 9/2011 | Prabhakar et al. |
| 8,032,721 B2 | 10/2011 | Murai |
| 8,036,374 B2 | 10/2011 | Noble, Jr. |
| 8,037,409 B2 | 10/2011 | Jacob et al. |
| 8,041,749 B2 | 10/2011 | Beck |
| 8,041,913 B2 | 10/2011 | Wang |
| 8,069,161 B2 | 11/2011 | Bugir et al. |
| 8,069,471 B2 | 11/2011 | Boren |
| 8,082,539 B1 | 12/2011 | Schelkogonov |
| 8,090,754 B2 | 1/2012 | Schmidt et al. |
| 8,095,923 B2 | 1/2012 | Harvey et al. |
| 8,099,709 B2 | 1/2012 | Baikov et al. |
| 8,103,962 B2 | 1/2012 | Embley et al. |
| 8,117,441 B2 | 2/2012 | Kurien et al. |
| 8,135,815 B2 | 3/2012 | Mayer |
| 8,146,054 B2 | 3/2012 | Baker et al. |
| 8,146,074 B2 | 3/2012 | Ito et al. |
| 8,150,717 B2 | 4/2012 | Whitmore |
| 8,156,105 B2 | 4/2012 | Altounian et al. |
| 8,156,158 B2 | 4/2012 | Rolls et al. |
| 8,156,159 B2 | 4/2012 | Ebrahimi et al. |
| 8,166,406 B1 | 4/2012 | Goldfeder et al. |
| 8,176,061 B2 | 5/2012 | Swanbeck et al. |
| 8,176,177 B2 | 5/2012 | Sussman et al. |
| 8,176,334 B2 | 5/2012 | Vainstein |
| 8,176,470 B2 | 5/2012 | Klumpp et al. |
| 8,180,759 B2 | 5/2012 | Hamzy |
| 8,181,151 B2 | 5/2012 | Sedukhin et al. |
| 8,185,409 B2 | 5/2012 | Putnam et al. |
| 8,196,176 B2 | 6/2012 | Berteau et al. |
| 8,205,093 B2 | 6/2012 | Argott |
| 8,205,140 B2 | 6/2012 | Hafeez et al. |
| 8,214,362 B1 | 7/2012 | Djabarov |
| 8,214,803 B2 | 7/2012 | Horii et al. |
| 8,234,377 B2 | 7/2012 | Cohn |
| 8,239,244 B2 | 8/2012 | Ginsberg et al. |
| 8,250,051 B2 | 8/2012 | Bugir et al. |
| 8,255,468 B2 | 8/2012 | Vitaldevara et al. |
| 8,260,262 B2 | 9/2012 | Ben Ayed |
| 8,261,362 B2 | 9/2012 | Goodwin et al. |
| 8,266,231 B1 | 9/2012 | Golovin et al. |
| 8,275,632 B2 | 9/2012 | Awaraji et al. |
| 8,275,793 B2 | 9/2012 | Ahmad et al. |
| 8,286,239 B1 | 10/2012 | Sutton |
| 8,312,549 B2 | 11/2012 | Goldberg et al. |
| 8,316,237 B1 | 11/2012 | Felsher et al. |
| 8,332,908 B2 | 12/2012 | Hatakeyama et al. |
| 8,340,999 B2 | 12/2012 | Kumaran et al. |
| 8,341,405 B2 | 12/2012 | Meijer et al. |
| 8,346,929 B1 | 1/2013 | Lai |
| 8,364,713 B2 | 1/2013 | Pollard |
| 8,370,224 B2 | 2/2013 | Grewal |
| 8,370,794 B2 | 2/2013 | Moosmann et al. |
| 8,380,630 B2 | 2/2013 | Felsher |
| 8,380,743 B2 | 2/2013 | Convertino et al. |
| 8,381,180 B2 | 2/2013 | Rostoker |
| 8,381,297 B2 | 2/2013 | Touboul |
| 8,386,314 B2 | 2/2013 | Kirkby et al. |
| 8,392,982 B2 | 3/2013 | Harris et al. |
| 8,418,226 B2 | 4/2013 | Gardner |
| 8,423,954 B2 | 4/2013 | Ronen et al. |
| 8,429,179 B1 | 4/2013 | Mirhaji |
| 8,429,597 B2 | 4/2013 | Prigge |
| 8,429,630 B2 | 4/2013 | Nickolov et al. |
| 8,429,758 B2 | 4/2013 | Chen et al. |
| 8,438,644 B2 | 5/2013 | Watters et al. |
| 8,463,247 B2 | 6/2013 | Misiag |
| 8,464,311 B2 | 6/2013 | Ashley et al. |
| 8,468,244 B2 | 6/2013 | Redlich et al. |
| 8,473,324 B2 | 6/2013 | Alvarez et al. |
| 8,474,012 B2 | 6/2013 | Ahmed et al. |
| 8,494,894 B2 | 7/2013 | Jaster et al. |
| 8,504,481 B2 | 8/2013 | Motahari et al. |
| 8,510,199 B1 | 8/2013 | Erlanger |
| 8,515,988 B2 | 8/2013 | Jones et al. |
| 8,516,076 B2 | 8/2013 | Thomas |
| 8,527,337 B1 | 9/2013 | Lim et al. |
| 8,533,746 B2 | 9/2013 | Nolan et al. |
| 8,533,844 B2 | 9/2013 | Mahaffey et al. |
| 8,538,817 B2 | 9/2013 | Wilson |
| 8,539,359 B2 | 9/2013 | Rapaport et al. |
| 8,539,437 B2 | 9/2013 | Finlayson et al. |
| 8,560,645 B2 | 10/2013 | Linden et al. |
| 8,560,841 B2 | 10/2013 | Chin et al. |
| 8,560,956 B2 | 10/2013 | Curtis et al. |
| 8,561,100 B2 | 10/2013 | Hu et al. |
| 8,561,153 B2 | 10/2013 | Grason et al. |
| 8,565,729 B2 | 10/2013 | Moseler et al. |
| 8,566,726 B2 | 10/2013 | Dixon et al. |
| 8,566,938 B1 | 10/2013 | Prakash et al. |
| 8,571,909 B2 | 10/2013 | Miller et al. |
| 8,572,717 B2 | 10/2013 | Narayanaswamy |
| 8,578,036 B1 | 11/2013 | Holfelder et al. |
| 8,578,166 B2 | 11/2013 | De Monseignat et al. |
| 8,578,481 B2 | 11/2013 | Rowley |
| 8,578,501 B1 | 11/2013 | Ogilvie |
| 8,583,694 B2 | 11/2013 | Siegel et al. |
| 8,583,766 B2 | 11/2013 | Dixon et al. |
| 8,589,183 B2 | 11/2013 | Awaraji et al. |
| 8,601,467 B2 | 12/2013 | Hofhansl et al. |
| 8,601,591 B2 | 12/2013 | Krishnamurthy et al. |
| 8,606,746 B2 | 12/2013 | Yeap et al. |
| 8,612,420 B2 | 12/2013 | Sun et al. |
| 8,612,993 B2 | 12/2013 | Grant et al. |
| 8,615,549 B2 | 12/2013 | Knowles et al. |
| 8,615,731 B2 | 12/2013 | Doshi |
| 8,620,952 B2 | 12/2013 | Bennett et al. |
| 8,621,637 B2 | 12/2013 | Al-Harbi et al. |
| 8,626,671 B2 | 1/2014 | Federgreen |
| 8,627,114 B2 | 1/2014 | Resch et al. |
| 8,630,961 B2 | 1/2014 | Beilby et al. |
| 8,631,048 B1 | 1/2014 | Davis et al. |
| 8,640,110 B2 | 1/2014 | Kopp et al. |
| 8,646,072 B1 | 2/2014 | Savant |
| 8,650,399 B2 | 2/2014 | Le Bihan et al. |
| 8,655,939 B2 | 2/2014 | Redlich et al. |
| 8,656,265 B1 | 2/2014 | Paulin et al. |
| 8,656,456 B2 | 2/2014 | Maxson et al. |
| 8,661,036 B2 | 2/2014 | Turski et al. |
| 8,667,074 B1 | 3/2014 | Farkas |
| 8,667,487 B1 | 3/2014 | Boodman et al. |
| 8,677,472 B1 | 3/2014 | Dotan et al. |
| 8,681,984 B2 | 3/2014 | Lee et al. |
| 8,682,698 B2 | 3/2014 | Cashman et al. |
| 8,683,502 B2 | 3/2014 | Shkedi et al. |
| 8,688,601 B2 | 4/2014 | Jaiswal |
| 8,689,292 B2 | 4/2014 | Williams et al. |
| 8,693,689 B2 | 4/2014 | Belenkiy et al. |
| 8,700,524 B2 | 4/2014 | Williams et al. |
| 8,700,699 B2 | 4/2014 | Shen et al. |
| 8,706,742 B1 | 4/2014 | Ravid et al. |
| 8,707,451 B2 | 4/2014 | Ture et al. |
| 8,712,813 B2 | 4/2014 | King |
| 8,713,098 B1 | 4/2014 | Adya et al. |
| 8,713,638 B2 | 4/2014 | Hu et al. |
| 8,719,366 B2 | 5/2014 | Mathew et al. |
| 8,732,839 B2 | 5/2014 | Hohl |

(56) References Cited

U.S. PATENT DOCUMENTS

| | | |
|---|---|---|
| 8,744,894 B2 | 6/2014 | Christiansen et al. |
| 8,751,285 B2 | 6/2014 | Deb et al. |
| 8,762,406 B2 | 6/2014 | Ho et al. |
| 8,762,413 B2 | 6/2014 | Graham, Jr. et al. |
| 8,763,071 B2 | 6/2014 | Sinha et al. |
| 8,763,082 B2 | 6/2014 | Huber et al. |
| 8,763,131 B2 | 6/2014 | Archer et al. |
| 8,767,947 B1 | 7/2014 | Ristock et al. |
| 8,769,242 B2 | 7/2014 | Tkac et al. |
| 8,769,412 B2 | 7/2014 | Gill et al. |
| 8,769,671 B2 | 7/2014 | Shraim et al. |
| 8,776,241 B2 | 7/2014 | Zaitsev |
| 8,788,935 B1 | 7/2014 | Hirsch et al. |
| 8,793,614 B2 | 7/2014 | Wilson et al. |
| 8,793,650 B2 | 7/2014 | Hilerio et al. |
| 8,793,781 B2 | 7/2014 | Grossi et al. |
| 8,793,809 B2 | 7/2014 | Falkenburg et al. |
| 8,799,984 B2 | 8/2014 | Ahn |
| 8,805,707 B2 | 8/2014 | Schumann, Jr. et al. |
| 8,805,806 B2 | 8/2014 | Amarendran et al. |
| 8,805,925 B2 | 8/2014 | Price et al. |
| 8,812,342 B2 | 8/2014 | Barcelo et al. |
| 8,812,752 B1 | 8/2014 | Shih et al. |
| 8,812,766 B2 | 8/2014 | Kranendonk et al. |
| 8,813,028 B2 | 8/2014 | Farooqi |
| 8,819,253 B2 | 8/2014 | Simeloff et al. |
| 8,819,617 B1 | 8/2014 | Koenig et al. |
| 8,819,800 B2 | 8/2014 | Gao et al. |
| 8,826,446 B1 | 9/2014 | Liu et al. |
| 8,832,649 B2 | 9/2014 | Bishop et al. |
| 8,832,854 B1 | 9/2014 | Staddon et al. |
| 8,839,232 B2 | 9/2014 | Taylor et al. |
| 8,843,487 B2 | 9/2014 | McGraw et al. |
| 8,843,745 B2 | 9/2014 | Roberts, Jr. |
| 8,849,757 B2 | 9/2014 | Kruglick |
| 8,856,534 B2 | 10/2014 | Khosravi et al. |
| 8,856,936 B2 | 10/2014 | Datta Ray et al. |
| 8,862,507 B2 | 10/2014 | Sandhu et al. |
| 8,863,261 B2 | 10/2014 | Yang |
| 8,875,232 B2 | 10/2014 | Blom et al. |
| 8,893,078 B2 | 11/2014 | Schaude et al. |
| 8,893,286 B1 | 11/2014 | Oliver |
| 8,893,297 B2 | 11/2014 | Eversoll et al. |
| 8,904,494 B2 | 12/2014 | Kindler et al. |
| 8,914,263 B2 | 12/2014 | Shimada et al. |
| 8,914,299 B2 | 12/2014 | Pesci-Anderson et al. |
| 8,914,342 B2 | 12/2014 | Kalaboukis et al. |
| 8,914,902 B2 | 12/2014 | Moritz et al. |
| 8,918,306 B2 | 12/2014 | Cashman et al. |
| 8,918,392 B1 | 12/2014 | Brooker et al. |
| 8,918,632 B1 | 12/2014 | Sartor |
| 8,930,896 B1 | 1/2015 | Wiggins |
| 8,930,897 B2 | 1/2015 | Nassar |
| 8,935,198 B1 | 1/2015 | Phillips et al. |
| 8,935,266 B2 | 1/2015 | Wu |
| 8,935,342 B2 | 1/2015 | Patel |
| 8,935,804 B1 | 1/2015 | Clark et al. |
| 8,938,221 B2 | 1/2015 | Brazier et al. |
| 8,943,076 B2 | 1/2015 | Stewart et al. |
| 8,943,548 B2 | 1/2015 | Drokov et al. |
| 8,949,137 B2 | 2/2015 | Crapo et al. |
| 8,955,038 B2 | 2/2015 | Nicodemus et al. |
| 8,959,568 B2 | 2/2015 | Hudis et al. |
| 8,959,584 B2 | 2/2015 | Piliouras |
| 8,966,575 B2 | 2/2015 | McQuay et al. |
| 8,966,597 B1 | 2/2015 | Saylor et al. |
| 8,973,108 B1 | 3/2015 | Roth et al. |
| 8,977,234 B2 | 3/2015 | Chava |
| 8,977,643 B2 | 3/2015 | Schindlauer et al. |
| 8,978,158 B2 | 3/2015 | Rajkumar et al. |
| 8,983,972 B2 | 3/2015 | Kriebel et al. |
| 8,984,031 B1 | 3/2015 | Todd |
| 8,990,933 B1 | 3/2015 | Magdalin |
| 8,996,417 B1 | 3/2015 | Channakeshava |
| 8,996,480 B2 | 3/2015 | Agarwala et al. |
| 8,997,213 B2 | 3/2015 | Papakipos et al. |
| 9,003,295 B2 | 4/2015 | Baschy |
| 9,003,552 B2 | 4/2015 | Goodwin et al. |
| 9,009,851 B2 | 4/2015 | Droste et al. |
| 9,014,661 B2 | 4/2015 | Decharms |
| 9,015,796 B1 | 4/2015 | Fujioka |
| 9,021,469 B2 | 4/2015 | Hilerio et al. |
| 9,026,526 B1 | 5/2015 | Bau et al. |
| 9,030,987 B2 | 5/2015 | Bianchetti et al. |
| 9,032,067 B2 | 5/2015 | Prasad et al. |
| 9,043,217 B2 | 5/2015 | Cashman et al. |
| 9,043,480 B2 | 5/2015 | Barton et al. |
| 9,047,463 B2 | 6/2015 | Porras |
| 9,047,582 B2 | 6/2015 | Hutchinson et al. |
| 9,047,583 B2 | 6/2015 | Patton et al. |
| 9,047,639 B1 | 6/2015 | Quintiliani et al. |
| 9,049,244 B2 | 6/2015 | Prince et al. |
| 9,049,314 B2 | 6/2015 | Pugh et al. |
| 9,055,071 B1 | 6/2015 | Gates et al. |
| 9,058,590 B2 | 6/2015 | Criddle et al. |
| 9,064,033 B2 | 6/2015 | Jin et al. |
| 9,069,940 B2 | 6/2015 | Hars |
| 9,076,231 B1 | 7/2015 | Hill et al. |
| 9,077,736 B2 | 7/2015 | Werth et al. |
| 9,081,952 B2 | 7/2015 | Sagi et al. |
| 9,087,090 B1 | 7/2015 | Cormier et al. |
| 9,092,796 B2 | 7/2015 | Eversoll et al. |
| 9,094,434 B2 | 7/2015 | Williams et al. |
| 9,098,515 B2 | 8/2015 | Richter et al. |
| 9,100,778 B2 | 8/2015 | Stogaitis et al. |
| 9,106,691 B1 | 8/2015 | Burger et al. |
| 9,106,710 B1 | 8/2015 | Feimster |
| 9,110,918 B1 | 8/2015 | Rajaa et al. |
| 9,111,105 B2 | 8/2015 | Barton et al. |
| 9,111,295 B2 | 8/2015 | Tietzen et al. |
| 9,123,330 B1 | 9/2015 | Sharifi et al. |
| 9,123,339 B1 | 9/2015 | Shaw et al. |
| 9,129,311 B2 | 9/2015 | Schoen et al. |
| 9,135,261 B2 | 9/2015 | Maunder et al. |
| 9,135,444 B2 | 9/2015 | Carter et al. |
| 9,141,823 B2 | 9/2015 | Dawson |
| 9,141,911 B2 | 9/2015 | Zhao et al. |
| 9,152,818 B1 | 10/2015 | Hathaway et al. |
| 9,152,820 B1 | 10/2015 | Pauley, Jr. et al. |
| 9,154,514 B1 | 10/2015 | Prakash |
| 9,154,556 B1 | 10/2015 | Dotan et al. |
| 9,158,655 B2 | 10/2015 | Wadhwani et al. |
| 9,165,036 B2 | 10/2015 | Mehra |
| 9,170,996 B2 | 10/2015 | Lovric et al. |
| 9,172,706 B2 | 10/2015 | Krishnamurthy et al. |
| 9,177,293 B1 | 11/2015 | Gagnon et al. |
| 9,178,901 B2 | 11/2015 | Xue et al. |
| 9,183,100 B2 | 11/2015 | Gventer et al. |
| 9,189,642 B2 | 11/2015 | Perlman |
| 9,201,572 B2 | 12/2015 | Lyon et al. |
| 9,201,770 B1 | 12/2015 | Duerk |
| 9,202,026 B1 | 12/2015 | Reeves |
| 9,202,085 B2 | 12/2015 | Mawdsley et al. |
| 9,215,076 B1 | 12/2015 | Roth et al. |
| 9,215,252 B2 | 12/2015 | Smith et al. |
| 9,218,596 B2 | 12/2015 | Ronca et al. |
| 9,224,009 B1 | 12/2015 | Liu et al. |
| 9,230,036 B2 | 1/2016 | Davis |
| 9,231,935 B1 | 1/2016 | Bridge et al. |
| 9,232,040 B2 | 1/2016 | Barash et al. |
| 9,235,476 B2 | 1/2016 | McHugh et al. |
| 9,240,987 B2 | 1/2016 | Barrett-Bowen et al. |
| 9,241,259 B2 | 1/2016 | Daniela et al. |
| 9,245,126 B2 | 1/2016 | Christodorescu et al. |
| 9,245,266 B2 | 1/2016 | Hardt |
| 9,253,609 B2 | 2/2016 | Hosier, Jr. |
| 9,264,443 B2 | 2/2016 | Weisman |
| 9,274,858 B2 | 3/2016 | Milliron et al. |
| 9,280,581 B1 | 3/2016 | Grimes et al. |
| 9,286,149 B2 | 3/2016 | Sampson et al. |
| 9,286,282 B2 | 3/2016 | Ling, III et al. |
| 9,288,118 B1 | 3/2016 | Pattan |
| 9,288,556 B2 | 3/2016 | Kim et al. |
| 9,294,498 B1 | 3/2016 | Yampolskiy et al. |

(56) References Cited

U.S. PATENT DOCUMENTS

| | | |
|---|---|---|
| 9,299,050 B2 | 3/2016 | Stiffler et al. |
| 9,306,939 B2 | 4/2016 | Chan et al. |
| 9,317,697 B2 | 4/2016 | Maier et al. |
| 9,317,715 B2 | 4/2016 | Schuette et al. |
| 9,325,731 B2 | 4/2016 | McGeehan |
| 9,336,184 B2 | 5/2016 | Mital et al. |
| 9,336,220 B2 | 5/2016 | Li et al. |
| 9,336,324 B2 | 5/2016 | Lomme et al. |
| 9,336,332 B2 | 5/2016 | Davis et al. |
| 9,336,400 B2 | 5/2016 | Milman et al. |
| 9,338,188 B1 | 5/2016 | Ahn |
| 9,342,706 B2 | 5/2016 | Chawla et al. |
| 9,344,297 B2 | 5/2016 | Shah et al. |
| 9,344,424 B2 | 5/2016 | Tenenboym et al. |
| 9,344,484 B2 | 5/2016 | Ferris |
| 9,348,802 B2 | 5/2016 | Massand |
| 9,348,862 B2 | 5/2016 | Kawecki, III |
| 9,348,929 B2 | 5/2016 | Eberlein |
| 9,349,016 B1 | 5/2016 | Brisebois et al. |
| 9,350,718 B2 | 5/2016 | Sondhi et al. |
| 9,355,157 B2 | 5/2016 | Mohammed et al. |
| 9,356,961 B1 | 5/2016 | Todd et al. |
| 9,361,446 B1 | 6/2016 | Demirjian et al. |
| 9,369,488 B2 | 6/2016 | Woods et al. |
| 9,374,693 B1 | 6/2016 | Olincy et al. |
| 9,384,199 B2 | 7/2016 | Thereska et al. |
| 9,384,357 B2 | 7/2016 | Patil et al. |
| 9,386,078 B2 | 7/2016 | Reno et al. |
| 9,386,104 B2 | 7/2016 | Adams et al. |
| 9,395,959 B2 | 7/2016 | Hatfield et al. |
| 9,396,332 B2 | 7/2016 | Abrams et al. |
| 9,401,900 B2 | 7/2016 | Levasseur et al. |
| 9,411,967 B2 | 8/2016 | Parecki et al. |
| 9,411,982 B1 | 8/2016 | Dippenaar et al. |
| 9,417,859 B2 | 8/2016 | Gounares et al. |
| 9,424,021 B2 | 8/2016 | Zamir |
| 9,424,414 B1 | 8/2016 | Demirjian et al. |
| 9,426,177 B2 | 8/2016 | Wang et al. |
| 9,450,940 B2 | 9/2016 | Belov et al. |
| 9,460,136 B1 | 10/2016 | Todd et al. |
| 9,460,171 B2 | 10/2016 | Marrelli et al. |
| 9,460,307 B2 | 10/2016 | Breslau et al. |
| 9,461,876 B2 | 10/2016 | Van Dusen et al. |
| 9,462,009 B1 | 10/2016 | Kolman et al. |
| 9,465,702 B2 | 10/2016 | Gventer et al. |
| 9,465,800 B2 | 10/2016 | Lacey |
| 9,473,446 B2 | 10/2016 | Vijay et al. |
| 9,473,505 B1 | 10/2016 | Asano et al. |
| 9,473,535 B2 | 10/2016 | Sartor |
| 9,477,523 B1 | 10/2016 | Warman et al. |
| 9,477,660 B2 | 10/2016 | Scott et al. |
| 9,477,685 B1 | 10/2016 | Leung et al. |
| 9,477,942 B2 | 10/2016 | Adachi et al. |
| 9,483,659 B2 | 11/2016 | Bao et al. |
| 9,489,366 B2 | 11/2016 | Scott et al. |
| 9,495,547 B1 | 11/2016 | Schepis et al. |
| 9,501,523 B2 | 11/2016 | Hyatt et al. |
| 9,507,960 B2 | 11/2016 | Bell et al. |
| 9,509,674 B1 | 11/2016 | Nasserbakht et al. |
| 9,509,702 B2 | 11/2016 | Grigg et al. |
| 9,514,231 B2 | 12/2016 | Eden |
| 9,516,012 B2 | 12/2016 | Chochois et al. |
| 9,521,166 B2 | 12/2016 | Wilson |
| 9,524,500 B2 | 12/2016 | Dave et al. |
| 9,529,989 B2 | 12/2016 | Kling et al. |
| 9,536,108 B2 | 1/2017 | Powell et al. |
| 9,537,546 B2 | 1/2017 | Cordeiro et al. |
| 9,542,568 B2 | 1/2017 | Francis et al. |
| 9,549,047 B1 | 1/2017 | Fredinburg et al. |
| 9,552,395 B2 | 1/2017 | Bayer et al. |
| 9,552,470 B2 | 1/2017 | Turgeman et al. |
| 9,553,918 B1 | 1/2017 | Manion et al. |
| 9,558,497 B2 | 1/2017 | Carvalho |
| 9,569,752 B2 | 2/2017 | Deering et al. |
| 9,571,509 B1 | 2/2017 | Satish et al. |
| 9,571,526 B2 | 2/2017 | Sartor |
| 9,571,559 B2 | 2/2017 | Raleigh et al. |
| 9,571,991 B1 | 2/2017 | Brizendine et al. |
| 9,576,289 B2 | 2/2017 | Henderson et al. |
| 9,578,060 B1 | 2/2017 | Brisebois et al. |
| 9,578,173 B2 | 2/2017 | Sanghavi et al. |
| 9,582,681 B2 | 2/2017 | Mishra |
| 9,584,964 B2 | 2/2017 | Pelkey |
| 9,589,110 B2 | 3/2017 | Carey et al. |
| 9,600,181 B2 | 3/2017 | Patel et al. |
| 9,602,529 B2 | 3/2017 | Jones et al. |
| 9,606,971 B2 | 3/2017 | Seolas et al. |
| 9,607,041 B2 | 3/2017 | Himmelstein |
| 9,619,652 B2 | 4/2017 | Slater |
| 9,619,661 B1 | 4/2017 | Finkelstein |
| 9,621,357 B2 | 4/2017 | Williams et al. |
| 9,621,566 B2 | 4/2017 | Gupta et al. |
| 9,626,124 B2 | 4/2017 | Lipinski et al. |
| 9,626,680 B1 | 4/2017 | Ryan et al. |
| 9,629,064 B2 | 4/2017 | Graves et al. |
| 9,642,008 B2 | 5/2017 | Wyatt et al. |
| 9,646,095 B1 | 5/2017 | Gottlieb et al. |
| 9,647,949 B2 | 5/2017 | Varki et al. |
| 9,648,036 B2 | 5/2017 | Seiver et al. |
| 9,652,314 B2 | 5/2017 | Mahiddini |
| 9,654,506 B2 | 5/2017 | Barrett |
| 9,654,541 B1 | 5/2017 | Kapczynski et al. |
| 9,665,722 B2 | 5/2017 | Nagasundaram et al. |
| 9,665,733 B1 | 5/2017 | Sills et al. |
| 9,665,883 B2 | 5/2017 | Roullier et al. |
| 9,672,053 B2 | 6/2017 | Tang et al. |
| 9,672,355 B2 | 6/2017 | Titonis et al. |
| 9,678,794 B1 | 6/2017 | Barrett et al. |
| 9,691,090 B1 | 6/2017 | Barday |
| 9,699,209 B2 | 7/2017 | Ng et al. |
| 9,703,549 B2 | 7/2017 | Dufresne |
| 9,704,103 B2 | 7/2017 | Suskind et al. |
| 9,705,840 B2 | 7/2017 | Pujare et al. |
| 9,705,880 B2 | 7/2017 | Siris |
| 9,721,078 B2 | 8/2017 | Cornick et al. |
| 9,721,108 B2 | 8/2017 | Krishnamurthy et al. |
| 9,727,751 B2 | 8/2017 | Oliver et al. |
| 9,729,583 B1 | 8/2017 | Barday |
| 9,734,148 B2 | 8/2017 | Bendersky et al. |
| 9,734,255 B2 | 8/2017 | Jiang |
| 9,736,004 B2 | 8/2017 | Jung et al. |
| 9,740,985 B2 | 8/2017 | Byron et al. |
| 9,740,987 B2 | 8/2017 | Dolan |
| 9,749,408 B2 | 8/2017 | Subramani et al. |
| 9,754,091 B2 | 9/2017 | Kode et al. |
| 9,756,059 B2 | 9/2017 | Demirjian et al. |
| 9,760,620 B2 | 9/2017 | Nachnani et al. |
| 9,760,635 B2 | 9/2017 | Bliss et al. |
| 9,760,697 B1 | 9/2017 | Walker |
| 9,760,849 B2 | 9/2017 | Vinnakota et al. |
| 9,762,553 B2 | 9/2017 | Ford et al. |
| 9,767,202 B2 | 9/2017 | Darby et al. |
| 9,767,309 B1 | 9/2017 | Patel et al. |
| 9,769,124 B2 | 9/2017 | Yan |
| 9,773,269 B1 | 9/2017 | Lazarus |
| 9,785,795 B2 | 10/2017 | Grondin et al. |
| 9,787,671 B1 | 10/2017 | Bogrett |
| 9,798,749 B2 | 10/2017 | Saner |
| 9,798,826 B2 | 10/2017 | Wilson et al. |
| 9,798,896 B2 | 10/2017 | Jakobsson |
| 9,800,605 B2 | 10/2017 | Baikalov et al. |
| 9,800,606 B1 | 10/2017 | Yumer |
| 9,804,649 B2 | 10/2017 | Cohen et al. |
| 9,804,928 B2 | 10/2017 | Davis et al. |
| 9,805,381 B2 | 10/2017 | Frank et al. |
| 9,811,532 B2 | 11/2017 | Parkison et al. |
| 9,817,850 B2 | 11/2017 | Dubbels et al. |
| 9,817,978 B2 | 11/2017 | Marsh et al. |
| 9,819,684 B2 | 11/2017 | Cernoch et al. |
| 9,825,928 B2 | 11/2017 | Lelcuk et al. |
| 9,830,563 B2 | 11/2017 | Paknad |
| 9,832,633 B2 | 11/2017 | Gerber, Jr. et al. |
| 9,836,598 B2 | 12/2017 | Iyer et al. |
| 9,838,407 B1 | 12/2017 | Oprea et al. |

(56) References Cited

U.S. PATENT DOCUMENTS

| | | |
|---|---|---|
| 9,838,839 B2 | 12/2017 | Vudali et al. |
| 9,841,969 B2 | 12/2017 | Seibert, Jr. et al. |
| 9,842,042 B2 | 12/2017 | Chhatwal et al. |
| 9,842,349 B2 | 12/2017 | Sawczuk et al. |
| 9,848,005 B2 | 12/2017 | Ardeli et al. |
| 9,848,061 B1 | 12/2017 | Jain et al. |
| 9,852,150 B2 | 12/2017 | Sharpe et al. |
| 9,853,959 B1 | 12/2017 | Kapczynski et al. |
| 9,860,226 B2 | 1/2018 | Thormaehlen |
| 9,864,735 B1 | 1/2018 | Lamprecht |
| 9,876,825 B2 | 1/2018 | Amar et al. |
| 9,877,138 B1 | 1/2018 | Franklin |
| 9,880,157 B2 | 1/2018 | Levak et al. |
| 9,882,935 B2 | 1/2018 | Barday |
| 9,887,965 B2 | 2/2018 | Kay et al. |
| 9,888,377 B1 | 2/2018 | McCorkendale et al. |
| 9,892,441 B2 | 2/2018 | Barday |
| 9,892,442 B2 | 2/2018 | Barday |
| 9,892,443 B2 | 2/2018 | Barday |
| 9,892,444 B2 | 2/2018 | Barday |
| 9,894,076 B2 | 2/2018 | Li et al. |
| 9,898,613 B1 | 2/2018 | Swerdlow et al. |
| 9,898,739 B2 | 2/2018 | Monastyrsky et al. |
| 9,898,769 B2 | 2/2018 | Barday |
| 9,912,625 B2 | 3/2018 | Mutha et al. |
| 9,912,677 B2 | 3/2018 | Chien |
| 9,912,810 B2 | 3/2018 | Segre et al. |
| 9,916,703 B2 | 3/2018 | Levinson et al. |
| 9,922,124 B2 | 3/2018 | Rathod |
| 9,923,927 B1 | 3/2018 | McClintock et al. |
| 9,928,379 B1 | 3/2018 | Hoffer |
| 9,934,493 B2 | 4/2018 | Castinado et al. |
| 9,934,544 B1 | 4/2018 | Whitfield et al. |
| 9,936,127 B2 | 4/2018 | Todasco |
| 9,942,214 B1 | 4/2018 | Burciu et al. |
| 9,942,244 B2 | 4/2018 | Lahoz et al. |
| 9,942,276 B2 | 4/2018 | Sartor |
| 9,946,897 B2 | 4/2018 | Lovin |
| 9,948,652 B2 | 4/2018 | Yu et al. |
| 9,948,663 B1 | 4/2018 | Wang et al. |
| 9,953,189 B2 | 4/2018 | Cook et al. |
| 9,954,879 B1 | 4/2018 | Sadaghiani et al. |
| 9,954,883 B2 | 4/2018 | Ahuja et al. |
| 9,959,551 B1 | 5/2018 | Schermerhorn et al. |
| 9,959,582 B2 | 5/2018 | Sukman et al. |
| 9,961,070 B2 | 5/2018 | Tang |
| 9,973,518 B2 | 5/2018 | Lee et al. |
| 9,973,585 B2 | 5/2018 | Ruback et al. |
| 9,977,904 B2 | 5/2018 | Khan et al. |
| 9,977,920 B2 | 5/2018 | Danielson et al. |
| 9,983,936 B2 | 5/2018 | Dornemann et al. |
| 9,984,252 B2 | 5/2018 | Pollard |
| 9,990,499 B2 | 6/2018 | Chan et al. |
| 9,992,213 B2 | 6/2018 | Sinnema |
| 10,001,975 B2 | 6/2018 | Bharthulwar |
| 10,002,064 B2 | 6/2018 | Muske |
| 10,007,895 B2 | 6/2018 | Vanasco |
| 10,013,577 B1 | 7/2018 | Beaumont et al. |
| 10,015,164 B2 | 7/2018 | Hamburg et al. |
| 10,019,339 B2 | 7/2018 | Von Hanxleden et al. |
| 10,019,588 B2 | 7/2018 | Garcia et al. |
| 10,019,591 B1 | 7/2018 | Beguin |
| 10,019,741 B2 | 7/2018 | Hesselink |
| 10,021,143 B2 | 7/2018 | Cabrera et al. |
| 10,025,804 B2 | 7/2018 | Vranyes et al. |
| 10,025,836 B2 | 7/2018 | Batchu et al. |
| 10,028,226 B2 | 7/2018 | Ayyagari et al. |
| 10,032,172 B2 | 7/2018 | Barday |
| 10,044,761 B2 | 8/2018 | Ducatel et al. |
| 10,055,426 B2 | 8/2018 | Arasan et al. |
| 10,055,869 B2 | 8/2018 | Borrelli et al. |
| 10,061,847 B2 | 8/2018 | Mohammed et al. |
| 10,069,858 B2 | 9/2018 | Robinson et al. |
| 10,069,914 B1 | 9/2018 | Smith |
| 10,073,924 B2 | 9/2018 | Karp et al. |
| 10,075,437 B1 | 9/2018 | Costigan et al. |
| 10,075,451 B1 | 9/2018 | Hall et al. |
| 10,084,817 B2 | 9/2018 | Saher et al. |
| 10,091,214 B2 | 10/2018 | Godlewski et al. |
| 10,091,312 B1 | 10/2018 | Khanwalkar et al. |
| 10,102,533 B2 | 10/2018 | Barday |
| 10,108,409 B2 | 10/2018 | Pirzadeh et al. |
| 10,122,663 B2 | 11/2018 | Hu et al. |
| 10,122,760 B2 | 11/2018 | Terrill et al. |
| 10,127,403 B2 | 11/2018 | Kong et al. |
| 10,129,211 B2 | 11/2018 | Heath |
| 10,140,666 B1 | 11/2018 | Wang et al. |
| 10,142,113 B2 | 11/2018 | Zaidi et al. |
| 10,152,560 B2 | 12/2018 | Potiagalov et al. |
| 10,158,676 B2 | 12/2018 | Barday |
| 10,165,011 B2 | 12/2018 | Barday |
| 10,169,762 B2 | 1/2019 | Ogawa |
| 10,176,503 B2 | 1/2019 | Barday et al. |
| 10,181,043 B1 | 1/2019 | Pauley, Jr. et al. |
| 10,181,051 B2 | 1/2019 | Barday et al. |
| 10,187,363 B2 | 1/2019 | Smirnoff et al. |
| 10,187,394 B2 | 1/2019 | Bar et al. |
| 10,204,154 B2 | 2/2019 | Barday et al. |
| 10,205,994 B2 | 2/2019 | Splaine et al. |
| 10,212,134 B2 | 2/2019 | Rai |
| 10,212,175 B2 | 2/2019 | Seul et al. |
| 10,223,533 B2 | 3/2019 | Dawson |
| 10,230,571 B2 | 3/2019 | Rangasamy et al. |
| 10,250,594 B2 | 4/2019 | Chathoth et al. |
| 10,255,602 B2 | 4/2019 | Wang |
| 10,257,127 B2 | 4/2019 | Dotan-Cohen et al. |
| 10,257,181 B1 | 4/2019 | Sherif et al. |
| 10,268,838 B2 | 4/2019 | Yadgiri et al. |
| 10,275,221 B2 | 4/2019 | Thattai et al. |
| 10,275,614 B2 | 4/2019 | Barday et al. |
| 10,282,370 B1 | 5/2019 | Barday et al. |
| 10,282,559 B2 | 5/2019 | Barday et al. |
| 10,284,604 B2 | 5/2019 | Barday et al. |
| 10,289,584 B2 | 5/2019 | Chiba |
| 10,289,857 B1 | 5/2019 | Brinskelle |
| 10,289,866 B2 | 5/2019 | Barday et al. |
| 10,289,867 B2 | 5/2019 | Barday et al. |
| 10,289,870 B2 | 5/2019 | Barday et al. |
| 10,296,504 B2 | 5/2019 | Hock et al. |
| 10,304,442 B1 | 5/2019 | Rudden et al. |
| 10,310,723 B2 | 6/2019 | Rathod |
| 10,311,042 B1 | 6/2019 | Kumar |
| 10,311,475 B2 | 6/2019 | Yuasa |
| 10,311,492 B2 | 6/2019 | Gelfenbeyn et al. |
| 10,318,761 B2 | 6/2019 | Barday et al. |
| 10,320,940 B1 | 6/2019 | Brennan et al. |
| 10,324,960 B1 | 6/2019 | Skvortsov et al. |
| 10,326,768 B2 | 6/2019 | Verweyst et al. |
| 10,326,798 B2 | 6/2019 | Lambert |
| 10,326,841 B2 | 6/2019 | Bradley et al. |
| 10,331,689 B2 | 6/2019 | Sorrentino et al. |
| 10,331,904 B2 | 6/2019 | Sher-Jan et al. |
| 10,333,975 B2 | 6/2019 | Soman et al. |
| 10,346,186 B2 | 7/2019 | Kalyanpur |
| 10,346,635 B2 | 7/2019 | Kumar et al. |
| 10,346,637 B2 | 7/2019 | Barday et al. |
| 10,346,638 B2 | 7/2019 | Barday et al. |
| 10,346,849 B2 | 7/2019 | Ionescu et al. |
| 10,348,726 B2 | 7/2019 | Caluwaert |
| 10,348,775 B2 | 7/2019 | Barday |
| 10,353,673 B2 | 7/2019 | Barday et al. |
| 10,361,857 B2 | 7/2019 | Woo |
| 10,366,241 B2 | 7/2019 | Sartor |
| 10,373,119 B2 | 8/2019 | Driscoll et al. |
| 10,373,409 B2 | 8/2019 | White et al. |
| 10,375,115 B2 | 8/2019 | Mallya |
| 10,387,559 B2 | 8/2019 | Wendt et al. |
| 10,387,577 B2 | 8/2019 | Hill et al. |
| 10,387,657 B2 | 8/2019 | Belfiore, Jr. et al. |
| 10,387,952 B1 | 8/2019 | Sandhu et al. |
| 10,395,201 B2 | 8/2019 | Vescio |
| 10,402,545 B2 | 9/2019 | Gorfein et al. |
| 10,404,729 B2 | 9/2019 | Turgeman |
| 10,417,401 B2 | 9/2019 | Votaw et al. |

(56) References Cited

U.S. PATENT DOCUMENTS

| | | |
|---|---|---|
| 10,417,621 B2 | 9/2019 | Cassel et al. |
| 10,419,476 B2 | 9/2019 | Parekh |
| 10,423,985 B1 | 9/2019 | Dutta et al. |
| 10,425,492 B2 | 9/2019 | Comstock et al. |
| 10,430,608 B2 | 10/2019 | Peri et al. |
| 10,435,350 B2 | 10/2019 | Ito et al. |
| 10,437,412 B2 | 10/2019 | Barday et al. |
| 10,437,860 B2 | 10/2019 | Barday et al. |
| 10,438,016 B2 | 10/2019 | Barday et al. |
| 10,438,273 B2 | 10/2019 | Burns et al. |
| 10,440,062 B2 | 10/2019 | Barday et al. |
| 10,445,508 B2 | 10/2019 | Sher-Jan et al. |
| 10,445,526 B2 | 10/2019 | Barday et al. |
| 10,452,864 B2 | 10/2019 | Barday et al. |
| 10,452,866 B2 | 10/2019 | Barday et al. |
| 10,453,076 B2 | 10/2019 | Parekh et al. |
| 10,453,092 B1 | 10/2019 | Wang et al. |
| 10,454,934 B2 | 10/2019 | Parimi et al. |
| 10,481,763 B2 | 11/2019 | Bartkiewicz et al. |
| 10,489,454 B1 | 11/2019 | Chen |
| 10,503,926 B2 | 12/2019 | Barday et al. |
| 10,510,031 B2 | 12/2019 | Barday et al. |
| 10,521,623 B2 | 12/2019 | Rodriguez et al. |
| 10,534,851 B1 | 1/2020 | Chan et al. |
| 10,535,081 B2 | 1/2020 | Ferreira et al. |
| 10,536,475 B1 | 1/2020 | McCorkle, Jr. et al. |
| 10,536,478 B2 | 1/2020 | Kirti et al. |
| 10,541,938 B1 | 1/2020 | Timmerman et al. |
| 10,546,135 B1 | 1/2020 | Kassoumeh et al. |
| 10,552,462 B1 | 2/2020 | Hart |
| 10,558,809 B1 | 2/2020 | Joyce et al. |
| 10,558,821 B2 | 2/2020 | Barday et al. |
| 10,564,815 B2 | 2/2020 | Soon-Shiong |
| 10,564,935 B2 | 2/2020 | Barday et al. |
| 10,564,936 B2 | 2/2020 | Barday et al. |
| 10,565,161 B2 | 2/2020 | Barday et al. |
| 10,565,236 B1 | 2/2020 | Barday et al. |
| 10,567,439 B2 | 2/2020 | Barday |
| 10,567,517 B2 | 2/2020 | Weinig et al. |
| 10,572,684 B2 | 2/2020 | Lafever et al. |
| 10,572,686 B2 | 2/2020 | Barday et al. |
| 10,574,705 B2 | 2/2020 | Barday et al. |
| 10,581,825 B2 | 3/2020 | Poschel et al. |
| 10,592,648 B2 | 3/2020 | Barday et al. |
| 10,592,692 B2 | 3/2020 | Brannon et al. |
| 10,606,916 B2 | 3/2020 | Brannon et al. |
| 10,613,971 B1 | 4/2020 | Vasikarla |
| 10,628,553 B1 | 4/2020 | Murrish et al. |
| 10,645,102 B2 | 5/2020 | Hamdi |
| 10,645,548 B2 | 5/2020 | Reynolds et al. |
| 10,649,630 B1 | 5/2020 | Vora et al. |
| 10,650,408 B1 | 5/2020 | Andersen et al. |
| 10,657,469 B2 | 5/2020 | Bade et al. |
| 10,657,504 B1 | 5/2020 | Zimmerman et al. |
| 10,659,566 B1 | 5/2020 | Luah et al. |
| 10,671,749 B2 | 6/2020 | Felice-Steele et al. |
| 10,671,760 B2 | 6/2020 | Esmailzadeh et al. |
| 10,678,945 B2 | 6/2020 | Barday et al. |
| 10,685,140 B2 | 6/2020 | Barday et al. |
| 10,706,176 B2 | 7/2020 | Brannon et al. |
| 10,706,226 B2 | 7/2020 | Byun et al. |
| 10,708,305 B2 | 7/2020 | Barday et al. |
| 10,713,387 B2 | 7/2020 | Brannon et al. |
| 10,726,145 B2 | 7/2020 | Duminy et al. |
| 10,726,153 B2 | 7/2020 | Nerurkar et al. |
| 10,726,158 B2 | 7/2020 | Brannon et al. |
| 10,732,865 B2 | 8/2020 | Jain et al. |
| 10,735,388 B2 | 8/2020 | Rose et al. |
| 10,740,487 B2 | 8/2020 | Barday et al. |
| 10,747,893 B2 | 8/2020 | Kiriyama et al. |
| 10,747,897 B2 | 8/2020 | Cook |
| 10,749,870 B2 | 8/2020 | Brouillette et al. |
| 10,762,213 B2 | 9/2020 | Rudek et al. |
| 10,762,236 B2 | 9/2020 | Brannon et al. |
| 10,769,302 B2 | 9/2020 | Barday et al. |
| 10,769,303 B2 | 9/2020 | Brannon et al. |
| 10,776,510 B2 | 9/2020 | Antonelli et al. |
| 10,776,518 B2 | 9/2020 | Barday et al. |
| 10,778,792 B1 | 9/2020 | Handy Bosma et al. |
| 10,785,173 B2 | 9/2020 | Willett et al. |
| 10,785,299 B2 | 9/2020 | Gupta et al. |
| 10,791,150 B2 | 9/2020 | Barday et al. |
| 10,795,527 B1 | 10/2020 | Legge et al. |
| 10,796,020 B2 | 10/2020 | Barday et al. |
| 10,796,260 B2 | 10/2020 | Brannon et al. |
| 10,798,133 B2 | 10/2020 | Barday et al. |
| 10,803,196 B2 | 10/2020 | Bodegas Martinez et al. |
| 10,805,331 B2 | 10/2020 | Boyer et al. |
| 10,831,831 B2 | 11/2020 | Greene |
| 10,834,590 B2 | 11/2020 | Turgeman et al. |
| 10,846,433 B2 | 11/2020 | Brannon et al. |
| 10,853,501 B2 | 12/2020 | Brannon |
| 10,860,721 B1 | 12/2020 | Gentile |
| 10,860,742 B2 | 12/2020 | Joseph et al. |
| 10,860,979 B2 | 12/2020 | Geffen et al. |
| 10,878,127 B2 | 12/2020 | Brannon et al. |
| 10,885,485 B2 | 1/2021 | Brannon et al. |
| 10,891,393 B2 | 1/2021 | Currier et al. |
| 10,893,074 B2 | 1/2021 | Sartor |
| 10,896,394 B2 | 1/2021 | Brannon et al. |
| 10,902,490 B2 | 1/2021 | He et al. |
| 10,909,488 B2 | 2/2021 | Hecht et al. |
| 10,924,514 B1 | 2/2021 | Altman et al. |
| 10,929,557 B2 | 2/2021 | Chavez |
| 10,949,555 B2 | 3/2021 | Rattan et al. |
| 10,949,565 B2 | 3/2021 | Barday et al. |
| 10,957,326 B2 | 3/2021 | Bhaya et al. |
| 10,963,571 B2 | 3/2021 | Bar et al. |
| 10,963,572 B2 | 3/2021 | Belfiore, Jr. et al. |
| 10,965,547 B1 | 3/2021 | Esposito et al. |
| 10,970,418 B2 | 4/2021 | Durvasula et al. |
| 10,972,509 B2 | 4/2021 | Barday et al. |
| 10,976,950 B1 | 4/2021 | Trezzo et al. |
| 10,983,963 B2 | 4/2021 | Venkatasubramanian et al. |
| 10,984,458 B1 | 4/2021 | Gutierrez |
| 10,997,318 B2 | 5/2021 | Barday et al. |
| 11,003,748 B2 | 5/2021 | Oliker et al. |
| 11,012,475 B2 | 5/2021 | Patnala et al. |
| 11,023,528 B1 | 6/2021 | Lee et al. |
| 11,037,168 B1 | 6/2021 | Lee et al. |
| 11,057,356 B2 | 7/2021 | Malhotra et al. |
| 11,057,427 B2 | 7/2021 | Wright et al. |
| 11,062,051 B2 | 7/2021 | Barday et al. |
| 11,068,318 B2 | 7/2021 | Kuesel et al. |
| 11,068,584 B2 | 7/2021 | Burriesci et al. |
| 11,068,618 B2 | 7/2021 | Brannon et al. |
| 11,068,797 B2 | 7/2021 | Bhide et al. |
| 11,068,847 B2 | 7/2021 | Boutros et al. |
| 11,093,950 B2 | 8/2021 | Hersh et al. |
| 11,138,299 B2 | 10/2021 | Brannon et al. |
| 11,144,622 B2 | 10/2021 | Brannon |
| 11,144,678 B2 | 10/2021 | Dondini et al. |
| 11,144,862 B1 | 10/2021 | Jackson et al. |
| 11,195,134 B2 | 12/2021 | Brannon |
| 11,201,929 B2 | 12/2021 | Dudmesh et al. |
| 11,238,390 B2 | 2/2022 | Brannon |
| 11,240,273 B2 | 2/2022 | Barday et al. |
| 11,252,159 B2 | 2/2022 | Kannan et al. |
| 11,256,777 B2 | 2/2022 | Brannon et al. |
| 11,263,262 B2 | 3/2022 | Chen |
| 11,327,996 B2 | 5/2022 | Reynolds et al. |
| 2002/0004736 A1 | 1/2002 | Roundtree et al. |
| 2002/0049907 A1 | 4/2002 | Woods et al. |
| 2002/0055932 A1 | 5/2002 | Wheeler et al. |
| 2002/0077941 A1 | 6/2002 | Halligan et al. |
| 2002/0103854 A1 | 8/2002 | Okita |
| 2002/0129216 A1 | 9/2002 | Collins |
| 2002/0161594 A1 | 10/2002 | Bryan et al. |
| 2002/0161733 A1 | 10/2002 | Grainger |
| 2003/0041250 A1 | 2/2003 | Proudler |
| 2003/0065641 A1 | 4/2003 | Chaloux |
| 2003/0093680 A1 | 5/2003 | Astley et al. |
| 2003/0097451 A1 | 5/2003 | Bjorksten et al. |
| 2003/0097661 A1 | 5/2003 | Li et al. |

(56) References Cited

U.S. PATENT DOCUMENTS

| | | |
|---|---|---|
| 2003/0115142 A1 | 6/2003 | Brickell et al. |
| 2003/0130893 A1 | 7/2003 | Farmer |
| 2003/0131001 A1 | 7/2003 | Matsuo |
| 2003/0131093 A1 | 7/2003 | Aschen et al. |
| 2003/0140150 A1 | 7/2003 | Kemp et al. |
| 2003/0167216 A1 | 9/2003 | Brown et al. |
| 2003/0212604 A1 | 11/2003 | Cullen |
| 2004/0002818 A1 | 1/2004 | Kulp et al. |
| 2004/0025053 A1 | 2/2004 | Hayward |
| 2004/0088235 A1 | 5/2004 | Ziekle et al. |
| 2004/0098366 A1 | 5/2004 | Sinclair et al. |
| 2004/0098493 A1 | 5/2004 | Rees |
| 2004/0111359 A1 | 6/2004 | Hudock |
| 2004/0186912 A1 | 9/2004 | Harlow et al. |
| 2004/0193907 A1 | 9/2004 | Patanella |
| 2005/0022198 A1 | 1/2005 | Olapurath et al. |
| 2005/0033616 A1 | 2/2005 | Vavul et al. |
| 2005/0076294 A1 | 4/2005 | Dehamer et al. |
| 2005/0114343 A1 | 5/2005 | Wesinger, Jr. et al. |
| 2005/0144066 A1 | 6/2005 | Cope et al. |
| 2005/0197884 A1 | 9/2005 | Mullen, Jr. |
| 2005/0198177 A1 | 9/2005 | Black |
| 2005/0198646 A1 | 9/2005 | Kortela |
| 2005/0246292 A1 | 11/2005 | Sarcanin |
| 2005/0278538 A1 | 12/2005 | Fowler |
| 2006/0031078 A1 | 2/2006 | Pizzinger et al. |
| 2006/0035204 A1 | 2/2006 | Lamarche et al. |
| 2006/0075122 A1 | 4/2006 | Lindskog et al. |
| 2006/0149730 A1 | 7/2006 | Curtis |
| 2006/0156052 A1 | 7/2006 | Bodnar et al. |
| 2006/0190280 A1 | 8/2006 | Hoebel et al. |
| 2006/0206375 A1 | 9/2006 | Scott et al. |
| 2006/0224422 A1 | 10/2006 | Cohen |
| 2006/0253597 A1 | 11/2006 | Mujica |
| 2006/0259416 A1 | 11/2006 | Johnson |
| 2007/0011058 A1 | 1/2007 | Dev |
| 2007/0027715 A1 | 2/2007 | Gropper et al. |
| 2007/0061125 A1 | 3/2007 | Bhatt et al. |
| 2007/0061393 A1 | 3/2007 | Moore |
| 2007/0130101 A1 | 6/2007 | Anderson et al. |
| 2007/0130323 A1 | 6/2007 | Landsman et al. |
| 2007/0157311 A1 | 7/2007 | Meier et al. |
| 2007/0173355 A1 | 7/2007 | Klein |
| 2007/0179793 A1 | 8/2007 | Bagchi et al. |
| 2007/0180490 A1 | 8/2007 | Renzi et al. |
| 2007/0192438 A1 | 8/2007 | Goei |
| 2007/0266420 A1 | 11/2007 | Hawkins et al. |
| 2007/0283171 A1 | 12/2007 | Breslin et al. |
| 2008/0015927 A1 | 1/2008 | Ramirez |
| 2008/0028065 A1 | 1/2008 | Caso et al. |
| 2008/0028435 A1 | 1/2008 | Strickland et al. |
| 2008/0047016 A1 | 2/2008 | Spoonamore |
| 2008/0120699 A1 | 5/2008 | Spear |
| 2008/0140696 A1 | 6/2008 | Mathuria |
| 2008/0189306 A1 | 8/2008 | Hewett et al. |
| 2008/0195436 A1 | 8/2008 | Whyte |
| 2008/0222271 A1 | 9/2008 | Spires |
| 2008/0235177 A1 | 9/2008 | Kim et al. |
| 2008/0270203 A1 | 10/2008 | Holmes et al. |
| 2008/0270351 A1 | 10/2008 | Thomsen |
| 2008/0270381 A1 | 10/2008 | Thomsen |
| 2008/0270382 A1 | 10/2008 | Thomsen et al. |
| 2008/0270451 A1 | 10/2008 | Thomsen et al. |
| 2008/0270462 A1 | 10/2008 | Thomsen |
| 2008/0281649 A1 | 11/2008 | Morris |
| 2008/0282320 A1 | 11/2008 | Denovo et al. |
| 2008/0288271 A1 | 11/2008 | Faust |
| 2008/0288299 A1 | 11/2008 | Schultz |
| 2009/0012896 A1 | 1/2009 | Arnold |
| 2009/0022301 A1 | 1/2009 | Mudaliar |
| 2009/0037975 A1 | 2/2009 | Ishikawa et al. |
| 2009/0119500 A1 | 5/2009 | Roth et al. |
| 2009/0132419 A1 | 5/2009 | Grammer et al. |
| 2009/0138276 A1 | 5/2009 | Hayashida et al. |
| 2009/0140035 A1 | 6/2009 | Miller |
| 2009/0144702 A1 | 6/2009 | Atkin et al. |
| 2009/0158249 A1 | 6/2009 | Tomkins et al. |
| 2009/0172705 A1 | 7/2009 | Cheong |
| 2009/0182818 A1 | 7/2009 | Krywaniuk |
| 2009/0187764 A1 | 7/2009 | Astakhov et al. |
| 2009/0204452 A1 | 8/2009 | Iskandar et al. |
| 2009/0204820 A1 | 8/2009 | Brandenburg et al. |
| 2009/0210347 A1 | 8/2009 | Sarcanin |
| 2009/0216610 A1 | 8/2009 | Chorny |
| 2009/0249076 A1 | 10/2009 | Reed et al. |
| 2009/0303237 A1 | 12/2009 | Liu et al. |
| 2010/0010912 A1 | 1/2010 | Jones et al. |
| 2010/0010968 A1 | 1/2010 | Redlich et al. |
| 2010/0077484 A1 | 3/2010 | Paretti et al. |
| 2010/0082533 A1 | 4/2010 | Nakamura et al. |
| 2010/0094650 A1 | 4/2010 | Tran et al. |
| 2010/0100398 A1 | 4/2010 | Auker et al. |
| 2010/0121773 A1 | 5/2010 | Currier et al. |
| 2010/0192201 A1 | 7/2010 | Shimoni et al. |
| 2010/0205057 A1 | 8/2010 | Hook et al. |
| 2010/0223349 A1 | 9/2010 | Thorson |
| 2010/0228786 A1 | 9/2010 | Török |
| 2010/0234987 A1 | 9/2010 | Benschop et al. |
| 2010/0235297 A1 | 9/2010 | Mamorsky |
| 2010/0235915 A1 | 9/2010 | Memon et al. |
| 2010/0262624 A1 | 10/2010 | Pullikottil |
| 2010/0268628 A1 | 10/2010 | Pitkow et al. |
| 2010/0268932 A1 | 10/2010 | Bhattacharjee |
| 2010/0281313 A1 | 11/2010 | White et al. |
| 2010/0287114 A1 | 11/2010 | Bartko et al. |
| 2010/0333012 A1 | 12/2010 | Adachi et al. |
| 2011/0006996 A1 | 1/2011 | Smith et al. |
| 2011/0010202 A1 | 1/2011 | Neale |
| 2011/0082794 A1 | 4/2011 | Blechman |
| 2011/0137696 A1 | 6/2011 | Meyer et al. |
| 2011/0145154 A1 | 6/2011 | Rivers et al. |
| 2011/0153396 A1 | 6/2011 | Marcuvitz et al. |
| 2011/0191664 A1 | 8/2011 | Sheleheda et al. |
| 2011/0208850 A1 | 8/2011 | Sheleheda et al. |
| 2011/0209067 A1 | 8/2011 | Bogess et al. |
| 2011/0231896 A1 | 9/2011 | Tovar |
| 2011/0238573 A1 | 9/2011 | Varadarajan |
| 2011/0252456 A1 | 10/2011 | Hatakeyama |
| 2011/0302643 A1 | 12/2011 | Pichna et al. |
| 2012/0041939 A1 | 2/2012 | Amsterdamski |
| 2012/0084151 A1 | 4/2012 | Kozak et al. |
| 2012/0084349 A1 | 4/2012 | Lee et al. |
| 2012/0102411 A1 | 4/2012 | Sathish |
| 2012/0102543 A1 | 4/2012 | Kohli et al. |
| 2012/0110674 A1 | 5/2012 | Belani et al. |
| 2012/0116923 A1 | 5/2012 | Irving et al. |
| 2012/0131438 A1 | 5/2012 | Li et al. |
| 2012/0143650 A1 | 6/2012 | Crowley et al. |
| 2012/0144499 A1 | 6/2012 | Tan et al. |
| 2012/0191596 A1 | 7/2012 | Kremen et al. |
| 2012/0226621 A1 | 9/2012 | Petran et al. |
| 2012/0239557 A1 | 9/2012 | Weinflash et al. |
| 2012/0254320 A1 | 10/2012 | Dove et al. |
| 2012/0259752 A1 | 10/2012 | Agee |
| 2012/0323700 A1 | 12/2012 | Aleksandrovich et al. |
| 2012/0330769 A1 | 12/2012 | Arceo |
| 2012/0330869 A1 | 12/2012 | Durham |
| 2013/0004933 A1 | 1/2013 | Bhaskaran |
| 2013/0018954 A1 | 1/2013 | Cheng |
| 2013/0085801 A1 | 4/2013 | Sharpe et al. |
| 2013/0091156 A1 | 4/2013 | Raiche et al. |
| 2013/0103485 A1 | 4/2013 | Postrel |
| 2013/0111323 A1 | 5/2013 | Taghaddos et al. |
| 2013/0124257 A1 | 5/2013 | Schubert |
| 2013/0159351 A1 | 6/2013 | Hamann et al. |
| 2013/0171968 A1 | 7/2013 | Wang |
| 2013/0179982 A1 | 7/2013 | Bridges et al. |
| 2013/0179988 A1 | 7/2013 | Bekker et al. |
| 2013/0185806 A1 | 7/2013 | Hatakeyama |
| 2013/0211872 A1 | 8/2013 | Cherry et al. |
| 2013/0218829 A1 | 8/2013 | Martinez |
| 2013/0219459 A1 | 8/2013 | Bradley |
| 2013/0254139 A1 | 9/2013 | Lei |
| 2013/0254649 A1 | 9/2013 | ONeill |

(56) References Cited

U.S. PATENT DOCUMENTS

| | | |
|---|---|---|
| 2013/0254699 A1 | 9/2013 | Bashir et al. |
| 2013/0262328 A1 | 10/2013 | Federgreen |
| 2013/0282466 A1 | 10/2013 | Hampton |
| 2013/0290169 A1 | 10/2013 | Bathula et al. |
| 2013/0298071 A1 | 11/2013 | Wine |
| 2013/0311224 A1 | 11/2013 | Heroux et al. |
| 2013/0318207 A1 | 11/2013 | Dotter |
| 2013/0326112 A1 | 12/2013 | Park et al. |
| 2013/0332362 A1 | 12/2013 | Ciurea |
| 2013/0340086 A1 | 12/2013 | Blom |
| 2014/0006355 A1 | 1/2014 | Kirihata |
| 2014/0006616 A1 | 1/2014 | Aad et al. |
| 2014/0012833 A1 | 1/2014 | Humprecht |
| 2014/0019561 A1 | 1/2014 | Belity et al. |
| 2014/0032259 A1 | 1/2014 | Lafever et al. |
| 2014/0032265 A1 | 1/2014 | Paprocki |
| 2014/0040134 A1 | 2/2014 | Ciurea |
| 2014/0040161 A1 | 2/2014 | Berlin |
| 2014/0040979 A1 | 2/2014 | Barton et al. |
| 2014/0041048 A1 | 2/2014 | Goodwin et al. |
| 2014/0047551 A1 | 2/2014 | Nagasundaram et al. |
| 2014/0052463 A1 | 2/2014 | Cashman et al. |
| 2014/0067973 A1 | 3/2014 | Eden |
| 2014/0074645 A1 | 3/2014 | Ingram |
| 2014/0089027 A1 | 3/2014 | Brown |
| 2014/0089039 A1 | 3/2014 | McClellan |
| 2014/0108173 A1 | 4/2014 | Cooper et al. |
| 2014/0108968 A1 | 4/2014 | Vishria |
| 2014/0137257 A1 | 5/2014 | Martinez et al. |
| 2014/0142988 A1 | 5/2014 | Grosso et al. |
| 2014/0143011 A1 | 5/2014 | Mudugu et al. |
| 2014/0143844 A1 | 5/2014 | Goertzen |
| 2014/0164476 A1 | 6/2014 | Thomson |
| 2014/0188956 A1 | 7/2014 | Subba et al. |
| 2014/0196143 A1 | 7/2014 | Fliderman et al. |
| 2014/0208418 A1 | 7/2014 | Libin |
| 2014/0222468 A1 | 8/2014 | Araya et al. |
| 2014/0244309 A1 | 8/2014 | Francois |
| 2014/0244325 A1 | 8/2014 | Cartwright |
| 2014/0244375 A1 | 8/2014 | Kim |
| 2014/0244399 A1 | 8/2014 | Orduna et al. |
| 2014/0257917 A1 | 9/2014 | Spencer et al. |
| 2014/0258093 A1 | 9/2014 | Gardiner et al. |
| 2014/0278539 A1 | 9/2014 | Edwards |
| 2014/0278663 A1 | 9/2014 | Samuel et al. |
| 2014/0278730 A1 | 9/2014 | Muhart et al. |
| 2014/0283027 A1 | 9/2014 | Orona et al. |
| 2014/0283106 A1 | 9/2014 | Stahura et al. |
| 2014/0288971 A1 | 9/2014 | Whibbs, III |
| 2014/0289681 A1 | 9/2014 | Wielgosz |
| 2014/0289862 A1 | 9/2014 | Gorfein et al. |
| 2014/0317171 A1 | 10/2014 | Fox et al. |
| 2014/0324480 A1 | 10/2014 | Dufel et al. |
| 2014/0337041 A1 | 11/2014 | Madden et al. |
| 2014/0337466 A1 | 11/2014 | Li et al. |
| 2014/0344015 A1 | 11/2014 | Puértolas-Montañés et al. |
| 2015/0006514 A1 | 1/2015 | Hung |
| 2015/0012363 A1 | 1/2015 | Grant et al. |
| 2015/0019530 A1 | 1/2015 | Felch |
| 2015/0026056 A1 | 1/2015 | Calman et al. |
| 2015/0026260 A1 | 1/2015 | Worthley |
| 2015/0033112 A1 | 1/2015 | Norwood et al. |
| 2015/0066577 A1 | 3/2015 | Christiansen et al. |
| 2015/0066865 A1 | 3/2015 | Yara et al. |
| 2015/0088598 A1 | 3/2015 | Acharyya et al. |
| 2015/0106264 A1 | 4/2015 | Johnson |
| 2015/0106867 A1 | 4/2015 | Liang |
| 2015/0106948 A1 | 4/2015 | Holman et al. |
| 2015/0106949 A1 | 4/2015 | Holman et al. |
| 2015/0121462 A1 | 4/2015 | Courage et al. |
| 2015/0143258 A1 | 5/2015 | Carolan et al. |
| 2015/0149362 A1 | 5/2015 | Baum et al. |
| 2015/0154520 A1 | 6/2015 | Federgreen et al. |
| 2015/0169318 A1 | 6/2015 | Nash |
| 2015/0172296 A1 | 6/2015 | Fujioka |
| 2015/0178740 A1 | 6/2015 | Borawski et al. |
| 2015/0199534 A1 | 7/2015 | Francis et al. |
| 2015/0199541 A1 | 7/2015 | Koch et al. |
| 2015/0199702 A1 | 7/2015 | Singh |
| 2015/0229664 A1 | 8/2015 | Hawthorn et al. |
| 2015/0235049 A1 | 8/2015 | Cohen et al. |
| 2015/0235050 A1 | 8/2015 | Wouhaybi et al. |
| 2015/0235283 A1 | 8/2015 | Nishikawa |
| 2015/0242778 A1 | 8/2015 | Wilcox et al. |
| 2015/0242858 A1 | 8/2015 | Smith et al. |
| 2015/0248391 A1 | 9/2015 | Watanabe |
| 2015/0254597 A1 | 9/2015 | Jahagirdar |
| 2015/0261887 A1 | 9/2015 | Joukov |
| 2015/0262189 A1 | 9/2015 | Vergeer |
| 2015/0264417 A1 | 9/2015 | Spitz et al. |
| 2015/0269384 A1 | 9/2015 | Holman et al. |
| 2015/0271167 A1 | 9/2015 | Kalai |
| 2015/0309813 A1 | 10/2015 | Patel |
| 2015/0310227 A1 | 10/2015 | Ishida et al. |
| 2015/0310575 A1 | 10/2015 | Shelton |
| 2015/0317489 A1* | 11/2015 | Chawla .................. H04L 29/06 726/3 |
| 2015/0348200 A1 | 12/2015 | Fair et al. |
| 2015/0356362 A1 | 12/2015 | Demos |
| 2015/0379430 A1 | 12/2015 | Dirac et al. |
| 2016/0006760 A1 | 1/2016 | Lala et al. |
| 2016/0012465 A1 | 1/2016 | Sharp |
| 2016/0026394 A1 | 1/2016 | Goto |
| 2016/0034918 A1 | 2/2016 | Bjelajac et al. |
| 2016/0048700 A1 | 2/2016 | Stransky-Heilkron |
| 2016/0050213 A1 | 2/2016 | Storr |
| 2016/0063523 A1 | 3/2016 | Nistor et al. |
| 2016/0063567 A1 | 3/2016 | Srivastava |
| 2016/0071112 A1 | 3/2016 | Unser |
| 2016/0080405 A1 | 3/2016 | Schler et al. |
| 2016/0099963 A1 | 4/2016 | Mahaffey et al. |
| 2016/0103963 A1 | 4/2016 | Mishra |
| 2016/0125550 A1 | 5/2016 | Joao et al. |
| 2016/0125749 A1 | 5/2016 | Delacroix et al. |
| 2016/0125751 A1 | 5/2016 | Barker et al. |
| 2016/0140466 A1 | 5/2016 | Sidebottom et al. |
| 2016/0143570 A1 | 5/2016 | Valacich et al. |
| 2016/0148143 A1 | 5/2016 | Anderson et al. |
| 2016/0162269 A1 | 6/2016 | Pogorelik et al. |
| 2016/0164915 A1 | 6/2016 | Cook |
| 2016/0180386 A1 | 6/2016 | Konig |
| 2016/0188450 A1 | 6/2016 | Appusamy et al. |
| 2016/0189156 A1 | 6/2016 | Kim et al. |
| 2016/0196189 A1 | 7/2016 | Miyagi et al. |
| 2016/0225000 A1 | 8/2016 | Glasgow |
| 2016/0232465 A1 | 8/2016 | Kurtz et al. |
| 2016/0232534 A1 | 8/2016 | Lacey et al. |
| 2016/0234319 A1 | 8/2016 | Griffin |
| 2016/0253497 A1 | 9/2016 | Christodorescu et al. |
| 2016/0255139 A1 | 9/2016 | Rathod |
| 2016/0261631 A1 | 9/2016 | Vissamsetty et al. |
| 2016/0262163 A1 | 9/2016 | Gonzalez Garrido et al. |
| 2016/0292453 A1 | 10/2016 | Patterson et al. |
| 2016/0292621 A1 | 10/2016 | Ciccone et al. |
| 2016/0321582 A1 | 11/2016 | Broudou et al. |
| 2016/0321748 A1 | 11/2016 | Mahatma et al. |
| 2016/0330237 A1 | 11/2016 | Edlabadkar |
| 2016/0335531 A1 | 11/2016 | Mullen et al. |
| 2016/0342811 A1 | 11/2016 | Whitcomb et al. |
| 2016/0364736 A1 | 12/2016 | Maugans, III |
| 2016/0370954 A1 | 12/2016 | Burningham et al. |
| 2016/0378762 A1 | 12/2016 | Rohter |
| 2016/0381064 A1 | 12/2016 | Chan et al. |
| 2016/0381560 A1 | 12/2016 | Margaliot |
| 2017/0004055 A1 | 1/2017 | Horan et al. |
| 2017/0032395 A1 | 2/2017 | Kaufman et al. |
| 2017/0032408 A1 | 2/2017 | Kumar et al. |
| 2017/0034101 A1 | 2/2017 | Kumar et al. |
| 2017/0041324 A1 | 2/2017 | Ionutescu et al. |
| 2017/0046399 A1 | 2/2017 | Sankaranarasimhan et al. |
| 2017/0046753 A1 | 2/2017 | Deupree, IV |
| 2017/0061501 A1 | 3/2017 | Horwich |
| 2017/0068785 A1 | 3/2017 | Experton et al. |
| 2017/0070495 A1 | 3/2017 | Cherry et al. |

(56) References Cited

U.S. PATENT DOCUMENTS

| | | |
|---|---|---|
| 2017/0093917 A1 | 3/2017 | Chandra et al. |
| 2017/0115864 A1 | 4/2017 | Thomas et al. |
| 2017/0124570 A1 | 5/2017 | Nidamanuri et al. |
| 2017/0140174 A1 | 5/2017 | Lacey et al. |
| 2017/0140467 A1 | 5/2017 | Neag et al. |
| 2017/0142158 A1 | 5/2017 | Laoutaris et al. |
| 2017/0142177 A1 | 5/2017 | Hu |
| 2017/0154188 A1 | 6/2017 | Meier et al. |
| 2017/0161520 A1 | 6/2017 | Lockhart, III et al. |
| 2017/0171235 A1 | 6/2017 | Mulchandani et al. |
| 2017/0171325 A1 | 6/2017 | Perez |
| 2017/0177324 A1 | 6/2017 | Frank et al. |
| 2017/0180378 A1 | 6/2017 | Tyler et al. |
| 2017/0180505 A1 | 6/2017 | Shaw et al. |
| 2017/0193017 A1 | 7/2017 | Migliori |
| 2017/0193624 A1 | 7/2017 | Tsai |
| 2017/0201518 A1 | 7/2017 | Holmqvist et al. |
| 2017/0206707 A1 | 7/2017 | Guay et al. |
| 2017/0208084 A1 | 7/2017 | Steelman et al. |
| 2017/0220685 A1 | 8/2017 | Yan et al. |
| 2017/0220964 A1 | 8/2017 | Datta Ray |
| 2017/0249710 A1 | 8/2017 | Guillama et al. |
| 2017/0269791 A1 | 9/2017 | Meyerzon et al. |
| 2017/0270318 A1 | 9/2017 | Ritchie |
| 2017/0278004 A1 | 9/2017 | McElhinney et al. |
| 2017/0278117 A1 | 9/2017 | Wallace et al. |
| 2017/0286719 A1 | 10/2017 | Krishnamurthy et al. |
| 2017/0287031 A1 | 10/2017 | Barday |
| 2017/0289199 A1 | 10/2017 | Barday |
| 2017/0308875 A1 | 10/2017 | O'Regan et al. |
| 2017/0316400 A1 | 11/2017 | Venkatakrishnan et al. |
| 2017/0330197 A1 | 11/2017 | DiMaggio et al. |
| 2017/0353404 A1 | 12/2017 | Hodge |
| 2018/0032757 A1 | 2/2018 | Michael |
| 2018/0039975 A1 | 2/2018 | Hefetz |
| 2018/0041498 A1 | 2/2018 | Kikuchi |
| 2018/0046753 A1 | 2/2018 | Shelton |
| 2018/0046939 A1 | 2/2018 | Meron et al. |
| 2018/0063174 A1 | 3/2018 | Grill et al. |
| 2018/0063190 A1 | 3/2018 | Wright et al. |
| 2018/0082368 A1 | 3/2018 | Weinflash et al. |
| 2018/0083843 A1 | 3/2018 | Sambandam |
| 2018/0091476 A1 | 3/2018 | Jakobsson et al. |
| 2018/0131574 A1 | 5/2018 | Jacobs et al. |
| 2018/0131658 A1 | 5/2018 | Bhagwan et al. |
| 2018/0165637 A1 | 6/2018 | Romero et al. |
| 2018/0198614 A1 | 7/2018 | Neumann |
| 2018/0204281 A1 | 7/2018 | Painter et al. |
| 2018/0219917 A1 | 8/2018 | Chiang |
| 2018/0239500 A1 | 8/2018 | Allen et al. |
| 2018/0248914 A1 | 8/2018 | Sartor |
| 2018/0285887 A1 | 10/2018 | Crispen |
| 2018/0301222 A1 | 10/2018 | Dew, Sr. et al. |
| 2018/0307859 A1 | 10/2018 | Lafever et al. |
| 2018/0336509 A1 | 11/2018 | Guttmann |
| 2018/0349583 A1 | 12/2018 | Turgeman et al. |
| 2018/0351888 A1 | 12/2018 | Howard |
| 2018/0352003 A1 | 12/2018 | Winn et al. |
| 2018/0357243 A1 | 12/2018 | Yoon |
| 2018/0365720 A1 | 12/2018 | Goldman et al. |
| 2018/0374030 A1 | 12/2018 | Barday et al. |
| 2018/0375814 A1 | 12/2018 | Hart |
| 2019/0005210 A1 | 1/2019 | Wiederspohn et al. |
| 2019/0012211 A1 | 1/2019 | Selvaraj |
| 2019/0012672 A1 | 1/2019 | Francesco |
| 2019/0019184 A1 | 1/2019 | Lacey et al. |
| 2019/0050547 A1 | 2/2019 | Welsh et al. |
| 2019/0087570 A1 | 3/2019 | Sloane |
| 2019/0096020 A1 | 3/2019 | Barday et al. |
| 2019/0108353 A1 | 4/2019 | Sadeh et al. |
| 2019/0130132 A1 | 5/2019 | Barbas et al. |
| 2019/0138496 A1 | 5/2019 | Yamaguchi |
| 2019/0139087 A1 | 5/2019 | Dabbs et al. |
| 2019/0148003 A1 | 5/2019 | Van Hoe |
| 2019/0156053 A1 | 5/2019 | Vogel et al. |
| 2019/0156058 A1 | 5/2019 | Van Dyne et al. |
| 2019/0171801 A1* | 6/2019 | Barday ............... G06F 21/316 |
| 2019/0179652 A1 | 6/2019 | Hesener et al. |
| 2019/0180051 A1 | 6/2019 | Barday et al. |
| 2019/0182294 A1 | 6/2019 | Rieke et al. |
| 2019/0188402 A1 | 6/2019 | Wang et al. |
| 2019/0266200 A1 | 8/2019 | Francolla |
| 2019/0266201 A1 | 8/2019 | Barday et al. |
| 2019/0266350 A1 | 8/2019 | Barday et al. |
| 2019/0268343 A1 | 8/2019 | Barday et al. |
| 2019/0268344 A1 | 8/2019 | Barday et al. |
| 2019/0272492 A1 | 9/2019 | Elledge et al. |
| 2019/0294818 A1 | 9/2019 | Barday et al. |
| 2019/0332802 A1 | 10/2019 | Barday et al. |
| 2019/0332807 A1 | 10/2019 | Lafever et al. |
| 2019/0333118 A1 | 10/2019 | Crimmins et al. |
| 2019/0354709 A1 | 11/2019 | Brinskelle |
| 2019/0356684 A1 | 11/2019 | Sinha et al. |
| 2019/0362169 A1 | 11/2019 | Lin et al. |
| 2019/0362268 A1 | 11/2019 | Fogarty et al. |
| 2019/0377901 A1 | 12/2019 | Balzer et al. |
| 2019/0378073 A1 | 12/2019 | Lopez et al. |
| 2019/0384934 A1 | 12/2019 | Kim |
| 2019/0392162 A1 | 12/2019 | Stern et al. |
| 2019/0392170 A1 | 12/2019 | Barday et al. |
| 2019/0392171 A1 | 12/2019 | Barday et al. |
| 2020/0020454 A1 | 1/2020 | McGarvey et al. |
| 2020/0050966 A1 | 2/2020 | Enuka et al. |
| 2020/0051117 A1 | 2/2020 | Mitchell |
| 2020/0057781 A1 | 2/2020 | McCormick |
| 2020/0074471 A1 | 3/2020 | Adjaoute |
| 2020/0081865 A1 | 3/2020 | Farrar et al. |
| 2020/0082270 A1 | 3/2020 | Gu et al. |
| 2020/0090197 A1 | 3/2020 | Rodriguez et al. |
| 2020/0092179 A1 | 3/2020 | Chieu et al. |
| 2020/0110589 A1 | 4/2020 | Bequet et al. |
| 2020/0110904 A1 | 4/2020 | Shinde et al. |
| 2020/0117737 A1 | 4/2020 | Gopalakrishnan et al. |
| 2020/0137097 A1 | 4/2020 | Zimmermann et al. |
| 2020/0143301 A1 | 5/2020 | Bowers |
| 2020/0143797 A1 | 5/2020 | Manoharan et al. |
| 2020/0159952 A1 | 5/2020 | Dain et al. |
| 2020/0159955 A1 | 5/2020 | Barlik et al. |
| 2020/0167653 A1 | 5/2020 | Manjunath et al. |
| 2020/0175424 A1 | 6/2020 | Kursun |
| 2020/0183655 A1 | 6/2020 | Barday et al. |
| 2020/0186355 A1 | 6/2020 | Davies |
| 2020/0193018 A1 | 6/2020 | Van Dyke |
| 2020/0193022 A1 | 6/2020 | Lunsford et al. |
| 2020/0210558 A1 | 7/2020 | Barday et al. |
| 2020/0210620 A1 | 7/2020 | Haletky |
| 2020/0211002 A1 | 7/2020 | Steinberg |
| 2020/0220901 A1 | 7/2020 | Barday et al. |
| 2020/0226156 A1 | 7/2020 | Borra et al. |
| 2020/0226196 A1 | 7/2020 | Brannon et al. |
| 2020/0242259 A1 | 7/2020 | Chirravuri et al. |
| 2020/0242719 A1 | 7/2020 | Lee |
| 2020/0250342 A1* | 8/2020 | Miller ............... G06F 21/6245 |
| 2020/0252413 A1 | 8/2020 | Buzbee et al. |
| 2020/0252817 A1 | 8/2020 | Brouillette et al. |
| 2020/0272764 A1 | 8/2020 | Brannon et al. |
| 2020/0285755 A1 | 9/2020 | Kassoumeh et al. |
| 2020/0293679 A1 | 9/2020 | Handy Bosma et al. |
| 2020/0296171 A1* | 9/2020 | Mocanu ............... G06F 16/904 |
| 2020/0302089 A1 | 9/2020 | Barday et al. |
| 2020/0310917 A1 | 10/2020 | Tkachev et al. |
| 2020/0311310 A1 | 10/2020 | Barday et al. |
| 2020/0344243 A1 | 10/2020 | Brannon et al. |
| 2020/0356695 A1 | 11/2020 | Brannon et al. |
| 2020/0364369 A1 | 11/2020 | Brannon et al. |
| 2020/0372178 A1 | 11/2020 | Barday et al. |
| 2020/0394327 A1 | 12/2020 | Childress et al. |
| 2020/0401380 A1* | 12/2020 | Jacobs ............... G06F 8/33 |
| 2020/0401962 A1 | 12/2020 | Gottemukkala et al. |
| 2020/0410117 A1 | 12/2020 | Barday et al. |
| 2020/0410131 A1 | 12/2020 | Barday et al. |
| 2020/0410132 A1 | 12/2020 | Brannon et al. |
| 2021/0012341 A1 | 1/2021 | Garg et al. |
| 2021/0056569 A1 | 2/2021 | Silberman et al. |

(56) References Cited

U.S. PATENT DOCUMENTS

| | | |
|---|---|---|
| 2021/0075775 A1 | 3/2021 | Cheng et al. |
| 2021/0081567 A1 | 3/2021 | Park et al. |
| 2021/0099449 A1 | 4/2021 | Frederick et al. |
| 2021/0110047 A1 | 4/2021 | Fang |
| 2021/0125089 A1 | 4/2021 | Nickl et al. |
| 2021/0152496 A1 | 5/2021 | Kim et al. |
| 2021/0233157 A1 | 7/2021 | Crutchfield, Jr. |
| 2021/0243595 A1 | 8/2021 | Buck et al. |
| 2021/0248247 A1 | 8/2021 | Poothokaran et al. |
| 2021/0256163 A1 | 8/2021 | Fleming et al. |
| 2021/0279360 A1 | 9/2021 | Gimenez Palop et al. |
| 2021/0297441 A1 | 9/2021 | Olalere |
| 2021/0303828 A1 | 9/2021 | Lafreniere et al. |
| 2021/0312061 A1 | 10/2021 | Schroeder et al. |
| 2021/0326786 A1 | 10/2021 | Sun et al. |
| 2021/0328969 A1 | 10/2021 | Gaddam et al. |
| 2021/0382949 A1 | 12/2021 | Yastrebenetsky et al. |
| 2021/0397735 A1 | 12/2021 | Samatov et al. |
| 2021/0400018 A1 | 12/2021 | Vettaikaran et al. |
| 2021/0406712 A1 | 12/2021 | Bhide et al. |

FOREIGN PATENT DOCUMENTS

| | | |
|---|---|---|
| EP | 1394698 | 3/2004 |
| EP | 2031540 | 3/2009 |
| KR | 20130062500 | 6/2013 |
| WO | 2001033430 | 5/2001 |
| WO | 20020067158 | 8/2002 |
| WO | 20030050773 | 6/2003 |
| WO | 2005008411 | 1/2005 |
| WO | 2007002412 | 1/2007 |
| WO | 2008/134203 | 11/2008 |
| WO | 2012174659 | 12/2012 |
| WO | 2015116905 | 8/2015 |
| WO | 2020/146028 | 7/2020 |
| WO | 2022006421 | 1/2022 |

OTHER PUBLICATIONS

Jiahao Chen et al. "Fairness Under Unawareness: Assessing Disparity when Protected Class is Unobserved," arxiv.org, Cornell University Library, 201 Olin Library Cornell University, Ithaca, NY 14853, Nov. 27, 2018 (Nov. 27, 2018), Section 2, Figure 2. (Year 2018).
Notice of Allowance, dated Feb. 1, 2022, from corresponding U.S. Appl. No. 17/346,509.
Notice of Allowance, dated Feb. 14, 2022, from corresponding U.S. Appl. No. 16/623,157.
Notice of Allowance, dated Feb. 22, 2022, from corresponding U.S. Appl. No. 17/535,065.
Notice of Allowance, dated Feb. 4, 2022, from corresponding U.S. Appl. No. 17/520,272.
Notice of Allowance, dated Feb. 8, 2022, from corresponding U.S. Appl. No. 17/342,153.
Notice of Allowance, dated Jan. 31, 2022, from corresponding U.S. Appl. No. 17/472,948.
Office Action, dated Feb. 16, 2022, from corresponding U.S. Appl. No. 16/872,031.
Office Action, dated Feb. 9, 2022, from corresponding U.S. Appl. No. 17/543,546.
Office Action, dated Jan. 31, 2022, from corresponding U.S. Appl. No. 17/493,290.
Sarkar et al, "Towards Enforcement of the EU GDPR: Enabling Data Erasure," 2018 IEEE Confs on Internet of Things, Green Computing and Communications, Cyber, Physical and Social Computing, Smart Data, Blockchain, Computer and Information Technology, Congress on Cybermatics, 2018, pp. 222-229, IEEE (Year: 2018).
Written Opinion of the International Searching Authority, dated Feb. 11, 2022, from corresponding International Application No. PCT/US2021/053518.
Czeskis et al., "Lightweight Server Support for Browser-based CSRF Protection," Proceedings of the 22nd International Conference on World Wide Web, 2013, pp. 273-284 (Year 2013).
Final Office Action, dated Feb. 25, 2022, from corresponding U.S. Appl. No. 17/346,586.
Final Office Action, dated Mar. 21, 2022, from corresponding U.S. Appl. No. 17/373,444.
Final Office Action, dated Mar. 22, 2022, from corresponding U.S. Appl. No. 17/380,485.
Matte et al., "Do Cookie Banners Respect my Choice?: Measuring Legal Compliance of Banners from IAB Europe's Transparency and Consent Framework," 2020 IEEE Symposium on Security and Privacy (SP), 2020, pp. 791-809 (Year: 2020).
Notice of Allowance, dated Feb. 24, 2022, from corresponding U.S. Appl. No. 17/234,205.
Notice of Allowance, dated Feb. 24, 2022, from corresponding U.S. Appl. No. 17/549,170.
Notice of Allowance, dated Mar. 16, 2022, from corresponding U.S. Appl. No. 17/486,350.
Notice of Allowance, dated Mar. 2, 2022, from corresponding U.S. Appl. No. 16/872,130.
Notice of Allowance, dated Mar. 2, 2022, from corresponding U.S. Appl. No. 17/535,098.
Notice of Allowance, dated Mar. 21, 2022, from corresponding U.S. Appl. No. 17/366,754.
Notice of Allowance, dated Mar. 22, 2022, from corresponding U.S. Appl. No. 17/475,244.
Notice of Allowance, dated Mar. 22, 2022, from corresponding U.S. Appl. No. 17/504,102.
Notice of Allowance, dated Mar. 28, 2022, from corresponding U.S. Appl. No. 17/499,609.
Notice of Allowance, dated Mar. 4, 2022, from corresponding U.S. Appl. No. 17/409,999.
Office Action, dated Mar. 1, 2022, from corresponding U.S. Appl. No. 17/119,080.
Office Action, dated Mar. 2, 2022, from corresponding U.S. Appl. No. 17/020,275.
Office Action, dated Mar. 2, 2022, from corresponding U.S. Appl. No. 17/161,159.
Office Action, dated Mar. 2, 2022, from corresponding U.S. Appl. No. 17/200,698.
Office Action, dated Mar. 21, 2022, from corresponding U.S. Appl. No. 17/571,871.
Office Action, dated Mar. 22, 2022, from corresponding U.S. Appl. No. 17/187,329.
Sanchez-Rola et al., "Can I Opt Out Yet?: GDPR and the Global Illusion of Cookie Control," Proceedings of the 2019 ACM Asia Conference on Computer and Communications Security, 2019, pp. 340-351 (Year: 2019).
Niu, et al., "Achieving Data Truthfulness and Privacy Preservation in Data Markets", IEEE Transactions on Knowledge and Data Engineering, IEEE Service Centre, Los Alamitos, CA, US, vol. 31, No. 1, Jan. 1, 2019, pp. 105-119 (Year 2019).
Notice of Allowance, dated May 11, 2022, from corresponding U.S. Appl. No. 17/395,759.
Notice of Allowance, dated May 18, 2022, from corresponding U.S. Appl. No. 17/670,354.
Notice of Allowance, dated May 25, 2022, from corresponding U.S. Appl. No. 16/872,031.
Notice of Allowance, dated May 6, 2022, from corresponding U.S. Appl. No. 17/666,886.
Office Action, dated May 12, 2022, from corresponding U.S. Appl. No. 17/509,974.
Office Action, dated May 16, 2022, from corresponding U.S. Appl. No. 17/679,750.
Office Action, dated May 24, 2022, from corresponding U.S. Appl. No. 17/674,187.
Office Action, dated May 9, 2022, from corresponding U.S. Appl. No. 16/840,943.
Preuveneers et al., "Access Control with Delegated Authorization Policy Evaluation for Data-Driven Microservice Workflows," Future Internet 2017, MDPI, pp. 1-21 (Year: 2017).

(56) References Cited

OTHER PUBLICATIONS

Thomas et al., "MooM—A Prototype Framework for Management of Ontology Mappings," IEEE, pp. 548-555 (Year: 2011).
Written Opinion of the International Searching Authority, dated May 12, 2022, from corresponding International Application No. PCT/US2022/015929.
Written Opinion of the International Searching Authority, dated May 17, 2022, from corresponding International Application No. PCT/US2022/015241.
Written Opinion of the International Searching Authority, dated May 19, 2022, from corresponding International Application No. PCT/US2022/015637.
Ali et al., "Age Estimation from Facial Images Using Biometric Ratios and Wrinkle Analysis," IEEE, 2015, pp. 1-5 (Year: 2015).
Chang et al., "A Ranking Approach for Human Age Estimation Based on Face Images," IEEE, 2010, pp. 3396-3399 (Year: 2010).
Edinger et al., "Age and Gender Estimation of Unfiltered Faces," IEEE, 2014, pp. 2170-2179 (Year: 2014).
Final Office Action, dated Apr. 1, 2022, from corresponding U.S. Appl. No. 17/370,650.
Final Office Action, dated Apr. 25, 2022, from corresponding U.S. Appl. No. 17/149,421.
Final Office Action, dated Apr. 28, 2022, from corresponding U.S. Appl. No. 16/925,550.
Final Office Action, dated Apr. 5, 2022, from corresponding U.S. Appl. No. 17/013,756.
Han et al., "Demographic Estimation from Face Images: Human vs. Machine Performance," IEEE, 2015, pp. 1148-1161 (Year: 2015).
Huettner, "Digital Risk Management: Protecting Your Privacy, Improving Security, and Preparing for Emergencies," IEEE, pp. 136-138 (Year: 2006).
International Search Report, dated Apr. 12, 2022, from corresponding International Application No. PCT/US2022/016735.
International Search Report, dated Mar. 18, 2022, from corresponding International Application No. PCT/US2022/013733.
Jayasinghe et al., "Matching Facial Images Using Age Related Morphing Changes," ISSRI, 2009, pp. 2901-2907 (Year: 2009).
Khan et al., "Wrinkles Energy Based Age Estimation Using Discrete Cosine Transform," IEEE, 2015, pp. 1-4 (Year: 2015).
Kristian et al., "Human Facial Age Classification Using Active Shape Module, Geometrical Feature, and Support Vendor Machine on Early Growth Stage," ISICO, 2015, pp. 1-8 (Year: 2015).
Lewis, James et al., "Microservices," Mar. 25, 2014 (Mar. 25, 2014),XP055907494, Retrieved from the Internet: https://martinfowler.com/articles/micr oservices.html [retrieved on Mar. 31, 2022].
Liu et al., "Overview on Ontology Mapping and Approach," IEEE, pp. 592-595 (Year: 2011).
Milic et al., "Comparative Analysis of Metadata Models on e-Government Open Data Platforms," IEEE, pp. 119-130 (Year: 2021).
Notice of Allowance, dated Apr. 12, 2022, from corresponding U.S. Appl. No. 17/479,807.
Notice of Allowance, dated Apr. 14, 2022, from corresponding U.S. Appl. No. 17/572,276.
Notice of Allowance, dated Apr. 20, 2022, from corresponding U.S. Appl. No. 17/573,808.
Notice of Allowance, dated Apr. 27, 2022, from corresponding U.S. Appl. No. 17/573,999.
Notice of Allowance, dated Apr. 28, 2022, from corresponding U.S. Appl. No. 17/592,922.
Notice of Allowance, dated Apr. 28, 2022, from corresponding U.S. Appl. No. 17/670,352.
Notice of Allowance, dated Apr. 29, 2022, from corresponding U.S. Appl. No. 17/387,421.
Notice of Allowance, dated Apr. 4, 2022, from corresponding U.S. Appl. No. 17/493,332.
Notice of Allowance, dated Mar. 31, 2022, from corresponding U.S. Appl. No. 17/476,209.
Office Action, dated Apr. 12, 2022, from corresponding U.S. Appl. No. 17/670,341.
Office Action, dated Apr. 18, 2022, from corresponding U.S. Appl. No. 17/670,349.
Office Action, dated Apr. 25, 2022, from corresponding U.S. Appl. No. 17/588,645.
Office Action, dated Apr. 26, 2022, from corresponding U.S. Appl. No. 17/151,334.
Office Action, dated Apr. 8, 2022, from corresponding U.S. Appl. No. 16/938,509.
Qu et al., "Metadata Type System: Integrate Presentation, Data Models and Extraction to Enable Exploratory Browsing Interfaces," ACM, pp. 107-116 (Year: 2014).
Restriction Requirement, dated Apr. 12, 2022, from corresponding U.S. Appl. No. 17/584,187.
Shulz et al., "Generative Data Models for Validation and Evaluation of Visualization Techniques," ACM, pp. 1-13 (Year: 2016).
Written Opinion of the International Searching Authority, dated Apr. 12, 2022, from corresponding International Application No. PCT/US2022/016735.
Written Opinion of the International Searching Authority, dated Mar. 18, 2022, from corresponding International Application No. PCT/US2022/013733.
Bansal et al., "Integrating Big Data: A Semantic Extract-Transform-Load Framework," IEEE, pp. 42-50 (Year: 2015).
Bao et al., "Performance Modeling and Workflow Scheduling of Microservice-Based Applications in Clouds," IEEE Transactions on Parallel and Distributed Systems, vol. 30, No. 9, Sep. 2019, pp. 2101-2116 (Year: 2019).
Bindschaedler et al., "Privacy Through Fake Yet Semantically Real Traces," arxiv.org, Cornell University Library, 201 Olin Library Cornell University Ithaca, NY 14853, May 27, 2015 (Year: 2015).
Castro et al., "Creating Lightweight Ontologies for Dataset Description," IEEE, pp. 1-4 (Year: 2014).
Ex Parte Quayle Action, dated May 10, 2022, from corresponding U.S. Appl. No. 17/668,714.
Final Office Action, dated May 12, 2022, from corresponding U.S. Appl. No. 17/499,624.
Final Office Action, dated May 16, 2022, from corresponding U.S. Appl. No. 17/480,377.
Final Office Action, dated May 2, 2022, from corresponding U.S. Appl. No. 17/499,595.
Final Office Action, dated May 24, 2022, from corresponding U.S. Appl. No. 17/499,582.
International Search Report, dated May 12, 2022, from corresponding International Application No. PCT/US2022/015929.
International Search Report, dated May 17, 2022, from corresponding International Application No. PCT/US2022/015241.
International Search Report, dated May 19, 2022, from corresponding International Application No. PCT/US2022/015637.
Lasierra et al., "Data Management in Home Scenarios Using an Autonomic Ontology-Based Approach," IEEE, pp. 94-99 (Year: 2012).
Lenzerini et al., "Ontology-based Data Management," ACM, pp. 5-6 (Year: 2011).
Notice of Allowance, dated Dec. 13, 2019, from corresponding U.S. Appl. No. 16/512,033.
Notice of Allowance, dated Dec. 13, 2021, from corresponding U.S. Appl. No. 16/908,081.
Notice of Allowance, dated Dec. 13, 2021, from corresponding U.S. Appl. No. 17/347,853.
Notice of Allowance, dated Dec. 15, 2020, from corresponding U.S. Appl. No. 16/989,086.
Notice of Allowance, dated Dec. 16, 2019, from corresponding U.S. Appl. No. 16/505,461.
Notice of Allowance, dated Dec. 17, 2020, from corresponding U.S. Appl. No. 17/034,772.
Notice of Allowance, dated Dec. 18, 2019, from corresponding U.S. Appl. No. 16/659,437.
Notice of Allowance, dated Dec. 2, 2021, from corresponding U.S. Appl. No. 16/901,654.
Notice of Allowance, dated Dec. 23, 2019, from corresponding U.S. Appl. No. 16/656,835.
Notice of Allowance, dated Dec. 23, 2020, from corresponding U.S. Appl. No. 17/068,557.

(56) References Cited

OTHER PUBLICATIONS

Notice of Allowance, dated Dec. 3, 2019, from corresponding U.S. Appl. No. 16/563,749.
Notice of Allowance, dated Dec. 30, 2021, from corresponding U.S. Appl. No. 16/938,520.
Notice of Allowance, dated Dec. 31, 2018, from corresponding U.S. Appl. No. 16/159,634.
Notice of Allowance, dated Dec. 31, 2019, from corresponding U.S. Appl. No. 16/404,399.
Notice of Allowance, dated Dec. 4, 2019, from corresponding U.S. Appl. No. 16/594,670.
Notice of Allowance, dated Dec. 5, 2017, from corresponding U.S. Appl. No. 15/633,703.
Notice of Allowance, dated Dec. 6, 2017, from corresponding U.S. Appl. No. 15/619,451.
Notice of Allowance, dated Dec. 6, 2017, from corresponding U.S. Appl. No. 15/619,459.
Notice of Allowance, dated Dec. 7, 2020, from corresponding U.S. Appl. No. 16/817,136.
Notice of Allowance, dated Dec. 8, 2021, from corresponding U.S. Appl. No. 17/397,472.
Notice of Allowance, dated Dec. 9, 2019, from corresponding U.S. Appl. No. 16/565,261.
Notice of Allowance, dated Dec. 9, 2020, from corresponding U.S. Appl. No. 16/404,491.
Notice of Allowance, dated Feb. 10, 2020, from corresponding U.S. Appl. No. 16/552,765.
Notice of Allowance, dated Feb. 11, 2021, from corresponding U.S. Appl. No. 17/086,732.
Notice of Allowance, dated Feb. 12, 2020, from corresponding U.S. Appl. No. 16/572,182.
Notice of Allowance, dated Feb. 13, 2019, from corresponding U.S. Appl. No. 16/041,563.
Notice of Allowance, dated Feb. 14, 2019, from corresponding U.S. Appl. No. 16/226,272.
Notice of Allowance, dated Feb. 19, 2019, from corresponding U.S. Appl. No. 16/159,632.
Notice of Allowance, dated Feb. 19, 2021, from corresponding U.S. Appl. No. 16/832,451.
Notice of Allowance, dated Feb. 24, 2021, from corresponding U.S. Appl. No. 17/034,355.
Notice of Allowance, dated Feb. 24, 2021, from corresponding U.S. Appl. No. 17/068,198.
Notice of Allowance, dated Feb. 24, 2021, from corresponding U.S. Appl. No. 17/101,106.
Notice of Allowance, dated Feb. 24, 2021, from corresponding U.S. Appl. No. 17/101,253.
Notice of Allowance, dated Feb. 25, 2020, from corresponding U.S. Appl. No. 16/714,355.
Notice of Allowance, dated Feb. 25, 2021, from corresponding U.S. Appl. No. 17/106,469.
Notice of Allowance, dated Feb. 26, 2021, from corresponding U.S. Appl. No. 17/139,650.
Notice of Allowance, dated Feb. 27, 2019, from corresponding U.S. Appl. No. 16/041,468.
Notice of Allowance, dated Feb. 27, 2019, from corresponding U.S. Appl. No. 16/226,290.
Notice of Allowance, dated Feb. 3, 2021, from corresponding U.S. Appl. No. 16/827,039.
Notice of Allowance, dated Feb. 3, 2021, from corresponding U.S. Appl. No. 17/068,558.
Notice of Allowance, dated Jan. 1, 2021, from corresponding U.S. Appl. No. 17/026,727.
Notice of Allowance, dated Jan. 11, 2022, from corresponding U.S. Appl. No. 17/371,350.
Notice of Allowance, dated Jan. 12, 2022, from corresponding U.S. Appl. No. 17/334,948.
Notice of Allowance, dated Jan. 12, 2022, from corresponding U.S. Appl. No. 17/463,775.
Notice of Allowance, dated Jan. 14, 2020, from corresponding U.S. Appl. No. 16/277,715.
Notice of Allowance, dated Jan. 15, 2021, from corresponding U.S. Appl. No. 17/030,714.
Notice of Allowance, dated Jan. 18, 2018, from corresponding U.S. Appl. No. 15/619,478.
Notice of Allowance, dated Jan. 18, 2019 from corresponding U.S. Appl. No. 16/159,635.
Notice of Allowance, dated Jan. 2, 2020, from corresponding U.S. Appl. No. 16/410,296.
Notice of Allowance, dated Jan. 23, 2018, from corresponding U.S. Appl. No. 15/619,251.
Office Action, dated Feb. 3, 2021, from corresponding U.S. Appl. No. 17/013,757.
Office Action, dated Feb. 5, 2020, from corresponding U.S. Appl. No. 16/586,202.
Office Action, dated Feb. 6, 2020, from corresponding U.S. Appl. No. 16/707,762.
Office Action, dated Feb. 8, 2021, from corresponding U.S. Appl. No. 17/139,650.
Office Action, dated Feb. 9, 2021, from corresponding U.S. Appl. No. 16/808,493.
Office Action, dated Jan. 14, 2022, from corresponding U.S. Appl. No. 17/499,595.
Office Action, dated Jan. 18, 2019, from corresponding U.S. Appl. No. 16/055,984.
Office Action, dated Jan. 21, 2022, from corresponding U.S. Appl. No. 17/499,624.
Office Action, dated Jan. 22, 2021, from corresponding U.S. Appl. No. 17/099,270.
Office Action, dated Jan. 24, 2020, from corresponding U.S. Appl. No. 16/505,426.
Office Action, dated Jan. 24, 2020, from corresponding U.S. Appl. No. 16/700,049.
Office Action, dated Jan. 25, 2022, from corresponding U.S. Appl. No. 17/494,220.
Office Action, dated Jan. 27, 2020, from corresponding U.S. Appl. No. 16/656,895.
Office Action, dated Jan. 28, 2020, from corresponding U.S. Appl. No. 16/712,104.
Office Action, dated Jan. 29, 2021, from corresponding U.S. Appl. No. 17/101,106.
Office Action, dated Jan. 4, 2019, from corresponding U.S. Appl. No. 16/159,566.
Office Action, dated Jan. 4, 2019, from corresponding U.S. Appl. No. 16/159,628.
Office Action, dated Jan. 4, 2021, from corresponding U.S. Appl. No. 17/013,756.
Office Action, dated Jan. 4, 2022, from corresponding U.S. Appl. No. 17/480,377.
Office Action, dated Jan. 7, 2020, from corresponding U.S. Appl. No. 16/572,182.
Office Action, dated Jan. 7, 2022, from corresponding U.S. Appl. No. 17/387,421.
Office Action, dated Jul. 13, 2021, from corresponding U.S. Appl. No. 17/306,496.
Office Action, dated Jul. 15, 2021, from corresponding U.S. Appl. No. 17/020,275.
Office Action, dated Jul. 18, 2019, from corresponding U.S. Appl. No. 16/410,762.
Office Action, dated Jul. 19, 2021, from corresponding U.S. Appl. No. 17/316,179.
Office Action, dated Jul. 21, 2017, from corresponding U.S. Appl. No. 15/256,430.
Office Action, dated Jul. 21, 2021, from corresponding U.S. Appl. No. 16/901,654.
Office Action, dated Jul. 23, 2019, from corresponding U.S. Appl. No. 16/436,616.
Office Action, dated Jul. 24, 2020, from corresponding U.S. Appl. No. 16/404,491.
Office Action, dated Jul. 27, 2020, from corresponding U.S. Appl. No. 16/595,342.

(56) References Cited

OTHER PUBLICATIONS

Office Action, dated Jun. 1, 2020, from corresponding U.S. Appl. No. 16/862,952.
Office Action, dated Jun. 24, 2019, from corresponding U.S. Appl. No. 16/410,336.
Office Action, dated Jun. 24, 2021, from corresponding U.S. Appl. No. 17/234,205.
Office Action, dated Jun. 27, 2019, from corresponding U.S. Appl. No. 16/404,405.
Office Action, dated Jun. 7, 2021, from corresponding U.S. Appl. No. 17/200,698.
Office Action, dated Jun. 9, 2021, from corresponding U.S. Appl. No. 17/222,523.
Office Action, dated Mar. 11, 2019, from corresponding U.S. Appl. No. 16/220,978.
Office Action, dated Mar. 12, 2019, from corresponding U.S. Appl. No. 16/221,153.
Office Action, dated Mar. 15, 2021, from corresponding U.S. Appl. No. 17/149,421.
Office Action, dated Mar. 16, 2020, from corresponding U.S. Appl. No. 16/719,488.
Office Action, dated Mar. 17, 2020, from corresponding U.S. Appl. No. 16/565,395.
Office Action, dated Mar. 17, 2020, from corresponding U.S. Appl. No. 16/719,071.
Office Action, dated Mar. 20, 2020, from corresponding U.S. Appl. No. 16/778,709.
Office Action, dated Mar. 23, 2020, from corresponding U.S. Appl. No. 16/671,444.
Office Action, dated Mar. 25, 2019, from corresponding U.S. Appl. No. 16/278,121.
Office Action, dated Mar. 25, 2020, from corresponding U.S. Appl. No. 16/701,043.
Office Action, dated Mar. 25, 2020, from corresponding U.S. Appl. No. 16/791,006.
Office Action, dated Mar. 27, 2019, from corresponding U.S. Appl. No. 16/278,120.
Office Action, dated Mar. 30, 2018, from corresponding U.S. Appl. No. 15/894,890.
Office Action, dated Mar. 30, 2018, from corresponding U.S. Appl. No. 15/896,790.
Notice of Allowance, dated Nov. 3, 2020, from corresponding U.S. Appl. No. 16/719,071.
Notice of Allowance, dated Nov. 5, 2019, from corresponding U.S. Appl. No. 16/560,965.
Notice of Allowance, dated Nov. 7, 2017, from corresponding U.S. Appl. No. 15/671,073.
Notice of Allowance, dated Nov. 8, 2018, from corresponding U.S. Appl. No. 16/042,642.
Notice of Allowance, dated Nov. 9, 2020, from corresponding U.S. Appl. No. 16/595,342.
Notice of Allowance, dated Oct. 1, 2021, from corresponding U.S. Appl. No. 17/340,395.
Notice of Allowance, dated Oct. 10, 2019, from corresponding U.S. Appl. No. 16/277,539.
Notice of Allowance, dated Oct. 17, 2018, from corresponding U.S. Appl. No. 15/896,790.
Notice of Allowance, dated Oct. 17, 2018, from corresponding U.S. Appl. No. 16/054,672.
Notice of Allowance, dated Oct. 17, 2019, from corresponding U.S. Appl. No. 16/563,741.
Notice of Allowance, dated Oct. 21, 2019, from corresponding U.S. Appl. No. 16/404,405.
Notice of Allowance, dated Oct. 21, 2020, from corresponding U.S. Appl. No. 16/834,812.
Notice of Allowance, dated Oct. 22, 2021, from corresponding U.S. Appl. No. 17/346,847.
Notice of Allowance, dated Oct. 3, 2019, from corresponding U.S. Appl. No. 16/511,700.
Notice of Allowance, dated Sep. 1, 2021, from corresponding U.S. Appl. No. 17/196,570.
Notice of Allowance, dated Sep. 1, 2021, from corresponding U.S. Appl. No. 17/222,556.
Notice of Allowance, dated Sep. 12, 2019, from corresponding U.S. Appl. No. 16/512,011.
Notice of Allowance, dated Sep. 13, 2018, from corresponding U.S. Appl. No. 15/894,809.
Notice of Allowance, dated Sep. 13, 2018, from corresponding U.S. Appl. No. 15/894,890.
Notice of Allowance, dated Sep. 14, 2021, from corresponding U.S. Appl. No. 16/808,497.
Notice of Allowance, dated Sep. 16, 2020, from corresponding U.S. Appl. No. 16/915,097.
Notice of Allowance, dated Sep. 17, 2020, from corresponding U.S. Appl. No. 16/863,226.
Notice of Allowance, dated Sep. 18, 2018, from corresponding U.S. Appl. No. 15/894,819.
Notice of Allowance, dated Sep. 18, 2018, from corresponding U.S. Appl. No. 16/041,545.
Notice of Allowance, dated Sep. 18, 2020, from corresponding U.S. Appl. No. 16/812,795.
Notice of Allowance, dated Sep. 23, 2020, from corresponding U.S. Appl. No. 16/811,793.
Notice of Allowance, dated Sep. 23, 2021, from corresponding U.S. Appl. No. 17/068,454.
Notice of Allowance, dated Sep. 24, 2021, from corresponding U.S. Appl. No. 17/334,939.
Notice of Allowance, dated Sep. 25, 2020, from corresponding U.S. Appl. No. 16/983,536.
Notice of Allowance, dated Sep. 27, 2017, from corresponding U.S. Appl. No. 15/626,052.
Notice of Allowance, dated Sep. 27, 2021, from corresponding U.S. Appl. No. 17/222,523.
Notice of Allowance, dated Sep. 28, 2018, from corresponding U.S. Appl. No. 16/041,520.
Notice of Allowance, dated Sep. 29, 2021, from corresponding U.S. Appl. No. 17/316,179.
Notice of Allowance, dated Sep. 4, 2018, from corresponding U.S. Appl. No. 15/883,041.
Notice of Allowance, dated Sep. 4, 2020, from corresponding U.S. Appl. No. 16/808,500.
Notice of Allowance, dated Sep. 4, 2020, from corresponding U.S. Appl. No. 16/901,662.
Notice of Allowance, dated Sep. 9, 2021, from corresponding U.S. Appl. No. 17/334,909.
Restriction Requirement, dated Apr. 10, 2019, from corresponding U.S. Appl. No. 16/277,715.
Restriction Requirement, dated Apr. 13, 2020, from corresponding U.S. Appl. No. 16/817,136.
Restriction Requirement, dated Apr. 24, 2019, from corresponding U.S. Appl. No. 16/278,122.
Restriction Requirement, dated Aug. 7, 2019, from corresponding U.S. Appl. No. 16/410,866.
Restriction Requirement, dated Aug. 9, 2019, from corresponding U.S. Appl. No. 16/404,399.
Restriction Requirement, dated Dec. 17, 2021, from corresponding U.S. Appl. No. 17/475,244.
Restriction Requirement, dated Dec. 31, 2018, from corresponding U.S. Appl. No. 15/169,668.
Restriction Requirement, dated Dec. 9, 2019, from corresponding U.S. Appl. No. 16/565,395.
Restriction Requirement, dated Jan. 18, 2017, from corresponding U.S. Appl. No. 15/256,430.
Restriction Requirement, dated Jul. 28, 2017, from corresponding U.S. Appl. No. 15/169,658.
Restriction Requirement, dated Jun. 15, 2021, from corresponding U.S. Appl. No. 17/187,329.
Restriction Requirement, dated Jun. 15, 2021, from corresponding U.S. Appl. No. 17/222,556.
Restriction Requirement, dated Jun. 9, 2021, from corresponding U.S. Appl. No. 17/222,725.

(56) References Cited

OTHER PUBLICATIONS

Notice of Allowance, dated Mar. 1, 2019, from corresponding U.S. Appl. No. 16/059,911.
Notice of Allowance, dated Mar. 10, 2021, from corresponding U.S. Appl. No. 16/925,628.
Notice of Allowance, dated Mar. 10, 2021, from corresponding U.S. Appl. No. 17/128,666.
Notice of Allowance, dated Mar. 13, 2019, from corresponding U.S. Appl. No. 16/055,083.
Notice of Allowance, dated Mar. 14, 2019, from corresponding U.S. Appl. No. 16/055,944.
Notice of Allowance, dated Mar. 16, 2020, from corresponding U.S. Appl. No. 16/778,704.
Notice of Allowance, dated Mar. 16, 2021, from corresponding U.S. Appl. No. 17/149,380.
Notice of Allowance, dated Mar. 17, 2020, from corresponding U.S. Appl. No. 16/560,885.
Notice of Allowance, dated Mar. 18, 2020, from corresponding U.S. Appl. No. 16/560,963.
Notice of Allowance, dated Mar. 19, 2021, from corresponding U.S. Appl. No. 17/013,757.
Notice of Allowance, dated Mar. 2, 2018, from corresponding U.S. Appl. No. 15/858,802.
Notice of Allowance, dated Mar. 24, 2020, from corresponding U.S. Appl. No. 16/552,758.
Notice of Allowance, dated Mar. 25, 2019, from corresponding U.S. Appl. No. 16/054,780.
Notice of Allowance, dated Mar. 26, 2020, from corresponding U.S. Appl. No. 16/560,889.
Notice of Allowance, dated Mar. 26, 2020, from corresponding U.S. Appl. No. 16/578,712.
Notice of Allowance, dated Mar. 27, 2019, from corresponding U.S. Appl. No. 16/226,280.
Notice of Allowance, dated Mar. 29, 2019, from corresponding U.S. Appl. No. 16/055,998.
Notice of Allowance, dated Mar. 31, 2020, from corresponding U.S. Appl. No. 16/563,744.
Notice of Allowance, dated Mar. 31, 2021, from corresponding U.S. Appl. No. 17/013,758.
Notice of Allowance, dated Mar. 31, 2021, from corresponding U.S. Appl. No. 17/162,205.
Notice of Allowance, dated May 1, 2020, from corresponding U.S. Appl. No. 16/586,202.
Notice of Allowance, dated May 11, 2020, from corresponding U.S. Appl. No. 16/786,196.
Notice of Allowance, dated May 13, 2021, from corresponding U.S. Appl. No. 17/101,915.
Notice of Allowance, dated May 19, 2020, from corresponding U.S. Appl. No. 16/505,430.
Notice of Allowance, dated May 19, 2020, from corresponding U.S. Appl. No. 16/808,496.
Notice of Allowance, dated May 20, 2020, from corresponding U.S. Appl. No. 16/707,762.
Notice of Allowance, dated May 21, 2018, from corresponding U.S. Appl. No. 15/896,790.
Notice of Allowance, dated May 26, 2021, from corresponding U.S. Appl. No. 16/808,493.
Notice of Allowance, dated May 26, 2021, from corresponding U.S. Appl. No. 16/865,874.
Notice of Allowance, dated May 26, 2021, from corresponding U.S. Appl. No. 17/199,514.
Notice of Allowance, dated May 27, 2020, from corresponding U.S. Appl. No. 16/820,208.
Notice of Allowance, dated May 27, 2021, from corresponding U.S. Appl. No. 16/927,658.
Notice of Allowance, dated May 27, 2021, from corresponding U.S. Appl. No. 17/198,757.
Notice of Allowance, dated May 28, 2019, from corresponding U.S. Appl. No. 16/277,568.
Notice of Allowance, dated May 28, 2020, from corresponding U.S. Appl. No. 16/799,279.
Notice of Allowance, dated May 28, 2021, from corresponding U.S. Appl. No. 16/862,944.
Notice of Allowance, dated May 5, 2017, from corresponding U.S. Appl. No. 15/254,901.
Notice of Allowance, dated May 5, 2020, from corresponding U.S. Appl. No. 16/563,754.
Notice of Allowance, dated May 7, 2020, from corresponding U.S. Appl. No. 16/505,426.
Notice of Allowance, dated May 7, 2021, from corresponding U.S. Appl. No. 17/194,662.
Notice of Allowance, dated Nov. 14, 2019, from corresponding U.S. Appl. No. 16/436,616.
Notice of Allowance, dated Nov. 16, 2021, from corresponding U.S. Appl. No. 17/491,871.
Notice of Allowance, dated Nov. 2, 2018, from corresponding U.S. Appl. No. 16/054,762.
Notice of Allowance, dated Nov. 22, 2021, from corresponding U.S. Appl. No. 17/383,889.
Notice of Allowance, dated Nov. 23, 2020, from corresponding U.S. Appl. No. 16/791,589.
Notice of Allowance, dated Nov. 24, 2020, from corresponding U.S. Appl. No. 17/027,019.
Notice of Allowance, dated Nov. 25, 2020, from corresponding U.S. Appl. No. 17/019,771.
Notice of Allowance, dated Nov. 26, 2019, from corresponding U.S. Appl. No. 16/563,735.
Notice of Allowance, dated Nov. 27, 2019, from corresponding U.S. Appl. No. 16/570,712.
Notice of Allowance, dated Nov. 27, 2019, from corresponding U.S. Appl. No. 16/577,634.
Abdullah et al., "The Mapping Process of Unstructured Data to the Structured Data", ACM, pp. 151-155 (Year: 2013).
Acar, Gunes, et al., The Web Never Forgets, Computer and Communications Security, ACM, Nov. 3, 2014, pp. 674-689.
Aghasian, Erfan, et al., Scoring Users' Privacy Disclosure Across Multiple Online Social Networks,IEEE Access, Multidisciplinary Rapid Review Open Access Journal, Jul. 31, 2017, vol. 5, 2017.
Agosti et al., "Access and Exchange of Hierarchically Structured Resources on the Web with the NESTOR Framework", IEEE, pp. 659-662 (Year: 2009).
Agrawal et al., "Securing Electronic Health Records Without Impeding the Flow of Information," International Journal of Medical Informatics 76, 2007, pp. 471-479 (Year: 2007).
Ahmad et al., "Task-Oriented Access Model for Secure Data Sharing Over Cloud," ACM, pp. 1-7 (Year: 2015).
Ahmad, et al., "Performance of Resource Management Algorithms for Processable Bulk Data Transfer Tasks in Grid Environments," ACM, pp. 177-188 (Year: 2008).
Alaa et al., "Personalized Risk Scoring for Critical Care Prognosis Using Mixtures of Gaussian Processes," Apr. 27, 2017, IEEE, vol. 65, issue 1, pp. 207-217 (Year: 2017).
Aman et al., "Detecting Data Tampering Attacks in Synchrophasor Networks using Time Hopping," IEEE, pp. 1-6 (Year: 2016).
Amar et al., "Privacy-Aware Infrastructure for Managing Personal Data," ACM, pp. 571-572, Aug. 22-26, 2016 (Year: 2016).
Antunes et al., "Preserving Digital Data in Heterogeneous Environments", ACM, pp. 345-348, 2009 (Year: 2009).
Ardagna, et al., "A Privacy-Aware Access Control System," Journal of Computer Security, 16:4, pp. 369-397 (Year: 2008).
AvePoint, Automating Privacy Impact Assessments, AvePoint, Inc.
AvePoint, AvePoint Privacy Impact Assessment 1: User Guide, Cumulative Update 2, Revision E, Feb. 2015, AvePoint, Inc.
AvePoint, Installing and Configuring the APIA System, International Association of Privacy Professionals, AvePoint, Inc.
Ball, et al., "Aspects of the Computer-Based Patient Record," Computers in Healthcare, Springer-Verlag New York Inc., pp. 1-23 (Year: 1992).
Banerjee et al., "Link Before You Share: Managing Privacy Policies through Blockchain," IEEE, pp. 4438-4447 (Year: 2017).
Bang et al., "Building an Effective and Efficient Continuous Web Application Security Program," 2016 International Conference on

(56) References Cited

OTHER PUBLICATIONS

Cyber Security Situational Awareness, Data Analytics and Assessment (CyberSA), London, 2016, pp. 1-4 (Year: 2016).
Barker, "Personalizing Access Control by Generalizing Access Control," ACM, pp. 149-158 (Year: 2010).
Barr, "Amazon Rekognition Update—Estimated Age Range for Faces," AWS News Blog, Feb. 10, 2017, pp. 1-5 (Year: 2017).
Bayardo et al., "Technological Solutions for Protecting Privacy," Computer 36.9 (2003), pp. 115-118, (Year: 2003).
Berezovskiy et al., "A framework for dynamic data source identification and orchestration on the Web", ACM, pp. 1-8 (Year: 2010).
Bertino et al., "On Specifying Security Policies for Web Documents with an XML-based Language," ACM, pp. 57-65 (Year: 2001).
Bertino et al., "Towards Mechanisms for Detection and Prevention of Data Exfiltration by Insiders," Mar. 22, 2011, ACM, pp. 10-19 (Year: 2011).
Bhargav-Spantzel et al., Receipt Management—Transaction History based Trust Establishment, 2007, ACM, p. 82-91.
Bhuvaneswaran et al., "Redundant Parallel Data Transfer Schemes for the Grid Environment", ACM, pp. 18 (Year: 2006).
Bieker, et al., "Privacy-Preserving Authentication Solutions—Best Practices for Implementation and EU Regulatory Perspectives," Oct. 29, 2014, IEEE, pp. 1-10 (Year: 2014).
Bin, et al., "Research on Data Mining Models for the Internet of Things," IEEE, pp. 1-6 (Year: 2010).
Binns, et al., "Data Havens, or Privacy Sans Frontières? A Study of International Personal Data Transfers," ACM, pp. 273-274 (Year: 2002).
Bjorn Greif, "Cookie Pop-up Blocker: Cliqz Automatically Denies Consent Requests," Cliqz.com, pp. 1-9, Aug. 11, 2019 (Year: 2019).
Borgida, "Description Logics in Data Management," IEEE Transactions on Knowledge and Data Engineering, vol. 7, No. 5, Oct. 1995, pp. 671-682 (Year: 1995).
Brandt et al., "Efficient Metadata Management in Large Distributed Storage Systems," IEEE, pp. 1-9 (Year: 2003).
Bujlow et al., "Web Tracking: Mechanisms, Implications, and Defenses," Proceedings of the IEEE, Aug. 1, 2017, vol. 5, No. 8, pp. 1476-1510 (Year: 2017).
Byun, Ji-Won, Elisa Bertino, and Ninghui Li. "Purpose based access control of complex data for privacy protection." Proceedings of the tenth ACM symposium on Access control models and technologies. ACM, 2005. (Year: 2005).
Carminati et al., "Enforcing Access Control Over Data Streams," ACM, pp. 21-30 (Year: 2007).
Carpineto et al., "Automatic Assessment of Website Compliance to the European Cookie Law with CooLCheck," Proceedings of the 2016 ACM on Workshop on Privacy in the Electronic Society, 2016, pp. 135-138 (Year: 2016).
Cerpzone, "How to Access Data on Data Archival Storage and Recovery System", https://www.saj.usace.army.mil/Portals/44/docs/Environmental/Lake%20O%20Watershed/15February2017/How%20To%20Access%20Model%20Data%20on%20DASR.pdf?ver=2017-02-16-095535-633, Feb. 16, 2017.
Cha et al., "A Data-Driven Security Risk Assessment Scheme for Personal Data Protection," IEEE, pp. 50510-50517 (Year: 2018).
Cha, et al., "Process-Oriented Approach for Validating Asset Value for Evaluating Information Security Risk," IEEE, Aug. 31, 2009, pp. 379-385 (Year: 2009).
Chapados et al., "Scoring Models for Insurance Risk Sharing Pool Optimization," 2008, IEEE, pp. 97-105 (Year: 2008).
Cheng, Raymond, et al., "Radiatus: A Shared-Nothing Server-Side Web Architecture," Proceedings of the Seventh ACM Symposium on Cloud Computing, Oct. 5, 2016, pp. 237-250 (Year: 2016).
Choi et al., "Retrieval Effectiveness of Table of Contents and Subject Headings," ACM, pp. 103-104 (Year: 2007).
Chowdhury et al., "A System Architecture for Subject-Centric Data Sharing", ACM, pp. 1-10 (Year: 2018).
Chowdhury et al., "Managing Data Transfers in Computer Clusters with Orchestra," ACM, pp. 98-109 (Year: 2011).
Civili et al., "Mastro Studio: Managing Ontology-Based Data Access Applications," ACM, pp. 1314-1317, Aug. 26-30, 2013 (Year: 2013).
Decision Regarding Institution of Post-Grant Review in Case PGR2018-00056 for U.S. Pat. No. 9,691,090 B1, Oct. 11, 2018.
Degeling et al., "We Value Your Privacy . . . Now Take Some Cookies: Measuring the GDPRs Impact on Web Privacy," arxiv.org, Cornell University Library, 201 Olin Library Cornell University, Ithaca, NY 14853, Aug. 15, 2018, pp. 1-15 (Year: 2019).
Dimou et al., "Machine-Interpretable Dataset and Service Descriptions for Heterogeneous Data Access and Retrieval", ACM, pp. 145-152 (Year: 2015).
Dokholyan et al., "Regulatory and Ethical Considerations for Linking Clinical and Administrative Databases," American Heart Journal 157 6 (2009), pp. 971-982 (Year: 2009).
Dunkel et al., "Data Organization and Access for Efficient Data Mining", IEEE, pp. 522-529 (Year: 1999).
Choi et al., "A Survey on Ontology Mapping," ACM, pp. 34-41 (Year: 2006).
Cui et al., "Domain Ontology Management Environment," IEEE, pp. 1-9 (Year: 2000).
Falbo et al., "An Ontological Approach to Domain Engineering," ACM, pp. 351-358 (Year: 2002).
Final Office Action, dated Jun. 10, 2022, from corresponding U.S. Appl. No. 17/161,159.
Final Office Action, dated Jun. 9, 2022, from corresponding U.S. Appl. No. 17/494,220.
International Search Report, dated Jun. 1, 2022, from corresponding International Application No. PCT/US2022/016930.
International Search Report, dated Jun. 22, 2022, from corresponding International Application No. PCT/US2022/019358.
International Search Report, dated Jun. 24, 2022, from corresponding International Application No. PCT/US2022/019882.
Nemec et al., "Assessment of Query Execution Performance Using Selected Business Intelligence Tools and Experimental Agile Oriented Data Modeling Approach," Sep. 16, 2015, IEEE, pp. 1327-1333. (Year: 2015).
Notice of Allowance, dated Jun. 14, 2022, from corresponding U.S. Appl. No. 17/679,734.
Notice of Allowance, dated Jun. 16, 2022, from corresponding U.S. Appl. No. 17/119,080.
Notice of Allowance, dated Jun. 2, 2022, from corresponding U.S. Appl. No. 17/493,290.
Notice of Allowance, dated Jun. 23, 2022, from corresponding U.S. Appl. No. 17/588,645.
Notice of Allowance, dated Jun. 8, 2022, from corresponding U.S. Appl. No. 17/722,551.
Notice of Allowance, dated May 27, 2022, from corresponding U.S. Appl. No. 17/543,546.
Notice of Allowance, dated May 31, 2022, from corresponding U.S. Appl. No. 17/679,715.
Office Action, dated Jun. 1, 2022, from corresponding U.S. Appl. No. 17/306,496.
Office Action, dated Jun. 14, 2022, from corresponding U.S. Appl. No. 17/346,586.
Office Action, dated Jun. 16, 2022, from corresponding U.S. Appl. No. 17/689,683.
Ozdikis et al., "Tool Support for Transformation from an OWL Ontology to an HLA Object Model," ACM, pp. 1-6 (Year: 2010).
Vukovic et al., "Managing Enterprise IT Systems Using Online Communities," Jul. 9, 2011, IEEE, pp. 552-559. (Year: 2011).
Wong et al., "Ontology Mapping for the Interoperability Problem in Network Management," IEEE, pp. 2058-2068 (Year: 2005).
Written Opinion of the International Searching Authority, dated Jun. 1, 2022, from corresponding International Application No. PCT/US2022/016930.
Written Opinion of the International Searching Authority, dated Jun. 22, 2022, from corresponding International Application No. PCT/US2022/019358.
Written Opinion of the International Searching Authority, dated Jun. 24, 2022, from corresponding International Application No. PCT/US2022/019882.

(56) References Cited

OTHER PUBLICATIONS

Final Office Action, dated Jul. 1, 2022, from corresponding U.S. Appl. No. 17/187,329.
Final Office Action, dated Jul. 6, 2022, from corresponding U.S. Appl. No. 17/200,698.
Final Office Action, dated Jun. 29, 2022, from corresponding U.S. Appl. No. 17/020,275.
Notice of Allowance, dated Jun. 29, 2022, from corresponding U.S. Appl. No. 17/675,118.
Restriction Requirement, dated May 5, 2020, from corresponding U.S. Appl. No. 16/808,489.
Restriction Requirement, dated Nov. 10, 2021, from corresponding U.S. Appl. No. 17/366,754.
Restriction Requirement, dated Nov. 15, 2019, from corresponding U.S. Appl. No. 16/586,202.
Restriction Requirement, dated Nov. 21, 2016, from corresponding U.S. Appl. No. 15/254,901.
Restriction Requirement, dated Nov. 5, 2019, from corresponding U.S. Appl. No. 16/563,744.
Restriction Requirement, dated Oct. 17, 2018, from corresponding U.S. Appl. No. 16/055,984.
Restriction Requirement, dated Oct. 6, 2021, from corresponding U.S. Appl. No. 17/340,699.
Restriction Requirement, dated Sep. 15, 2020, from corresponding U.S. Appl. No. 16/925,628.
Restriction Requirement, dated Sep. 9, 2019, from corresponding U.S. Appl. No. 16/505,426.
Advisory Action, dated Jan. 13, 2021, from corresponding U.S. Appl. No. 16/808,493.
Advisory Action, dated Jan. 13, 2021, from corresponding U.S. Appl. No. 16/862,944.
Advisory Action, dated Jan. 13, 2021, from corresponding U.S. Appl. No. 16/862,948.
Advisory Action, dated Jan. 13, 2021, from corresponding U.S. Appl. No. 16/862,952.
Advisory Action, dated Jan. 6, 2021, from corresponding U.S. Appl. No. 16/808,497.
Advisory Action, dated Jun. 19, 2020, from corresponding U.S. Appl. No. 16/595,342.
Advisory Action, dated Jun. 2, 2020, from corresponding U.S. Appl. No. 16/404,491.
Advisory Action, dated May 21, 2020, from corresponding U.S. Appl. No. 16/557,392.
Written Opinion of the International Searching Authority, dated Jun. 6, 2017, from corresponding International Application No. PCT/US2017/025611.
Written Opinion of the International Searching Authority, dated Aug. 15, 2017, from corresponding International Application No. PCT/US2017/036919.
Written Opinion of the International Searching Authority, dated Aug. 21, 2017, from corresponding International Application No. PCT/US2017/036914.
Written Opinion of the International Searching Authority, dated Aug. 29, 2017, from corresponding International Application No. PCT/US2017/036898.
Written Opinion of the International Searching Authority, dated Aug. 8, 2017, from corresponding International Application No. PCT/US2017/036889.
Written Opinion of the International Searching Authority, dated Aug. 8, 2017, from corresponding International Application No. PCT/US2017/036890.
Written Opinion of the International Searching Authority, dated Aug. 8, 2017, from corresponding International Application No. PCT/US2017/036893.
Written Opinion of the International Searching Authority, dated Aug. 8, 2017, from corresponding International Application No. PCT/US2017/036901.
Written Opinion of the International Searching Authority, dated Aug. 8, 2017, from corresponding International Application No. PCT/US2017/036913.
Written Opinion of the International Searching Authority, dated Aug. 8, 2017, from corresponding International Application No. PCT/US2017/036920.
Written Opinion of the International Searching Authority, dated Dec. 14, 2018, from corresponding International Application No. PCT/US2018/045296.
Written Opinion of the International Searching Authority, dated Dec. 22, 2021, from corresponding International Application No. PCT/US2021/051217.
Written Opinion of the International Searching Authority, dated Jan. 14, 2019, from corresponding International Application No. PCT/US2018/046949.
Written Opinion of the International Searching Authority, dated Jan. 5, 2022, from corresponding International Application No. PCT/US2021/050497.
Written Opinion of the International Searching Authority, dated Jan. 7, 2019, from corresponding International Application No. PCT/US2018/055772.
Written Opinion of the International Searching Authority, dated Jun. 21, 2017, from corresponding International Application No. PCT/US2017/025600.
Written Opinion of the International Searching Authority, dated Jun. 6, 2017, from corresponding International Application No. PCT/US2017/025605.
Written Opinion of the International Searching Authority, dated Mar. 14, 2019, from corresponding International Application No. PCT/US2018/055736.
Written Opinion of the International Searching Authority, dated Mar. 4, 2019, from corresponding International Application No. PCT/US2018/055773.
Written Opinion of the International Searching Authority, dated Mar. 4, 2019, from corresponding International Application No. PCT/US2018/055774.
Written Opinion of the International Searching Authority, dated Nov. 12, 2021, from corresponding International Application No. PCT/US2021/043481.
Written Opinion of the International Searching Authority, dated Nov. 19, 2018, from corresponding International Application No. PCT/US2018/046939.
Written Opinion of the International Searching Authority, dated Nov. 3, 2021, from corresponding International Application No. PCT/US2021/040893.
Written Opinion of the International Searching Authority, dated Nov. 3, 2021, from corresponding International Application No. PCT/US2021/044910.
Written Opinion of the International Searching Authority, dated Oct. 11, 2018, from corresponding International Application No. PCT/US2018/043975.
Written Opinion of the International Searching Authority, dated Oct. 11, 2018, from corresponding International Application No. PCT/US2018/043976.
Written Opinion of the International Searching Authority, dated Oct. 11, 2018, from corresponding International Application No. PCT/US2018/043977.
Written Opinion of the International Searching Authority, dated Oct. 11, 2018, from corresponding International Application No. PCT/US2018/044026.
Written Opinion of the International Searching Authority, dated Oct. 11, 2018, from corresponding International Application No. PCT/US2018/045240.
Written Opinion of the International Searching Authority, dated Oct. 12, 2017, from corresponding International Application No. PCT/US2017/036888.
Written Opinion of the International Searching Authority, dated Oct. 12, 2018, from corresponding International Application No. PCT/US2018/044046.
Written Opinion of the International Searching Authority, dated Oct. 16, 2018, from corresponding International Application No. PCT/US2018/045243.
Written Opinion of the International Searching Authority, dated Oct. 18, 2018, from corresponding International Application No. PCT/US2018/045249.

(56) References Cited

OTHER PUBLICATIONS

Office Action, dated Mar. 30, 2021, from corresponding U.S. Appl. No. 17/151,399.
Office Action, dated Mar. 4, 2019, from corresponding U.S. Appl. No. 16/237,083.
Office Action, dated May 14, 2020, from corresponding U.S. Appl. No. 16/808,497.
Office Action, dated May 14, 2020, from corresponding U.S. Appl. No. 16/808,503.
Office Action, dated May 15, 2020, from corresponding U.S. Appl. No. 16/808,493.
Office Action, dated May 16, 2018, from corresponding U.S. Appl. No. 15/882,989.
Office Action, dated May 17, 2019, from corresponding U.S. Appl. No. 16/277,539.
Office Action, dated May 18, 2021, from corresponding U.S. Appl. No. 17/196,570.
Office Action, dated May 2, 2018, from corresponding U.S. Appl. No. 15/894,809.
Office Action, dated May 2, 2019, from corresponding U.S. Appl. No. 16/104,628.
Office Action, dated May 29, 2020, from corresponding U.S. Appl. No. 16/862,944.
Office Action, dated May 29, 2020, from corresponding U.S. Appl. No. 16/862,948.
Office Action, dated May 29, 2020, from corresponding U.S. Appl. No. 16/863,226.
Office Action, dated May 5, 2020, from corresponding U.S. Appl. No. 16/410,336.
Office Action, dated Nov. 1, 2017, from corresponding U.S. Appl. No. 15/169,658.
Office Action, dated Nov. 10, 2021, from corresponding U.S. Appl. No. 17/380,485.
Office Action, dated Nov. 10, 2021, from corresponding U.S. Appl. No. 17/409,999.
Office Action, dated Nov. 12, 2020, from corresponding U.S. Appl. No. 17/034,355.
Office Action, dated Nov. 12, 2020, from corresponding U.S. Appl. No. 17/034,772.
Office Action, dated Nov. 12, 2021, from corresponding U.S. Appl. No. 17/346,586.
Office Action, dated Nov. 12, 2021, from corresponding U.S. Appl. No. 17/373,444.
Office Action, dated Nov. 15, 2018, from corresponding U.S. Appl. No. 16/059,911.
Office Action, dated Nov. 15, 2019, from corresponding U.S. Appl. No. 16/552,758.
Office Action, dated Nov. 16, 2021, from corresponding U.S. Appl. No. 17/370,650.
Office Action, dated Nov. 16, 2021, from corresponding U.S. Appl. No. 17/486,350.
Office Action, dated Nov. 18, 2019, from corresponding U.S. Appl. No. 16/560,885.
Office Action, dated Nov. 18, 2019, from corresponding U.S. Appl. No. 16/560,889.
Office Action, dated Nov. 18, 2019, from corresponding U.S. Appl. No. 16/572,347.
Office Action, dated Nov. 19, 2019, from corresponding U.S. Appl. No. 16/595,342.
Office Action, dated Nov. 20, 2019, from corresponding U.S. Appl. No. 16/595,327.
Office Action, dated Nov. 23, 2018, from corresponding U.S. Appl. No. 16/042,673.
Office Action, dated Nov. 23, 2021, from corresponding U.S. Appl. No. 17/013,756.
Office Action, dated Nov. 24, 2020, from corresponding U.S. Appl. No. 16/925,628.
Office Action, dated Nov. 26, 2021, from corresponding U.S. Appl. No. 16/925,550.
Office Action, dated Nov. 4, 2021, from corresponding U.S. Appl. No. 17/491,906.
Office Action, dated Nov. 8, 2021, from corresponding U.S. Appl. No. 16/872,130.
Office Action, dated Oct. 10, 2018, from corresponding U.S. Appl. No. 16/041,563.
Office Action, dated Oct. 10, 2018, from corresponding U.S. Appl. No. 16/055,083.
Office Action, dated Oct. 10, 2018, from corresponding U.S. Appl. No. 16/055,944.
Office Action, dated Oct. 12, 2021, from corresponding U.S. Appl. No. 17/346,509.
Office Action, dated Oct. 14, 2020, from corresponding U.S. Appl. No. 16/927,658.
Office Action, dated Oct. 15, 2018, from corresponding U.S. Appl. No. 16/054,780.
Office Action, dated Oct. 15, 2021, from corresponding U.S. Appl. No. 16/908,081.
Office Action, dated Oct. 16, 2019, from corresponding U.S. Appl. No. 16/557,392.
Office Action, dated Oct. 16, 2020, from corresponding U.S. Appl. No. 16/808,489.
Office Action, dated Oct. 23, 2018, from corresponding U.S. Appl. No. 16/055,961.
Office Action, dated Oct. 26, 2018, from corresponding U.S. Appl. No. 16/041,468.
Office Action, dated Oct. 8, 2019, from corresponding U.S. Appl. No. 16/552,765.
Office Action, dated Sep. 1, 2017, from corresponding U.S. Appl. No. 15/619,459.
Office Action, dated Sep. 11, 2017, from corresponding U.S. Appl. No. 15/619,375.
Dwork, Cynthia, Differential Privacy, Microsoft Research, p. 1-12.
Emerson, et al., "A Data Mining Driven Risk Profiling Method for Road Asset Management," ACM, pp. 1267-1275 (Year: 2013).
Enck, William, et al., TaintDroid: An Information-Flow Tracking System for Realtime Privacy Monitoring on Smartphones, ACM Transactions on Computer Systems, vol. 32, No. 2, Article 5, Jun. 2014, p. 5:1-5:29.
Everypixel Team, "A New Age Recognition API Detects the Age of People on Photos," May 20, 2019, pp. 1-5 (Year: 2019).
Falahrastegar, Marjan, et al., Tracking Personal Identifiers Across the Web, Medical Image Computing and Computer-Assisted Intervention—Miccai 2015, 18th International Conference, Oct. 5, 2015, Munich, Germany.
Fan et al., "Intrusion Investigations with Data-hiding for Computer Log-file Forensics," IEEE, pp. 1-6 (Year: 2010).
Final Written Decision Regarding Post-Grant Review in Case PGR2018-00056 for U.S. Pat. No. 9,691,090 B1, dated Oct. 10, 2019.
Francis, Andre, Business Mathematics and Statistics, South-Western Cengage Learning, 2008, Sixth Edition.
Friedman et al., "Data Mining with Differential Privacy," ACM, Jul. 2010, pp. 493-502 (Year: 2010).
Friedman et al., "Informed Consent in the Mozilla Browser: Implementing Value-Sensitive Design," Proceedings of the 35th Annual Hawaii International Conference on System Sciences, 2002, IEEE, pp. 1-10 (Year: 2002).
Frikken, Keith B., et al., Yet Another Privacy Metric for Publishing Micro-data, Miami University, Oct. 27, 2008, p. 117-121.
Fung et al., "Discover Information and Knowledge from Websites using an Integrated Summarization and Visualization Framework", IEEE, pp. 232-235 (Year: 2010).
Gajare et al., "Improved Automatic Feature Selection Approach for Health Risk Prediction," Feb. 16, 2018, IEEE, pp. 816-819 (Year: 2018).
Geko et al., "An Ontology Capturing the Interdependence of the General Data Protection Regulation (GDPR) and Information Security," ACM, pp. 1-6, Nov. 15-16, 2018 (Year: 2018).
Ghiglieri, Marco et al.; Personal DLP for Facebook, 2014 IEEE International Conference on Pervasive Computing and Communication Workshops (Percom Workshops); IEEE; Mar. 24, 2014; pp. 629-634.

(56) References Cited

OTHER PUBLICATIONS

Gilda, et al., "Blockchain for Student Data Privacy and Consent," 2018 International Conference on Computer Communication and Informatics, Jan. 4-6, 2018, IEEE, pp. 1-5 (Year: 2018).
Golab, et al., "Issues in Data Stream Management," ACM, SIGMOD Record, vol. 32, No. 2, Jun. 2003, pp. 5-14 (Year: 2003).
Golfarelli et al., "Beyond Data Warehousing: What's Next in Business Intelligence?," ACM, pp. 1-6 (Year: 2004).
Gonçalves et al., "The XML Log Standard for Digital Libraries: Analysis, Evolution, and Deployment," IEEE, pp. 312-314 (Year: 2003).
Goni, Kyriaki, "Deletion Process_Only you can see my history: Investigating Digital Privacy, Digital Oblivion, and Control on Personal Data Through an Interactive Art Installation," ACM, 2016, retrieved online on Oct. 3, 2019, pp. 324-333. Retrieved from the Internet URL: http://delivery.acm.org/10.1145/2920000/291.
Gowadia et al., "RDF Metadata for XML Access Control," ACM, pp. 31-48 (Year: 2003).
Grolinger, et al., "Data Management in Cloud Environments: NoSQL and NewSQL Data Stores," Journal of Cloud Computing: Advances, Systems and Applications, pp. 1-24 (Year: 2013).
Guo, et al., "OPAL: A Passe-partout for Web Forms," ACM, pp. 353-356 (Year: 2012).
Gustarini, et al., "Evaluation of Challenges in Human Subject Studies "In-the-Wild" Using Subjects' Personal Smartphones," ACM, pp. 1447-1456 (Year: 2013).
Hacigümüs, Hakan, et al., Executing SQL over Encrypted Data in the Database-Service-Provider Model, ACM, Jun. 4, 2002, pp. 216-227.
Halevy, et al., "Schema Mediation in Peer Data Management Systems," IEEE, Proceedings of the 19th International Conference on Data Engineering, 2003, pp. 505-516 (Year: 2003).
Hauch, et al., "Information Intelligence: Metadata for Information Discovery, Access, and Integration," ACM, pp. 793-798 (Year: 2005).
He et al., "A Crowdsourcing Framework for Detecting of Cross-Browser Issues in Web Application," ACM, pp. 1-4, Nov. 6, 2015 (Year: 2015).
Hernandez, et al., "Data Exchange with Data-Metadata Translations," ACM, pp. 260-273 (Year: 2008).
Hinde, "A Model to Assess Organisational Information Privacy Maturity Against the Protection of Personal Information Act" Dissertation University of Cape Town 2014, pp. 1-121 (Year: 2014).
Hodge, et al., "Managing Virtual Data Marts with Metapointer Tables," pp. 1-7 (Year: 2002).
Horrall et al., "Evaluating Risk: IBM's Country Financial Risk and Treasury Risk Scorecards," Jul. 21, 2014, IBM, vol. 58, issue 4, pp. 2:1-2:9 (Year: 2014).
Hu, et al., "Attribute Considerations for Access Control Systems," NIST Special Publication 800-205, Jun. 2019, pp. 1-42 (Year: 2019).
Hu, et al., "Guide to Attribute Based Access Control (ABAC) Definition and Considerations (Draft)," NIST Special Publication 800-162, pp. 1-54 (Year: 2013).
Huang, et al., "A Study on Information Security Management with Personal Data Protection," IEEE, Dec. 9, 2011, pp. 624-630 (Year: 2011).
Huner et al., "Towards a Maturity Model for Corporate Data Quality Management", ACM, pp. 231-238, 2009 (Year: 2009).
Hunton & Williams LLP, The Role of Risk Management in Data Protection, Privacy Risk Framework and the Risk-based Approach to Privacy, Centre for Information Policy Leadership, Workshop II, Nov. 23, 2014.
Huo et al., "A Cloud Storage Architecture Model for Data-Intensive Applications," IEEE, pp. 1-4 (Year: 2011).
IAPP, Daily Dashboard, PIA Tool Stocked With New Templates for DPI, Infosec, International Association of Privacy Professionals, Apr. 22, 2014.
IAPP, ISO/IEC 27001 Information Security Management Template, Resource Center, International Association of Privacy Professionals.
Imran et al., "Searching in Cloud Object Storage by Using a Metadata Model", IEEE, 2014, retrieved online on Apr. 1, 2020, pp. 121-128. Retrieved from the Internet: URL: https://ieeexplore.ieee.org/stamp/stamp.jsp? (Year: 2014).
Iordanou et al., "Tracing Cross Border Web Tracking," Oct. 31, 2018, pp. 329-342, ACM (Year: 2018).
Islam, et al., "Mixture Model Based Label Association Techniques for Web Accessibility," ACM, pp. 67-76 (Year: 2010).
Jensen, et al., "Temporal Data Management," IEEE Transactions on Knowledge and Data Engineering, vol. 11, No. 1, Jan./Feb. 1999, pp. 36-44 (Year: 1999).
Joel Reardon et al., Secure Data Deletion from Persistent Media, ACM, Nov. 4, 2013, retrieved online on Jun. 13, 2019, pp. 271-283. Retrieved from the Internet: URL: http://delivery.acm.org/10.1145/2520000/2516699/p271-reardon.pdf? (Year: 2013).
Jones et al., "AI and the Ethics of Automating Consent," IEEE, pp. 64-72, May 2018 (Year: 2018).
Joonbakhsh et al., "Mining and Extraction of Personal Software Process measures through IDE Interaction logs," ACM/IEEE, 2018, retrieved online on Dec. 2, 2019, pp. 78-81. Retrieved from the Internet: URL: http://delivery.acm.org/10.1145/3200000/3196462/p78-joonbakhsh.pdf? (Year: 2018).
Jun et al., "Scalable Multi-Access Flash Store for Big Data Analytics," ACM, pp. 55-64 (Year: 2014).
Kirkham, et al., "A Personal Data Store for an Internet of Subjects," IEEE, pp. 92-97 (Year: 2011).
Korba, Larry et al.; "Private Data Discovery for Privacy Compliance in Collaborative Environments"; Cooperative Design, Visualization, and Engineering; Springer Beriin Heidelberg; Sep. 21, 2008; pp. 142-150.
Salim et al., "Data Retrieval and Security using Lightweight Directory Access Protocol", IEEE, pp. 685-688 (Year: 2009).
Santhisree, et al., "Web Usage Data Clustering Using Dbscan Algorithm and Set Similarities," IEEE, pp. 220-224 (Year: 2010).
Sanzo et al., "Analytical Modeling of Lock-Based Concurrency Control with Arbitrary Transaction Data Access Patterns," ACM, pp. 69-78 (Year: 2010).
Schwartz, Edward J., et al., 2010 IEEE Symposium on Security and Privacy: All You Ever Wanted to Know About Dynamic Analysis and forward Symbolic Execution (but might have been afraid to ask), Carnegie Mellon University, IEEE Computer Society, 2010, pp. 317-331.
Sedinic et al., "Security Risk Management in Complex Organization," May 29, 2015, IEEE, pp. 1331-1337 (Year: 2015).
Shahriar et al., "A Model-Based Detection of Vulnerable and Malicious Browser Extensions," IEEE, pp. 198-207 (Year: 2013).
Shankar et al., "Doppleganger: Better Browser Privacy Without the Bother," Proceedings of the 13th ACM Conference on Computer and Communications Security; [ACM Conference on Computer and Communications Security], New York, NY: ACM, US, Oct. 30, 2006, pp. 154-167 (Year: 2006).
Singh, et al., "A Metadata Catalog Service for Data Intensive Applications," ACM, pp. 1-17 (Year: 2003).
Sjosten et al., "Discovering Browser Extensions via Web Accessible Resources," ACM, pp. 329-336, Mar. 22, 2017 (Year: 2017).
Slezak, et al., "Brighthouse: An Analytic Data Warehouse for Ad-hoc Queries," ACM, pp. 1337-1345 (Year: 2008).
Soceanu, et al., "Managing the Privacy and Security of eHealth Data," May 29, 2015, IEEE, pp. 1-8 (Year: 2015).
Srinivasan et al., "Descriptive Data Analysis of File Transfer Data," ACM, pp. 1-8 (Year: 2014).
Srivastava, Agrima, et al., Measuring Privacy Leaks in Online Social Networks, International Conference on Advances in Computing, Communications and Informatics (ICACCI), 2013.
Stack Overflow, "Is there a way to force a user to scroll to the bottom of a div?," Stack Overflow, pp. 1-11, Nov. 2013. [Online], Available: https://stackoverflow.com/questions/2745935/is-there-a-way-to-force-a-user-to-scroll-to-the-bottom-of-a-div (Year: 2013).
Stern, Joanna, "iPhone Privacy Is Broken . . . and Apps Are to Blame", The Wall Street Journal, wsj.com, May 31, 2019.

(56) References Cited

OTHER PUBLICATIONS

Strodl, et al., "Personal & SOHO Archiving," Vienna University of Technology, Vienna, Austria, JCDL '08, Jun. 16-20, 2008, Pittsburgh, Pennsylvania, USA, pp. 115-123 (Year: 2008).
Sukumar et al., "Review on Modern Data Preprocessing Techniques in Web Usage Mining (WUM)," IEEE, 2016, pp. 64-69 (Year: 2016).
Symantec, Symantex Data Loss Prevention—Discover, monitor, and protect confidential data; 2008; Symantec Corporation; http://www.mssuk.com/images/Symantec%2014552315_IRC_BR_DLP_03.09_sngl.pdf.
Tanasa et al., "Advanced Data Preprocessing for Intersites Web Usage Mining," IEEE, Mar. 2004, pp. 59-65 (Year: 2004).
Tanwar, et al., "Live Forensics Analysis: Violations of Business Security Policy," 2014 International Conference on Contemporary Computing and Informatics (IC3I), 2014, pp. 971-976 (Year: 2014).
The Cookie Collective, Optanon Cookie Policy Generator, The Cookie Collective, Year 2016, http://web.archive.org/web/20160324062743/https:/optanon.com/.
Thuraisingham, "Security Issues for the Semantic Web," Proceedings 27th Annual International Computer Software and Applications Conference, COMPSAC 2003, Dallas, TX, USA, 2003, pp. 633-638 (Year: 2003).
TRUSTe Announces General Availability of Assessment Manager for Enterprises to Streamline Data Privacy Management with Automation, PRNewswire, Mar. 4, 2015.
Tsai et al., "Determinants of Intangible Assets Value: The Data Mining Approach," Knowledge Based System, pp. 67-77 http://www.elsevier.com/locate/knosys (Year: 2012).
Tuomas Aura et al., Scanning Electronic Documents for Personally Identifiable Information, ACM, Oct. 30, 2006, retrieved online on Jun. 13, 2019, pp. 41-49. Retrieved from the Internet: URL: http://delivery.acm.org/10.1145/1180000/1179608Zp41-aura.pdf? (Year: 2006).
Van Eijk et al., "The Impact of User Location on Cookie Notices (Inside and Outside of the European Union," IEEE Security & Privacy Workshop on Technology and Consumer Protection (CONPRO '19), Jan. 1, 2019 (Year: 2019).
Wang et al., "Revealing Key Non-Financial Factors for Online Credit-Scoring in E-Financing," 2013, IEEE, pp. 1-6 (Year: 2013).
Wang et al., "Secure and Efficient Access to Outsourced Data," ACM, pp. 55-65 (Year: 2009).
Weaver et al., "Understanding Information Preview in Mobile Email Processing", ACM, pp. 303-312, 2011 (Year: 2011).
Wu et al., "Data Mining with Big Data," IEEE, Jan. 2014, pp. 97-107, vol. 26, No. 1, (Year: 2014).
www.truste.com (1), Feb. 7, 2015, Internet Archive Wayback Machine, www.archive.org,2_7_2015.
Xu, et al., "GatorShare: A File System Framework for High-Throughput Data Management," ACM, pp. 776-786 (Year: 2010).
Yang et al., "DAC-MACS: Effective Data Access Control for Multiauthority Cloud Storage Systems," IEEE, pp. 1790-1801 (Year: 2013).
Yang et al., "Mining Web Access Sequence with Improved Apriori Algorithm," IEEE, 2017, pp. 780-784 (Year: 2017).
Ye et al., "An Evolution-Based Cache Scheme for Scalable Mobile Data Access," ACM, pp. 1-7 (Year: 2007).
Yin et al., "Multibank Memory Optimization for Parallel Data Access in Multiple Data Arrays", ACM, pp. 1-8 (Year: 2016).
Yu et al., "Outsourced Similarity Search on Metric Data Assets", IEEE, pp. 338-352 (Year: 2012).
Yu, "Using Data from Social Media Websites to Inspire the Design of Assistive Technology", ACM, pp. 1-2 (Year: 2016).
Yu, et al., "Performance and Fairness Issues in Big Data Transfers," ACM, pp. 9-11 (Year: 2014).
Yue et al., "An Automatic HTTP Cookie Management System," Computer Networks, Elsevier, Amsterdam, NL, vol. 54, No. 13, Sep. 15, 2010, pp. 2182-2198 (Year: 2010).
Zannone, et al., "Maintaining Privacy on Derived Objects," ACM, pp. 10-19 (Year: 2005).
Zeldovich, Nickolai, et al., Making Information Flow Explicit in HiStar, OSDI '06: 7th USENIX Symposium on Operating Systems Design and Implementation, USENIX Association, p. 263-278.
Zhang et al., "Data Transfer Performance Issues for a Web Services Interface to Synchrotron Experiments", ACM, pp. 59-65 (Year: 2007).
Zhang et al., "Dynamic Topic Modeling for Monitoring Market Competition from Online Text and Image Data", ACM, pp. 1425-1434 (Year: 2015).
Zheng, et al., "Methodologies for Cross-Domain Data Fusion: An Overview," IEEE, pp. 16-34 (Year: 2015).
Zheng, et al., "Toward Assured Data Deletion in Cloud Storage," IEEE, vol. 34, No. 3, pp. 101-107 May/Jun. 2020 (Year: 2020).
Zhu, et al., "Dynamic Data Integration Using Web Services," IEEE, pp. 1-8 (Year: 2004).
Final Office Action, dated Apr. 23, 2020, from corresponding U.S. Appl. No. 16/572,347.
Final Office Action, dated Apr. 27, 2021, from corresponding U.S. Appl. No. 17/068,454.
Final Office Action, dated Apr. 7, 2020, from corresponding U.S. Appl. No. 16/595,327.
Final Office Action, dated Aug. 10, 2020, from corresponding U.S. Appl. No. 16/791,589.
Final Office Action, dated Aug. 27, 2021, from corresponding U.S. Appl. No. 17/161,159.
Final Office Action, dated Aug. 28, 2020, from corresponding U.S. Appl. No. 16/410,336.
Final Office Action, dated Aug. 5, 2020, from corresponding U.S. Appl. No. 16/719,071.
Final Office Action, dated Aug. 9, 2021, from corresponding U.S. Appl. No. 17/119,080.
Final Office Action, dated Dec. 10, 2021, from corresponding U.S. Appl. No. 17/187,329.
Final Office Action, dated Dec. 7, 2020, from corresponding U.S. Appl. No. 16/862,956.
Final Office Action, dated Dec. 9, 2019, from corresponding U.S. Appl. No. 16/410,336.
Final Office Action, dated Feb. 19, 2020, from corresponding U.S. Appl. No. 16/404,491.
Final Office Action, dated Feb. 3, 2020, from corresponding U.S. Appl. No. 16/557,392.
Final Office Action, dated Feb. 8, 2021, from corresponding U.S. Appl. No. 16/927,658.
Final Office Action, dated Jan. 17, 2018, from corresponding U.S. Appl. No. 15/619,278.
Final Office Action, dated Jan. 21, 2020, from corresponding U.S. Appl. No. 16/410,762.
Final Office Action, dated Jan. 23, 2018, from corresponding U.S. Appl. No. 15/619,479.
Final Office Action, dated Jan. 23, 2020, from corresponding U.S. Appl. No. 16/505,430.
Final Office Action, dated Jul. 21, 2021, from corresponding U.S. Appl. No. 17/151,334.
Final Office Action, dated Jul. 7, 2021, from corresponding U.S. Appl. No. 17/149,421.
Final Office Action, dated Mar. 26, 2021, from corresponding U.S. Appl. No. 17/020,275.
Final Office Action, dated Mar. 5, 2019, from corresponding U.S. Appl. No. 16/055,961.
Final Office Action, dated Mar. 6, 2020, from corresponding U.S. Appl. No. 16/595,342.
Final Office Action, dated May 14, 2021, from corresponding U.S. Appl. No. 17/013,756.
Final Office Action, dated Nov. 29, 2017, from corresponding U.S. Appl. No. 15/619,237.
Final Office Action, dated Oct. 26, 2021, from corresponding U.S. Appl. No. 17/306,496.
Final Office Action, dated Oct. 28, 2021, from corresponding U.S. Appl. No. 17/234,205.
Final Office Action, dated Oct. 29, 2021, from corresponding U.S. Appl. No. 17/020,275.
Final Office Action, dated Sep. 17, 2021, from corresponding U.S. Appl. No. 17/200,698.

(56) References Cited

OTHER PUBLICATIONS

Final Office Action, dated Sep. 21, 2020, from corresponding U.S. Appl. No. 16/808,493.
Final Office Action, dated Sep. 21, 2020, from corresponding U.S. Appl. No. 16/862,944.
Final Office Action, dated Sep. 22, 2020, from corresponding U.S. Appl. No. 16/808,497.
Final Office Action, dated Sep. 23, 2020, from corresponding U.S. Appl. No. 16/862,948.
Final Office Action, dated Sep. 24, 2020, from corresponding U.S. Appl. No. 16/862,952.
Final Office Action, dated Sep. 25, 2019, from corresponding U.S. Appl. No. 16/278,119.
Final Office Action, dated Sep. 28, 2020, from corresponding U.S. Appl. No. 16/565,395.
Final Office Action, dated Sep. 8, 2020, from corresponding U.S. Appl. No. 16/410,866.
Office Action, dated Apr. 1, 2021, from corresponding U.S. Appl. No. 17/119,080.
Office Action, dated Apr. 15, 2021, from corresponding U.S. Appl. No. 17/161,159.
Office Action, dated Apr. 18, 2018, from corresponding U.S. Appl. No. 15/894,819.
Office Action, dated Apr. 2, 2021, from corresponding U.S. Appl. No. 17/151,334.
Office Action, dated Apr. 20, 2020, from corresponding U.S. Appl. No. 16/812,795.
Office Action, dated Apr. 22, 2019, from corresponding U.S. Appl. No. 16/241,710.
Office Action, dated Apr. 22, 2020, from corresponding U.S. Appl. No. 16/811,793.
Office Action, dated Apr. 28, 2020, from corresponding U.S. Appl. No. 16/798,818.
Office Action, dated Apr. 28, 2020, from corresponding U.S. Appl. No. 16/808,500.
Office Action, dated Apr. 28, 2021, from corresponding U.S. Appl. No. 16/808,497.
Office Action, dated Apr. 29, 2020, from corresponding U.S. Appl. No. 16/791,337.
Office Action, dated Apr. 5, 2019, from corresponding U.S. Appl. No. 16/278,119.
Office Action, dated Apr. 7, 2020, from corresponding U.S. Appl. No. 16/788,633.
Office Action, dated Apr. 7, 2020, from corresponding U.S. Appl. No. 16/791,589.
Office Action, dated Aug. 13, 2019, from corresponding U.S. Appl. No. 16/505,430.
Office Action, dated Aug. 13, 2019, from corresponding U.S. Appl. No. 16/512,033.
Office Action, dated Aug. 15, 2019, from corresponding U.S. Appl. No. 16/505,461.
Office Action, dated Aug. 18, 2021, from corresponding U.S. Appl. No. 17/222,725.
Office Action, dated Aug. 19, 2019, from corresponding U.S. Appl. No. 16/278,122.
Office Action, dated Aug. 20, 2020, from corresponding U.S. Appl. No. 16/817,136.
Office Action, dated Aug. 23, 2017, from corresponding U.S. Appl. No. 15/626,052.
Office Action, dated Aug. 24, 2017, from corresponding U.S. Appl. No. 15/169,643.
Office Action, dated Aug. 24, 2017, from corresponding U.S. Appl. No. 15/619,451.
Office Action, dated Aug. 24, 2020, from corresponding U.S. Appl. No. 16/595,327.
Office Action, dated Aug. 27, 2019, from corresponding U.S. Appl. No. 16/410,296.
Office Action, dated Aug. 27, 2021, from corresponding U.S. Appl. No. 17/187,329.
Office Action, dated Aug. 27, 2021, from corresponding U.S. Appl. No. 17/334,948.
Office Action, dated Aug. 29, 2017, from corresponding U.S. Appl. No. 15/619,237.
Office Action, dated Aug. 30, 2017, from corresponding U.S. Appl. No. 15/619,212.
Office Action, dated Aug. 30, 2017, from corresponding U.S. Appl. No. 15/619,382.
Office Action, dated Aug. 30, 2021, from corresponding U.S. Appl. No. 16/938,520.
Office Action, dated Aug. 6, 2019, from corresponding U.S. Appl. No. 16/404,491.
Office Action, dated Aug. 6, 2020, from corresponding U.S. Appl. No. 16/862,956.
Office Action, dated Dec. 11, 2019, from corresponding U.S. Appl. No. 16/578,712.
Office Action, dated Dec. 13, 2021, from corresponding U.S. Appl. No. 17/476,209.
Office Action, dated Dec. 14, 2018, from corresponding U.S. Appl. No. 16/104,393.
Office Action, dated Dec. 15, 2016, from corresponding U.S. Appl. No. 15/256,419.
Office Action, dated Dec. 16, 2019, from corresponding U.S. Appl. No. 16/563,754.
Office Action, dated Dec. 16, 2019, from corresponding U.S. Appl. No. 16/565,265.
Office Action, dated Dec. 16, 2020, from corresponding U.S. Appl. No. 17/020,275.
Office Action, dated Dec. 17, 2021, from corresponding U.S. Appl. No. 17/395,759.
Office Action, dated Dec. 17, 2021, from corresponding U.S. Appl. No. 17/499,582.
Office Action, dated Dec. 18, 2020, from corresponding U.S. Appl. No. 17/030,714.
Office Action, dated Dec. 19, 2019, from corresponding U.S. Appl. No. 16/410,866.
Office Action, dated Dec. 2, 2019, from corresponding U.S. Appl. No. 16/560,963.
Office Action, dated Dec. 2, 2021, from corresponding U.S. Appl. No. 17/504,102.
Office Action, dated Dec. 23, 2019, from corresponding U.S. Appl. No. 16/593,639.
Office Action, dated Dec. 24, 2020, from corresponding U.S. Appl. No. 17/068,454.
Office Action, dated Dec. 27, 2021, from corresponding U.S. Appl. No. 17/493,332.
Office Action, dated Dec. 29, 2021, from corresponding U.S. Appl. No. 17/479,807.
Office Action, dated Dec. 3, 2018, from corresponding U.S. Appl. No. 16/055,998.
Office Action, dated Dec. 30, 2021, from corresponding U.S. Appl. No. 17/149,421.
Office Action, dated Dec. 31, 2018, from corresponding U.S. Appl. No. 16/160,577.
Office Action, dated Dec. 7, 2021, from corresponding U.S. Appl. No. 17/499,609.
Office Action, dated Dec. 8, 2020, from corresponding U.S. Appl. No. 17/013,758.
Office Action, dated Dec. 8, 2020, from corresponding U.S. Appl. No. 17/068,198.
Office Action, dated Feb. 10, 2021, from corresponding U.S. Appl. No. 16/862,944.
Office Action, dated Feb. 10, 2021, from corresponding U.S. Appl. No. 17/106,469.
Office Action, dated Feb. 15, 2019, from corresponding U.S. Appl. No. 16/220,899.
Office Action, dated Feb. 17, 2021, from corresponding U.S. Appl. No. 16/862,948.
Office Action, dated Feb. 18, 2021, from corresponding U.S. Appl. No. 16/862,952.
Office Action, dated Feb. 2, 2021, from corresponding U.S. Appl. No. 17/101,915.

(56) References Cited

OTHER PUBLICATIONS

Office Action, dated Feb. 26, 2019, from corresponding U.S. Appl. No. 16/228,250.
Office Action, dated Sep. 11, 2017, from corresponding U.S. Appl. No. 15/619,478.
Office Action, dated Sep. 15, 2021, from corresponding U.S. Appl. No. 16/623,157.
Office Action, dated Sep. 16, 2019, from corresponding U.S. Appl. No. 16/277,715.
Office Action, dated Sep. 19, 2017, from corresponding U.S. Appl. No. 15/671,073.
Office Action, dated Sep. 22, 2017, from corresponding U.S. Appl. No. 15/619,278.
Office Action, dated Sep. 24, 2021, from corresponding U.S. Appl. No. 17/342,153.
Office Action, dated Sep. 4, 2020, from corresponding U.S. Appl. No. 16/989,086.
Office Action, dated Sep. 5, 2017, from corresponding U.S. Appl. No. 15/619,469.
Office Action, dated Sep. 6, 2017, from corresponding U.S. Appl. No. 15/619,479.
Office Action, dated Sep. 7, 2017, from corresponding U.S. Appl. No. 15/633,703.
Office Action, dated Sep. 8, 2017, from corresponding U.S. Appl. No. 15/619,251.
Notice of Allowance, dated Apr. 12, 2017, from corresponding U.S. Appl. No. 15/256,419.
Notice of Allowance, dated Apr. 17, 2020, from corresponding U.S. Appl. No. 16/593,639.
Notice of Allowance, dated Apr. 19, 2021, from corresponding U.S. Appl. No. 17/164,029.
Notice of Allowance, dated Apr. 2, 2019, from corresponding U.S. Appl. No. 16/160,577.
Notice of Allowance, dated Apr. 2, 2021, from corresponding U.S. Appl. No. 17/162,006.
Notice of Allowance, dated Apr. 22, 2021, from corresponding U.S. Appl. No. 17/163,701.
Notice of Allowance, dated Apr. 25, 2018, from corresponding U.S. Appl. No. 15/883,041.
Notice of Allowance, dated Apr. 28, 2021, from corresponding U.S. Appl. No. 17/135,445.
Notice of Allowance, dated Apr. 28, 2021, from corresponding U.S. Appl. No. 17/181,828.
Notice of Allowance, dated Apr. 29, 2020, from corresponding U.S. Appl. No. 16/700,049.
Notice of Allowance, dated Apr. 30, 2020, from corresponding U.S. Appl. No. 16/565,265.
Notice of Allowance, dated Apr. 30, 2020, from corresponding U.S. Appl. No. 16/820,346.
Notice of Allowance, dated Apr. 30, 2021, from corresponding U.S. Appl. No. 16/410,762.
Notice of Allowance, dated Apr. 8, 2019, from corresponding U.S. Appl. No. 16/228,250.
Notice of Allowance, dated Apr. 8, 2020, from corresponding U.S. Appl. No. 16/791,348.
Notice of Allowance, dated Apr. 9, 2020, from corresponding U.S. Appl. No. 16/791,075.
Notice of Allowance, dated Aug. 10, 2020, from corresponding U.S. Appl. No. 16/671,444.
Notice of Allowance, dated Aug. 10, 2020, from corresponding U.S. Appl. No. 16/788,633.
Notice of Allowance, dated Aug. 12, 2020, from corresponding U.S. Appl. No. 16/719,488.
Notice of Allowance, dated Aug. 12, 2021, from corresponding U.S. Appl. No. 16/881,832.
Notice of Allowance, dated Aug. 14, 2018, from corresponding U.S. Appl. No. 15/989,416.
Notice of Allowance, dated Aug. 18, 2017, from corresponding U.S. Appl. No. 15/619,455.
Notice of Allowance, dated Aug. 20, 2019, from corresponding U.S. Appl. No. 16/241,710.
Notice of Allowance, dated Aug. 24, 2018, from corresponding U.S. Appl. No. 15/619,479.
Notice of Allowance, dated Aug. 26, 2019, from corresponding U.S. Appl. No. 16/443,374.
Notice of Allowance, dated Aug. 26, 2020, from corresponding U.S. Appl. No. 16/808,503.
Notice of Allowance, dated Aug. 28, 2019, from corresponding U.S. Appl. No. 16/278,120.
Notice of Allowance, dated Aug. 30, 2018, from corresponding U.S. Appl. No. 15/996,208.
Notice of Allowance, dated Aug. 31, 2021, from corresponding U.S. Appl. No. 17/326,901.
Notice of Allowance, dated Aug. 4, 2021, from corresponding U.S. Appl. No. 16/895,278.
Notice of Allowance, dated Aug. 7, 2020, from corresponding U.S. Appl. No. 16/901,973.
Notice of Allowance, dated Aug. 9, 2018, from corresponding U.S. Appl. No. 15/882,989.
Notice of Allowance, dated Aug. 9, 2021, from corresponding U.S. Appl. No. 16/881,699.
Notice of Allowance, dated Dec. 10, 2018, from corresponding U.S. Appl. No. 16/105,602.
Notice of Allowance, dated Dec. 11, 2019, from corresponding U.S. Appl. No. 16/278,122.
Notice of Allowance, dated Dec. 11, 2019, from corresponding U.S. Appl. No. 16/593,634.
Notice of Allowance, dated Dec. 12, 2017, from corresponding U.S. Appl. No. 15/169,643.
Notice of Allowance, dated Dec. 12, 2017, from corresponding U.S. Appl. No. 15/619,212.
Notice of Allowance, dated Dec. 12, 2017, from corresponding U.S. Appl. No. 15/619,382.
Krol, Kat, et al., Control versus Effort in Privacy Warnings for Webforms, ACM, Oct. 24, 2016, pp. 13-23.
Lamb et al., "Role-Based Access Control for Data Service Integration", ACM, pp. 3-11 (Year: 2006).
Leadbetter, et al., "Where Big Data Meets Linked Data: Applying Standard Data Models to Environmental Data Streams," IEEE, pp. 2929-2937 (Year: 2016).
Lebeau, Franck, et al., "Model-Based Vulnerability Testing for Web Applications," 2013 IEEE Sixth International Conference on Software Testing, Verification and Validation Workshops, pp. 445-452, IEEE, 2013 (Year: 2013).
Li, Ninghui, et al., t-Closeness: Privacy Beyond k-Anonymity and I-Diversity, IEEE, 2014, p. 106-115.
Liu et al., "A Novel Approach for Detecting Browser-based Silent Miner," IEEE, pp. 490-497 (Year: 2018).
Liu et al., "Cross-Geography Scientific Data Transferring Trends and Behavior," ACM, pp. 267-278 (Year: 2018).
Liu, Kun, et al., A Framework for Computing the Privacy Scores of Users in Online Social Networks, ACM Transactions on Knowledge Discovery from Data, vol. 5, No. 1, Article 6, Dec. 2010, 30 pages.
Liu, Yandong, et al., "Finding the Right Consumer: Optimizing for Conversion in Display Advertising Campaigns," Proceedings of the Fifth ACM International Conference on Web Search and Data Mining, Feb. 2, 2012, pp. 473-428 (Year: 2012).
Lizar et al., "Usable Consents: Tracking and Managing Use of Personal Data with a Consent Transaction Receipt," Proceedings of the 2014 ACM International Joint Conference on Pervasive and Ubiquitous Computing: Adjunct Publication, 2014, pp. 647-652 (Year: 2014).
Lu et al., "An HTTP Flooding Detection Method Based on Browser Behavior," IEEE, pp. 1151-1154 (Year: 2006).
Lu, "How Machine Learning Mitigates Racial Bias in the US Housing Market," Available as SSRN 3489519, pp. 1-73, Nov. 2019 (Year: 2019).
Luu, et al., "Combined Local and Holistic Facial Features for Age-Determination," 2010 11th Int. Conf. Control, Automation, Robotics and Vision, Singapore, Dec. 7, 2010, IEEE, pp. 900-904 (Year: 2010).

(56) References Cited

OTHER PUBLICATIONS

Ma Ziang, et al., "LibRadar: Fast and Accurate Detection of Third-Party Libraries in Android Apps," 2016 IEEE/ACM 38th IEEE International Conference on Software Engineering Companion (ICSE-C), ACM, May 14, 2016, pp. 653-656, DOI: http://dx.doi.org/10.1145/2889160.2889178, p. 653, r.col, par. 1-3; figure 3 (Year: 2016).
Mandal, et al., "Automated Age Prediction Using Wrinkles Features of Facial Images and Neural Network," International Journal of Emerging Engineering Research and Technology, vol. 5, Issue 2, Feb. 2017, pp. 12-20 (Year: 2017).
Maret et al., "Multimedia Information Interchange: Web Forms Meet Data Servers", IEEE, pp. 499-505 (Year: 1999).
Martin, et al., "Hidden Surveillance by Web Sites: Web Bugs in Contemporary Use," Communications of the ACM, vol. 46, No. 12, Dec. 2003, pp. 258-264. Internet source https://doi.org/10.1145/953460.953509 (Year: 2003).
McGarth et al., "Digital Library Technology for Locating and Accessing Scientific Data", ACM, pp. 188-194 (Year: 1999).
Mesbah et al., "Crawling Ajax-Based Web Applications Through Dynamic Analysis of User Interface State Changes," ACM Transactions on the Web (TWEB) vol. 6, No. 1, Article 3, Mar. 2012, pp. 1-30 (Year: 2012).
Moiso et al., "Towards a User-Centric Personal Data Ecosystem The Role of the Bank of Individual's Data," 2012 16th International Conference on Intelligence in Next Generation Networks, Berlin, 2012, pp. 202-209 (Year: 2012).
Moscoso-Zea et al., "Datawarehouse Design for Educational Data Mining," IEEE, pp. 1-6 (Year: 2016).
Mudepalli et al., "An efficient data retrieval approach using blowfish encryption on cloud CipherText Retrieval in Cloud Computing" IEEE, pp. 267-271 (Year: 2017).
Mundada et al., "Half-Baked Cookies: Hardening Cookie-Based Authentication for the Modem Web," Proceedings of the 11th ACM on Asia Conference on Computer and Communications Security, 2016, pp. 675-685 (Year: 2016).
Newman et al., "High Speed Scientific Data Transfers using Software Defined Networking," ACM, pp. 1-9 (Year: 2015).
Newman, "Email Archive Overviews using Subject Indexes", ACM, pp. 652-653, 2002 (Year: 2002).
Nishikawa, Taiji, English Translation of JP 2019154505, Aug. 27, 2019 (Year: 2019).
Notice of Filing Date for Petition for Post-Grant Review of related U.S. Pat. No. 9,691,090 dated Apr. 12, 2018.
Nouwens et al., "Dark Patterns after the GDPR: Scraping Consent Pop-ups and Demonstrating their Influence," ACM, pp. 1-13, Apr. 25, 2020 (Year: 2020).
O'Keefe et al., "Privacy-Preserving Data Linkage Protocols," Proceedings of the 2004 ACM Workshop on Privacy in the Electronic Society, 2004, pp. 94-102 (Year: 2004).
Olenski, Steve, For Consumers, Data Is A Matter Of Trust, CMO Network, Apr. 18, 2016, https://www.forbes.com/sites/steveolenski/2016/04/18/for-consumers-data-is-a-matter-of-trust/#2e48496278b3.
Paes, "Student Research Abstract: Automatic Detection of Cross-Browser Incompatibilities using Machine Learning and Screenshot Similarity," ACM, pp. 697-698, Apr. 3, 2017 (Year: 2017).
Pearson, et al., "A Model-Based Privacy Compliance Checker," IJEBR, vol. 5, No. 2, pp. 63-83, 2009, Nov. 21, 2008. [Online]. Available: http://dx.doi.org/10.4018/jebr.2009040104 (Year: 2008).
Pechenizkiy et al., "Process Mining Online Assessment Data," Educational Data Mining, pp. 279-288 (Year: 2009).
Petition for Post-Grant Review of related U.S. Pat. No. 9,691,090 dated Mar. 27, 2018.
Petrie et al., "The Relationship between Accessibility and Usability of Websites", ACM, pp. 397-406 (Year: 2007).
Pfeifle, Sam, The Privacy Advisor, IAPP and AvePoint Launch New Free PIA Tool, International Association of Privacy Professionals, Mar. 5, 2014.
Pfeifle, Sam, The Privacy Advisor, IAPP Heads to Singapore with APIA Template in Tow, International Association of Privacy Professionals, https://iapp.org/news/a/iapp-heads-to-singapore-with-apia-template_in_tow/, Mar. 28, 2014, pp. 1-3.
Ping et al., "Wide Area Placement of Data Replicas for Fast and Highly Available Data Access," ACM, pp. 1-8 (Year: 2011).
Popescu-Zeletin, "The Data Access and Transfer Support in a Local Heterogeneous Network (Hminet)", IEEE, pp. 147-152 (Year: 1979).
Porter, "De-Identified Data and Third Party Data Mining: The Risk of Re-Identification of Personal Information," Shidler JL Com. & Tech. 5, 2008, pp. 1-9 (Year: 2008).
Pretorius, et al., "Attributing Users Based on Web Browser History," 2017 IEEE Conference on Application, Information and Network Security (AINS), 2017, pp. 69-74 (Year: 2017).
Qing-Jiang et al., "The (P, a, K) Anonymity Model for Privacy Protection of Personal Information in the Social Networks," 2011 6th IEEE Joint International Information Technology and Artificial Intelligence Conference, vol. 2 IEEE, 2011, pp. 420-423 (Year: 2011).
Qiu, et al., "Design and Application of Data Integration Platform Based on Web Services and XML," IEEE, pp. 253-256 (Year: 2016).
Radu, et al., "Analyzing Risk Evaluation Frameworks and Risk Assessment Methods," IEEE, Dec. 12, 2020, pp. 1-6 (Year: 2020).
Rakers, "Managing Professional and Personal Sensitive Information," ACM, pp. 9-13, Oct. 24-27, 2010 (Year: 2010).
Reardon et al., User-Level Secure Deletion on Log-Structured File Systems, ACM, 2012, retrieved online on Apr. 22, 2021, pp. 1-11. Retrieved from the Internet: URL: http://citeseerx.ist.psu.edu/viewdoc/download; sessionid=450713515DC7F19F8ED09AE961D4B60E. (Year: 2012).
Regulation (EU) 2016/679, "On the protection of natural persons with regard to the processing of personal data and on the free movement of such data, and repealing Directive 95/46/EC (General Data Protection Regulation)," Official Journal of the European Union, May 4, 2016, pp. L 119/1-L 119/88 (Year: 2016).
Roesner et al., "Detecting and Defending Against Third-Party Tracking on the Web," 9th USENIX Symposium on Networked Systems Design and Implementation, Apr. 11, 2013, pp. 1-14, ACM (Year: 2013).
Rozepz, "What is Google Privacy Checkup? Everything You Need to Know," Tom's Guide web post, Apr. 26, 2018, pp. 1-11 (Year: 2018).
Sachinopoulou et al., "Ontology-Based Approach for Managing Personal Health and Wellness Information," IEEE, pp. 1802-1805 (Year: 2007).
Written Opinion of the International Searching Authority, dated Oct. 20, 2017, from corresponding International Application No. PCT/US2017/036917.
Written Opinion of the International Searching Authority, dated Oct. 3, 2017, from corresponding International Application No. PCT/US2017/036912.
Written Opinion of the International Searching Authority, dated Sep. 1, 2017, from corresponding International Application No. PCT/US2017/036896.
Written Opinion of the International Searching Authority, dated Sep. 12, 2018, from corresponding International Application No. PCT/US2018/037504.
Written Opinion of the International Searching Authority, dated Sep. 15, 2021, from corresponding International Application No. PCT/US2021/033631.
International Search Report, dated Aug. 15, 2017, from corresponding International Application No. PCT/US2017/036919.
International Search Report, dated Aug. 21, 2017, from corresponding International Application No. PCT/US2017/036914.
International Search Report, dated Aug. 29, 2017, from corresponding International Application No. PCT/US2017/036898.
International Search Report, dated Aug. 8, 2017, from corresponding International Application No. PCT/US2017/036889.
International Search Report, dated Aug. 8, 2017, from corresponding International Application No. PCT/US2017/036890.
International Search Report, dated Aug. 8, 2017, from corresponding International Application No. PCT/US2017/036893.

(56) References Cited

OTHER PUBLICATIONS

International Search Report, dated Aug. 8, 2017, from corresponding International Application No. PCT/US2017/036901.
International Search Report, dated Aug. 8, 2017, from corresponding International Application No. PCT/US2017/036913.
International Search Report, dated Aug. 8, 2017, from corresponding International Application No. PCT/US2017/036920.
International Search Report, dated Dec. 14, 2018, from corresponding International Application No. PCT/US2018/045296.
International Search Report, dated Dec. 22, 2021, from corresponding International Application No. PCT/US2021/051217.
International Search Report, dated Jan. 14, 2019, from corresponding International Application No. PCT/US2018/046949.
International Search Report, dated Jan. 5, 2022, from corresponding International Application No. PCT/US2021/050497.
International Search Report, dated Jan. 7, 2019, from corresponding International Application No. PCT/US2018/055772.
International Search Report, dated Jun. 21, 2017, from corresponding International Application No. PCT/US2017/025600.
International Search Report, dated Jun. 6, 2017, from corresponding International Application No. PCT/US2017/025605.
International Search Report, dated Jun. 6, 2017, from corresponding International Application No. PCT/US2017/025611.
International Search Report, dated Mar. 14, 2019, from corresponding International Application No. PCT/US2018/055736.
International Search Report, dated Mar. 4, 2019, from corresponding International Application No. PCT/US2018/055773.
International Search Report, dated Mar. 4, 2019, from corresponding International Application No. PCT/US2018/055774.
International Search Report, dated Nov. 12, 2021, from corresponding International Application No. PCT/US2021/043481.
International Search Report, dated Nov. 19, 2018, from corresponding International Application No. PCT/US2018/046939.
International Search Report, dated Nov. 3, 2021, from corresponding International Application No. PCT/US2021/040893.
International Search Report, dated Nov. 3, 2021, from corresponding International Application No. PCT/US2021/044910.
International Search Report, dated Oct. 11, 2018, from corresponding International Application No. PCT/US2018/043975.
International Search Report, dated Oct. 11, 2018, from corresponding International Application No. PCT/US2018/043976.
International Search Report, dated Oct. 11, 2018, from corresponding International Application No. PCT/US2018/043977.
International Search Report, dated Oct. 11, 2018, from corresponding International Application No. PCT/US2018/044026.
International Search Report, dated Oct. 11, 2018, from corresponding International Application No. PCT/US2018/045240.
International Search Report, dated Oct. 12, 2017, from corresponding International Application No. PCT/US2017/036888.
International Search Report, dated Oct. 12, 2018, from corresponding International Application No. PCT/US2018/044046.
International Search Report, dated Oct. 16, 2018, from corresponding International Application No. PCT/US2018/045243.
International Search Report, dated Oct. 18, 2018, from corresponding International Application No. PCT/US2018/045249.
International Search Report, dated Oct. 20, 2017, from corresponding International Application No. PCT/US2017/036917.
International Search Report, dated Oct. 3, 2017, from corresponding International Application No. PCT/US2017/036912.
International Search Report, dated Sep. 1, 2017, from corresponding International Application No. PCT/US2017/036896.
International Search Report, dated Sep. 12, 2018, from corresponding International Application No. PCT/US2018/037504.
International Search Report, dated Sep. 15, 2021, from corresponding International Application No. PCT/US2021/033631.
Invitation to Pay Additional Search Fees, dated Aug. 10, 2017, from corresponding International Application No. PCT/US2017/036912.
Invitation to Pay Additional Search Fees, dated Aug. 10, 2017, from corresponding International Application No. PCT/US2017/036917.
Invitation to Pay Additional Search Fees, dated Aug. 24, 2017, from corresponding International Application No. PCT/US2017/036888.
Invitation to Pay Additional Search Fees, dated Jan. 18, 2019, from corresponding International Application No. PCT/US2018/055736.
Invitation to Pay Additional Search Fees, dated Jan. 7, 2019, from corresponding International Application No. PCT/US2018/055773.
Invitation to Pay Additional Search Fees, dated Jan. 8, 2019, from corresponding International Application No. PCT/US2018/055774.
Invitation to Pay Additional Search Fees, dated Oct. 23, 2018, from corresponding International Application No. PCT/US2018/045296.
Notice of Allowance, dated Jan. 24, 2022, from corresponding U.S. Appl. No. 17/340,699.
Notice of Allowance, dated Jan. 25, 2021, from corresponding U.S. Appl. No. 16/410,336.
Notice of Allowance, dated Jan. 26, 2018, from corresponding U.S. Appl. No. 15/619,469.
Notice of Allowance, dated Jan. 26, 2022, from corresponding U.S. Appl. No. 17/491,906.
Notice of Allowance, dated Jan. 29, 2020, from corresponding U.S. Appl. No. 16/278,119.
Notice of Allowance, dated Jan. 5, 2022, from corresponding U.S. Appl. No. 17/475,241.
Notice of Allowance, dated Jan. 6, 2021, from corresponding U.S. Appl. No. 16/595,327.
Notice of Allowance, dated Jan. 6, 2022, from corresponding U.S. Appl. No. 17/407,765.
Notice of Allowance, dated Jan. 7, 2022, from corresponding U.S. Appl. No. 17/222,725.
Notice of Allowance, dated Jan. 8, 2020, from corresponding U.S. Appl. No. 16/600,879.
Notice of Allowance, dated Jul. 10, 2019, from corresponding U.S. Appl. No. 16/237,083.
Notice of Allowance, dated Jul. 10, 2019, from corresponding U.S. Appl. No. 16/403,358.
Notice of Allowance, dated Jul. 12, 2019, from corresponding U.S. Appl. No. 16/278,121.
Notice of Allowance, dated Jul. 14, 2020, from corresponding U.S. Appl. No. 16/701,043.
Notice of Allowance, dated Jul. 15, 2020, from corresponding U.S. Appl. No. 16/791,006.
Notice of Allowance, dated Jul. 16, 2020, from corresponding U.S. Appl. No. 16/901,979.
Notice of Allowance, dated Jul. 17, 2019, from corresponding U.S. Appl. No. 16/055,961.
Notice of Allowance, dated Jul. 17, 2020, from corresponding U.S. Appl. No. 16/778,709.
Notice of Allowance, dated Jul. 19, 2021, from corresponding U.S. Appl. No. 17/306,252.
Notice of Allowance, dated Jul. 21, 2020, from corresponding U.S. Appl. No. 16/557,392.
Notice of Allowance, dated Jul. 23, 2019, from corresponding U.S. Appl. No. 16/220,978.
Notice of Allowance, dated Jul. 26, 2019, from corresponding U.S. Appl. No. 16/409,673.
Notice of Allowance, dated Jul. 26, 2021, from corresponding U.S. Appl. No. 17/151,399.
Notice of Allowance, dated Jul. 26, 2021, from corresponding U.S. Appl. No. 17/207,316.
Notice of Allowance, dated Jul. 31, 2019, from corresponding U.S. Appl. No. 16/221,153.
Notice of Allowance, dated Jul. 8, 2021, from corresponding U.S. Appl. No. 17/201,040.
Notice of Allowance, dated Jun. 1, 2020, from corresponding U.S. Appl. No. 16/813,321.
Notice of Allowance, dated Jun. 11, 2021, from corresponding U.S. Appl. No. 16/862,948.
Notice of Allowance, dated Jun. 11, 2021, from corresponding U.S. Appl. No. 16/862,952.
Notice of Allowance, dated Jun. 11, 2021, from corresponding U.S. Appl. No. 17/216,436.
Notice of Allowance, dated Jun. 12, 2019, from corresponding U.S. Appl. No. 16/278,123.

(56) References Cited

OTHER PUBLICATIONS

Notice of Allowance, dated Jun. 12, 2019, from corresponding U.S. Appl. No. 16/363,454.
Notice of Allowance, dated Jun. 16, 2020, from corresponding U.S. Appl. No. 16/798,818.
Notice of Allowance, dated Jun. 17, 2020, from corresponding U.S. Appl. No. 16/656,895.
Notice of Allowance, dated Jun. 18, 2019, from corresponding U.S. Appl. No. 16/410,566.
Notice of Allowance, dated Jun. 19, 2018, from corresponding U.S. Appl. No. 15/894,890.
Notice of Allowance, dated Jun. 19, 2019, from corresponding U.S. Appl. No. 16/042,673.
Notice of Allowance, dated Jun. 19, 2019, from corresponding U.S. Appl. No. 16/055,984.
Notice of Allowance, dated Jun. 2, 2021, from corresponding U.S. Appl. No. 17/198,581.
Notice of Allowance, dated Jun. 21, 2019, from corresponding U.S. Appl. No. 16/404,439.
Notice of Allowance, dated Jun. 22, 2020, from corresponding U.S. Appl. No. 16/791,337.
Notice of Allowance, dated Jun. 27, 2018, from corresponding U.S. Appl. No. 15/882,989.
Notice of Allowance, dated Jun. 4, 2019, from corresponding U.S. Appl. No. 16/159,566.
Notice of Allowance, dated Jun. 5, 2019, from corresponding U.S. Appl. No. 16/220,899.
Notice of Allowance, dated Jun. 5, 2019, from corresponding U.S. Appl. No. 16/357,260.
Notice of Allowance, dated Jun. 6, 2018, from corresponding U.S. Appl. No. 15/875,570.
Notice of Allowance, dated Jun. 6, 2019, from corresponding U.S. Appl. No. 16/159,628.
Notice of Allowance, dated Jun. 7, 2021, from corresponding U.S. Appl. No. 17/099,270.
Notice of Allowance, dated Jun. 8, 2020, from corresponding U.S. Appl. No. 16/712,104.
Notice of Allowance, dated Mar. 1, 2018, from corresponding U.S. Appl. No. 15/853,674.

\* cited by examiner

| OneTrust | Sabourin DM79 | Hello Jason SITEADMIN7 |
|---|---|---|

Data Mapping > Assets

- Dashboard
- Asset Template
- Processing Template
- Assesments
- Assets
- Processing Activities
- Data Elements
- Asset Map
- Scan Results

[Send Assessments(0)] [Delete(0)]

2000

| ☐ | Asset | Managing Organi... | Hosting Location | Processing Activi... | Status |
|---|---|---|---|---|---|
| ☐ | ▼ 7th Asset | | | 2010 | |

Asset Attributes

| Asset | Managing Organization Group | Hosting Location | Type |
|---|---|---|---|
| 7th Asset | Sabourin DM79 | Algeria | |
| Processing Activities | Status | Description | |
| .... | In Discovery | Value_1  2025 | |
| Internal or 3rd Party Storage | Storage Format | Technical Security Measures | Organizational Security Measures |
| .... | .... | .... | .... |
| Other Security Measures | Volume of Data Subjects | Data Retention | IT Owner |
| .... | .... | .... | .... |

| | Additional Asset | Sabourin DM79 | Argentina | | |
|---|---|---|---|---|---|
| ☐ ▲ | Asset1 | Ssbourin DM79 | Afghanistan | Application | New |
| ☐ ▲ | Asset2 | Ssbourin DM79 | United Arab Emira... | Database | In Discovery |
| ☐ ▲ | | | | | In Discovery |

Privacy Policy

Effective Date: 17 April 2017

We at OneTrust LLC and OneTrust Technology Limited (collectively, "OneTrust", "we" and "us") know you care about how your personal information is used and shared, and we take your privacy seriously. Please read the following to learn more about how we collect, store, use and disclose information about you when you interact or use any of the following websites: www.onetrust.com, www.cookielaw.org, www.optanon.com, www.governor.co.uk, and https://cookiepedia.co.uk/ (collectively the "Websites") or any related events, trade shows, sales or marketing, and/or if you use any of our products, services or applications (including any trial) (collectively the "Services") in any manner.

What does this Privacy Policy cover?

This Privacy Policy covers our treatment of information that we gather when you are accessing or

Consents for processing

| 53490630-fb65-4a22-a8fc-981d87fbdd07 | Free Trial Signup | Email marketing | First Name, Last Name, Work Email, Company, Job Title, Phone Number | view process | view receipts |

Free Trial Signup

| | |
|---|---|
| Data being processed | List of the types of data involved in the processing, e.g name, email, device identifier, usage history | First Name, Last Name, Work Email, Company, Job Title, Phone Number |
| Purpose(s) of Processing | What purpose(s) does the consent relate to.(Should be separate consent actions for each purpose) | Marketing information about OneTrust services |
| CollectionMethod | Desc. of interface where data is collected e.g. website, app, device. | Website:https://onetrust.com/free-trial/ |
| Transaction | Desc. of interface where data is collected e.g. website, app, device. | Free Trial Signup |
| Controller Name | Legal identity of the data controller for the process | OneTrust UK |
| Contact Address | Postal address | 1 Eversholt St, London. NW1 2DN |
| Contact person | DPO, representative or other responsible person in organization. Most likely job title rather than invidual | Data Protection Officer |
| Contact Email | To contact the above | thedpo@onetrust.com |
| Contact Tel | To contact the above | 0207 123 4567 |
| Process/Service | Description of process or service that the consent relates to: | This is a record of your agreement to the collection and use of your personal information. You may keep it for future reference and use it to contact us to exercise your legal rights in relation to your information. |
| Unique User data item | identifies which of the above data items is a unique user identifier | Email |
| Jurisdictions | Initially EU, but expandable. Essentially the legal framework that applies | European Union |
| Legal Basis of processing | initially consent, but could be expandable in the future | consent |
| TypeOfConsent | unambiguous or explicit | Unambiguous |
| Privacy | The policy that the processing relies on | https://onetrust.com/privacy-policy/ |
| Data sharing | Whether the data is shared with a third party controller | false |

FIG. 39

Sign up Free Trial

First Name: John
Last Name: Doe
Email: jdoe@acme.com
Company: Acme
Job Title: Manager
Phone Number: 0123456789

What am I agreeing to

Data being processed
First Name, Last Name, Work Email, Company, Job Title, Phone Number
Purpose
Marketing information about OneTrust services By filling in this form, you agree that we may contact you with information about our services
Use of your information is governed by our Privacy Policy.
We will provide you with a record of this agreement and the option to withdraw at any time Submit

OneTrust Technology Limited

1 Eversholt Street

London

NW1 2DN

UK https://onetrust.com/privacy-policy/

2017-05-23T 12:58 +0000

Receipt No: d60061de-9648-43f6-ba8f-f36be227f188

Information processed:

First Name, Last Name, Work Email, Company, job Title, Phone Number

Purpose of Prossessing:

Marketing information about one Trust services

This is a record of your agreement to the collection and use of your personal information.You may keep it for future reference and use it to contact us to exercise legal rights in relation to your information.

You may withdraw your permission, obtain a copy of the information,or request that we remove it from our records at any time.

More information:

thedpo@onetrust.com https://onetrust.com/datasubjectrights

Tel:0207 123 4567

Thank You

FIG. 41

Consents for processing

| | | | | |
|---|---|---|---|---|
| 53490630-fb65-4a22-a8fc-981d87fbdd07 | Free Trial Signup | First Name, Last Name, Work Email, Company, Job Title, Phone Number | view process | view receipts |
| | Email marketing | | | |

Receipts for Free Trial Signup

| | | |
|---|---|---|
| 32ebfcba-baad-41ba-9aac-2dtebcc14b1c0 | 2017-05-23T09:32 +0000 | test@hotmail.com |
| 531e6d47-a39b-4ef4-a344-ec60fb5016c8 | 2017-05-23T09:33 +0000 | rb@onetrust.com |
| 62fb9038-80d9-4a72-b4df-ef90a63324c23 | 2017-05-23T12:35 +0000 | bernie@gmail.com |
| d60061de-9648-4316-ba8f-f36be2271188 | 2017-05-23T12:58 +0000 | jdoe@acme.com |
| fecc6239-bb58-4db8-9b8f-f75b18e55d39 | 2017-05-23T09:11 +0000 | peter@gmail.com |

Free Trial Sign Up

New Transaction / Free Trial Sign Up

Is this based on an existing processing activity?

[ Yes ]   [ No ]

Describe the Process Service this Consent relates to.

[Enter your answer here.]

If applicable, provide a the public URL where consent is collected.

[Enter your answer here.]

How is Consent being collected?
What is the general method for collecting the consent? e.g. website, application, device, paper form.

[Enter your answer here.]

What data elements you processing based on the consent of the data subject?
Pick all that apply this transaction

5.1 Background Checks
which data elements are processed by Backgroud Checks

[ Credit checks ]   [ Criminal History ]

OneTrust - PIA Platform | Hello Eliza Crawford ▼

Consent Receipt Management

New Transaction / Free Trial Sign Up

→⬚ Export CSV   🔍 Filters

Free Trial Sign Up (cont)

Is the data shared with any third parties?
*A third party is any other data controller.*

[Yes] [No]

List all the third parties

[Enter your answer here.]

Will the processing involve transfer outside the original jurisdiction?

[Yes] [No]

List all the destination countries or regions for the international transfer

[Enter your answer here.]

What is the process for subjects to withdraw their consent?

[Enter your answer here.]

If applicable, provide a URL for the withdrawal mechanism

[Enter your answer here.]

Consent Receipt Management

Search / All Receipts

Search

Unique Subject identifier

Email: john.doe@gmail.com

---

Results for john.doe@gmail.com

| Process Name | Receipt No | Consent Date | Status | Withdrawal Date |
|---|---|---|---|---|
| Free Trial SignUp | 81c8f0f7-00fe-41a9-8e34-744a3ba34d26 | 1 Jan 2017 15:31 | Withdrawn | 19 March 2017 19:56 |
| Trade Show | b74c295a-1cc2-41b0-8645-145f601f145e | 15 May 2017 09:36 | Active | - |

FIG. 53

OneTrust - PIA Platform

Consent Receipt Management

Transaction / Free Trial Sign Up

Implementation - SDK

Variables
GUID: c43b3db7-81f0-4414-825b-c391c26f0b26
Unique Subject Identifier: Email

— JavaScript:
Put this code on your page where you are collecting consent:

```
<!--OneTrust Consent Receipt start-->
<script src="https://consent.onetrust.com/consent.js" type="text/javascript" charset="UTF-8"></script>
<!--OneTrust Consent Receipt end-->
```

| | |
|---|---|
| + iOS | Documentation |
| + Android | Documentation |
| + Java | Documentation |
| + C# | Documentation |
| + PHP | Documentation |

OneTrust | Hello Eliza Crawford
Export CSV | Filters

FIG. 54

DATA PROCESSING SYSTEMS AND METHODS FOR AUTOMATIC DISCOVERY AND ASSESSMENT OF MOBILE SOFTWARE DEVELOPMENT KITS

CROSS-REFERENCE TO RELATED APPLICATIONS

This application is a continuation of U.S. patent application Ser. No. 17/326,901, filed May 21, 2021, which claims priority from U.S. Provisional Patent Application Ser. No. 63/028,149, filed May 21, 2020, and is also a continuation-in-part of U.S. patent application Ser. No. 17/163,701, filed Feb. 1, 2021, now U.S. Pat. No. 11,113,416, issued Sep. 7, 2021, which is a continuation of U.S. patent application Ser. No. 16/915,097, filed Jun. 29, 2020, now U.S. Pat. No. 10,909,265, issued Feb. 2, 2021, which claims priority from U.S. Provisional Patent Application Ser. No. 62/868,373, filed Jun. 28, 2019, and is also a continuation-in-part of U.S. patent application Ser. No. 16/895,278, filed Jun. 8, 2020, now U.S. Pat. No. 11,200,341, issued Dec. 14, 2021, which is a continuation of U.S. patent application Ser. No. 16/552,765, filed Aug. 27, 2019, now U.S. Pat. No. 10,678,945, issued Jun. 9, 2020, which is a continuation-in-part of U.S. patent application Ser. No. 16/277,568, filed Feb. 15, 2019, now U.S. Pat. No. 10,440,062, issued Oct. 8, 2019, which claims priority from U.S. Provisional Patent Application Ser. No. 62/631,684, filed Feb. 17, 2018 and U.S. Provisional Patent Application Ser. No. 62/631,703, filed Feb. 17, 2018, and is also a continuation-in-part of U.S. patent application Ser. No. 16/159,634, filed Oct. 13, 2018, now U.S. Pat. No. 10,282,692, issued May 7, 2019, which claims priority from U.S. Provisional Patent Application Ser. No. 62/572,096, filed Oct. 13, 2017 and U.S. Provisional Patent Application Ser. No. 62/728,435, filed Sep. 7, 2018, and is also a continuation-in-part of U.S. patent application Ser. No. 16/055,083, filed Aug. 4, 2018, now U.S. Pat. No. 10,289,870, issued May 14, 2019, which claims priority from U.S. Provisional Patent Application Ser. No. 62/547,530, filed Aug. 18, 2017, and is also a continuation-in-part of U.S. patent application Ser. No. 15/996,208, filed Jun. 1, 2018, now U.S. Pat. No. 10,181,051, issued Jan. 15, 2019, which claims priority from U.S. Provisional Patent Application Ser. No. 62/537,839, filed Jul. 27, 2017, and is also a continuation-in-part of U.S. patent application Ser. No. 15/853,674, filed Dec. 22, 2017, now U.S. Pat. No. 10,019,597, issued Jul. 10, 2018, which claims priority from U.S. Provisional Patent Application Ser. No. 62/541,613, filed Aug. 4, 2017, and is also a continuation-in-part of U.S. patent application Ser. No. 15/619,455, filed Jun. 10, 2017, now U.S. Pat. No. 9,851,966, issued Dec. 26, 2017, which is a continuation-in-part of U.S. patent application Ser. No. 15/254,901, filed Sep. 1, 2016, now U.S. Pat. No. 9,729,583, issued Aug. 8, 2017, which claims priority from: (1) U.S. Provisional Patent Application Ser. No. 62/360,123, filed Jul. 8, 2016; (2) U.S. Provisional Patent Application Ser. No. 62/353,802, filed Jun. 23, 2016; (3) U.S. Provisional Patent Application Ser. No. 62/348,695, filed Jun. 10, 2016. The disclosures of all of the above patents and patent applications are hereby incorporated herein by reference in their entirety.

BACKGROUND

Over the past years, privacy and security policies, and related operations have become increasingly important. Breaches in security, leading to the unauthorized access of personal data (which may include sensitive personal data) have become more frequent among companies and other organizations of all sizes. Such personal data may include, but is not limited to, Internet browsing habits and history, purchase history, geolocation data, biometric data (e.g., fingerprint data, facial recognition data), user preferences, user activity on websites and/or social media (e.g., postings, likes and dislikes, social media data), and any other data that may be associated with and/or can be used to identify a particular user.

Many organizations that obtain, use, and transfer personal data, including sensitive personal data, have begun to address these privacy and security issues. To manage personal data, many companies have attempted to implement operational policies and processes that comply with legal and industry requirements. However, there is an increasing need for improved systems and methods to manage personal data in a manner that complies with such policies.

Applications configured on user devices, like smartphones, can present privacy issues. Such applications may obtain, use, and/or transfer personal data, including sensitive personal data, both knowingly and unknowingly to users of such devices and applications.

Developers and providers of applications (e.g., application vendors) may use software development kits (SDKs) to develop mobile applications. An SDK may include privacy-related functions and attributes and may install and/or use files that may be scattered throughout a mobile device's file system. Moreover, application developers and providers may be reluctant to be transparent about the particular SDKs used in the generation of an application. Due to the large number of files likely to be configured on a typical mobile device and the difficulty in identifying a particular application or development kit associated with each file, it can be challenging to determine that a particular SDK was used to generate a particular application configured on the mobile device. Additionally, scanning software (e.g., software tools used to analyze privacy impacts of software programs) may inaccurately assess the degree to which a software program transmits or otherwise processes such sensitive information when the identity of the SDK used to build the program is inaccessible to the scanning software.

Because there is an increasing need to manage the privacy impact of applications configured on user devices, there is also an increasing need to understand the privacy implications of the development tools used to generate such applications, with or without the cooperation of application developers and providers.

SUMMARY

A method, according to various aspects, comprises: (1) generating, by computing hardware, a tokenized name for a third-party development tool, the tokenized name comprising a functionality token representing a function of the third-party development tool and a source token indicating a third-party computing system from which the third-party development tool can be obtained; (2) determining, by the computing hardware, a functionality category for the functionality token; (3) identifying, by the computing hardware, the third-party computing system from the source token; (4) assigning, by the computing hardware, a third-party development tool category to the third-party development tool based on the functionality category and the identification of the third-party computing system; and (5) storing, by the computing hardware, the assigned third-party development tool category and linking the assigned third-party development tool category to the third-party development tool.

In some aspects, the third-party development tool is a software development kit used to generate an application, the application being configured to operate on a mobile device. In particular aspects, the method comprises determining, by the computing hardware, identifying information of the third-party development tool by scanning at least one of a folder on a mobile device or a file stored on the mobile device. In various aspects, scanning the at least one of the folder on the mobile device or the file stored on the mobile device comprises identifying information regarding at least one of a package name, a file name, or a folder name. In particular aspects, the method further comprising generating, by the computing hardware, the source token. In particular aspects, generating the source token comprises: (1) querying, by the computing hardware based on the identifying information of the third-party development tool, a database that stores a plurality of third-party identities in correlation with a plurality of respective identifying information of third-party development tools; (2) determining, by the computing hardware and based on a result of querying the database, a third-party identity corresponding to the third-party development tool; and (3) generating the source token based on the third-party identity.

In a particular aspects, the method comprises: (1) determining, by the computing hardware, identifying information for the third-party development tool; (2) cross-referencing, by the computing hardware, the identifying information in a database storing a plurality of third-party identities in correlation with a plurality of respective identifying information of third-party development tools; and (3) determining, by the computing hardware, that the third-party development tool is valid in response to successfully cross-referencing the identifying information in the database. In various aspects, generating the tokenized name for the third-party development tool comprises using natural language processing.

A system, according to particular aspects, comprises: (1) a non-transitory computer-readable medium storing instructions; and (2) a processing device communicatively coupled to the non-transitory computer-readable medium. In any aspect described herein, the processing device may be configured to execute the instructions and thereby perform operations comprising: (1) generating, by computing hardware, a tokenized name for a third-party development tool, the tokenized name comprising a source token indicating a third-party computing system from which the third-party development tool can be obtained; (2) determining, by the computing hardware, a source category corresponding to a source of the third-party development tool; (3) identifying, by the computing hardware, the third-party computing system from the source token; (4) assigning, by the computing hardware, a third-party development tool category to the third-party development tool based on the source category; and (5) storing, by the computing hardware, the assigned third-party development tool category and linking the assigned third-party development tool category to the third-party development tool.

In a particular aspect, the third-party development tool is a software development kit used to generate an application. In various aspects, the operations further comprise determining, by the computing hardware, identifying information of the third-party development tool by scanning at least one of a folder on a mobile device or a file stored on the mobile device. In some aspects, scanning the at least one of the folder on the mobile device or the file stored on the mobile device comprises identifying information regarding at least one of a package name, a file name, or a folder name. In various aspects, the operations further comprising generating the source token. In such aspects, generating the source token may comprise: (1) querying, by the computing hardware, a database, wherein the query stores a plurality of third-party identities in correlation with a plurality of respective identifying information of third-party development tools; (2) determining, by the computing hardware and based on a result of querying the database, a third-party identity corresponding to the third-party development tool; and (3) generating the source token based on the third-party identity.

In particular aspects, the operations further comprise: (1) determining, by the computing hardware, identifying information of the third-party development tool; (2) cross-referencing, by the computing hardware, the identifying information in a database storing a plurality of third-party identities in correlation with a plurality of respective identifying information of third-party development tools; and (3) determining, by the computing hardware, that the third-party development tool is valid in response to successfully cross-referencing the identifying information in the database. In particular aspects, generating the tokenized name for the third-party development tool comprises using natural language processing.

A non-transitory computer-readable medium, in various aspects, stores computer-executable instructions that, when executed by processing hardware, configure the processing hardware to perform operations comprising: (1) generating a tokenized name for a third-party development tool, the tokenized name comprising a functionality token representing a function of the third-party development tool; (2) determining a functionality category for the functionality token; (3) identifying a third-party computing system from which the third-party development tool can be obtained; (4) assigning a third-party development tool category to the third-party development tool based on the functionality category and the identification of the third-party computing system; and (5) storing the assigned third-party development tool category and linking the assigned third-party development tool category to the third-party development tool. In various aspects, the third-party development tool is a software development kit used to generate an application, the application being configured to operate on a mobile device.

In particular aspects the operations further comprise determining, by the computing hardware, identifying information of the third-party development tool by scanning at least one of a folder on a mobile device or a file stored on the mobile device. In some aspects, scanning the at least one of the folder on the mobile device or the file stored on the mobile device comprises identifying information regarding at least one of a package name, a file name, or a folder name.

In a particular aspect, the operations further comprise generating a source token by: (1) querying, by the computing hardware, a database based on the identifying information of the third-party development tool, the database storing a plurality of third-party identities in correlation with a plurality of respective identifying information of third-party development tools; (2) determining, by the computing hardware and based on a result of querying the database, a third-party identity corresponding to the third-party development tool; and (3) generating the source token based on the third-party identity. In various aspects, identifying the third-party computing system from which the third-party development tool can be obtained based on the source token. In other aspects, generating the tokenized name for the third-party development tool comprises using natural language processing.

BRIEF DESCRIPTION OF THE DRAWINGS

Various embodiments of a data subject access request fulfillment system are described below. In the course of this description, reference will be made to the accompanying drawings, which are not necessarily drawn to scale, and wherein:

FIGS. 14-25 depict exemplary screen displays and graphical user interfaces (GUIs) according to various embodiments of the system, which may display information associated with the system or enable access to, or interaction with, the system by one or more users (e.g., to configure a questionnaire for populating one or more inventory attributes for one or more data models, complete one or more assessments, etc.).

FIGS. 30-31 depict exemplary screen displays and graphical user interfaces (GUIs) according to various embodiments of the system, which may display information associated with the system or enable access to, or interaction with, the system by one or more users (e.g., for the purpose of submitting a data subject access request or other suitable request).

Figure 32:
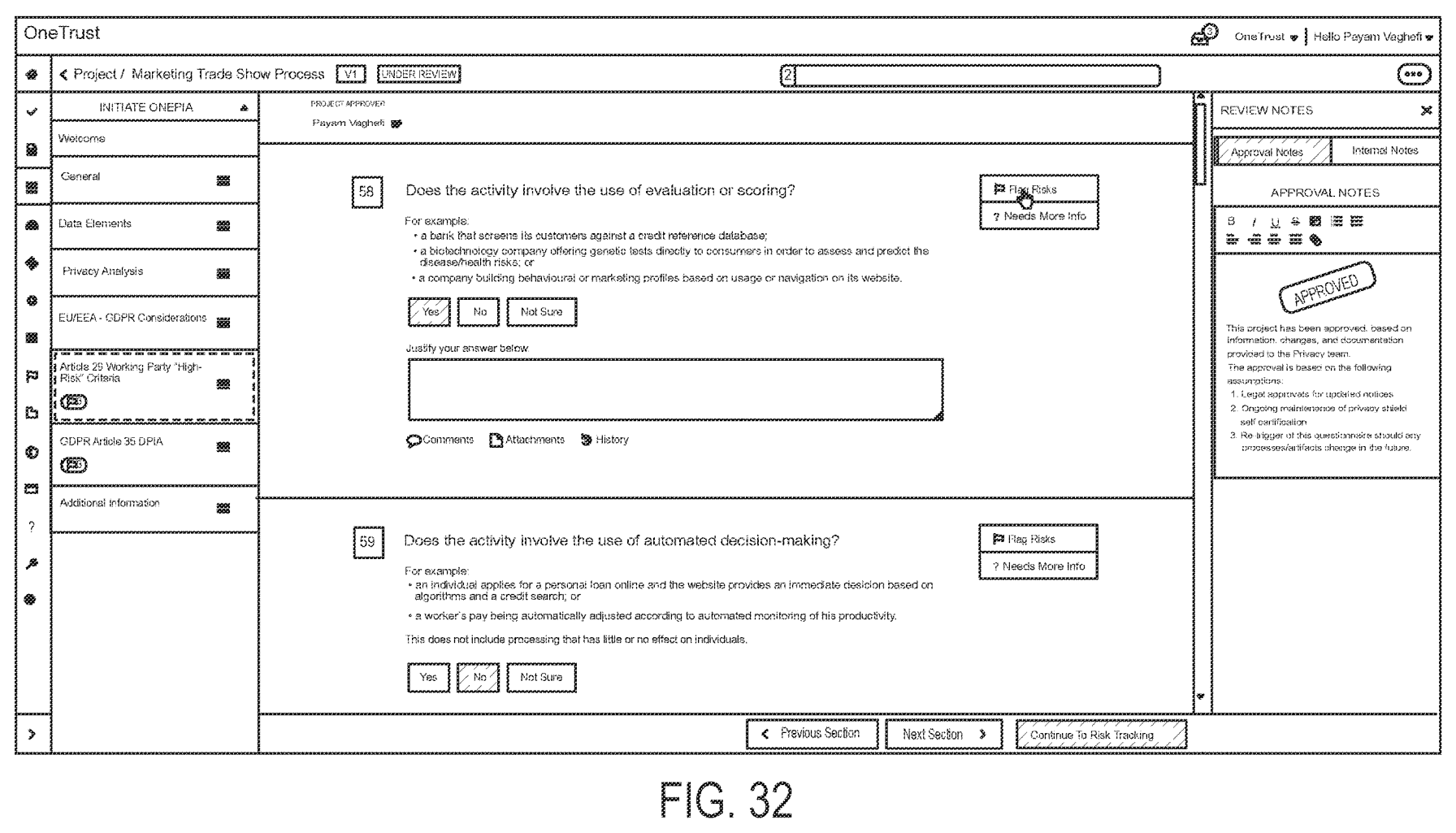
Figure 33:
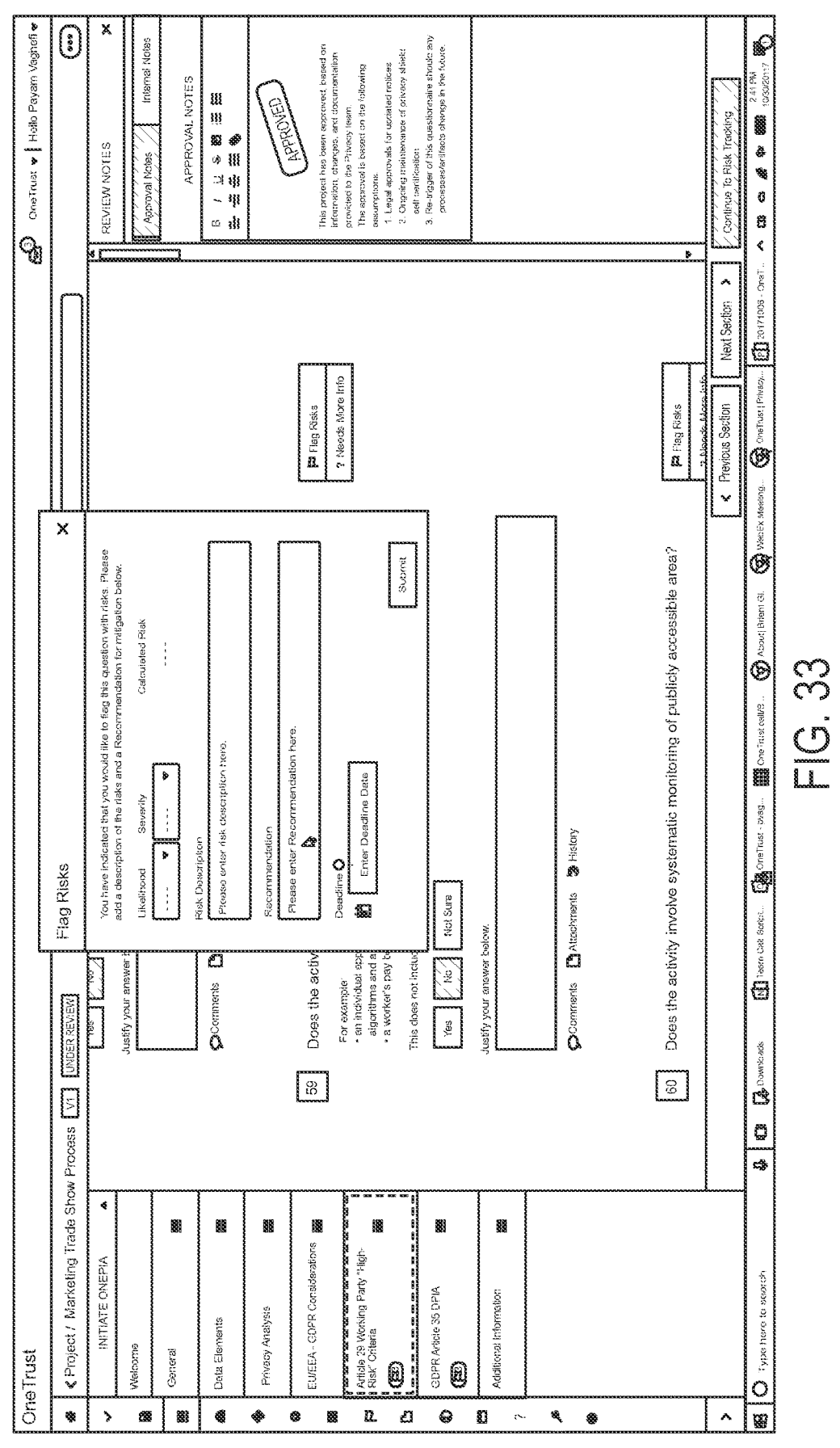
Figure 34:
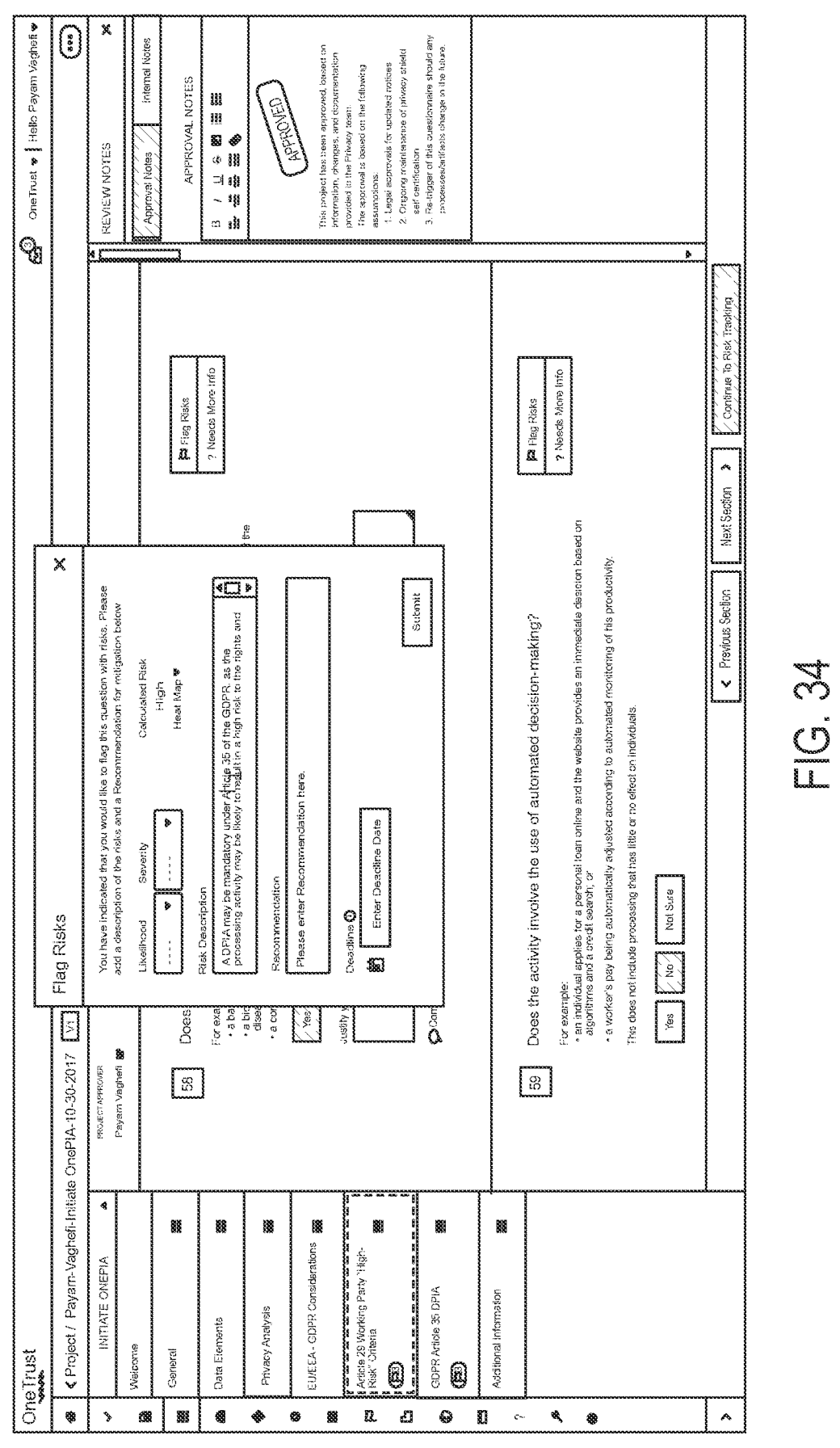
Figure 35:
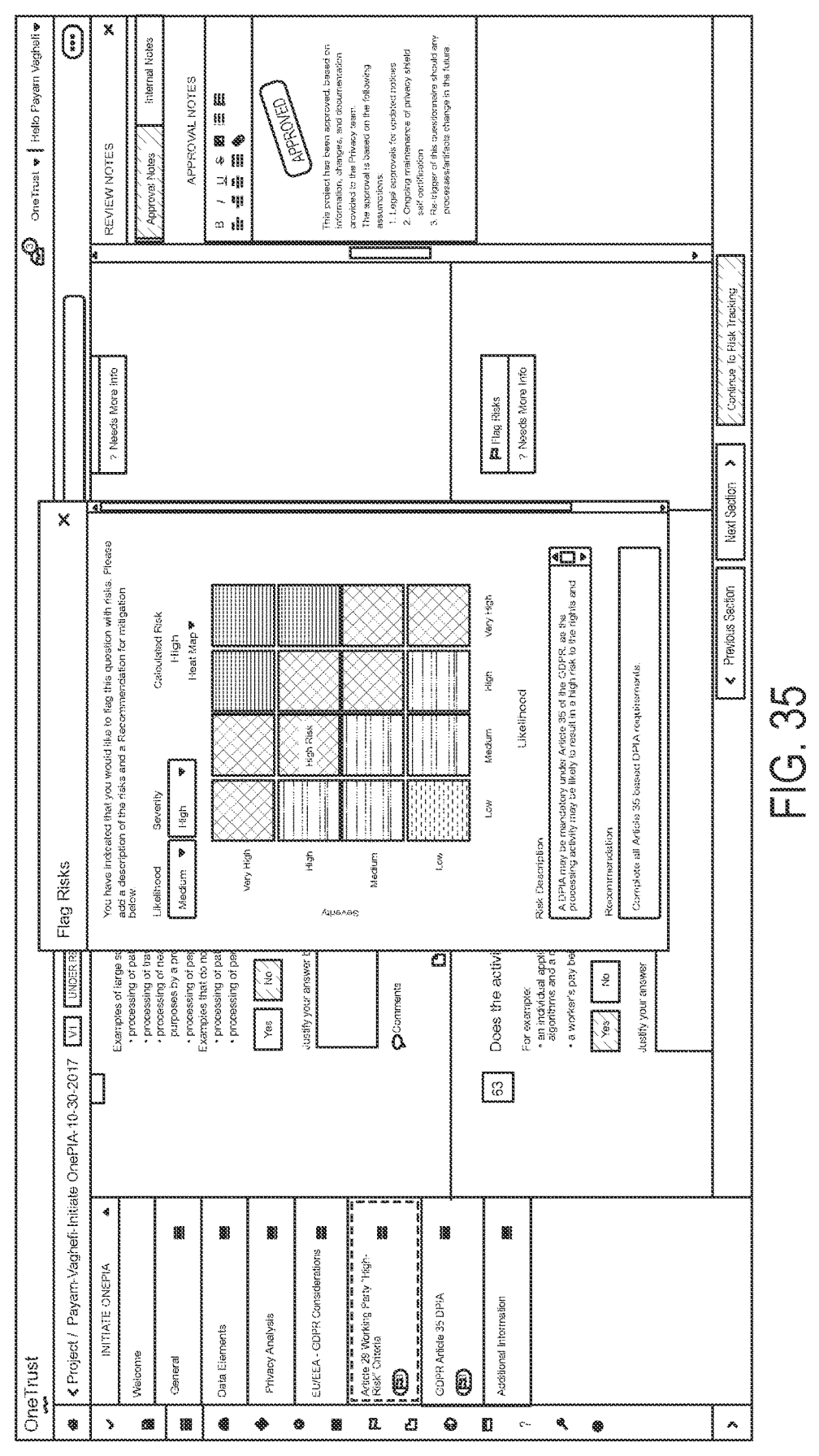

FIGS. 32-35 depict exemplary screen displays and graphical user interfaces (GUIs) according to various embodiments of the system, which may display information associated with the system or enable access to, or interaction with, the system by one or more users (e.g., for the purpose of flagging one or more risks associated with one or more particular questionnaire questions).

FIGS. 39-54 are computer screen shots that demonstrate the operation of various embodiments.

DETAILED DESCRIPTION

Various embodiments now will be described more fully hereinafter with reference to the accompanying drawings. It should be understood that the invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Overview

A data model generation and population system, according to particular embodiments, is configured to generate a data model (e.g., one or more data models) that maps one or more relationships between and/or among a plurality of data assets utilized by a corporation or other entity (e.g., individual, organization, etc.) in the context, for example, of one or more business processes. In particular embodiments, each of the plurality of data assets (e.g., data systems) may include, for example, any entity that collects, processes, contains, and/or transfers data (e.g., such as a software application, "internet of things" computerized device, database, web site, data-center, server, etc.). For example, a first data asset may include any software or device (e.g., server or servers) utilized by a particular entity for such data collection, processing, transfer, storage, etc.

Figure 4:
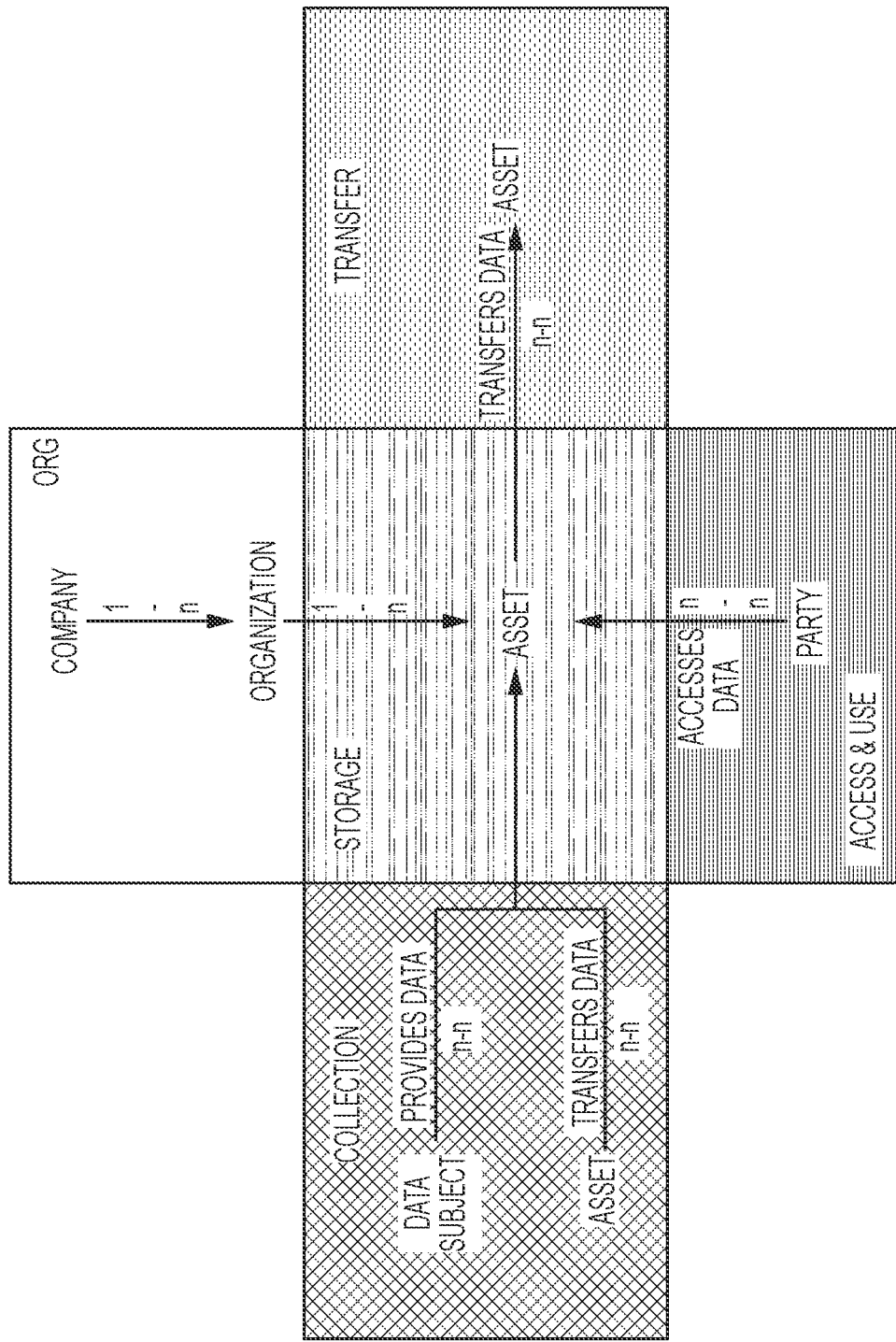
FIGS. 4-10 depict various exemplary visual representations of data models according to particular embodiments.
Figure 5:
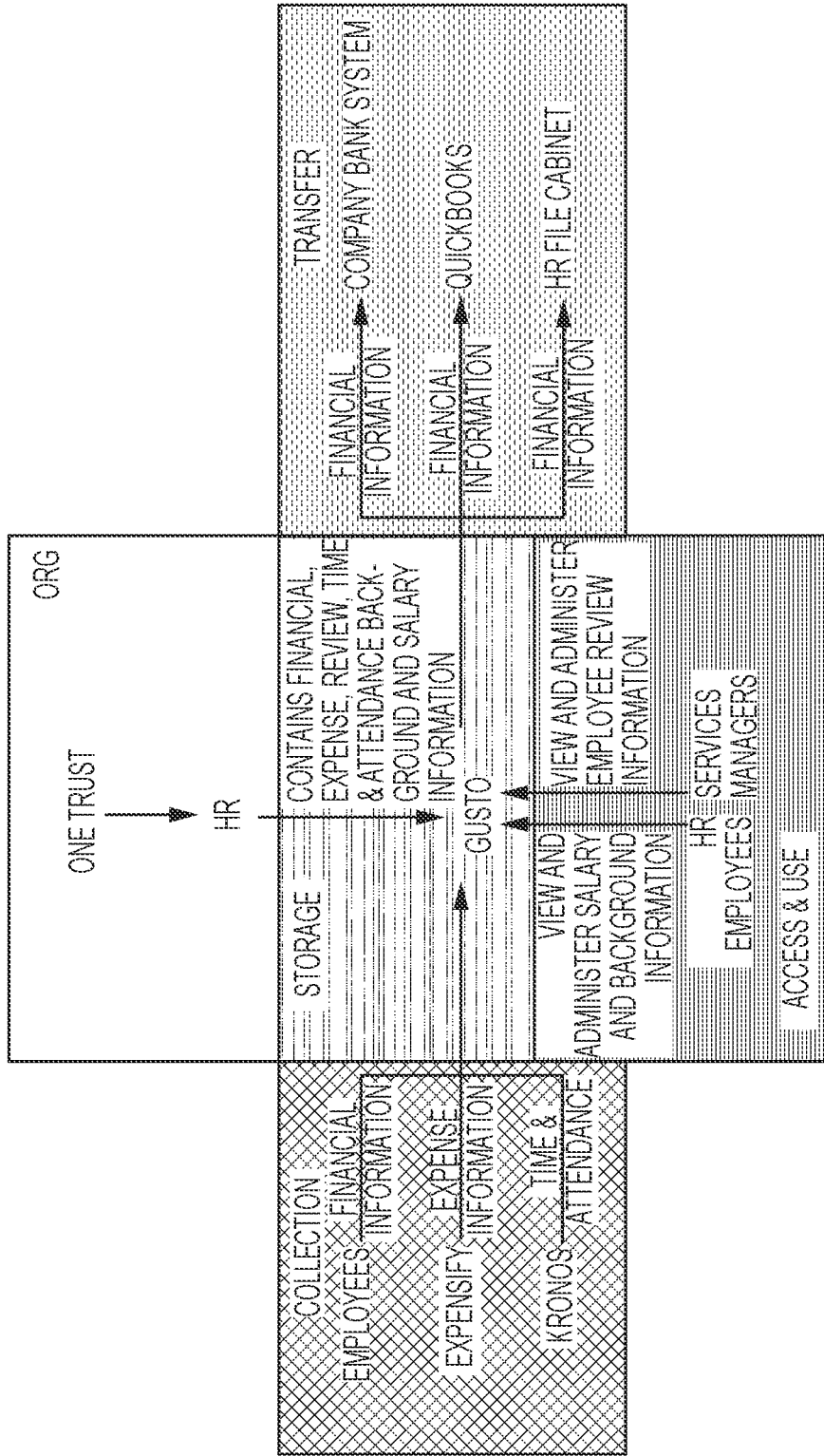
Figure 6:
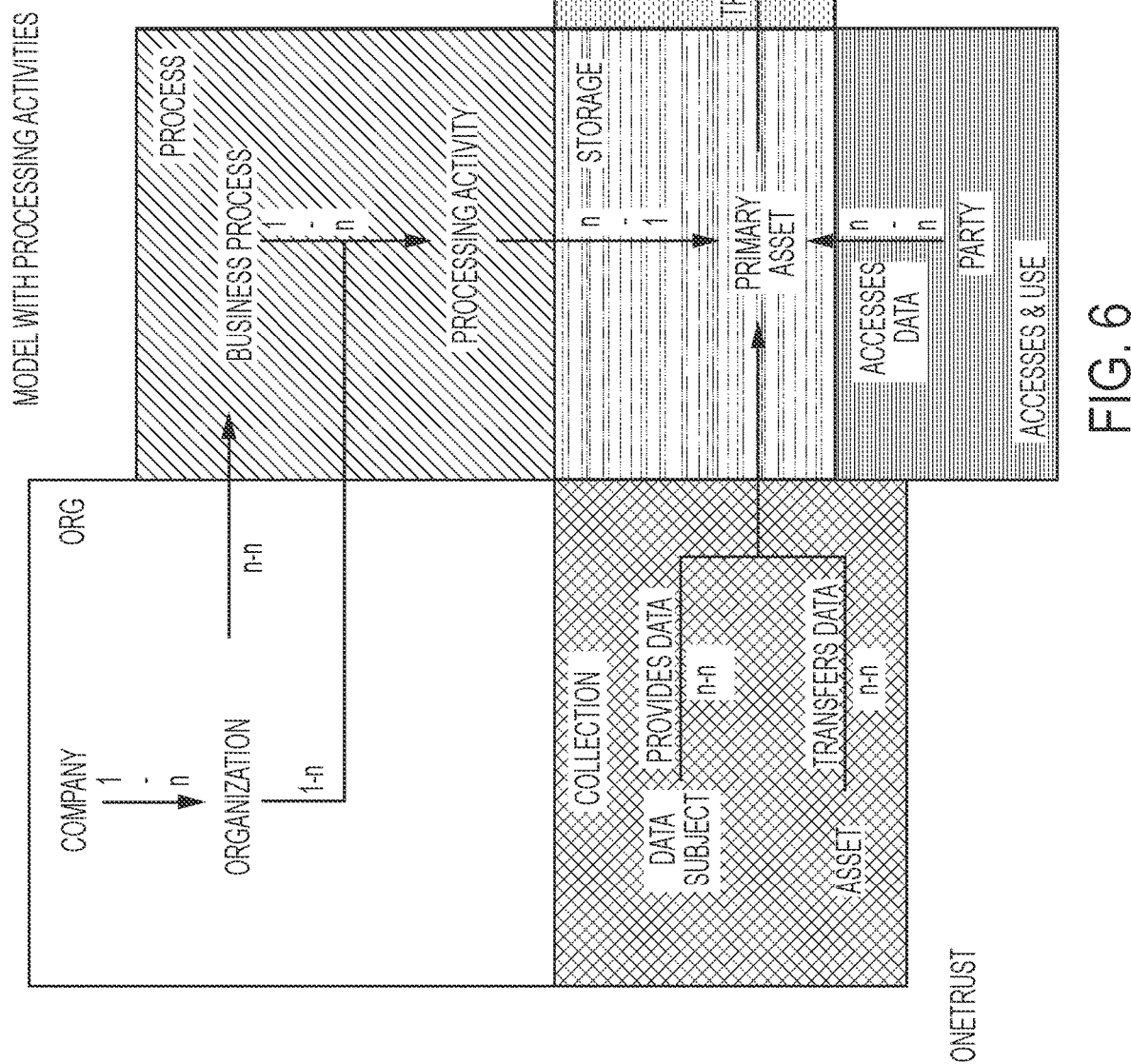
Figure 7:
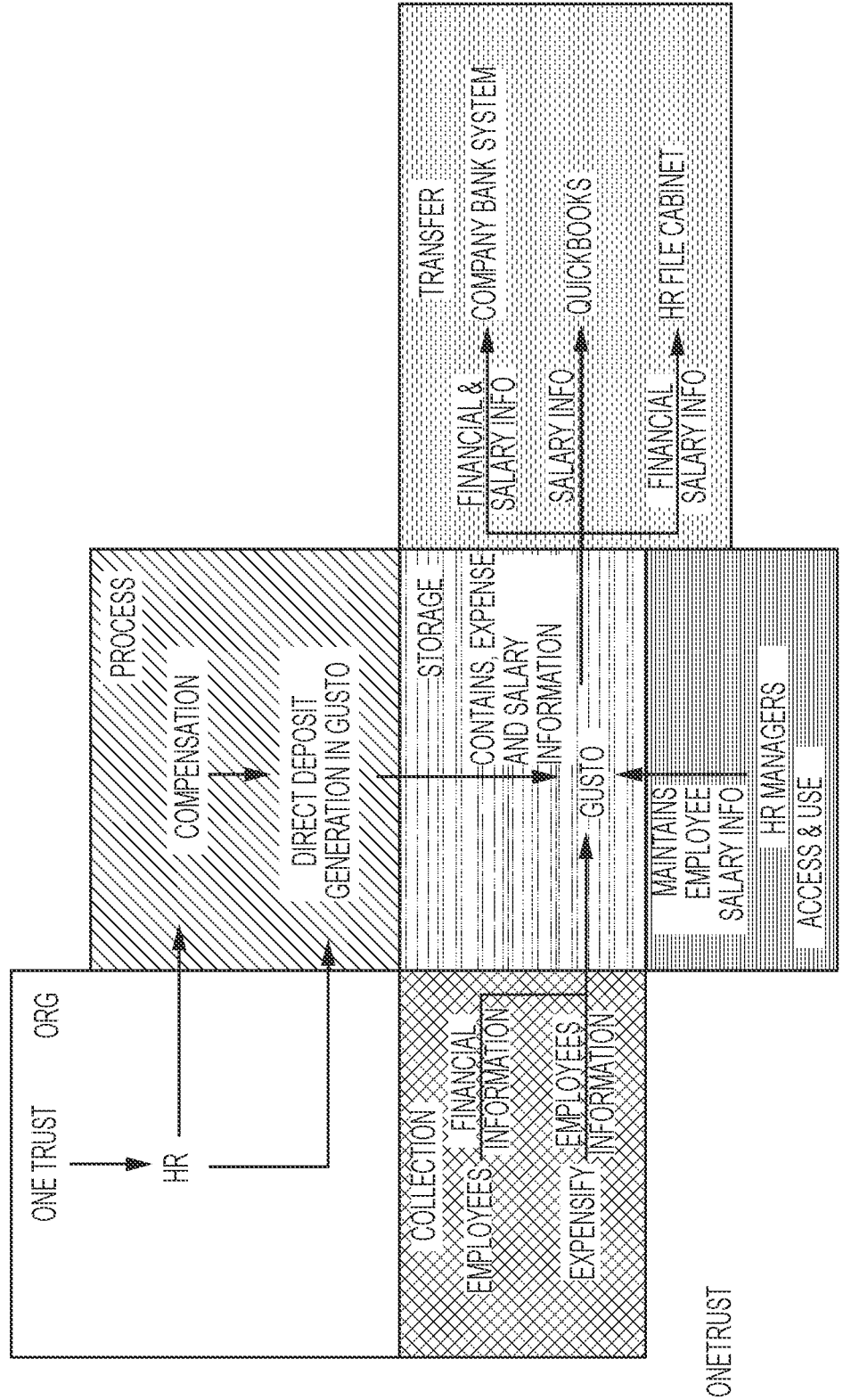

As shown in FIGS. 4 and 5, in various embodiments, the data model may store the following information: (1) the organization that owns and/or uses a particular data asset (a primary data asset, which is shown in the center of the data model in FIG. 4); (2) one or more departments within the organization that are responsible for the data asset; (3) one or more software applications that collect data (e.g., personal data) for storage in and/or use by the data asset (e.g., or one or more other suitable collection assets from which the personal data that is collected, processed, stored, etc. by the primary data asset is sourced); (4) one or more particular data subjects (or categories of data subjects) that information is collected from for use by the data asset; (5) one or more particular types of data that are collected by each of the particular applications for storage in and/or use by the data asset; (6) one or more individuals (e.g., particular individuals or types of individuals) that are permitted to access and/or use the data stored in, or used by, the data asset; (7) which particular types of data each of those individuals are allowed to access and use; and (8) one or more data assets (destination assets) that the data is transferred to for other use, and which particular data is transferred to each of those data assets. As shown in FIGS. 6 and 7, the system may also optionally store information regarding, for example, which business processes and processing activities utilize the data asset.

In particular embodiments, the data model stores this information for each of a plurality of different data assets and may include links between, for example, a portion of the model that provides information for a first particular data asset and a second portion of the model that provides information for a second particular data asset.

In various embodiments, the data model generation and population system may be implemented in the context of any suitable privacy management system that is configured to ensure compliance with one or more legal or industry standards related to the collection and/or storage of private information. In various embodiments, a particular organization, sub-group, or other entity may initiate a privacy campaign or other activity (e.g., processing activity) as part of its business activities. In such embodiments, the privacy campaign may include any undertaking by a particular organization (e.g., such as a project or other activity) that includes the collection, entry, and/or storage (e.g., in memory) of any personal data associated with one or more individuals. In particular embodiments, a privacy campaign may include any project undertaken by an organization that includes the use of personal data, or any other activity that could have an impact on the privacy of one or more individuals.

In any embodiment described herein, personal data may include, for example: (1) the name of a particular data subject (which may be a particular individual); (2) the data subject's address; (3) the data subject's telephone number; (4) the data subject's e-mail address; (5) the data subject's social security number; (6) information associated with one or more of the data subject's credit accounts (e.g., credit card numbers); (7) banking information for the data subject; (8) location data for the data subject (e.g., their present or past location); (9) internet search history for the data subject; and/or (10) any other suitable personal information, such as other personal information discussed herein. In particular embodiments, such personal data may include one or more cookies (e.g., where the individual is directly identifiable or may be identifiable based at least in part on information stored in the one or more cookies).

In particular embodiments, when generating a data model, the system may, for example: (1) identify one or more data assets associated with a particular organization; (2) generate a data inventory for each of the one or more data assets, where the data inventory comprises information such as: (a) one or more processing activities associated with each of the one or more data assets, (b) transfer data associated with each of the one or more data assets (data regarding which data is transferred to/from each of the data assets, and which data assets, or individuals, the data is received from and/or transferred to, (c) personal data associated with each of the one or more data assets (e.g., particular types of data collected, stored, processed, etc. by the one or more data assets), and/or (d) any other suitable information; and (3) populate the data model using one or more suitable techniques.

In particular embodiments, the one or more techniques for populating the data model may include, for example: (1) obtaining information for the data model by using one or more questionnaires associated with a particular privacy campaign, processing activity, etc.; (2) using one or more intelligent identity scanning techniques discussed herein to identify personal data stored by the system and map such data to a suitable data model, data asset within a data model, etc.; (3) obtaining information for the data model from a third-party application (or other application) using one or more application programming interfaces (API); and/or (4) using any other suitable technique.

In particular embodiments, the system is configured to generate and populate a data model substantially on the fly (e.g., as the system receives new data associated with particular processing activities). In still other embodiments, the system is configured to generate and populate a data model based at least in part on existing information stored by the system (e.g., in one or more data assets), for example, using one or more suitable scanning techniques described herein.

As may be understood in light of this disclosure, a particular organization may undertake a plurality of different privacy campaigns, processing activities, etc. that involve the collection and storage of personal data. In some embodiments, each of the plurality of different processing activities may collect redundant data (e.g., may collect the same personal data for a particular individual more than once), and may store data and/or redundant data in one or more particular locations (e.g., on one or more different servers, in one or more different databases, etc.). In this way, a particular organization may store personal data in a plurality of different locations which may include one or more known and/or unknown locations. By generating and populating a data model of one or more data assets that are involved in the collection, storage and processing of such personal data, the system may be configured to create a data model that facilitates a straightforward retrieval of information stored by the organization as desired. For example, in various embodiments, the system may be configured to use a data model in substantially automatically responding to one or more data access requests by an individual (e.g., or other organization). Various embodiments of a system for generating and populating a data model are described more fully below.

To ensure compliance with privacy regulations and/or standards, entities may determine the privacy and security impact of data and software installed on computing devices that such entities may control or interact with. Examples of such data and software may include cookies that may contain personal data and applications that may track a user's activity ("trackers"). In various embodiments, the disclosed systems may assess (e.g., score, categorize, etc.) such data and applications based on various privacy-related criteria and/or security-related criteria. In particular embodiments, the system may apply such assessment techniques to mobile devices and the data and software installed thereon.

In various embodiments, the system may identify one or more software development kits (SDKs) configured on a mobile device and/or used to generate an application configured on the mobile device. Using natural language processing (NLP) artificial intelligence techniques, the system may generate a tokenized name for the SDK that includes tokens representing the vendor of the SDK and various functions performed by applications generated using the SDK. The system may determine scores for one or more such tokens and determine a privacy category or score for the SDK based on the token scores. The security and privacy impact of the particular identified SDK may be assessed based, at least in part, on one or more privacy and security impact determinations (e.g., scores, categorization, etc.) associated with the SDK and/or the SDK vendor.

Technical Contributions of Various Embodiments

With the proliferation of mobile devices, the number of privacy-implicated activities performed on mobile devices and/or by software configured on mobile devices continues to grow. Therefore, determining the privacy implications of applications and other software executing on mobile devices is increasingly important. However, mobile device applications are often generated using software development kits (SDKs) that may install and/or use files that may be scattered throughout a mobile device's file system. As there are likely to be thousands of files (or more) configured on a typical mobile device, it can be very challenging to locate and identify files associated with a particular SDK or make a determination that a particular SDK was used to generate a particular application configured on the mobile device based on the filed installed on the device.

Accordingly, various embodiments of present disclosure overcome many of the technical challenges associated with determining particular SDKs used to generate applications configured on a mobile device. Specifically, various embodiments of the disclosure are directed to a computational framework configured for analyzing the many files (e.g., distributed across many folders within a file system) that may be configured on a mobile device and determining whether such files are associated with valid SDKs. The various embodiments may then tokenize the file names of identified SDKs to generate data structures representing various aspects of the identified SDKs. The system can evaluate these data structures (the tokenized SDK package names and/or one or more portions thereof) to determine a privacy category, privacy-related score, and/or a privacy assessment information for the package. For example, the various embodiments evaluate individual tokens of a package's tokenized name, determine a score for one or more of the tokens (including, in various embodiments, weighting such scores), and determine a category and/or score for the associated SDK based on the token scores. In this way, the various embodiments spare users from the time-consuming operations of manually searching folders and files on a mobile to device to identify files, determining whether an SDK is associated with each identified file, determining a function of an SDK that may be represented by a particular file if it is associated with an SDK, and determining the privacy-related implications (e.g., most relevant privacy category or a privacy-related score) of the SDK based on various functions of the SDK indicated by files that have been identified as being associated with the SDK. The various embodiments thus increase the efficiency with which users can evaluate the privacy impact of SDKs used to generate mobile device applications.

Accordingly, various embodiments of the disclosure provided herein are more effective, efficient, timely, accurate, and faster in determining a mobile device application's privacy implications and those of an SDK used to generate the application. In addition, various embodiments of the disclosure provided herein can facilitate the identification and/or documentation of (e.g., automated) processes and activities performed by an application that may be related to privacy and security. The system may use the determination of the privacy implications of a mobile device application and/or its associated SDK to determine an entity's compliance (and/or efforts to comply) with numerous regulations and requirements. Various embodiments of the disclosure can execute data processing related to determining the privacy implications of a mobile device application and/or its associated SDK that cannot be feasibly performed by a human, for example, by using such data processing to analyze the many files configured throughout the file system of a mobile device to identify a package and generate a tokenized package name which can then be used to calculate a privacy score and/or determine a suitable privacy category based on values determined for the tokens in a tokenized package name. This is especially advantageous when this data processing must be carried out over a reasonable timeframe to ensure that the privacy implications of a mobile device application and/or its associated SDK can be understood in a timely fashion. By facilitating such data processing, the various embodiments of the present disclosure improve the computational efficiency and reliability of various automated systems and procedures for determining the privacy implications of a mobile device application and/or its associated SDK, and therefore an extent of compliance with one or more particular regulations and/or requirements and/or extents of compliance between multiple regulations and/or requirements based on such privacy implications. Further detail is now provided for different aspects of various embodiments of the disclosure.

Exemplary Technical Platforms

As will be appreciated by one skilled in the relevant field, various embodiments may be, for example, embodied as a computer system, a method, or a computer program product. Accordingly, various embodiments may take the form of an entirely hardware embodiment, an entirely software embodiment, or an embodiment combining software and hardware aspects. Furthermore, particular embodiments may take the form of a computer program product stored on a computer-readable storage medium having computer-readable instructions (e.g., software) embodied in the storage medium. Various embodiments may take the form of web-implemented computer software. Any suitable computer-readable storage medium may be utilized including, for example, hard disks, compact disks, DVDs, optical storage devices, and/or magnetic storage devices.

Various embodiments are described below with reference to block diagrams and flowchart illustrations of methods, apparatuses (e.g., systems), and computer program products. It should be understood that each block of the block diagrams and flowchart illustrations, and combinations of blocks in the block diagrams and flowchart illustrations, respectively, can be implemented by a computer executing computer program instructions. These computer program instructions may be loaded onto a general purpose computer, special purpose computer, or other programmable data processing apparatus to produce a machine, such that the instructions which execute on the computer or other programmable data processing apparatus to create means for implementing the functions specified in the flowchart block or blocks.

These computer program instructions may also be stored in a computer-readable memory that can direct a computer or other programmable data processing apparatus to function in a particular manner such that the instructions stored in the computer-readable memory produce an article of manufacture that is configured for implementing the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of mechanisms for performing the specified functions, combinations of steps for performing the specified functions, and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and other hardware executing appropriate computer instructions.

Example System Architecture

Figure 1:
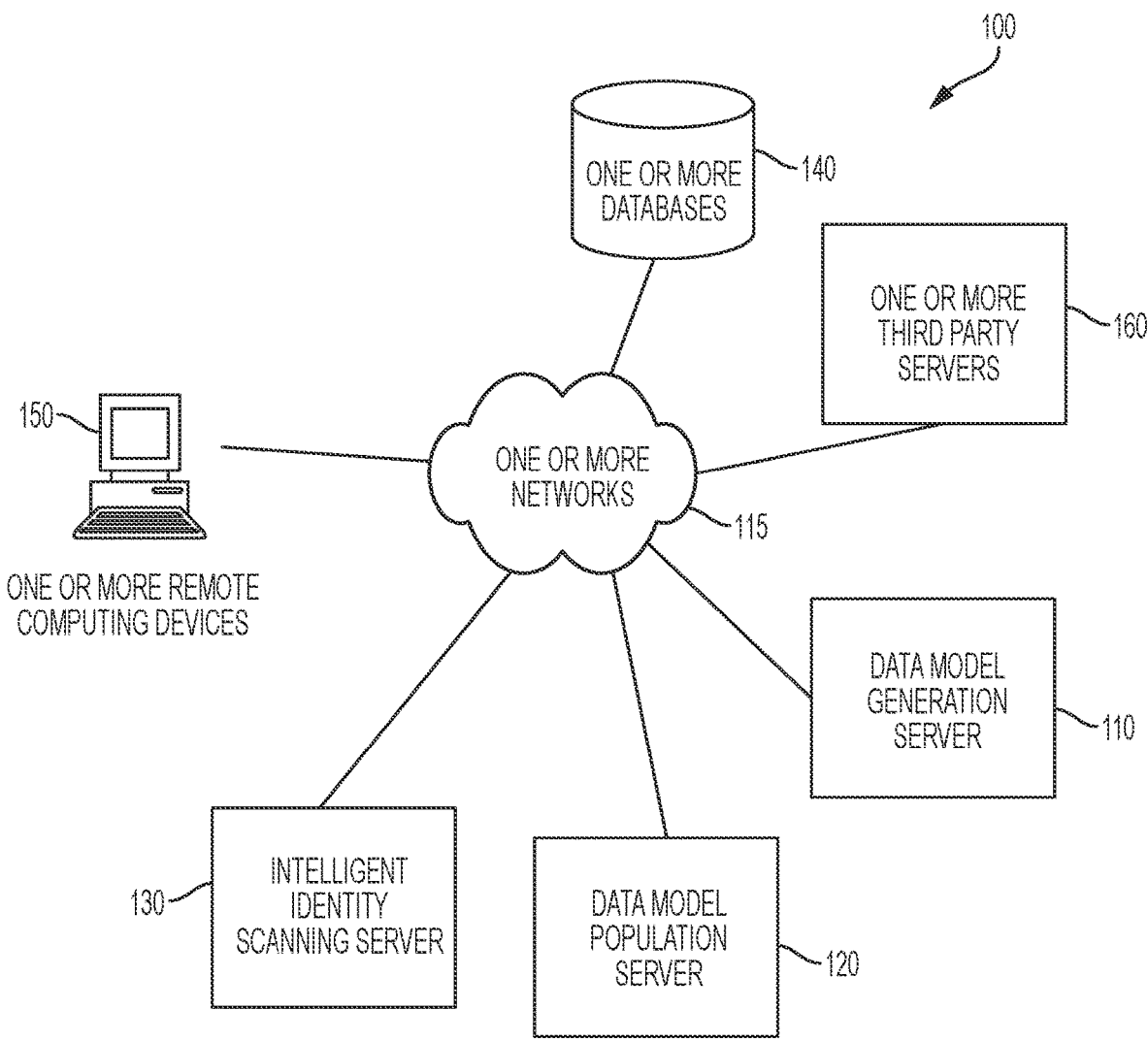
FIG. 1 depicts a data model generation and population system according to particular embodiments.

FIG. 1 is a block diagram of a Data Model Generation and Population System 100 according to a particular embodiment. In various embodiments, the Data Model Generation and Population System 100 is part of a privacy compliance system (also referred to as a privacy management system), or other system, which may, for example, be associated with a particular organization and be configured to aid in compliance with one or more legal or industry regulations related to the collection and storage of personal data. In some embodiments, the Data Model Generation and Population System 100 is configured to: (1) generate a data model based on one or more identified data assets, where the data model includes a data inventory associated with each of the one or more identified data assets; (2) identify populated and unpopulated aspects of each data inventory; and (3) populate the unpopulated aspects of each data inventory using one or more techniques such as intelligent identity scanning, questionnaire response mapping, APIs, etc.

As may be understood from FIG. 1, the Data Model Generation and Population System 100 includes one or more computer networks 115, a Data Model Generation Server 110, a Data Model Population Server 120, an Intelligent Identity Scanning Server 130, One or More Databases 140 or other data structures, one or more remote computing devices 150 (e.g., a desktop computer, laptop computer, tablet computer, smartphone, etc.), and One or More Third Party Servers 160. In particular embodiments, the one or more computer networks 115 facilitate communication between the Data Model Generation Server 110, Data Model Population Server 120, Intelligent Identity Scanning Server 130, One or More Databases 140, one or more remote computing devices 150 (e.g., a desktop computer, laptop computer, tablet computer, smartphone, etc.), and One or More Third Party Servers 160. Although in the embodiment shown in FIG. 1, the Data Model Generation Server 110, Data Model Population Server 120, Intelligent Identity Scanning Server 130, One or More Databases 140, one or more remote computing devices 150 (e.g., a desktop computer, laptop computer, tablet computer, smartphone, etc.), and One or More Third Party Servers 160 are shown as separate servers, it should be understood that in other embodiments, one or more of these servers and/or computing devices may comprise a single server, a plurality of servers, one or more cloud-based servers, or any other suitable configuration.

The one or more computer networks 115 may include any of a variety of types of wired or wireless computer networks such as the Internet, a private intranet, a public switch telephone network (PSTN), or any other type of network. The communication link between The Intelligent Identity Scanning Server 130 and the One or More Third Party Servers 160 may be, for example, implemented via a Local Area Network (LAN) or via the Internet. In other embodiments, the One or More Databases 140 may be stored either fully or partially on any suitable server or combination of servers described herein.

Figure 2:
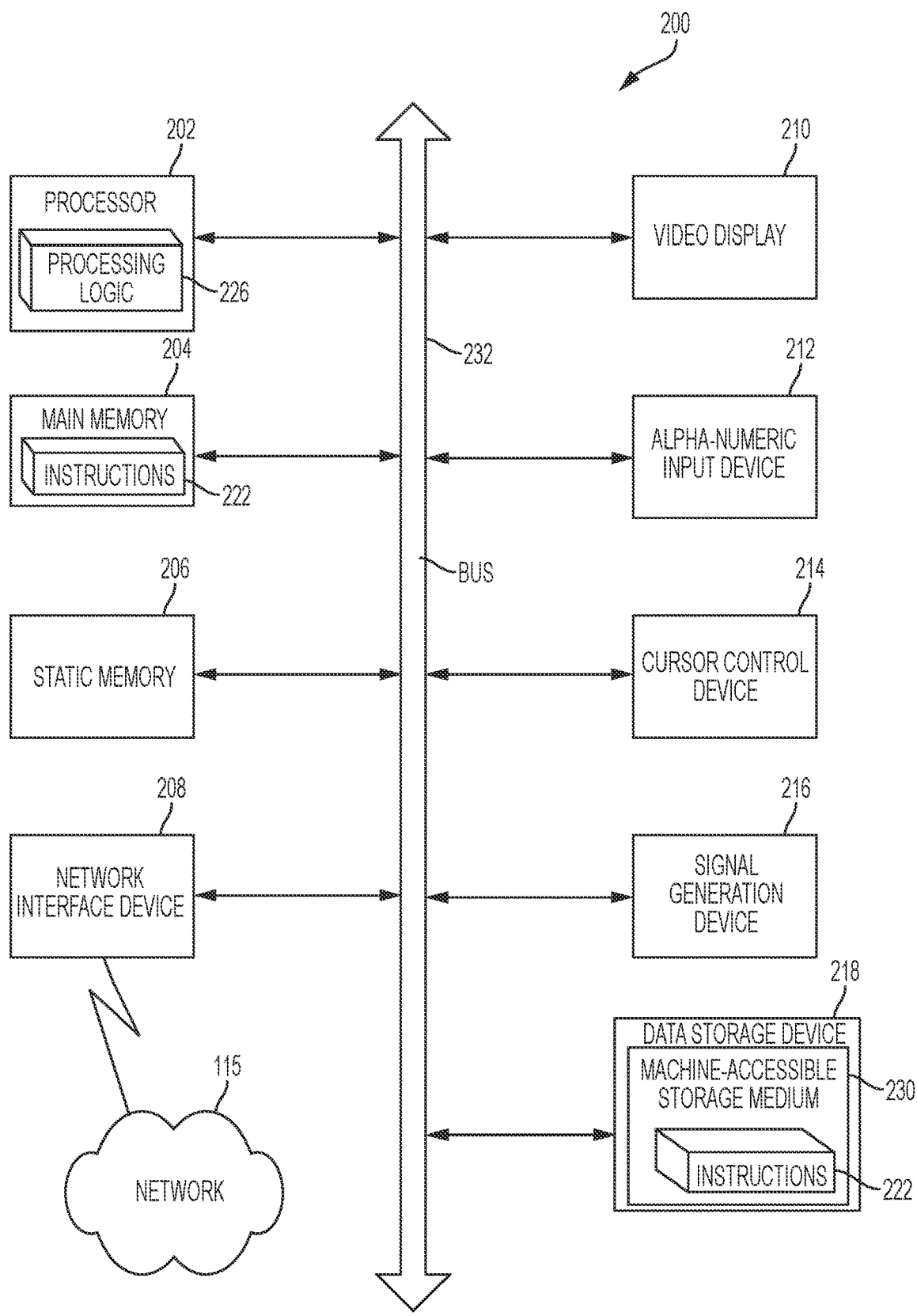
FIG. 2 is a schematic diagram of a computer (such as the data model generation server 110, or data model population server 120) that is suitable for use in various embodiments of the data model generation and population system shown in FIG. 1.

FIG. 2 illustrates a diagrammatic representation of a computer 200 that can be used within the Data Model Generation and Population System 100, for example, as a client computer (e.g., one or more remote computing devices 130 shown in FIG. 1), or as a server computer (e.g., Data Model Generation Server 110 shown in FIG. 1). In particular embodiments, the computer 200 may be suitable for use as a computer within the context of the Data Model Generation and Population System 100 that is configured to generate a data model and map one or more relationships between one or more pieces of data that make up the model.

In particular embodiments, the computer 200 may be connected (e.g., networked) to other computers in a LAN, an intranet, an extranet, and/or the Internet. As noted above, the computer 200 may operate in the capacity of a server or a client computer in a client-server network environment, or as a peer computer in a peer-to-peer (or distributed) network environment. The computer 200 may be a personal computer (PC), a tablet PC, a set-top box (STB), a Personal Digital Assistant (PDA), a cellular telephone, a web appliance, a server, a network router, a switch or bridge, or any other computer capable of executing a set of instructions (sequential or otherwise) that specify actions to be taken by that computer. Further, while only a single computer is illustrated, the term "computer" shall also be taken to include any collection of computers that individually or jointly execute a set (or multiple sets) of instructions to perform any one or more of the methodologies discussed herein.

An exemplary computer 200 includes a processing device 202, a main memory 204 (e.g., read-only memory (ROM), flash memory, dynamic random access memory (DRAM) such as synchronous DRAM (SDRAM) or Rambus DRAM (RDRAM), etc.), static memory 206 (e.g., flash memory, static random access memory (SRAM), etc.), and a data storage device 218, which communicate with each other via a bus 232.

The processing device 202 represents one or more general-purpose processing devices such as a microprocessor, a central processing unit, or the like. More particularly, the processing device 202 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 202 may also be one or more special-purpose processing devices such as an application specific integrated circuit (ASIC), a field programmable gate array (FPGA), a digital signal processor (DSP), network processor, or the like. The processing device 202 may be configured to execute processing logic 226 for performing various operations and steps discussed herein.

The computer 120 may further include a network interface device 208. The computer 200 also may include a video display unit 210 (e.g., a liquid crystal display (LCD) or a cathode ray tube (CRT)), an alphanumeric input device 212 (e.g., a keyboard), a cursor control device 214 (e.g., a mouse), and a signal generation device 216 (e.g., a speaker).

The data storage device 218 may include a non-transitory computer-accessible storage medium 230 (also known as a non-transitory computer-readable storage medium or a non-transitory computer-readable medium) on which is stored one or more sets of instructions (e.g., software instructions 222) embodying any one or more of the methodologies or functions described herein. The software instructions 222 may also reside, completely or at least partially, within main memory 204 and/or within processing device 202 during execution thereof by computer 200—main memory 204 and processing device 202 also constituting computer-accessible storage media. The software instructions 222 may further be transmitted or received over a network 115 via network interface device 208.

While the computer-accessible storage medium 230 is shown in an exemplary embodiment to be a single medium, the term "computer-accessible storage medium" should be understood to include a single medium or multiple media (e.g., a centralized or distributed database, and/or associated caches and servers) that store the one or more sets of instructions. The term "computer-accessible storage medium" should also be understood to include any medium that is capable of storing, encoding, or carrying a set of instructions for execution by the computer and that cause the computer to perform any one or more of the methodologies of the disclosed embodiments. The term "computer-accessible storage medium" should accordingly be understood to include, but not be limited to, solid-state memories, optical and magnetic media, etc.

Exemplary System Platform

Various embodiments of a Data Model Generation and Population System 100 may be implemented in the context of any suitable system (e.g., a privacy compliance system). For example, the Data Model Generation and Population System 100 may be implemented to analyze a particular company or other organization's data assets to generate a data model for one or more processing activities, privacy campaigns, etc. undertaken by the organization. In particular embodiments, the system may implement one or more modules in order to at least partially ensure compliance with one or more regulations (e.g., legal requirements) related to the collection and/or storage of personal data. Various aspects of the system's functionality may be executed by certain system modules, including a Data Model Generation Module 300, Data Model Population Module 1100, Data Population Questionnaire Generation Module 1200, Intelligent Identity Scanning Module 2600, and Data Subject Access Request Fulfillment Module 2900. These modules are discussed in greater detail below.

Although these modules are presented as a series of steps, it should be understood in light of this disclosure that various embodiments of the Data Model Generation Module 300, Data Model Population Module 1100, Data Population Questionnaire Generation Module 1200, Intelligent Identity Scanning Module 2600, and Data Subject Access Request Fulfillment Module 2900 described herein may perform the steps described below in an order other than in which they are presented. In still other embodiments, the Data Model Generation Module 300, Data Model Population Module 1100, Data Population Questionnaire Generation Module 1200, Intelligent Identity Scanning Module 2600, and Data Subject Access Request Fulfillment Module 2900 may omit certain steps described below. In various other embodiments, the Data Model Generation Module 300, Data Model Population Module 1100, Data Population Questionnaire Generation Module 1200, Intelligent Identity Scanning Module 2600, and Data Subject Access Request Fulfillment Module 2900 may perform steps in addition to those described (e.g., such as one or more steps described with respect to one or more other modules, etc.).

Data Model Generation Module

In particular embodiments, a Data Model Generation Module 300 is configured to: (1) generate a data model (e.g., a data inventory) for one or more data assets utilized by a particular organization; (2) generate a respective data inventory for each of the one or more data assets; and (3) map one or more relationships between one or more aspects of the data inventory, the one or more data assets, etc. within the data model. In particular embodiments, a data asset (e.g., data system, software application, etc.) may include, for example, any entity that collects, processes, contains, and/or transfers data (e.g., such as a software application, "internet of things" computerized device, database, website, datacenter, server, etc.). For example, a first data asset may include any software or device (e.g., server or servers) utilized by a particular entity for such data collection, processing, transfer, storage, etc.

In particular embodiments, a particular data asset, or collection of data assets, may be utilized as part of a particular data processing activity (e.g., direct deposit generation for payroll purposes). In various embodiments, a data model generation system may, on behalf of a particular organization (e.g., entity), generate a data model that encompasses a plurality of processing activities. In other embodiments, the system may be configured to generate a discrete data model for each of a plurality of processing activities undertaken by an organization.

Figure 3:
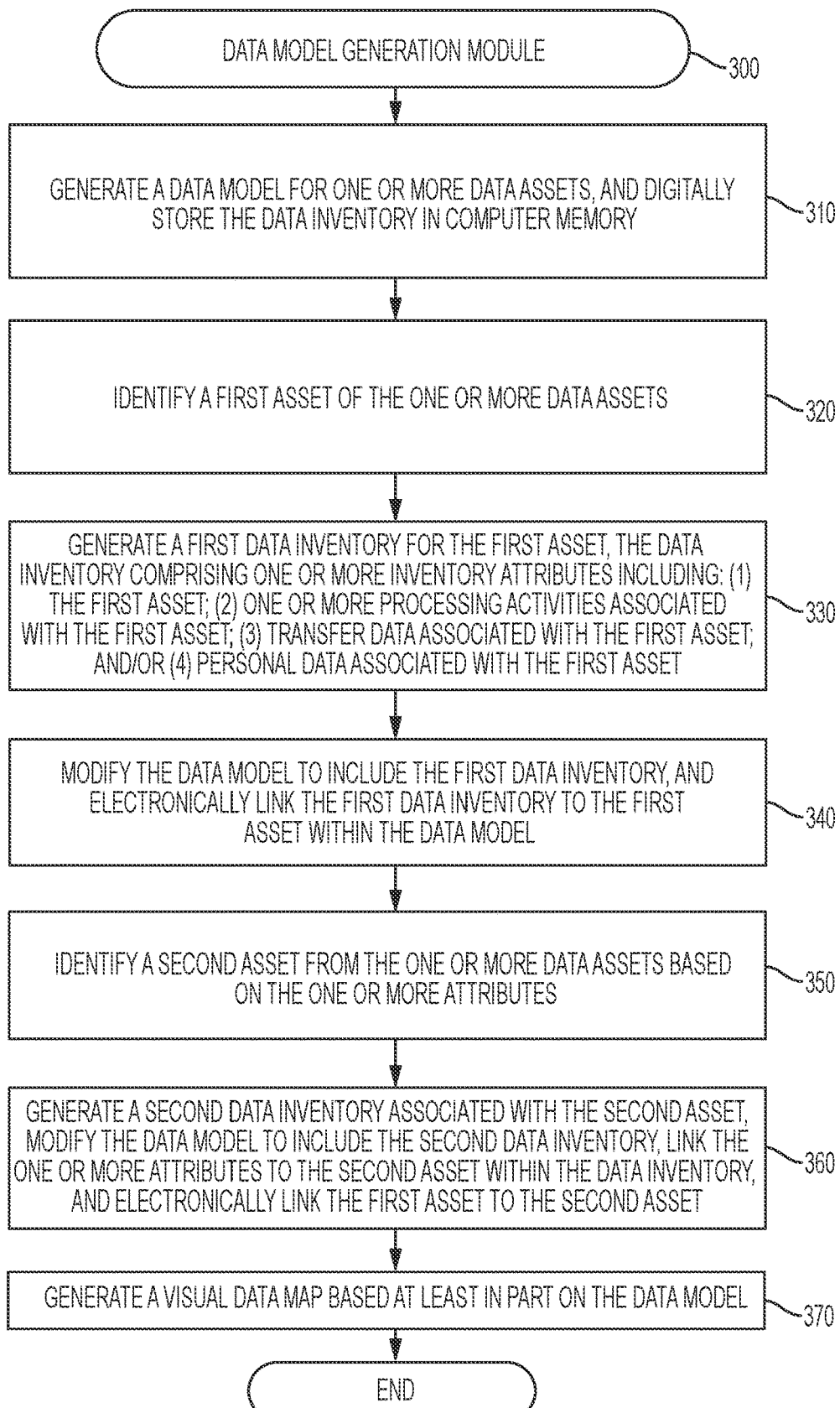
FIG. 3 is a flowchart showing an example of steps performed by a Data Model Generation Module according to particular embodiments.

Turning to FIG. 3, in particular embodiments, when executing the Data Model Generation Module 300, the system begins, at Step 310, by generating a data model for one or more data assets and digitally storing the data model in computer memory. The system may, for example, store the data model in the One or More Databases 140 described above (or any other suitable data structure). In various embodiments, generating the data model comprises generating a data structure that comprises information regarding one or more data assets, attributes and other elements that make up the data model. As may be understood in light of this disclosure, the one or more data assets may include any data assets that may be related to one another. In particular embodiments, the one or more data assets may be related by virtue of being associated with a particular entity (e.g., organization). For example, the one or more data assets may include one or more computer servers owned, operated, or utilized by the entity that at least temporarily store data sent, received, or otherwise processed by the particular entity.

In still other embodiments, the one or more data assets may comprise one or more third party assets which may, for example, send, receive and/or process personal data on behalf of the particular entity. These one or more data assets may include, for example, one or more software applications (e.g., such as EXPENSIFY to collect expense information, QUICKBOOKS to maintain and store salary information, etc.).

Continuing to step 320, the system is configured to identify a first data asset of the one or more data assets. In particular embodiments, the first data asset may include, for example, any entity (e.g., system) that collects, processes, contains, and/or transfers data (e.g., such as a software application, "internet of things" computerized device, database, website, data-center, server, etc.). For example, the first data asset may include any software or device utilized by a particular organization for such data collection, processing, transfer, etc. In various embodiments, the first data asset may be associated with a particular processing activity (e.g., the first data asset may make up at least a part of a data flow that relates to the collection, storage, transfer, access, use, etc. of a particular piece of data (e.g., personal data)). Information regarding the first data asset may clarify, for example, one or more relationships between and/or among one or more other data assets within a particular organization. In a particular example, the first data asset may include a software application provided by a third party (e.g., a third party vendor) with which the particular entity interfaces for the purpose of collecting, storing, or otherwise processing personal data (e.g., personal data regarding customers, employees, potential customers, etc.).

In particular embodiments, the first data asset is a storage asset that may, for example: (1) receive one or more pieces of personal data form one or more collection assets; (2) transfer one or more pieces of personal data to one or more transfer assets; and/or (3) provide access to one or more pieces of personal data to one or more authorized individuals (e.g., one or more employees, managers, or other authorized individuals within a particular entity or organization). In a particular embodiment, the first data asset is a primary data asset associated with a particular processing activity around which the system is configured to build a data model associated with the particular processing activity.

In particular embodiments, the system is configured to identify the first data asset by scanning a plurality of computer systems associated with a particular entity (e.g., owned, operated, utilized, etc. by the particular entity). In various embodiments, the system is configured to identify the first data asset from a plurality of data assets identified in response to completion, by one or more users, of one or more questionnaires.

Advancing to Step 330, the system generates a first data inventory of the first data asset. The data inventory may comprise, for example, one or more inventory attributes associated with the first data asset such as, for example: (1) one or more processing activities associated with the first data asset; (2) transfer data associated with the first data asset (e.g., how and where the data is being transferred to and/or from); (3) personal data associated with the first data asset (e.g., what type of personal data is collected and/or stored by the first data asset; how, and from where, the data is collected, etc.); (4) storage data associated with the personal data (e.g., whether the data is being stored, protected and deleted); and (5) any other suitable attribute related to the collection, use, and transfer of personal data. In other embodiments, the one or more inventory attributes may comprise one or more other pieces of information such as, for example: (1) the type of data being stored by the first data asset; (2) an amount of data stored by the first data asset; (3) whether the data is encrypted; (4) a location of the stored data (e.g., a physical location of one or more computer servers on which the data is stored); etc. In particular other embodiments, the one or more inventory attributes may comprise one or more pieces of information technology data related to the first data asset (e.g., such as one or more pieces of network and/or infrastructure information, IP address, MAC address, etc.).

In various embodiments, the system may generate the data inventory based at least in part on the type of first data asset. For example, particular types of data assets may have particular default inventory attributes. In such embodiments, the system is configured to generate the data inventory for the first data asset, which may, for example, include one or more placeholder fields to be populated by the system at a later time. In this way, the system may, for example, identify particular inventory attributes for a particular data asset for which information and/or population of data is required as the system builds the data model.

As may be understood in light of this disclosure, the system may, when generating the data inventory for the first data asset, generate one or more placeholder fields that may include, for example: (1) the organization (e.g., entity) that owns and/or uses the first data asset (a primary data asset, which is shown in the center of the data model in FIG. 4); (2) one or more departments within the organization that are responsible for the first data asset; (3) one or more software applications that collect data (e.g., personal data) for storage in and/or use by the first data asset (e.g., or one or more other suitable collection assets from which the personal data that is collected, processed, stored, etc. by the first data asset is sourced); (4) one or more particular data subjects (or categories of data subjects) that information is collected from for use by the first data asset; (5) one or more particular types of data that are collected by each of the particular applications for storage in and/or use by the first data asset; (6) one or more individuals (e.g., particular individuals or types of individuals) that are permitted to access and/or use the data stored in, or used by, the first data asset; (7) which particular types of data each of those individuals are allowed to access and use; and (8) one or more data assets (destination assets) that the data is transferred to from the first data asset, and which particular data is transferred to each of those data assets.

As may be understood in light of this disclosure, the system may be configured to generate the one or more placeholder fields based at least in part on, for example: (1) the type of the first data asset; (2) one or more third party vendors utilized by the particular organization; (3) a number of collection or storage assets typically associated with the type of the first data asset; and/or (4) any other suitable factor related to the first data asset, its one or more inventory attributes, etc. In other embodiments, the system may substantially automatically generate the one or more placeholders based at least in part on a hierarchy and/or organization of the entity for which the data model is being built. For example, a particular entity may have a marketing division, legal department, human resources department, engineering division, or other suitable combination of departments that make up an overall organization. Other particular entities may have further subdivisions within the organization. When generating the data inventory for the first data asset, the system may identify that the first data asset will have both an associated organization and subdivision within the organization to which it is assigned. In this example, the system may be configured to store an indication in computer memory that the first data asset is associated with an organization and a department within the organization.

Next, at Step 340, the system modifies the data model to include the first data inventory and electronically links the first data inventory to the first data asset within the data model. In various embodiments, modifying the data model may include configuring the data model to store the data inventory in computer memory, and to digitally associate the data inventory with the first data asset in memory.

FIGS. 4 and 5 show a data model according to a particular embodiment. As shown in these figures, the data model may store the following information for the first data asset: (1) the organization that owns and/or uses the first data asset; (2) one or more departments within the organization that are responsible for the first data asset; (3) one or more applications that collect data (e.g., personal data) for storage in and/or use by the first data asset; (4) one or more particular data subjects that information is collected from for use by the first data asset; (5) one or more collection assets from which the first asset receives data (e.g., personal data); (6)

one or more particular types of data that are collected by each of the particular applications (e.g., collection assets) for storage in and/or use by the first data asset; (7) one or more individuals (e.g., particular individuals, types of individuals, or other parties) that are permitted to access and/or use the data stored in or used by the first data asset; (8) which particular types of data each of those individuals are allowed to access and use; and (9) one or more data assets (destination assets) the data is transferred to for other use, and which particular data is transferred to each of those data assets. As shown in FIGS. 6 and 7, the system may also optionally store information regarding, for example, which business processes and processing activities utilize the first data asset.

As noted above, in particular embodiments, the data model stores this information for each of a plurality of different data assets and may include one or more links between, for example, a portion of the model that provides information for a first particular data asset and a second portion of the model that provides information for a second particular data asset.

Advancing to Step 350, the system next identifies a second data asset from the one or more data assets. In various embodiments, the second data asset may include one of the one or more inventory attributes associated with the first data asset (e.g., the second data asset may include a collection asset associated with the first data asset, a destination asset or transfer asset associated with the first data asset, etc.). In various embodiments, as may be understood in light of the exemplary data models described below, a second data asset may be a primary data asset for a second processing activity, while the first data asset is the primary data asset for a first processing activity. In such embodiments, the second data asset may be a destination asset for the first data asset as part of the first processing activity. The second data asset may then be associated with one or more second destination assets to which the second data asset transfers data. In this way, particular data assets that make up the data model may define one or more connections that the data model is configured to map and store in memory.

Returning to Step 360, the system is configured to identify one or more attributes associated with the second data asset, modify the data model to include the one or more attributes, and map the one or more attributes of the second data asset within the data model. The system may, for example, generate a second data inventory for the second data asset that comprises any suitable attribute described with respect to the first data asset above. The system may then modify the data model to include the one or more attributes and store the modified data model in memory. The system may further, in various embodiments, associate the first and second data assets in memory as part of the data model. In such embodiments, the system may be configured to electronically link the first data asset with the second data asset. In various embodiments, such association may indicate a relationship between the first and second data assets in the context of the overall data model (e.g., because the first data asset may serve as a collection asset for the second data asset, etc.).

Next, at Step 370, the system may be further configured to generate a visual representation of the data model. In particular embodiments, the visual representation of the data model comprises a data map. The visual representation may, for example, include the one or more data assets, one or more connections between the one or more data assets, the one or more inventory attributes, etc.

In particular embodiments, generating the visual representation (e.g., visual data map) of a particular data model (e.g., data inventory) may include, for example, generating a visual representation that includes: (1) a visual indication of a first data asset (e.g., a storage asset), a second data asset (e.g., a collection asset), and a third data asset (e.g., a transfer asset); (2) a visual indication of a flow of data (e.g., personal data) from the second data asset to the first data asset (e.g., from the collection asset to the storage asset); (3) a visual indication of a flow of data (e.g., personal data) from the first data asset to the third data asset (e.g., from the storage asset to the transfer asset); (4) one or more visual indications of a risk level associated with the transfer of personal data; and/or (5) any other suitable information related to the one or more data assets, the transfer of data between/among the one or more data assets, access to data stored or collected by the one or more data assets, etc.

In particular embodiments, the visual indication of a particular asset may comprise a box, symbol, shape, or other suitable visual indicator. In particular embodiments, the visual indication may comprise one or more labels (e.g., a name of each particular data asset, a type of the asset, etc.). In still other embodiments, the visual indication of a flow of data may comprise one or more arrows. In particular embodiments, the visual representation of the data model may comprise a data flow, flowchart, or other suitable visual representation.

In various embodiments, the system is configured to display (e.g., to a user) the generated visual representation of the data model on a suitable display device.

Exemplary Data Models and Visual Representations of Data Models (e.g., Data Maps)

FIGS. 4-10 depict exemplary data models according to various embodiments of the system described herein. FIG. 4, for example, depicts an exemplary data model that does not include a particular processing activity (e.g., that is not associated with a particular processing activity). As may be understood from the data model shown in this figure, a particular data asset (e.g., a primary data asset) may be associated with a particular company (e.g., organization), or organization within a particular company, sub-organization of a particular organization, etc. In still other embodiments, the particular asset may be associated with one or more collection assets (e.g., one or more data subjects from whom personal data is collected for storage by the particular asset), one or more parties that have access to data stored by the particular asset, one or more transfer assets (e.g., one or more assets to which data stored by the particular asset may be transferred), etc.

As may be understood from FIG. 4, a particular data model for a particular asset may include a plurality of data elements. When generating the data model for the particular asset, a system may be configured to substantially automatically identify one or more types of data elements for inclusion in the data model, and automatically generate a data model that includes those identified data elements (e.g., even if one or more of those data elements must remain unpopulated because the system may not initially have access to a value for the particular data element). In such cases, the system may be configured to store a placeholder for a particular data element until the system is able to populate the particular data element with accurate data.

As may be further understood from FIG. 4, the data model shown in FIG. 4 may represent a portion of an overall data model. For example, in the embodiment shown in this figure, the transfer asset depicted may serve as a storage asset for another portion of the data model. In such embodiments, the transfer asset may be associated with a respective one or more of the types of data elements described above. In this way, the system may generate a data model that may build upon itself to comprise a plurality of layers as the system adds one or more new data assets, attributes, etc.

As may be further understood from FIG. 4, a particular data model may indicate one or more parties that have access to and/or use of the primary asset (e.g., storage asset). In such embodiments, the system may be configured to enable the one or more parties to access one or more pieces of data (e.g., personal data) stored by the storage asset.

As shown in FIG. 4, the data model may further comprise one or more collection assets (e.g., one or more data assets or individuals from which the storage asset receives data such as personal data). In the exemplary data model (e.g., visual data map) shown in this figure, the collection assets comprise a data subject (e.g., an individual that may provide data to the system for storage in the storage asset) and a collection asset (e.g., which may transfer one or more pieces of data that the collection asset has collected to the storage asset).

FIG. 5 depicts a portion of an exemplary data model that is populated for the primary data asset GUSTO. GUSTO is a software application that, in the example shown in FIG. 5, may serve as a human resources service that contains financial, expense, review, time and attendance, background, and salary information for one or more employees of a particular organization (e.g., GeneriTech). In the example of FIG. 5, the primary asset (e.g., GUSTO) may be utilized by the HR (e.g., Human Resources) department of the particular organization (e.g., GeneriTech). Furthermore, the primary asset, GUSTO, may collect financial information from one or more data subjects (e.g., employees of the particular organization), receive expense information transferred from Expensify (e.g., expensing software), and receive time and attendance data transferred from Kronos (e.g., timekeeping software). In the example shown in FIG. 5, access to the information collected and/or stored by GUSTO may include, for example: (1) an ability to view and administer salary and background information by HR employees, and (2) an ability to view and administer employee review information by one or more service managers. In the example shown in this figure, personal and other data collected and stored by GUSTO (e.g., salary information, etc.) may be transferred to a company banking system, to QUICKBOOKS, and/or to an HR file cabinet.

As may be understood from the example shown in FIG. 5, the system may be configured to generate a data model based around GUSTO that illustrates a flow of personal data utilized by GUSTO. The data model in this example illustrates, for example, a source of personal data collected, stored and/or processed by GUSTO, a destination of such data, an indication of who has access to such data within GUSTO, and an organization and department responsible for the information collected by GUSTO. In particular embodiments, the data model and accompanying visual representation (e.g., data map) generated by the system as described in any embodiment herein may be utilized in the context of compliance with one or more record keeping requirements related to the collection, storage, and processing of personal data.

FIGS. 6 and 7 depict an exemplary data model and related example that is similar, in some respects, to the data model and example of FIGS. 4 and 5. In the example shown in FIGS. 6 and 7, the exemplary data model and related example include a specific business process and processing activity that is associated with the primary asset (GUSTO). In this example, the business process is compensation and the specific processing activity is direct deposit generation in GUSTO. As may be understood from this figure, the collection and transfer of data related to the storage asset of GUSTO is based on a need to generate direct deposits through GUSTO in order to compensate employees. GUSTO generates the information needed to conduct a direct deposit (e.g., financial and salary information) and then transmits this information to: (1) a company bank system for execution of the direct deposit; (2) QUICK-BOOKS for use in documenting the direct deposit payment; and (3) HR File cabinet for use in documenting the salary info and other financial information.

As may be understood in light of this disclosure, when generating such a data model, particular pieces of data (e.g., data attributes, data elements) may not be readily available to the system. In such embodiment, the system is configured to identify a particular type of data, create a placeholder for such data in memory, and seek out (e.g., scan for and populate) an appropriate piece of data to further populate the data model. For example, in particular embodiments, the system may identify GUSTO as a primary asset and recognize that GUSTO stores expense information. The system may then be configured to identify a source of the expense information (e.g., Expensify).

Figure 8:
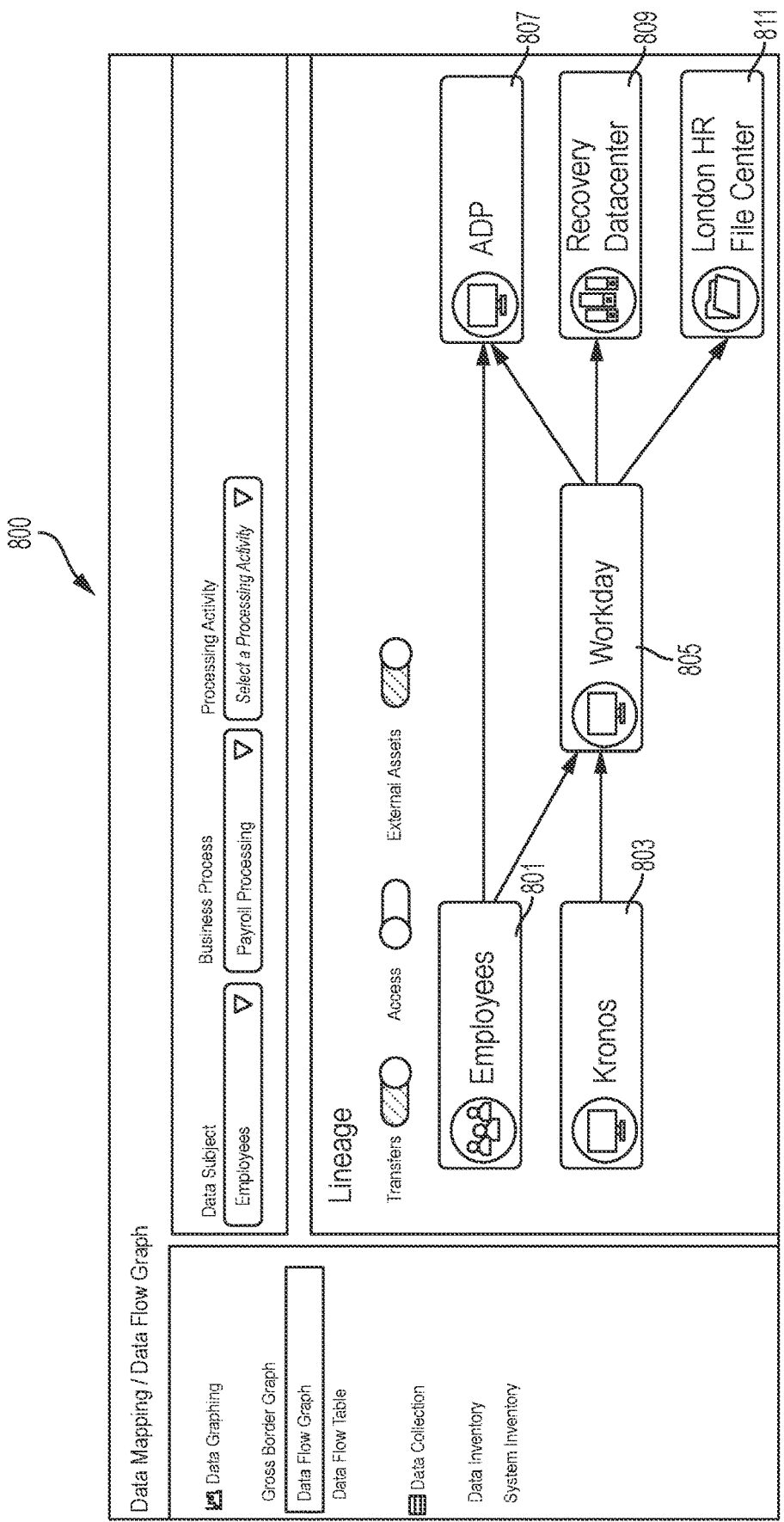

FIG. 8 depicts an exemplary screen display 800 that illustrates a visual representation (e.g., visual data map) of a data model (e.g., a data inventory). In the example shown in FIG. 8, the data map provides a visual indication of a flow of data collected from particular data subjects (e.g., employees 801). As may be understood from this figure, the data map illustrates that three separate data assets receive data (e.g., which may include personal data) directly from the employees 801. In this example, these three data assets include Kronos 803 (e.g., a human resources software application), Workday 805 (e.g., a human resources software application), and ADP 807 (e.g., a human resources software application and payment processor). As shown in FIG. 8, the transfer of data from the employees 801 to these assets is indicated by respective arrows.

As further illustrated in FIG. 8, the data map indicates a transfer of data from Workday 805 to ADP 807 as well as to a Recovery Datacenter 809 and a London HR File Center 811. As may be understood in light of this disclosure, the Recovery Datacenter 809 and London HR File Center 811 may comprise additional data assets in the context of the data model illustrated by the data map shown in FIG. 8. The Recover Datacenter 809 may include, for example, one or more computer servers (e.g., backup servers). The London HR File Center 811 may include, for example, one or more databases (e.g., such as the One or More Databases 140 shown in FIG. 1). AS shown in FIG. 8, each particular data asset depicted in the data map may be shown along with a visual indication of the type of data asset. For example, Kronos 803, Workday 805, and ADP 807 are depicted adjacent a first icon type (e.g., a computer monitor), while Recover Datacenter 809 and London HR File Center 811 are depicted adjacent a second and third icon type respectively (e.g., a server cluster and a file folder). In this way, the system may be configured to visually indicate, via the data model, particular information related to the data model in a relatively minimal manner.

Figure 9:
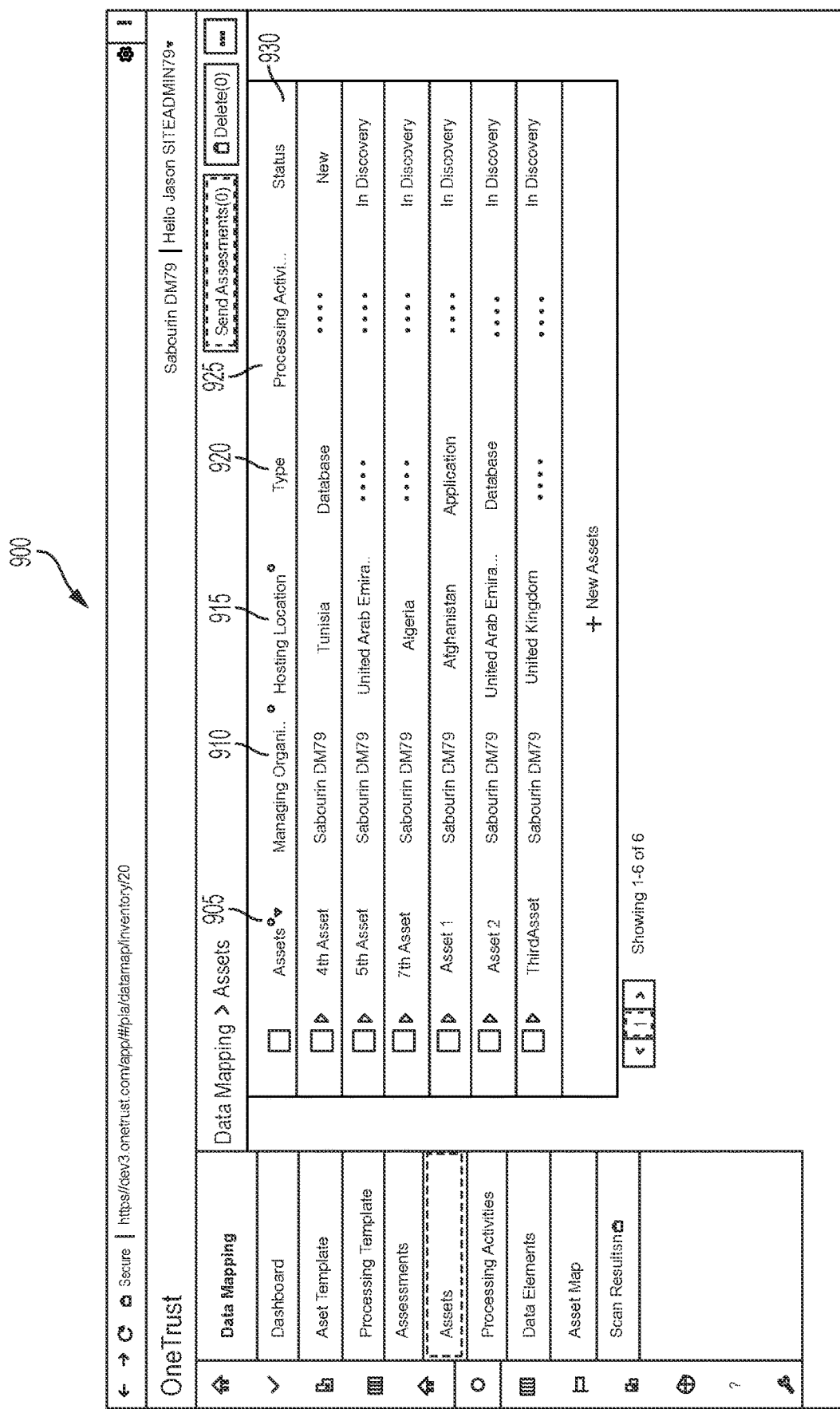

FIG. 9 depicts an exemplary screen display 900 that illustrates a data map of a plurality of assets 905 in tabular form (e.g., table form). As may be understood from this figure, a table that includes one or more inventory attributes of each particular asset 905 in the table may indicate, for example: (1) a managing organization 910 of each respective asset 905; (2) a hosting location 915 of each respective asset 905 (e.g., a physical storage location of each asset 905); (3) a type 920 of each respective asset 905, if known (e.g., a database, software application, server, etc.); (4) a processing activity 925 associated with each respective asset 905; and/or (5) a status 930 of each particular data asset 905. In various embodiments, the status 930 of each particular asset 905 may indicate a status of the asset 905 in the discovery process. This may include, for example: (1) a "new" status for a particular asset that has recently been discovered as an asset that processes, stores, or collects personal data on behalf of an organization (e.g., discovered via one or more suitable techniques described herein); (2) an "in discovery" status for a particular asset for which the system is populating or seeking to populate one or more inventory attributes, etc.

Figure 10:
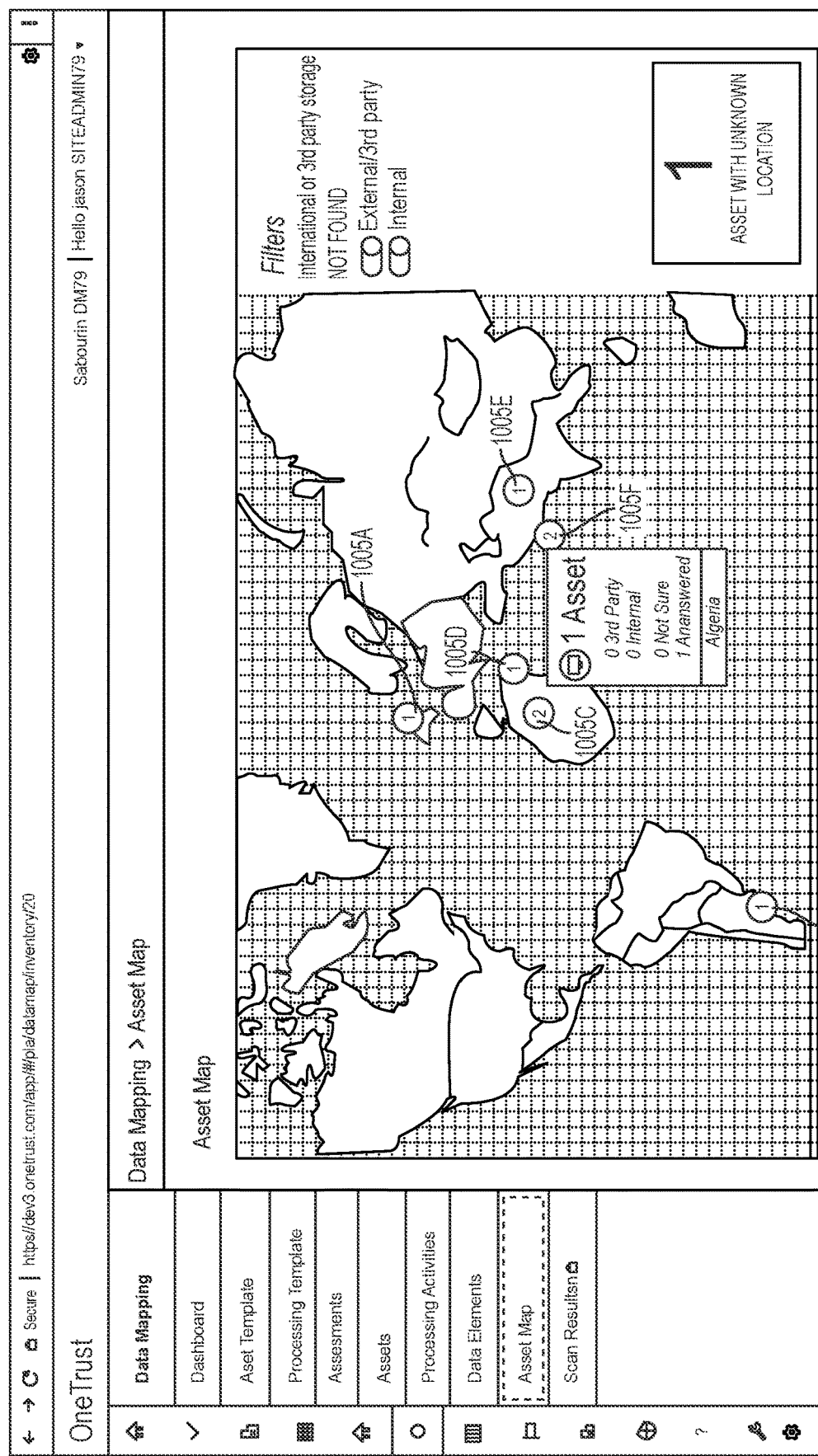

FIG. 10 depicts an exemplary data map 1000 that includes an asset map of a plurality of data assets 1005A-F, which may, for example, be utilized by a particular entity in the collection, storage, and/or processing of personal data. As may be understood in light of this disclosure, the plurality of data assets 1005A-F may have been discovered using any suitable technique described herein (e.g., one or more intelligent identity scanning techniques, one or more questionnaires, one or more application programming interfaces, etc.). In various embodiments, a data inventory for each of the plurality of data assets 1005A-F may define, for each of the plurality of data assets 1005A-F a respective inventory attribute related to a storage location of the data asset.

As may be understood from this figure, the system may be configured to generate a map that indicates a location of the plurality of data assets 1005A-F for a particular entity. In the embodiment shown in this figure, locations that contain a data asset are indicated by circular indicia that contain the number of assets present at that location. In the embodiment shown in this figure, the locations are broken down by country. In particular embodiments, the asset map may distinguish between internal assets (e.g., first party servers, etc.) and external/third party assets (e.g., third party owned servers or software applications that the entity utilizes for data storage, transfer, etc.).

In some embodiments, the system is configured to indicate, via the visual representation, whether one or more assets have an unknown location (e.g., because the data model described above may be incomplete with regard to the location). In such embodiments, the system may be configured to: (1) identify the asset with the unknown location; (2) use one or more data modeling techniques described herein to determine the location (e.g., such as pinging the asset, generating one or more questionnaires for completion by a suitable individual, etc.); and (3) update a data model associated with the asset to include the location.

Data Model Population Module

In particular embodiments, a Data Model Population Module 1100 is configured to: (1) determine one or more unpopulated inventory attributes in a data model; (2) determine one or more attribute values for the one or more unpopulated inventory attributes; and (3) modify the data model to include the one or more attribute values.

Figure 11:
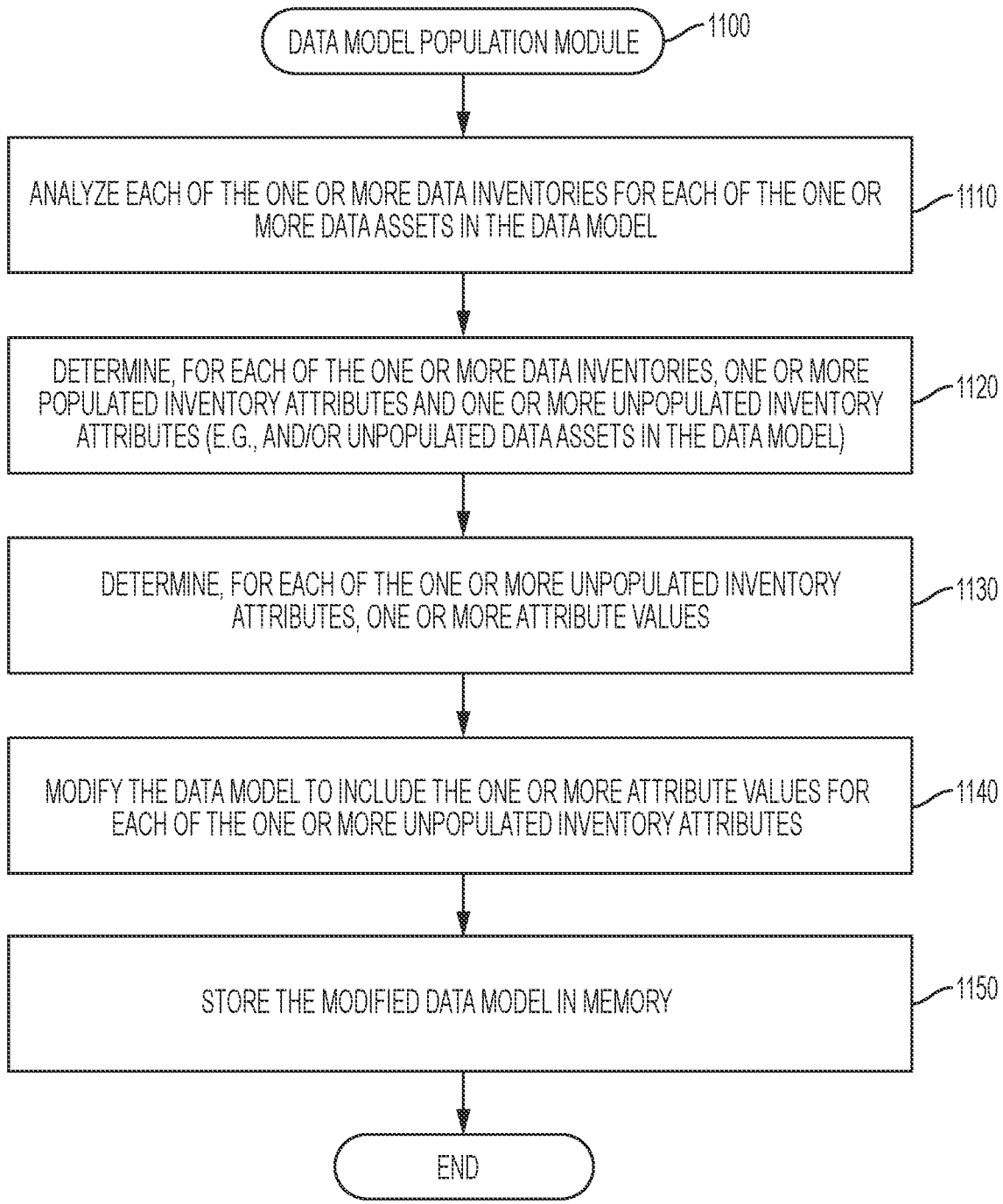
FIG. 11 is a flowchart showing an example of steps performed by a Data Model Population Module.

Turning to FIG. 11, in particular embodiments, when executing the Data Model Population Module 1100, the system begins, at Step 1110, by analyzing one or more data inventories for each of the one or more data assets in the data model. The system may, for example, identify one or more particular data elements (e.g., inventory attributes) that make up the one or more data inventories. The system may, in various embodiments, scan one or more data structures associated with the data model to identify the one or more data inventories. In various embodiments, the system is configured to build an inventory of existing (e.g., known) data assets and identify inventory attributes for each of the known data assets.

Continuing to Step 1120, the system is configured to determine, for each of the one or more data inventories, one or more populated inventory attributes and one or more unpopulated inventory attributes (e.g., and/or one or more unpopulated data assets within the data model). As a particular example related to an unpopulated data asset, when generating and populating a data model, the system may determine that, for a particular asset, there is a destination asset. In various embodiments, the destination asset may be known (e.g., and already stored by the system as part of the data model). In other embodiments, the destination asset may be unknown (e.g., a data element that comprises the destination asset may comprise a placeholder or other indication in memory for the system to populate the unpopulated inventory attribute (e.g., data element).

As another particular example, a particular storage asset may be associated with a plurality of inventory assets (e.g., stored in a data inventory associated with the storage asset). In this example, the plurality of inventory assets may include an unpopulated inventory attribute related to a type of personal data stored in the storage asset. The system may, for example, determine that the type of personal data is an unpopulated inventory asset for the particular storage asset.

Returning to Step 1130, the system is configured to determine, for each of the one or more unpopulated inventory attributes, one or more attribute values. In particular embodiments, the system may determine the one or more attribute values using any suitable technique (e.g., any suitable technique for populating the data model). In particular embodiments, the one or more techniques for populating the data model may include, for example: (1) obtaining data for the data model by using one or more questionnaires associated with a particular privacy campaign, processing activity, etc.; (2) using one or more intelligent identity scanning techniques discussed herein to identify personal data stored by the system and then map such data to a suitable data model; (3) using one or more application programming interfaces (API) to obtain data for the data model from another software application; and/or (4) using any other suitable technique. Exemplary techniques for determining the one or more attribute values are described more fully below. In other embodiments, the system may be configured to use such techniques or other suitable techniques to populate one or more unpopulated data assets within the data model.

Next, at Step 1140, the system modifies the data model to include the one or more attribute values for each of the one or more unpopulated inventory attributes. The system may, for example, store the one or more attributes values in computer memory, associate the one or more attribute values with the one or more unpopulated inventory attributes, etc. In still other embodiments, the system may modify the data model to include the one or more data assets identified as filling one or more vacancies left within the data model by the unpopulated one or more data assets.

Continuing to Step 1150, the system is configured to store the modified data model in memory. In various embodiments, the system is configured to store the modified data model in the One or More Databases 140, or in any other suitable location. In particular embodiments, the system is configured to store the data model for later use by the system in the processing of one or more data subject access requests. In other embodiments, the system is configured to store the data model for use in one or more privacy impact assessments performed by the system.

Data Model Population Questionnaire Generation Module

In particular embodiments, a Data Population Questionnaire Generation Module 1200 is configured to generate a questionnaire (e.g., one or more questionnaires) comprising one or more questions associated with one or more particular unpopulated data attributes, and populate the unpopulated data attributes based at least in part on one or more responses to the questionnaire. In other embodiments, the system may be configured to populate the unpopulated data attributes based on one or more responses to existing questionnaires.

In various embodiments, the one or more questionnaires may comprise one or more processing activity questionnaires (e.g., privacy impact assessments, data privacy impact assessments, etc.) configured to elicit one or more pieces of data related to one or more undertakings by an organization related to the collection, storage, and/or processing of personal data (e.g., processing activities). In particular embodiments, the system is configured to generate the questionnaire (e.g., a questionnaire template) based at least in part on one or more processing activity attributes, data asset attributes (e.g., inventory attributes), or other suitable attributes discussed herein.

Figure 12:
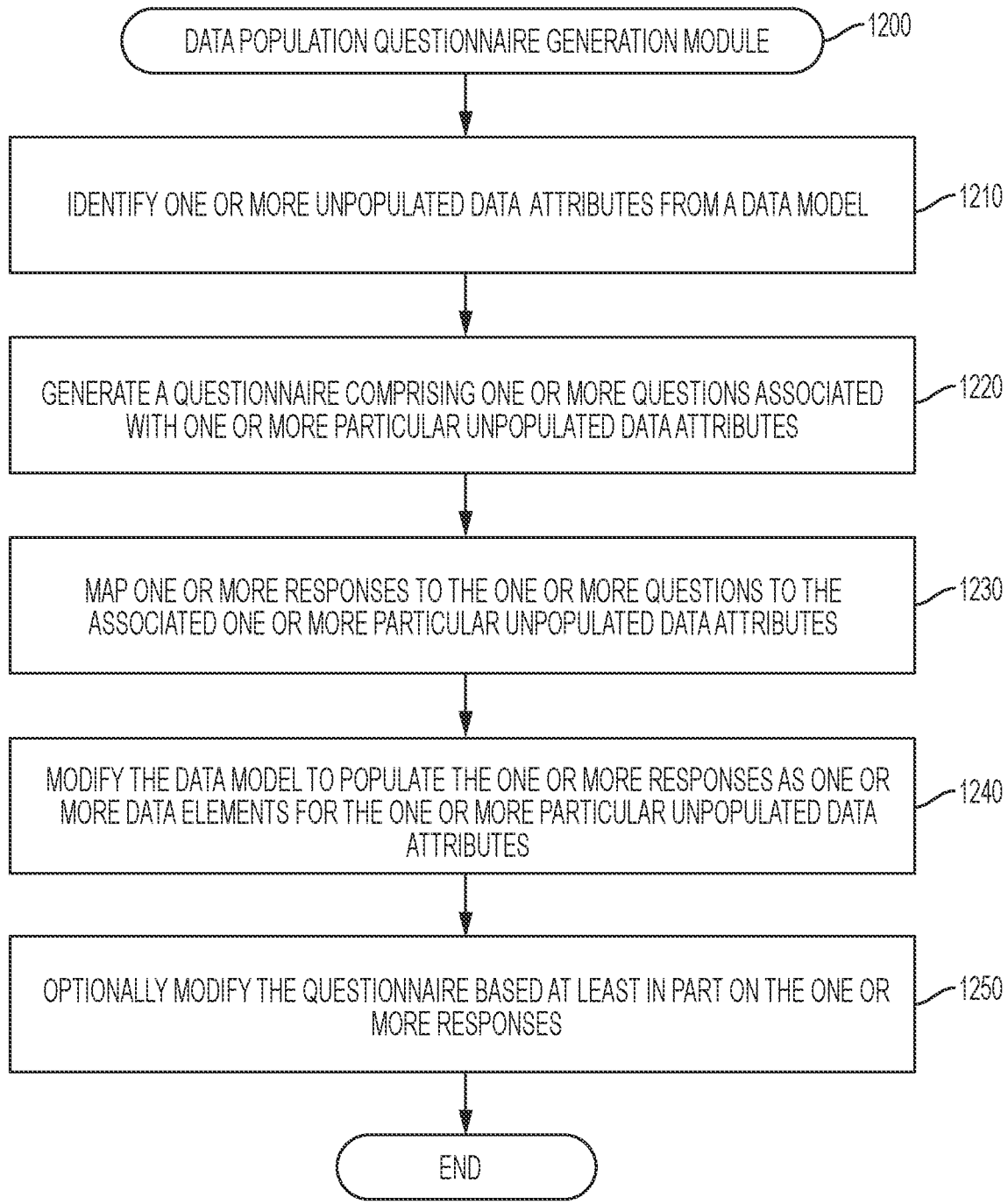
FIG. 12 is a flowchart showing an example of steps performed by a Data Population Questionnaire Generation Module.

Turning to FIG. 12, in particular embodiments, when executing the Data Population Questionnaire Generation Module 1200, the system begins, at Step 1210, by identifying one or more unpopulated data attributes from a data model. The system may, for example, identify the one or more unpopulated data attributes using any suitable technique described above. In particular embodiments, the one or more unpopulated data attributes may relate to, for example, one or more processing activity or asset attributes such as: (1) one or more processing activities associated with a particular data asset; (2) transfer data associated with the particular data asset (e.g., how and where the data stored and/or collected by the particular data asset is being transferred to and/or from); (3) personal data associated with the particular data assets asset (e.g., what type of personal data is collected and/or stored by the particular data asset; how, and from where, the data is collected, etc.); (4) storage data associated with the personal data (e.g., whether the data is being stored, protected and deleted); and (5) any other suitable attribute related to the collection, use, and transfer of personal data by one or more data assets or via one or more processing activities. In other embodiments, the one or more unpopulated inventory attributes may comprise one or more other pieces of information such as, for example: (1) the type of data being stored by the particular data asset; (2) an amount of data stored by the particular data asset; (3) whether the data is encrypted by the particular data asset; (4) a location of the stored data (e.g., a physical location of one or more computer servers on which the data is stored by the particular data asset); etc.

Continuing to Step 1220, the system generates a questionnaire (e.g., a questionnaire template) comprising one or more questions associated with one or more particular unpopulated data attributes. As may be understood in light of the above, the one or more particulate unpopulated data attributes may relate to, for example, a particular processing activity or a particular data asset (e.g., a particular data asset utilized as part of a particular processing activity). In various embodiments, the one or more questionnaires comprise one or more questions associated with the unpopulated data attribute. For example, if the data model includes an unpopulated data attribute related to a location of a server on which a particular asset stores personal data, the system may generate a questionnaire associated with a processing activity that utilizes the asset (e.g., or a questionnaire associated with the asset). The system may generate the questionnaire to include one or more questions regarding the location of the server.

Returning to Step 1230, the system maps one or more responses to the one or more questions to the associated one or more particular unpopulated data attributes. The system may, for example, when generating the questionnaire, associate a particular question with a particular unpopulated data attribute in computer memory. In various embodiments, the questionnaire may comprise a plurality of question/answer pairings, where the answer in the question/answer pairings maps to a particular inventory attribute for a particular data asset or processing activity.

In this way, the system may, upon receiving a response to the particular question, substantially automatically populate the particular unpopulated data attribute. Accordingly, at Step 1240, the system modifies the data model to populate the one or more responses as one or more data elements for the one or more particular unpopulated data attributes. In particular embodiments, the system is configured to modify the data model such that the one or more responses are stored in association with the particular data element (e.g., unpopulated data attribute) to which the system mapped it at Step 1230. In various embodiments, the system is configured to store the modified data model in the One or More Databases 140, or in any other suitable location. In particular embodiments, the system is configured to store the data model for later use by the system in the processing of one or more data subject access requests. In other embodiments, the system is configured to store the data model for use in one or more privacy impact assessments performed by the system.

Continuing to optional Step 1250, the system may be configured to modify the questionnaire based at least in part on the one or more responses. The system may, for example, substantially dynamically add and/or remove one or more questions to/from the questionnaire based at least in part on the one or more responses (e.g., one or more response received by a user completing the questionnaire). For example, the system may, in response to the user providing a particular inventory attribute or new asset, generates additional questions that relate to that particular inventory attribute or asset. The system may, as the system adds additional questions, substantially automatically map one or more responses to one or more other inventory attributes or assets. For example, in response to the user indicating that personal data for a particular asset is stored in a particular location, the system may substantially automatically generate one or more additional questions related to, for example, an encryption level of the storage, who has access to the storage location, etc.

In still other embodiments, the system may modify the data model to include one or more additional assets, data attributes, inventory attributes, etc. in response to one or more questionnaire responses. For example, the system may modify a data inventory for a particular asset to include a storage encryption data element (which specifies whether the particular asset stores particular data in an encrypted format) in response to receiving such data from a questionnaire. Modification of a questionnaire is discussed more fully below with respect to FIG. 13.

Data Model Population Via Questionnaire Process Flow

Figure 13:
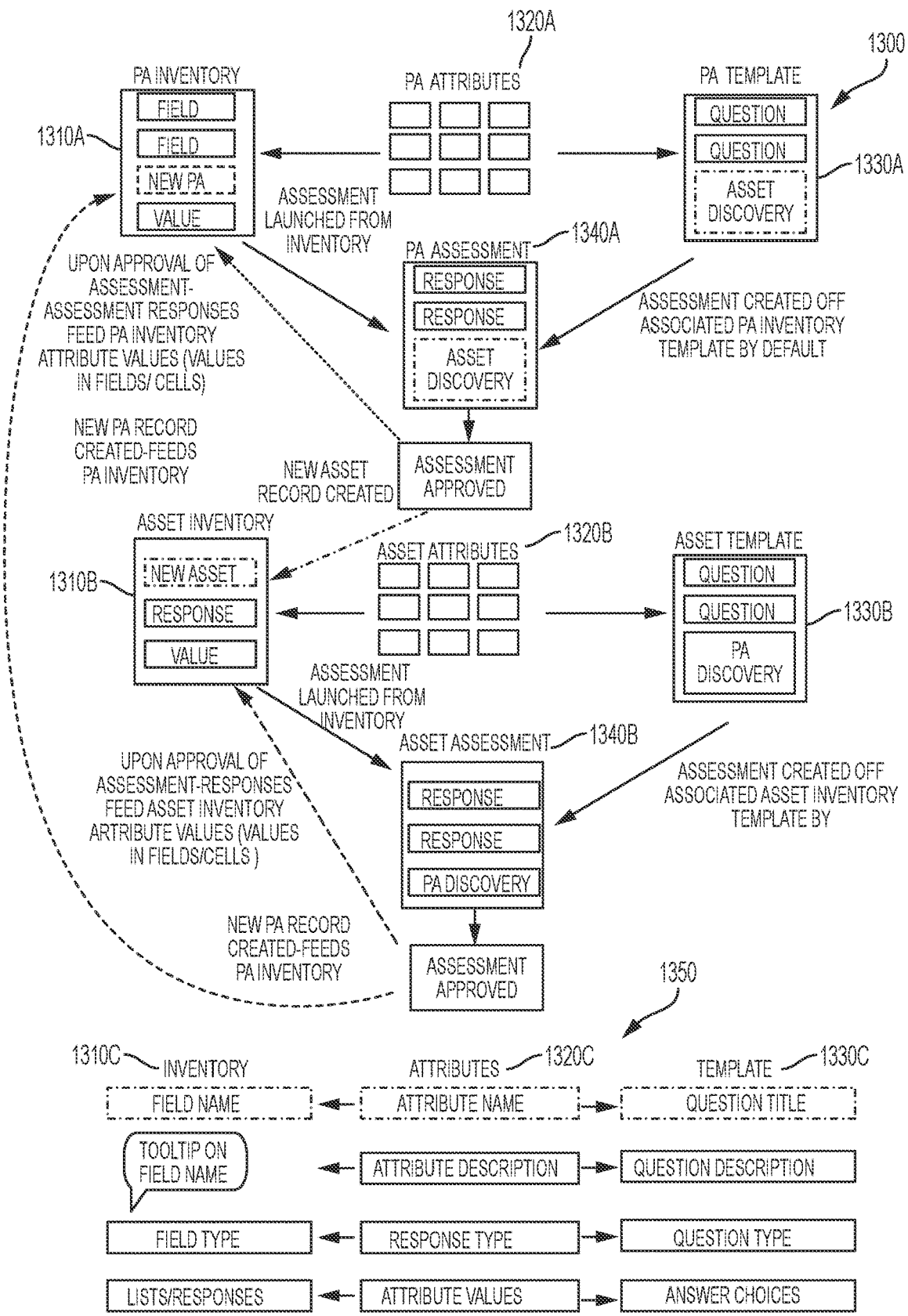
FIG. 13 is a process flow for populating a data inventory according to a particular embodiment using one or more data mapping techniques.

FIG. 13 depicts an exemplary process flow 1300 for populating a data model (e.g., modifying a data model to include a newly discovered data asset, populating one or more inventory attributes for a particular processing activity or data asset, etc.). In particular, FIG. 13 depicts one or more exemplary data relationships between one or more particular data attributes (e.g., processing activity attributes and/or asset attributes), a questionnaire template (e.g., a processing activity template and/or a data asset template), a completed questionnaire (e.g., a processing activity assessment and/or a data asset assessment), and a data inventory (e.g., a processing activity inventory and/or an asset inventory). As may be understood from this figure the system is configured to: (1) identify new data assets; (2) generate an asset inventory for identified new data assets; and (3) populate the generated asset inventories. Systems and methods for populating the generated inventories are described more fully below.

As may be understood from FIG. 13, a system may be configured to map particular processing activity attributes 1320A to each of: (1) a processing activity template 1330A; and (2) a processing activity data inventory 1310A. As may be understood in light of this disclosure, the processing activity template 1330A may comprise a plurality of questions (e.g., as part of a questionnaire), which may, for example, be configured to elicit discovery of one or more new data assets. The plurality of questions may each correspond to one or more fields in the processing activity inventory 1310A, which may, for example, define one or more inventory attributes of the processing activity.

In particular embodiments, the system is configured to provide a processing activity assessment 1340A to one or more individuals for completion. As may be understood from FIG. 13, the system is configured to launch the processing activity assessment 1340A from the processing activity inventory 1310A and further configured to create the processing activity assessment 1340A from the processing activity template 1330. The processing activity assessment 1340A may comprise, for example, one or more questions related to the processing activity. The system may, in various embodiments, be configured to map one or more responses provided in the processing activity assessment 1340A to one or more corresponding fields in the processing activity inventory 1310A. The system may then be configured to modify the processing activity inventory 1310A to include the one or more responses, and store the modified inventory in computer memory. In various embodiments, the system may be configured to approve a processing activity assessment 1340A (e.g., receive approval of the assessment) prior to feeding the processing activity inventory attribute values into one or more fields and/or cells of the inventory.

As may be further understood from FIG. 13, in response to creating a new asset record (e.g., which the system may create, for example, in response to a new asset discovery via the processing activity assessment 1340A described immediately above, or in any other suitable manner), the system may generate an asset inventory 1310B (e.g., a data asset inventory) that defines a plurality of inventory attributes for the new asset (e.g., new data asset).

As may be understood from FIG. 13, a system may be configured to map particular asset attributes 1320B to each of: (1) an asset template 1330BA; and (2) an asset inventory 1310A. As may be understood in light of this disclosure, the asset template 1330B may comprise a plurality of questions (e.g., as part of a questionnaire), which may, for example, be configured to elicit discovery of one or more processing activities associated with the asset and/or one or more inventory attributes of the asset. The plurality of questions may each correspond to one or more fields in the asset inventory 1310B, which may, for example, define one or more inventory attributes of the asset.

In particular embodiments, the system is configured to provide an asset assessment 1340B to one or more individuals for completion. As may be understood from FIG. 13, the system is configured to launch the asset assessment 1340B from the asset inventory 1310B and further configured to create the asset assessment 1340B from the asset template 1330B. The asset assessment 1340B may comprise, for example, one or more questions related to the data asset. The system may, in various embodiments, be configured to map one or more responses provided in the asset assessment 1340B to one or more corresponding fields in the asset inventory 1310B. The system may then be configured to modify the asset inventory 1310B (e.g., and/or a related processing activity inventory 1310A) to include the one or more responses, and store the modified inventory in computer memory. In various embodiments, the system may be configured to approve an asset assessment 1340B (e.g., receive approval of the assessment) prior to feeding the asset inventory attribute values into one or more fields and/or cells of the inventory.

FIG. 13 further includes a detail view 1350 of a relationship between particular data attributes 1320C with an exemplary data inventory 1310C and a questionnaire template 1330C. As may be understood from this detail view 1350, a particular attribute name may map to a particular question title in a template 1330C as well as to a field name in an exemplary data inventory 1310C. In this way, the system may be configured to populate (e.g., automatically populate) a field name for a particular inventory 1310C in response to a user providing a question title as part of a questionnaire template 1330C. Similarly, a particular attribute description may map to a particular question description in a template 1330C as well as to a tooltip on a fieldname in an exemplary data inventory 1310C. In this way, the system may be configured to provide the tooltip for a particular inventory 1310C that includes the question description provided by a user as part of a questionnaire template 1330C.

As may be further understood from the detail view 1350 of FIG. 13, a particular response type may map to a particular question type in a template 1330C as well as to a field type in an exemplary data inventory 1310C. A particular question type may include, for example, a multiple choice question (e.g., A, B, C, etc.), a freeform response, an integer value, a drop down selection, etc. A particular field type may include, for example, a memo field type, a numeric field type, an integer field type, a logical field type, or any other suitable field type. A particular data attribute may require a response type of, for example: (1) a name of an organization responsible for a data asset (e.g., a free form response); (2) a number of days that data is stored by the data asset (e.g., an integer value); and/or (3) any other suitable response type.

In still other embodiments, the system may be configured to map a one or more attribute values to one or more answer choices in a template 1330C as well as to one or more lists and/or responses in a data inventory 1310C. The system may then be configured to populate a field in the data inventory 1310C with the one or more answer choices provided in a response to a question template 1330C with one or more attribute values.

Exemplary Questionnaire Generation and Completion User Experience

Figure 14:
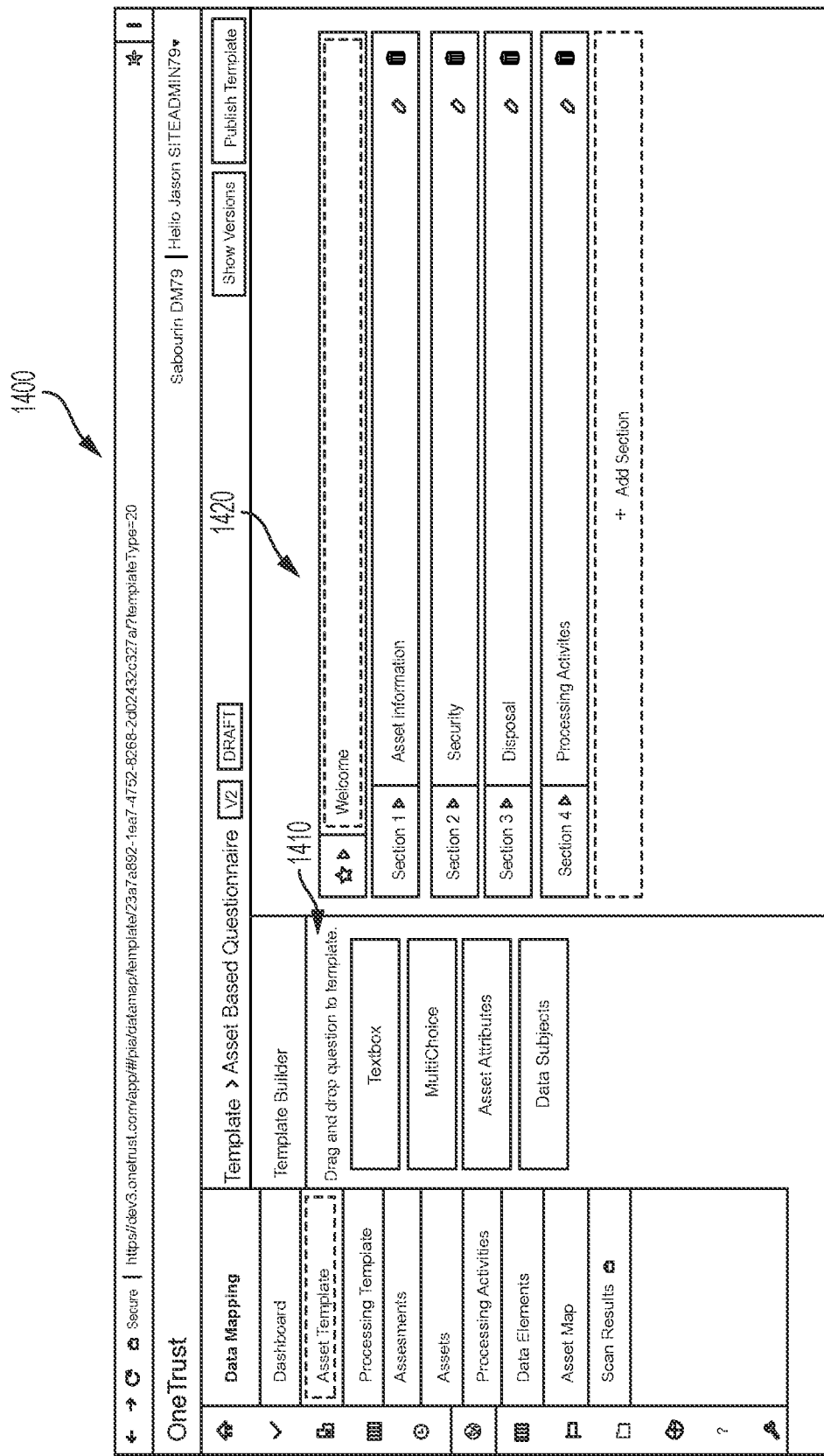

FIGS. 14-25 depict exemplary screen displays that a user may encounter when generating a questionnaire (e.g., one or more questionnaires and/or templates) for populating one or more data elements (e.g., inventory attributes) of a data model for a data asset and/or processing activity. FIG. 14, for example, depicts an exemplary asset based questionnaire template builder 1400. As may be understood from FIG. 14, the template builder may enable a user to generate an asset based questionnaire template that includes one or more sections 1420 related to the asset (e.g., asset information, security, disposal, processing activities, etc.). As may be understood in light of this disclosure, the system may be configured to substantially automatically generate an asset based questionnaire template based at least in part on the one or more unpopulated inventory attributes discussed above. The system may, for example, be configured to generate a template that is configured to populate the one or more unpopulated attributes (e.g., by eliciting responses, via a questionnaire to one or more questions that are mapped to the attributes within the data inventory).

In various embodiments, the system is configured to enable a user to modify a default template (e.g., or a system-created template) by, for example, adding additional sections, adding one or more additional questions to a particular section, etc. In various embodiments, the system may provide one or more tools for modifying the template. For example, in the embodiment shown in FIG. 14, the system may provide a user with a draft and drop question template 1410, from which the user may select a question type (e.g., textbox, multiple choice, etc.).

A template for an asset may include, for example: (1) one or more questions requesting general information about the asset; (2) one or more security-related questions about the asset; (3) one or more questions regarding how the data asset disposes of data that it uses; and/or (4) one or more questions regarding processing activities that involve the data asset. In various embodiments, each of these one or more sections may comprise one or more specific questions that may map to particular portions of a data model (e.g., a data map).

Figure 15:
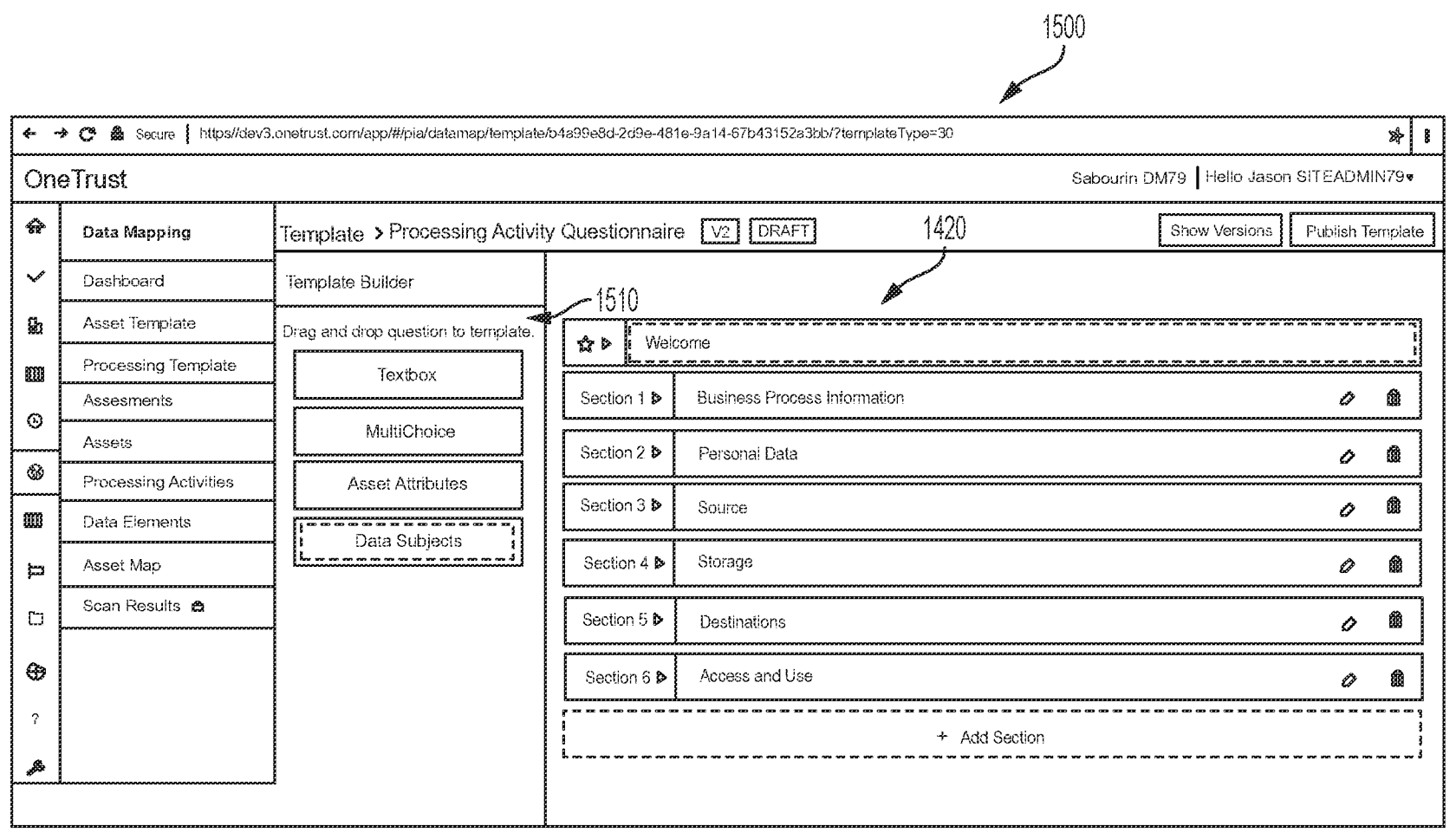

FIG. 15 depicts an exemplary screen display of a processing activity questionnaire template builder 1500. The screen display shown in FIG. 15 is similar to the template builder shown in FIG. 14 with respect to the data asset based template builder. As may be understood from FIG. 15, the template builder may enable a user to generate a processing activity based questionnaire template that includes one or more sections 1520 related to the processing activity (e.g., business process information, personal data, source, storage, destinations, access and use, etc.). As may be understood in light of this disclosure, the system may be configured to substantially automatically generate a processing activity based questionnaire template based at least in part on the one or more unpopulated inventory attributes related to the processing activity (e.g., as discussed above). The system may, for example, be configured to generate a template that is configured to populate the one or more unpopulated attributes (e.g., by eliciting responses, via a questionnaire to one or more questions that are mapped to the attributes within the data inventory).

In various embodiments, the system is configured to enable a user to modify a default template (e.g., or a system-created template) by, for example, adding additional sections, adding one or more additional questions to a particular section, etc. In various embodiments, the system may provide one or more tools for modifying the template. For example, in the embodiment shown in FIG. 15, the system may provide a user with a draft and drop question template 1510, from which the user may select a question type (e.g., textbox, multiple choice, asset attributes, data subjects, etc.). The system may be further configured to enable a user to publish a completed template (e.g., for use in a particular assessment). In other embodiments, the system may be configured to substantially automatically publish the template.

In various embodiments, a template for a processing activity may include, for example: (1) one or more questions related to the type of business process that involves a particular data asset; (2) one or more questions regarding what type of personal data is acquired from data subjects for use by a particular data asset; (3) one or more questions related to a source of the acquired personal data; (4) one or more questions related to how and/or where the personal data will be stored and/or for how long; (5) one or more questions related to one or more other data assets that the personal data will be transferred to; and/or (6) one or more questions related to who will have the ability to access and/or use the personal data.

Figure 16:
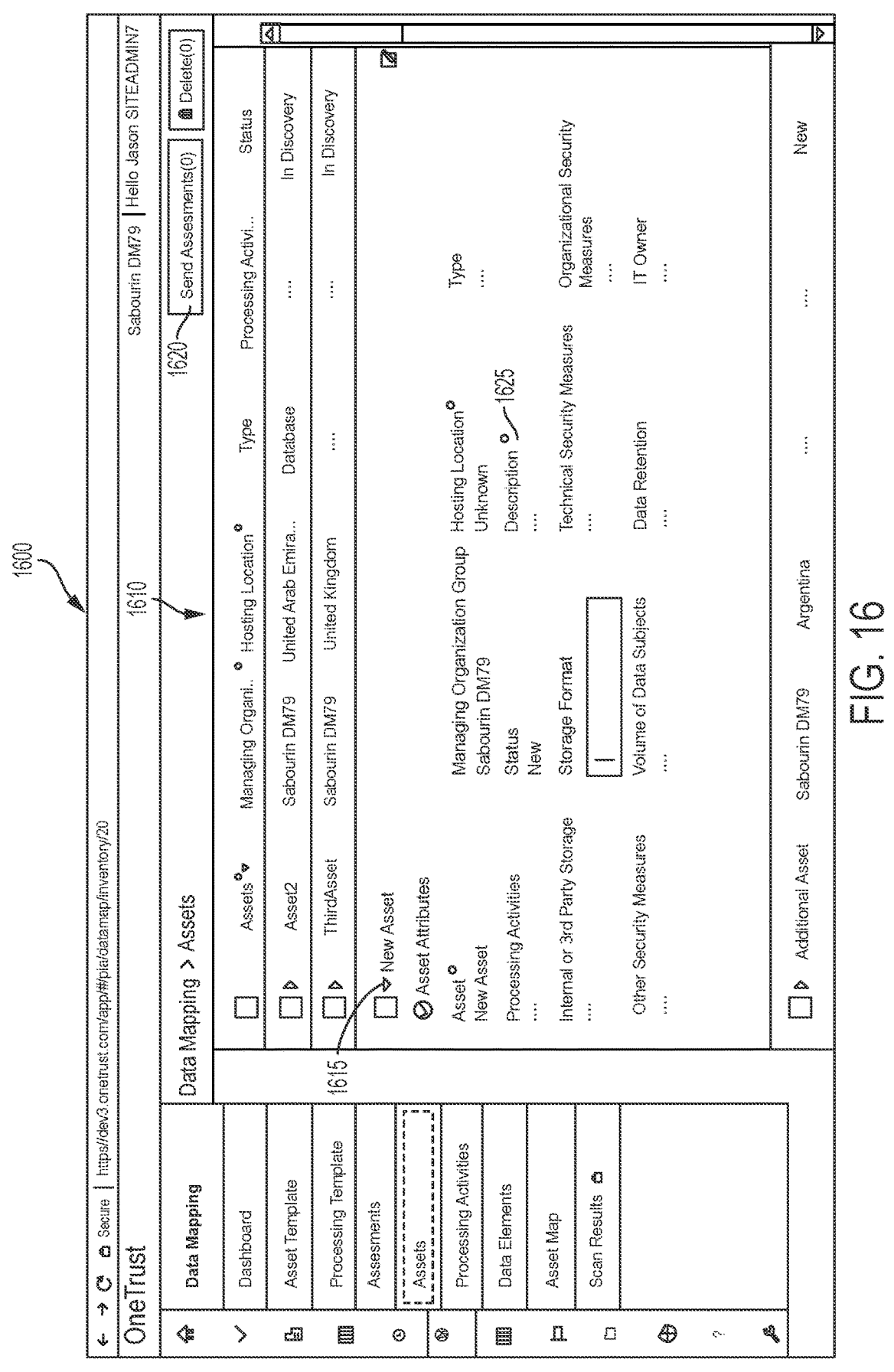

Continuing to FIG. 16, an exemplary screen display 1600 depicts a listing of assets 1610 for a particular entity. These may, for example, have been identified as part of the data model generation system described above. As may be understood from this figure, a user may select a drop down indicator 1615 to view more information about a particular asset. In the exemplary embodiment shown in FIG. 16, the system stores the managing organization group for the "New Asset", but is missing some additional information (e.g., such as a description 1625 of the asset). In order to fill out the missing inventory attributes for the "New Asset", the system, in particular embodiments, is configured to enable a user to select a Send Assessment indicia 1620 in order to transmit an assessment related to the selected asset to an individual tasked with providing one or more pieces of information related to the asset (e.g., a manager, or other individual with knowledge of the one or more inventory attributes).

In response to the user selecting the Send Assessment indicia 1620, the system may create the assessment based at least in part on a template associated with the asset, and transmit the assessment to a suitable individual for completion (e.g., and/or transmit a request to the individual to complete the assessment).

Figure 17:
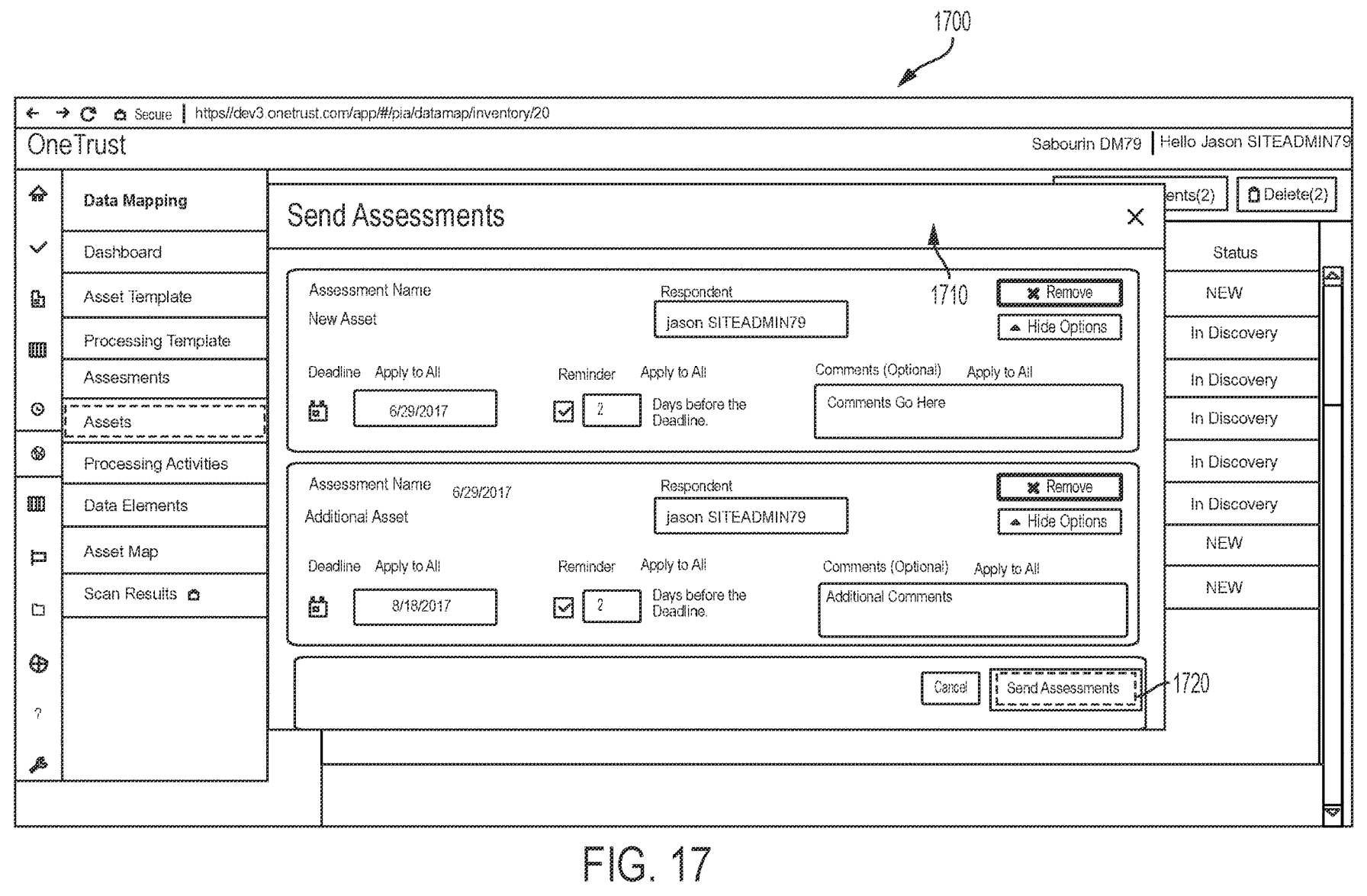

FIG. 17 depicts an exemplary assessment transmission interface 1700 via which a user can transmit one or more assessments for completion. As shown in this figure, the user may assign a respondent, provide a deadline, indicate a reminder time, and provide one or more comments using an assessment request interface 1710. The user may then select a Send Assessment(s) indicia 1720 in order to transmit the assessment.

Figure 18:
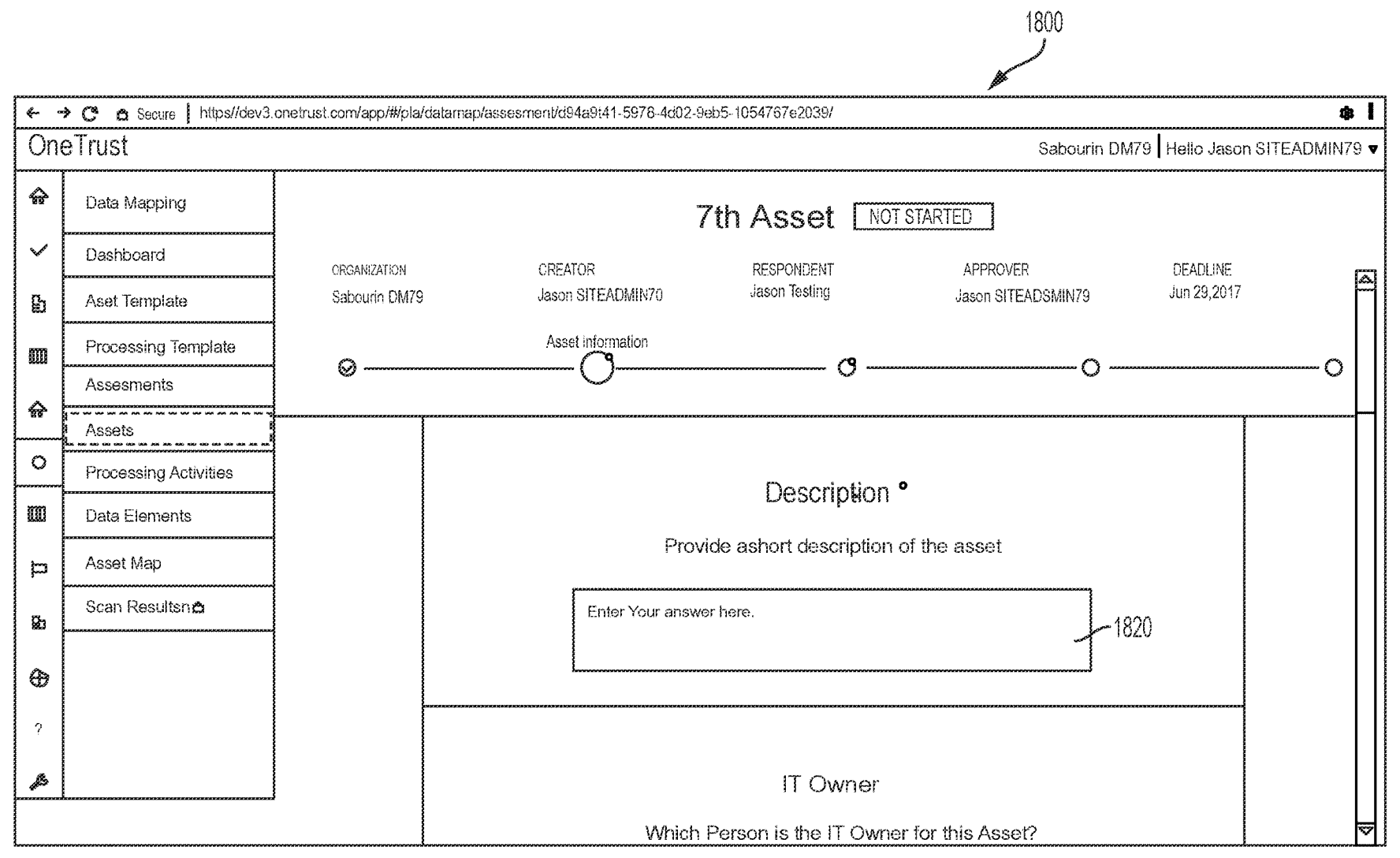
Figure 19:
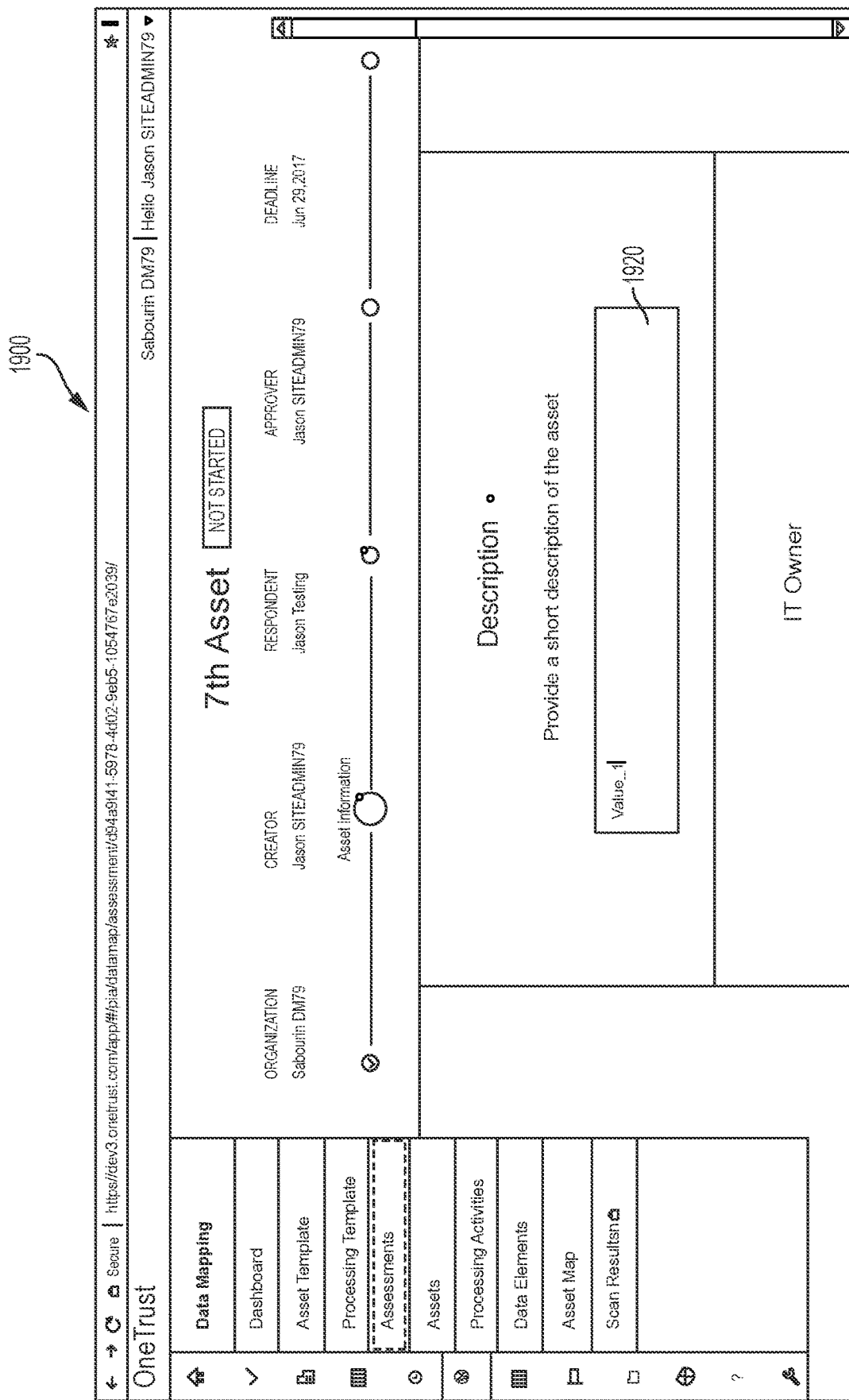

FIG. 18 depicts an exemplary assessment 1800 which a user may encounter in response to receiving a request to complete the assessment as described above with respect to FIGS. 16 and 17. As shown in FIG. 18, the assessment 1800 may include one or more questions that map to the one or more unpopulated attributes for the asset shown in FIG. 16. For example, the one or more questions may include a question related to a description of the asset, which may include a free form text box 1820 for providing a description of the asset. FIG. 19 depicts an exemplary screen display 1900 with the text box 1920 completed, where the description includes a value of "Value_1". As shown in FIGS. 18 and 19, the user may have renamed "New Asset" (e.g., which may have included a default or placeholder name) shown in FIGS. 16 and 17 to "$7^{th}$ Asset."

Continuing to FIG. 20, the exemplary screen display 2000 depicts the listing of assets 2010 from FIG. 16 with some additional attributes populated. For example, the Description 2025 (e.g., "Value_1") provided in FIG. 19 has been added to the inventory. As may be understood in light of this disclosure, in response to a user providing the description via the assessment shown in FIGS. 18 and 19, the system may be configured to map the provided description to the attribute value associated with the description of the asset in the data inventory. The system may have then modified the data inventory for the asset to include the description attribute. In various embodiments, the system is configured to store the modified data inventory as part of a data model (e.g., in computer memory).

Figure 21:
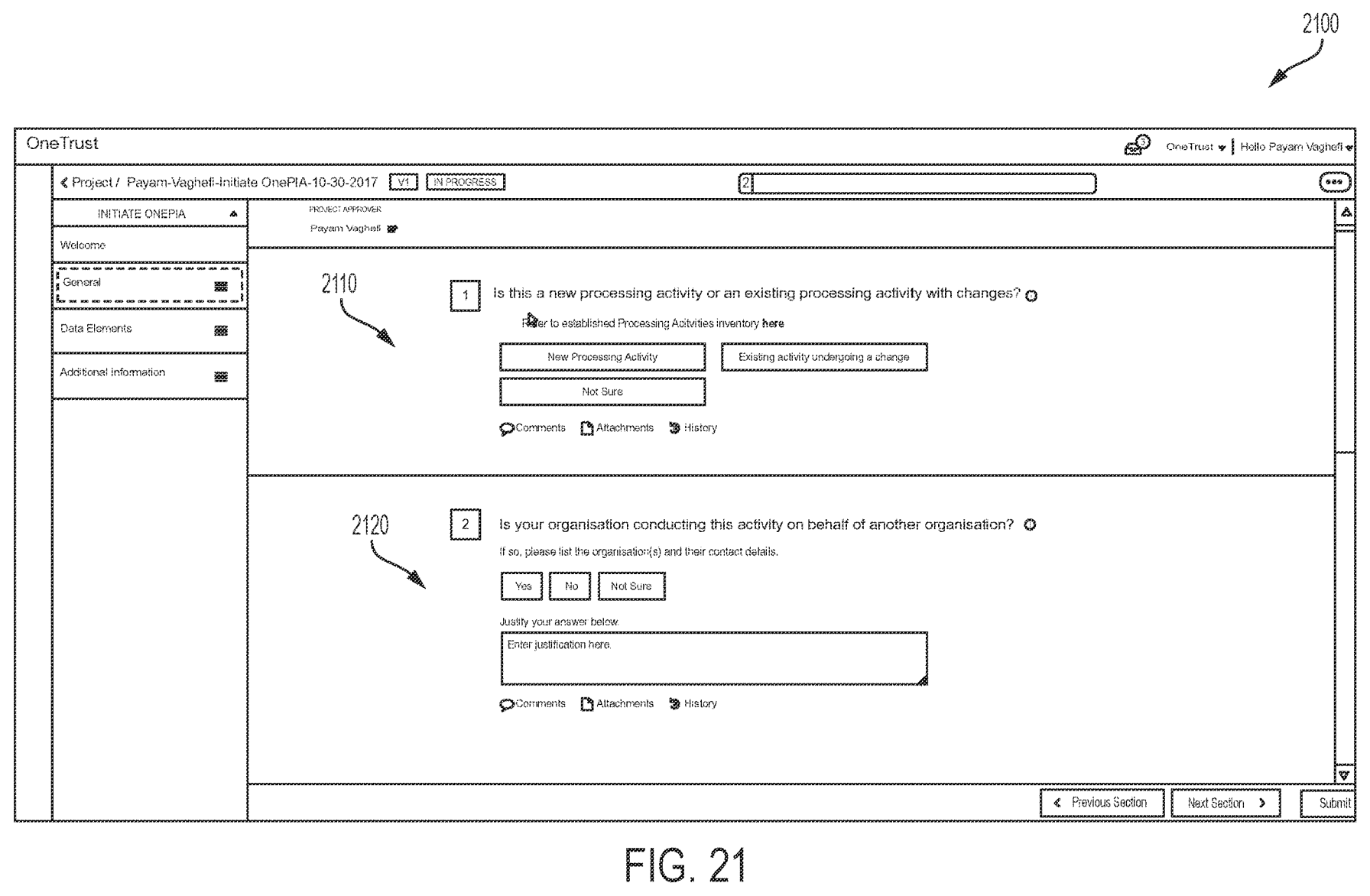

FIGS. 21-24 depict exemplary screen displays showing exemplary questions that make up part of a processing activity questionnaire (e.g., assessment). FIG. 21 depicts an exemplary interface 2100 for responding to a first question 2110 and a second question 2120. As shown in FIG. 21, the first question 2110 relates to whether the processing activity is a new or existing processing activity. The first question 2110 shown in FIG. 21 is a multiple choice question. The second question 2120 relates to whether the organization is conducting the activity on behalf of another organization. As shown in this figure, the second question 2120 includes both a multiple choice portion and a free-form response portion.

Figure 22:
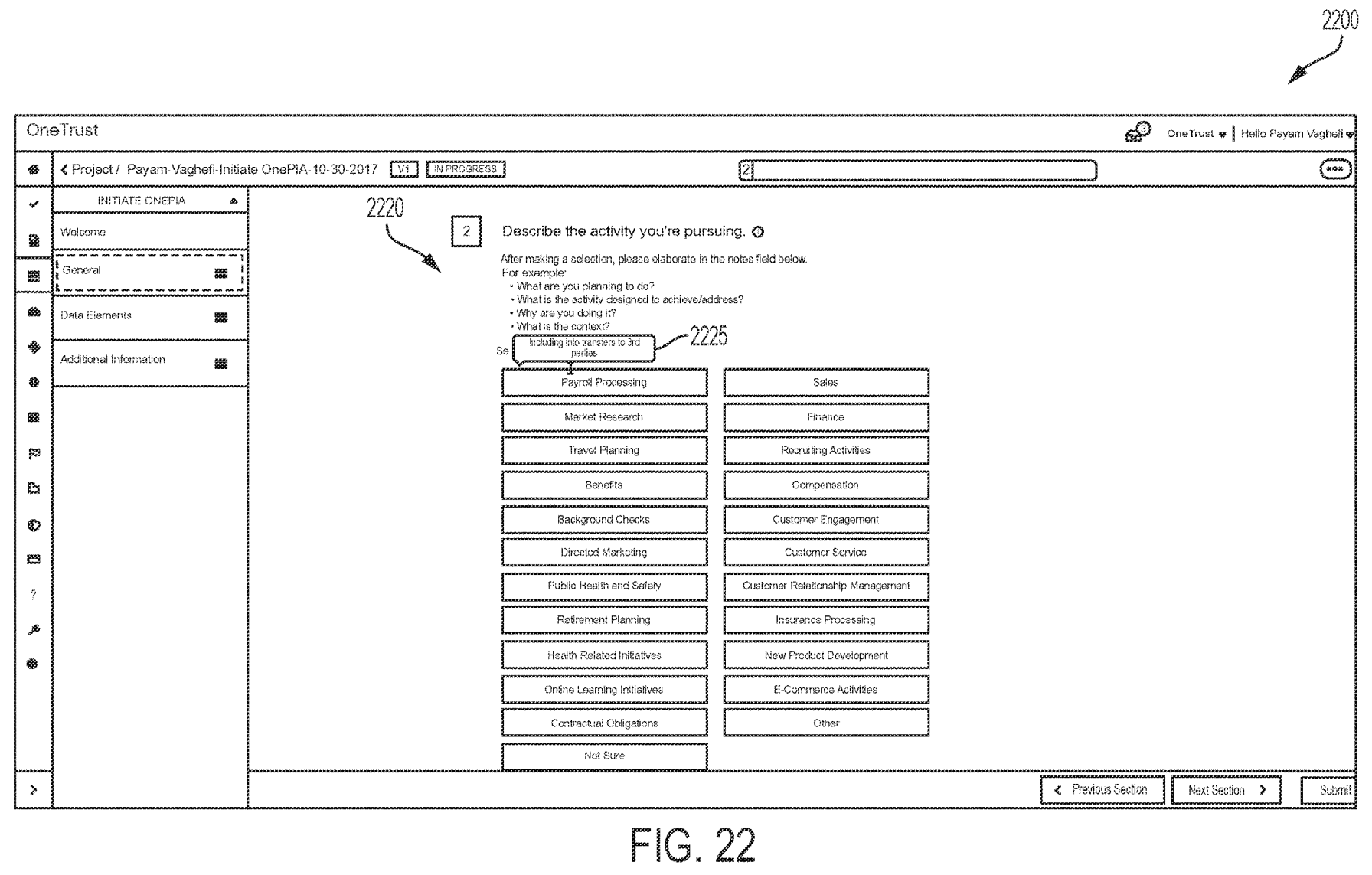

As discussed above, in various embodiments, the system may be configured to modify a questionnaire in response to (e.g., based on) one or more responses provided by a user completing the questionnaire. In particular embodiments, the system is configured to modify the questionnaire substantially on-the-fly (e.g., as the user provides each particular answer). FIG. 22 depicts an interface 2200 that includes a second question 2220 that differs from the second question 2120 shown in FIG. 21. As may be understood in light of this disclosure, in response to the user providing a response to the first question 2110 in FIG. 21 that indicates that the processing activity is a new processing activity, the system may substantially automatically modify the second question 2120 from FIG. 21 to the second question 2220 from FIG. 22 (e.g., such that the second question 2220 includes one or more follow up questions or requests for additional information based on the response to the first question 2110 in FIG. 21).

As shown in FIG. 22, the second question 2220 requests a description of the activity that is being pursued. In various embodiments (e.g., such as if the user had selected that the processing activity was an existing one), the system may not modify the questionnaire to include the second question 2220 from FIG. 22, because the system may already store information related to a description of the processing activity at issue. In various embodiments, any suitable question described herein may include a tooltip 2225 on a field name (e.g., which may provide one or more additional pieces of information to guide a user's response to the questionnaire and/or assessment).

Figure 23:
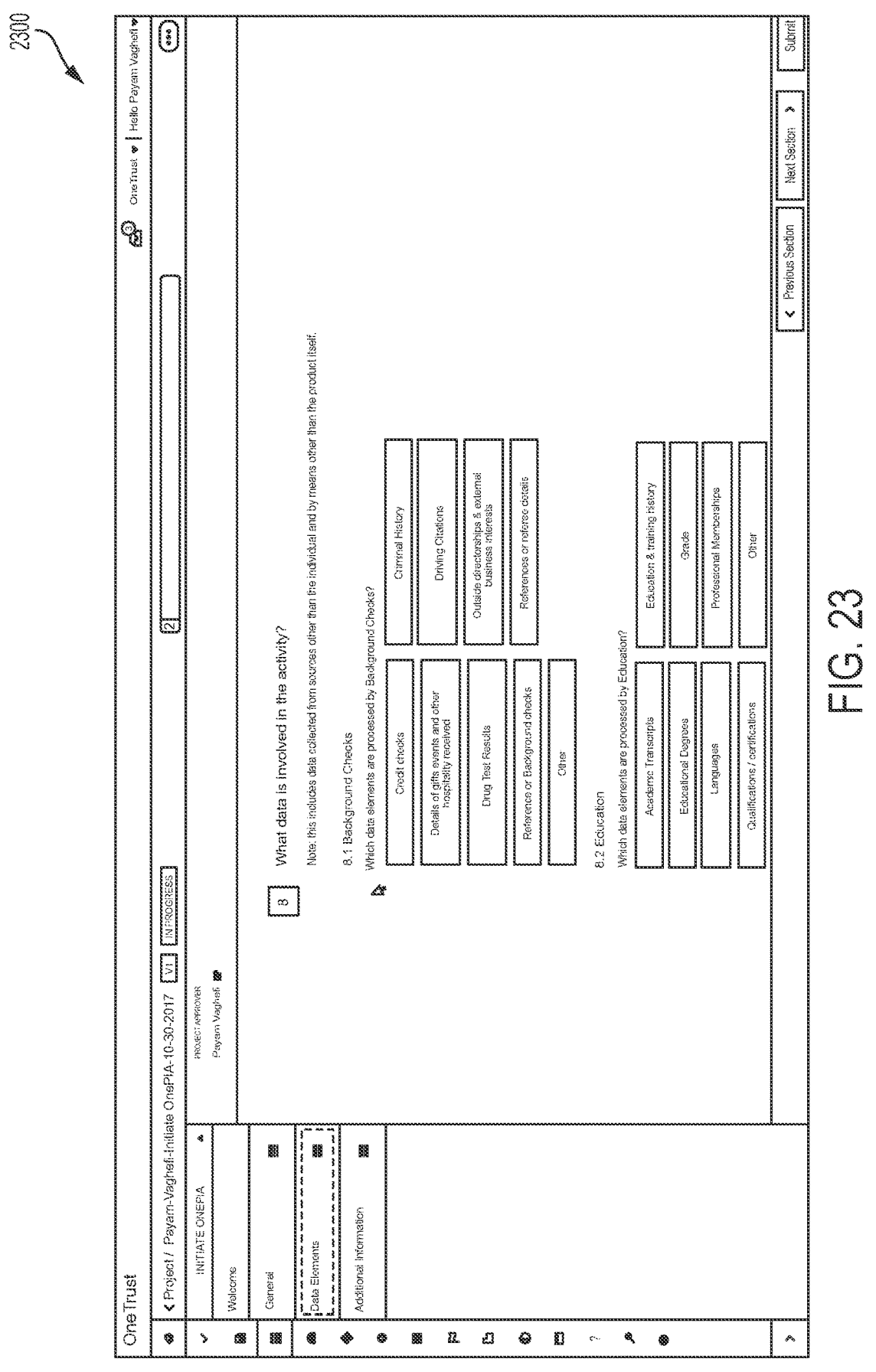
Figure 24:
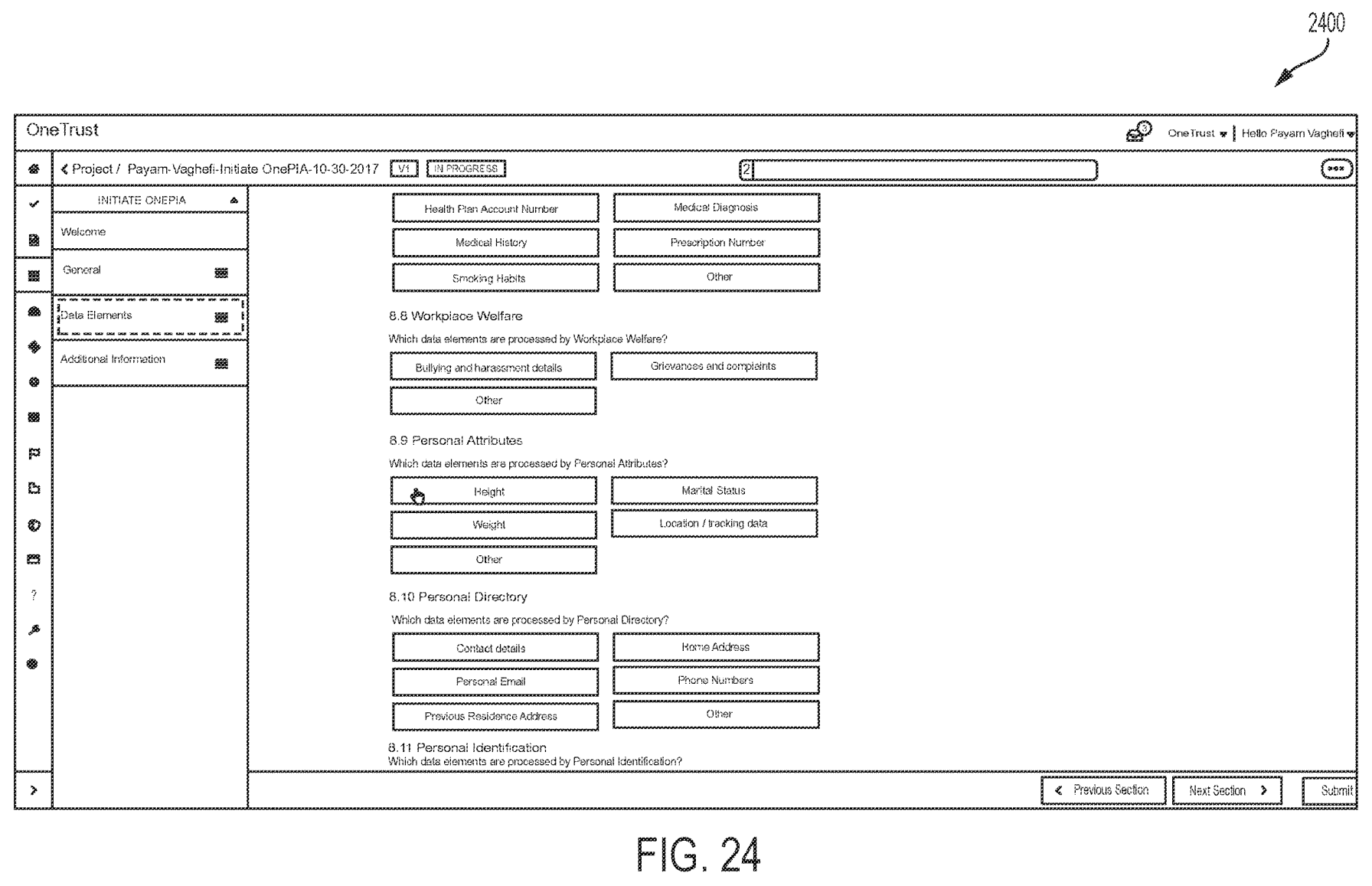

FIGS. 23 and 24 depict additional exemplary assessment questions. The questions shown in these figures relate to, for example, particular data elements processed by various aspects of a processing activity.

Figure 25:
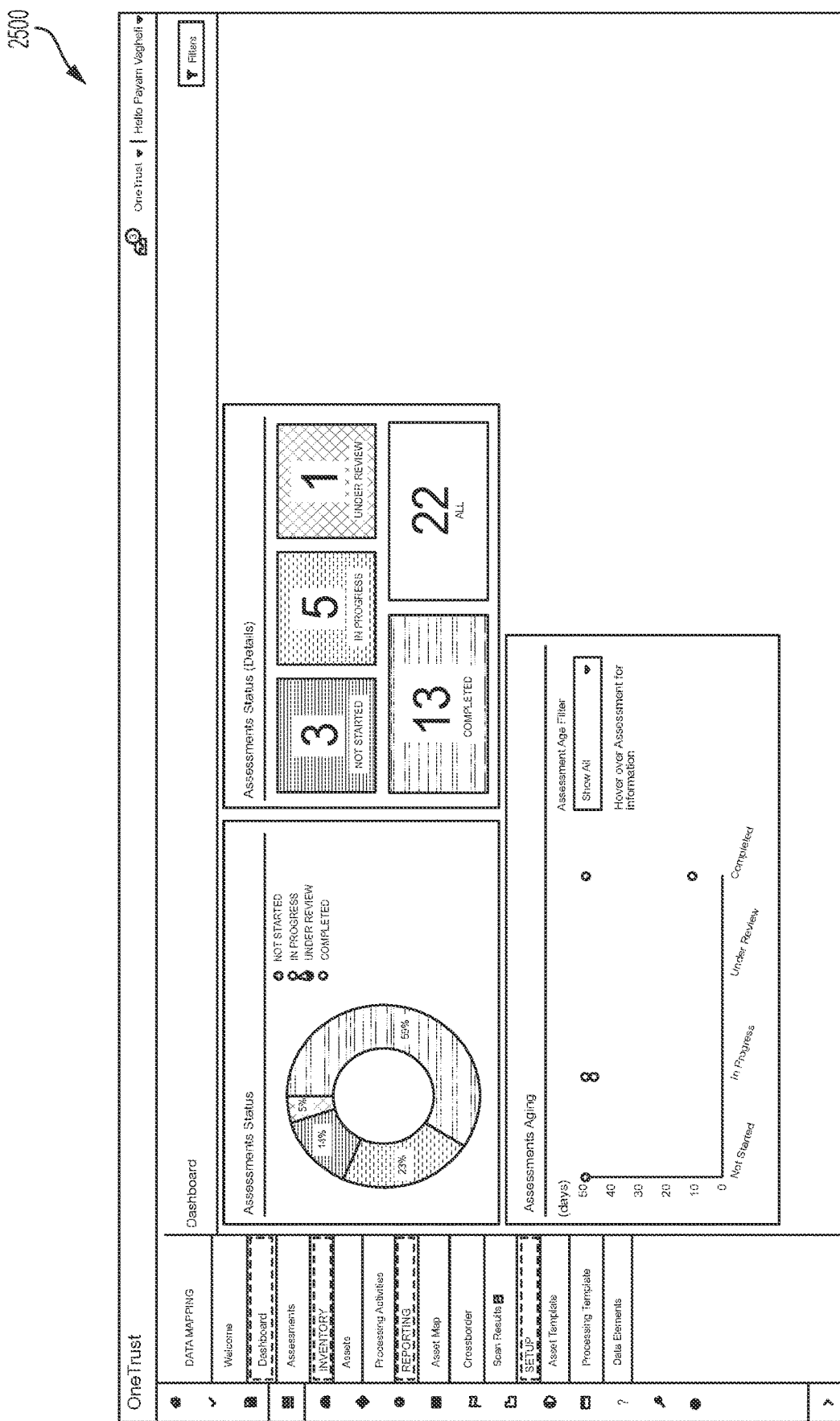

FIG. 25 depicts a dashboard 2500 that includes an accounting of one or more assessments that have been completed, are in progress, or require completion by a particular organization. The dashboard 2500 shown in this figure is configured to provide information relate to the status of one or more outstanding assessments. As may be understood in light of this disclosure, because of the volume of assessment requests, it may be necessary to utilize one or more third party organizations to facilitate a timely completion of one or more assessment requests. In various embodi-ments, the dashboard may indicate that, based on a fact that a number of assessments are still in progress or incomplete, that a particular data model for an entity, data asset, processing activity, etc. remains incomplete. In such embodiments, an incomplete nature of a data model may raise one or more flags or indicate a risk that an entity may not be in compliance with one or more legal or industry requirements related to the collection, storage, and/or processing of personal data.

Intelligent Identity Scanning Module

Figure 26:
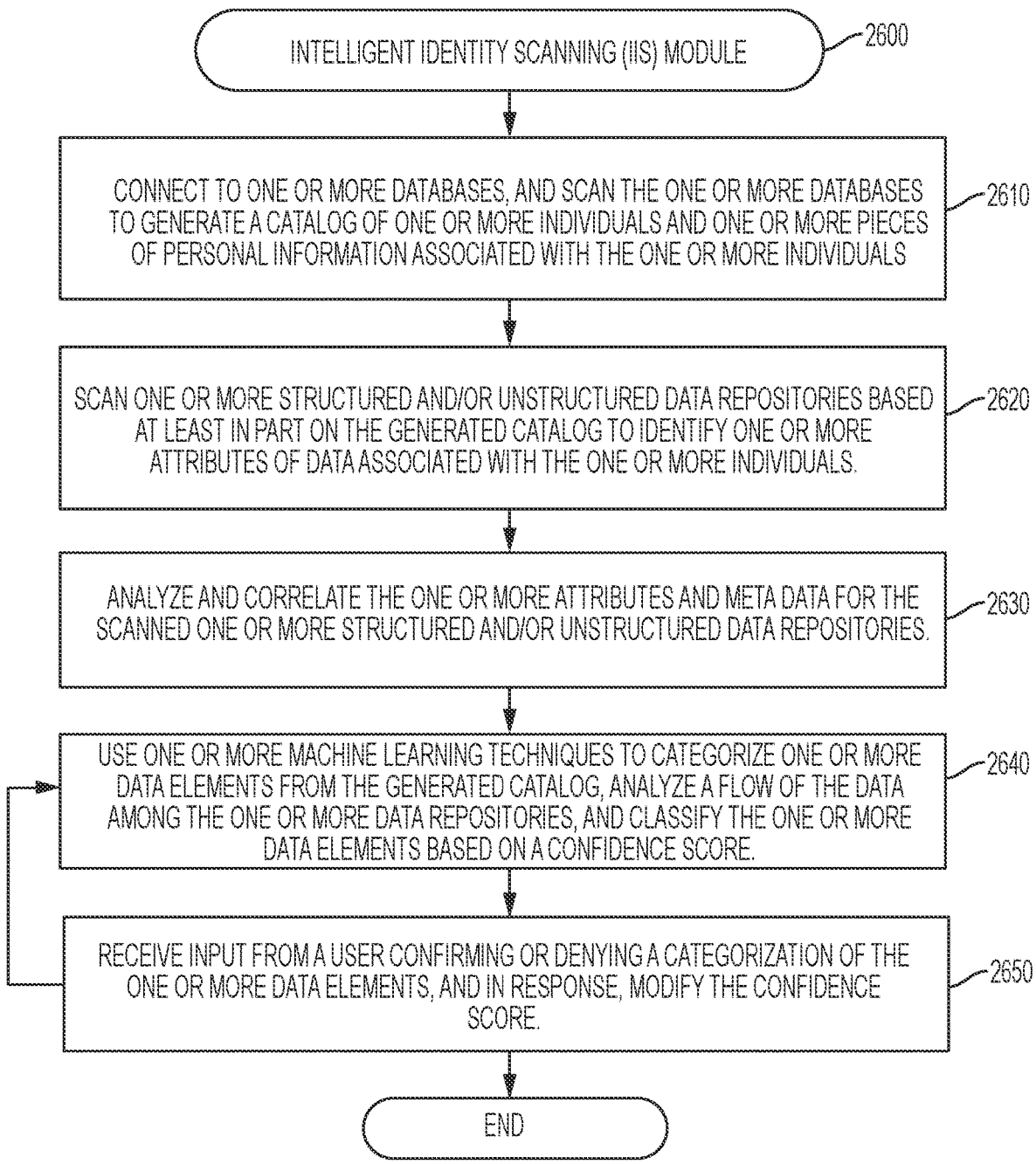
FIG. 26 is a flowchart showing an example of steps performed by an Intelligent Identity Scanning Module.

Turning to FIG. 26, in particular embodiments, the Intelligent Identity Scanning Module 2600 is configured to scan one or more data sources to identify personal data stored on one or more network devices for a particular organization, analyze the identified personal data, and classify the personal data (e.g., in a data model) based at least in part on a confidence score derived using one or more machine learning techniques. The confidence score may be and/or comprise, for example, an indication of the probability that the personal data is actually associated with a particular data subject (e.g., that there is at least an 80% confidence level that a particular phone number is associated with a particular individual.)

When executing the Intelligent Identity Scanning Module 2600, the system begins, at Step 2610, by connecting to one or more databases or other data structures, and scanning the one or more databases to generate a catalog of one or more individuals and one or more pieces of personal information associated with the one or more individuals. The system may, for example, be configured to connect to one or more databases associated with a particular organization (e.g., one or more databases that may serve as a storage location for any personal or other data collected, processed, etc. by the particular organization, for example, as part of a suitable processing activity. As may be understood in light of this disclosure, a particular organization may use a plurality of one or more databases (e.g., the One or More Databases 140 shown in FIG. 1), a plurality of servers (e.g., the One or More Third Party Servers 160 shown in FIG. 1), or any other suitable data storage location in order to store personal data and other data collected as part of any suitable privacy campaign, privacy impact assessment, processing activity, etc.

In particular embodiments, the system is configured to scan the one or more databases by searching for particular data fields comprising one or more pieces of information that may include personal data. The system may, for example, be configured to scan and identify one of more pieces of personal data such as: (1) name; (2) address; (3) telephone number; (4) e-mail address; (5) social security number; (6) information associated with one or more credit accounts (e.g., credit card numbers); (7) banking information; (8) location data; (9) internet search history; (10) non-credit account data; and/or (11) any other suitable personal information discussed herein. In particular embodiments, the system is configured to scan for a particular type of personal data (e.g., or one or more particular types of personal data).

The system may, in various embodiments, be further configured to generate a catalog of one or more individuals that also includes one or more pieces of personal information (e.g., personal data) identified for the individuals during the scan. The system may, for example, in response to discovering one or more pieces of personal data in a particular storage location, identify one or more associations between the discovered pieces of personal data. For example, a particular database may store a plurality of individuals' names in association with their respective telephone numbers. One or more other databases may include any other suitable information.

The system may, for example, generate the catalog to include any information associated with the one or more individuals identified in the scan. The system may, for example, maintain the catalog in any suitable format (e.g., a data table, etc.).

Continuing to Step 2620, the system is configured to scan one or more structured and/or unstructured data repositories based at least in part on the generated catalog to identify one or more attributes of data associated with the one or more individuals. The system may, for example, be configured to utilize information discovered during the initial scan at Step 2610 to identify the one or more attributes of data associated with the one or more individuals.

For example, the catalog generated at Step 2610 may include a name, address, and phone number for a particular individual. The system may be configured, at Step 2620, to scan the one or more structured and/or unstructured data repositories to identify one or more attributes that are associated with one or more of the particular individual's name, address and/or phone number. For example, a particular data repository may store banking information (e.g., a bank account number and routing number for the bank) in association with the particular individual's address. In various embodiments, the system may be configured to identify the banking information as an attribute of data associated with the particular individual. In this way, the system may be configured to identify particular data attributes (e.g., one or more pieces of personal data) stored for a particular individual by identifying the particular data attributes using information other than the individual's name.

Returning to Step 2630, the system is configured to analyze and correlate the one or more attributes and metadata for the scanned one or more structured and/or unstructured data repositories. In particular embodiments, the system is configured to correlate the one or more attributes with metadata for the associated data repositories from which the system identified the one or more attributes. In this way, the system may be configured to store data regarding particular data repositories that store particular data attributes.

In particular embodiments, the system may be configured to cross-reference the data repositories that are discovered to store one or more attributes of personal data associated with the one or more individuals with a database of known data assets. In particular embodiments, the system is configured to analyze the data repositories to determine whether each data repository is part of an existing data model of data assets that collect, store, and/or process personal data. In response to determining that a particular data repository is not associated with an existing data model, the system may be configured to identify the data repository as a new data asset (e.g., via asset discovery), and take one or more actions (e.g., such as any suitable actions described herein) to generate and populate a data model of the newly discovered data asset. This may include, for example: (1) generating a data inventory for the new data asset; (2) populating the data inventory with any known attributes associated with the new data asset; (3) identifying one or more unpopulated (e.g., unknown) attributes of the data asset; and (4) taking any suitable action described herein to populate the unpopulated data attributes.

In particular embodiments, the system my, for example: (1) identify a source of the personal data stored in the data repository that led to the new asset discovery; (2) identify one or more relationships between the newly discovered asset and one or more known assets; and/or (3) etc.

Continuing to Step 2640, the system is configured to use one or more machine learning techniques to categorize one or more data elements from the generated catalog, analyze a flow of the data among the one or more data repositories, and/or classify the one or more data elements based on a confidence score as discussed below.

Continuing to Step 2650, the system, in various embodiments, is configured to receive input from a user confirming or denying a categorization of the one or more data elements, and, in response, modify the confidence score. In various embodiments, the system is configured to iteratively repeat Steps 2640 and 2650. In this way, the system is configured to modify the confidence score in response to a user confirming or denying the accuracy of a categorization of the one or more data elements. For example, in particular embodiments, the system is configured to prompt a user (e.g., a system administrator, privacy officer, etc.) to confirm that a particular data element is, in fact, associated with a particular individual from the catalog. The system may, in various embodiments, be configured to prompt a user to confirm that a data element or attribute discovered during one or more of the scans above were properly categorized at Step 2640.

In particular embodiments, the system is configured to modify the confidence score based at least in part on receiving one or more confirmations that one or more particular data elements or attributes discovered in a particular location during a scan are associated with particular individuals from the catalog. As may be understood in light of this disclosure, the system may be configured to increase the confidence score in response to receiving confirmation that particular types of data elements or attributes discovered in a particular storage location are typically confirmed as being associated with particular individuals based on one or more attributes for which the system was scanning.

Exemplary Intelligent Identity Scanning Technical Platforms

Figure 27:
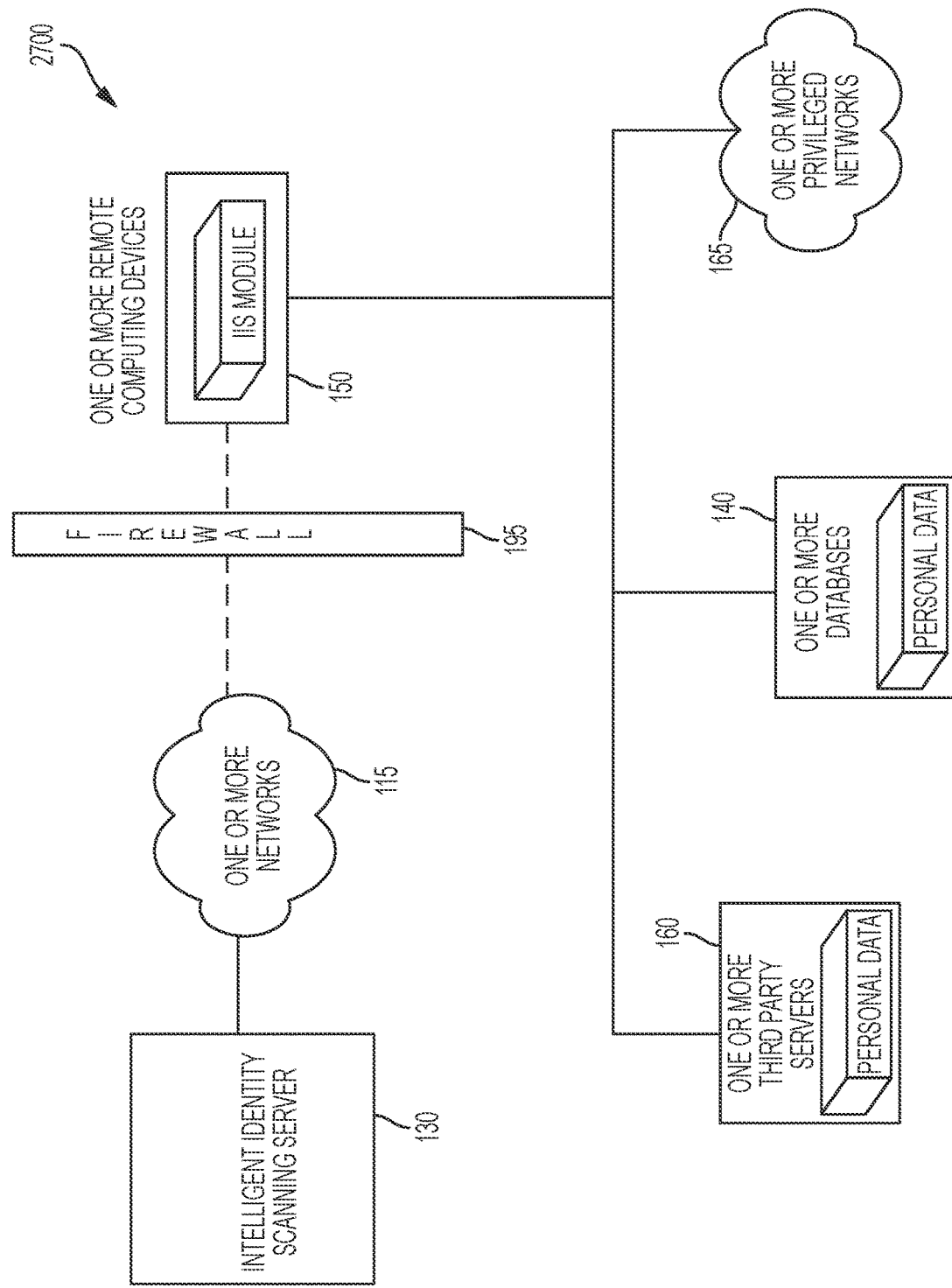
FIG. 27 is schematic diagram of network architecture for an intelligent identity scanning system 2700 according to a particular embodiment.

FIG. 27 depicts an exemplary technical platform via which the system may perform one or more of the steps described above with respect to the Intelligent Identity Scanning Module 2600. As shown in the embodiment in this figure, an Intelligent Identity Scanning System 2600 comprises an Intelligent Identity Scanning Server 130, such as the Intelligent Identity Scanning Server 130 described above with respect to FIG. 1. The Intelligent Identity Scanning Server 130 may, for example, comprise a processing engine (e.g., one or more computer processors). In some embodiments, the Intelligent Identity Scanning Server 130 may include any suitable cloud hosted processing engine (e.g., one or more cloud-based computer servers). In particular embodiments, the Intelligent Identity Scanning Server 130 is hosted in a Microsoft Azure cloud.

In particular embodiments, the Intelligent Identity Scanning Server 130 is configured to sit outside one or more firewalls (e.g., such as the firewall 195 shown in FIG. 26). In such embodiments, the Intelligent Identity Scanning Server 130 is configured to access One or More Remote Computing Devices 150 through the Firewall 195 (e.g., one or more firewalls) via One or More Networks 115 (e.g., such as any of the One or More Networks 115 described above with respect to FIG. 1).

In particular embodiments, the One or More Remote Computing Devices 150 include one or more computing devices that make up at least a portion of one or more computer networks associated with a particular organization. In particular embodiments, the one or more computer networks associated with the particular organization comprise one or more suitable servers, one or more suitable databases, one or more privileged networks, and/or any other suitable device and/or network segment that may store and/or provide for the storage of personal data. In the embodiment shown in FIG. 27, the one or more computer networks associated with the particular organization may comprise One or More Third Party Servers 160, One or More Databases 140, etc. In particular embodiments, the One or More Remote Computing Devices 150 are configured to access one or more segments of the one or more computer networks associated with the particular organization. In some embodiments, the one or more computer networks associated with the particular organization comprise One or More Privileged Networks 165. In still other embodiments, the one or more computer networks comprise one or more network segments connected via one or more suitable routers, one or more suitable network hubs, one or more suitable network switches, etc.

As shown in FIG. 27, various components that make up one or more parts of the one or more computer networks associated with the particular organization may store personal data (e.g., such as personal data stored on the One or More Third Party Servers 160, the One or More Databases 140, etc.). In various embodiments, the system is configured to perform one or more steps related to the Intelligent Identity Scanning Server 2600 in order to identify the personal data for the purpose of generating the catalog of individuals described above (e.g., and/or identify one or more data assets within the organization's network that store personal data)

As further shown in FIG. 27, in various embodiments, the One or More Remote Computing Devices 150 may store a software application (e.g., the Intelligent Identity Scanning Module). In such embodiments, the system may be configured to provide the software application for installation on the One or More Remote Computing Devices 150. In particular embodiments, the software application may comprise one or more virtual machines. In particular embodiments, the one or more virtual machines may be configured to perform one or more of the steps described above with respect to the Intelligent Identity Scanning Module 2600 (e.g., perform the one or more steps locally on the One or More Remote Computing Devices 150).

In various embodiments, the one or more virtual machines may have the following specifications: (1) any suitable number of cores (e.g., 4, 6, 8, etc.); (2) any suitable amount of memory (e.g., 4 GB, 8 GB, 16 GB etc.); (3) any suitable operating system (e.g., CentOS 7.2); and/or (4) any other suitable specification. In particular embodiments, the one or more virtual machines may, for example, be used for one or more suitable purposes related to the Intelligent Identity Scanning System 2700. These one or more suitable purposes may include, for example, running any of the one or more modules described herein, storing hashed and/or non-hashed information (e.g., personal data, personally identifiable data, catalog of individuals, etc.), storing and running one or more searching and/or scanning engines (e.g., Elasticsearch), etc.

In various embodiments, the Intelligent Identity Scanning System 2700 may be configured to distribute one or more processes that make up part of the Intelligent Identity Scanning Process (e.g., described above with respect to the Intelligent Identity Scanning Module 1800). The one or more software applications installed on the One or more Remote Computing Devices 150 may, for example, be configured to provide access to the one or more computer networks associated with the particular organization to the Intelligent Identity Scanning Server 130. The system may then be configured to receive, from the One or more Remote Computing Devices 150 at the Intelligent Identity Scanning Server 130, via the Firewall 195 and One or More Networks 115, scanned data for analysis.

In particular embodiments, the Intelligent Identity Scanning System 2700 is configured to reduce an impact on a performance of the One or More Remote Computing Devices 150, One or More Third Party Servers 160 and other components that make up one or more segments of the one or more computer networks associated with the particular organization. For example, in particular embodiments, the Intelligent Identity Scanning System 2700 may be configured to utilize one or more suitable bandwidth throttling techniques. In other embodiments, the Intelligent Identity Scanning System 2700 is configured to limit scanning (e.g., any of the one or more scanning steps described above with respect to the Intelligent Identity Scanning Module 2600) and other processing steps (e.g., one or more steps that utilize one or more processing resources) to non-peak times (e.g., during the evening, overnight, on weekends and/or holidays, etc.). In other embodiments, the system is configured to limit performance of such processing steps to backup applications and data storage locations. The system may, for example, use one or more sampling techniques to decrease a number of records required to scan during the personal data discovery process.

Figure 28:
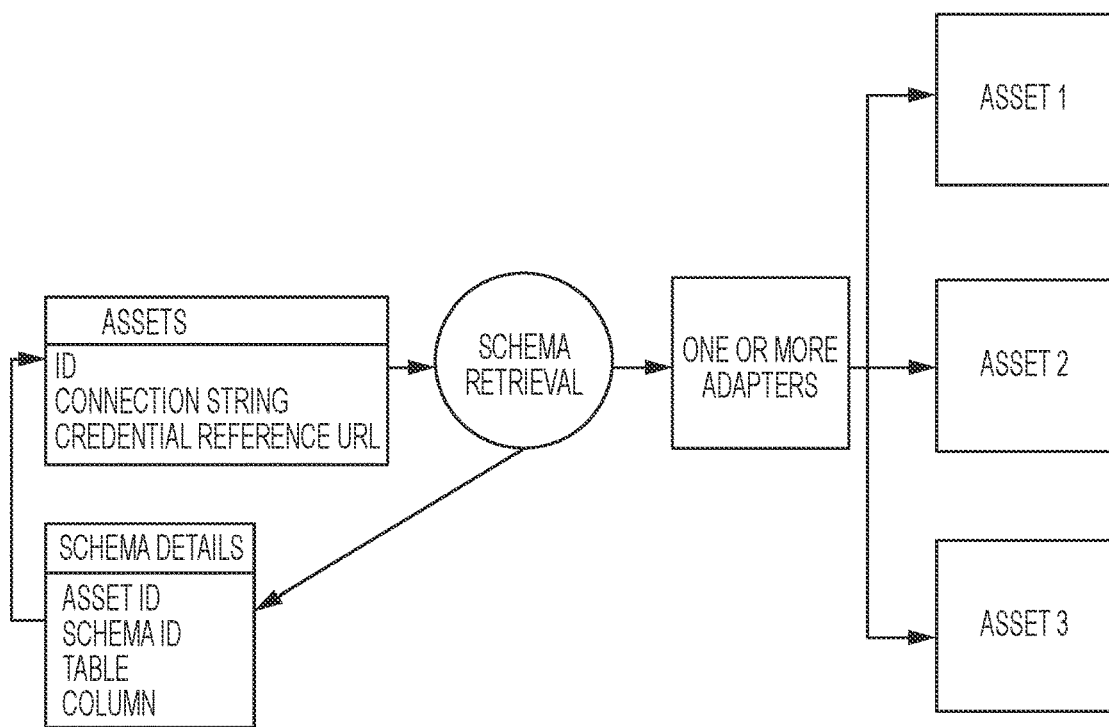
FIG. 28 is a schematic diagram of an asset access methodology utilized by an intelligent identity scanning system 2700 in various embodiments of the system.

FIG. 28 depicts an exemplary asset access methodology that the system may utilize in order to access one or more network devices that may store personal data (e.g., or other personally identifiable information). As may be understood from this figure, the system may be configured to access the one or more network devices using a locally deployed software application (e.g., such as the software application described immediately above). In various embodiments, the software application is configured to route identity scanning traffic through one or more gateways, configure one or more ports to accept one or more identity scanning connections, etc.

As may be understood from this figure, the system may be configured to utilize one or more credential management techniques to access one or more privileged network portions. The system may, in response to identifying particular assets or personally identifiable information via a scan, be configured to retrieve schema details such as, for example, an asset ID, Schema ID, connection string, credential reference URL, etc. In this way, the system may be configured to identify and store a location of any discovered assets or personal data during a scan.

Data Subject Access Request Fulfillment Module

Figure 29:
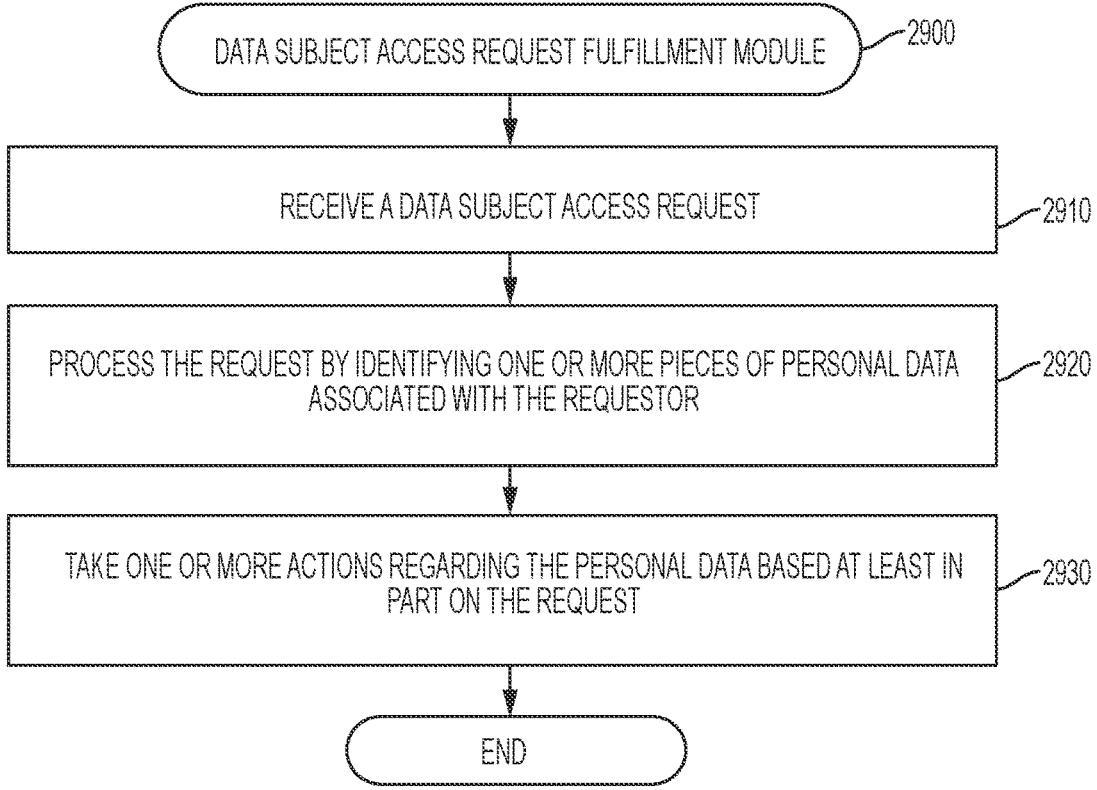
FIG. 29 is a flowchart showing an example of a processes performed by a Data Subject Access Request Fulfillment Module 2900 according to various embodiments.

Turning to FIG. 29, in particular embodiments, a Data Subject Access Request Fulfillment Module 2900 is configured to receive a data subject access request, process the request, and fulfill the request based at least in part on one or more request parameters. In various embodiments, an organization, corporation, etc. may be required to provide information requested by an individual for whom the organization stores personal data within a certain time period (e.g., 30 days). As a particular example, an organization may be required to provide an individual with a listing of, for example: (1) any personal data that the organization is processing for an individual, (2) an explanation of the categories of data being processed and the purpose of such processing; and/or (3) categories of third parties to whom the data may be disclosed.

Various privacy and security policies (e.g., such as the European Union's General Data Protection Regulation, and other such policies) may provide data subjects (e.g., individuals, organizations, or other entities) with certain rights related to the data subject's personal data that is collected, stored, or otherwise processed by an organization. These rights may include, for example: (1) a right to obtain confirmation of whether a particular organization is processing their personal data; (2) a right to obtain information about the purpose of the processing (e.g., one or more reasons for which the personal data was collected); (3) a right to obtain information about one or more categories of data being processed (e.g., what type of personal data is being collected, stored, etc.); (4) a right to obtain information about one or more categories of recipients with whom their personal data may be shared (e.g., both internally within the organization or externally); (5) a right to obtain information about a time period for which their personal data will be stored (e.g., or one or more criteria used to determine that time period); (6) a right to obtain a copy of any personal data being processed (e.g., a right to receive a copy of their personal data in a commonly used, machine-readable format); (7) a right to request erasure (e.g., the right to be forgotten), rectification (e.g., correction or deletion of inaccurate data), or restriction of processing of their personal data; and (8) any other suitable rights related to the collection, storage, and/or processing of their personal data (e.g., which may be provided by law, policy, industry or organizational practice, etc.).

As may be understood in light of this disclosure, a particular organization may undertake a plurality of different privacy campaigns, processing activities, etc. that involve the collection and storage of personal data. In some embodiments, each of the plurality of different processing activities may collect redundant data (e.g., may collect the same personal data for a particular individual more than once), and may store data and/or redundant data in one or more particular locations (e.g., on one or more different servers, in one or more different databases, etc.). In this way, a particular organization may store personal data in a plurality of different locations which may include one or more known and/or unknown locations. As such, complying with particular privacy and security policies related to personal data (e.g., such as responding to one or more requests by data subjects related to their personal data) may be particularly difficult (e.g., in terms of cost, time, etc.). In particular embodiments, a data subject access request fulfillment system may utilize one or more data model generation and population techniques (e.g., such as any suitable technique described herein) to create a centralized data map with which the system can identify personal data stored, collected, or processed for a particular data subject, a reason for the processing, and any other information related to the processing.

Turning to FIG. 29, when executing the Data Subject Access Request Fulfillment Module 2900, the system begins, at Step 2910, by receiving a data subject access request. In various embodiments, the system receives the request via a suitable web form. In certain embodiments, the request comprises a particular request to perform one or more actions with any personal data stored by a particular organization regarding the requestor. For example, in some embodiments, the request may include a request to view one or more pieces of personal data stored by the system regarding the requestor. In other embodiments, the request may include a request to delete one or more pieces of personal data stored by the system regarding the requestor. In still other embodiments, the request may include a request to update one or more pieces of personal data stored by the system regarding the requestor. In still other embodiments, the request may include a request based on any suitable right afforded to a data subject, such as those discussed above.

Continuing to Step 2920, the system is configured to process the request by identifying and retrieving one or more pieces of personal data associated with the requestor that are being processed by the system. For example, in various embodiments, the system is configured to identify any personal data stored in any database, server, or other data repository associated with a particular organization. In various embodiments, the system is configured to use one or more data models, such as those described above, to identify this personal data and suitable related information (e.g., where the personal data is stored, who has access to the personal data, etc.). In various embodiments, the system is configured to use intelligent identity scanning (e.g., as described above) to identify the requestor's personal data and related information that is to be used to fulfill the request.

In still other embodiments, the system is configured to use one or more machine learning techniques to identify such personal data. For example, the system may identify particular stored personal data based on, for example, a country in which a website that the data subject request was submitted is based, or any other suitable information.

In particular embodiments, the system is configured to scan and/or search one or more existing data models (e.g., one or more current data models) in response to receiving the request in order to identify the one or more pieces of personal data associated with the requestor. The system may, for example, identify, based on one or more data inventories (e.g., one or more inventory attributes) a plurality of storage locations that store personal data associated with the requestor. In other embodiments, the system may be configured to generate a data model or perform one or more scanning techniques in response to receiving the request (e.g., in order to automatically fulfill the request).

Returning to Step 2930, the system is configured to take one or more actions based at least in part on the request. In some embodiments, the system is configured to take one or more actions for which the request was submitted (e.g., display the personal data, delete the personal data, correct the personal data, etc.). In particular embodiments, the system is configured to take the one or more actions substantially automatically. In particular embodiments, in response a data subject submitting a request to delete their personal data from an organization's systems, the system may: (1) automatically determine where the data subject's personal data is stored; and (2) in response to determining the location of the data (which may be on multiple computing systems), automatically facilitate the deletion of the data subject's personal data from the various systems (e.g., by automatically assigning a plurality of tasks to delete data across multiple business systems to effectively delete the data subject's personal data from the systems). In particular embodiments, the step of facilitating the deletion may comprise, for example: (1) overwriting the data in memory; (2) marking the data for overwrite; (2) marking the data as free (e.g., and deleting a directory entry associated with the data); and/or (3) any other suitable technique for deleting the personal data. In particular embodiments, as part of this process, the system uses an appropriate data model (see discussion above) to efficiently determine where all of the data subject's personal data is stored.

Data Subject Access Request User Experience

Figure 31:

FIGS. 30-31 depict exemplary screen displays that a user may view when submitting a data subject access request. As shown in FIG. 30, a website 3000 associated with a particular organization may include a user-selectable indicia 3005 for submitting a privacy-related request. A user desiring to make such a request may select the indicia 3005 in order to initiate the data subject access request process.

FIG. 31 depicts an exemplary data subject access request form in both an unfilled and filled out state. As shown in this figure, the system may prompt a user to provide information such as, for example: (1) what type of requestor the user is (e.g., employee, customer, etc.); (2) what the request involves (e.g., requesting info, opting out, deleting data, updating data, etc.); (3) first name; (4) last name; (5) email address; (6) telephone number; (7) home address; and/or (8) one or more details associated with the request.

As discussed in more detail above, a data subject may submit a subject access request, for example, to request a listing of any personal information that a particular organization is currently storing regarding the data subject, to request that the personal data be deleted, to opt out of allowing the organization to process the personal data, etc.

Alternative Embodiment

In particular embodiments, a data modeling or other system described herein may include one or more features in addition to those described. Various such alternative embodiments are described below.

Processing Activity and Data Asset Assessment Risk Flagging

In particular embodiments, the questionnaire template generation system and assessment system described herein may incorporate one or more risk flagging systems. FIGS. 32-35 depict exemplary user interfaces that include risk flagging of particular questions within a processing activity assessment. As may be understood from these figures, a user may select a flag risk indicia to provide input related to a description of risks and mitigation of a risk posed by one or more inventory attributes associated with the question. As shown in these figures, the system may be configured to substantially automatically assign a risk to a particular response to a question in a questionnaire. In various embodiments, the assigned risk is determined based at least in part on the template from which the assessment was generated.

In particular embodiments, the system may utilize the risk level assigned to particular questionnaire responses as part of a risk analysis of a particular processing activity or data asset. Various techniques for assessing the risk of various privacy campaigns are described in U.S. patent application Ser. No. 15/256,419, filed Sep. 2, 2016, entitled "Data processing systems and methods for operationalizing privacy compliance and assessing the risk of various respective privacy campaigns," which is hereby incorporated herein in its entirety.

Centralized Repository of Personally Identifiable Information (PII) Overview

A centralized data repository system, in various embodiments, is configured to provide a central data-storage repository (e.g., one or more servers, databases, etc.) for the centralized storage of personally identifiable information (PII) and/or personal data for one or more particular data subjects. In particular embodiments, the centralized data repository may enable the system to populate one or more data models (e.g., using one or more suitable techniques described above) substantially on-the-fly (e.g., as the system collects, processes, stores, etc. personal data regarding a particular data subject). In this way, in particular embodiments, the system is configured to maintain a substantially up-to-date data model for a plurality of data subjects (e.g., each particular data subject for whom the system collects, processes, stores, etc. personal data). The system may then be configured to substantially automatically respond to one or more data access requests by a data subject (e.g., individual, entity, organization, etc.), for example, using the substantially up-to-date data model. In particular embodiments, the system may be configured to respond to the one or more data access requests using any suitable technique described herein.

As may be understood in light of this disclosure, a particular organization may undertake a plurality of different privacy campaigns, processing activities, etc. that involve the collection and storage of personal data. In some embodiments, each of the plurality of different processing activities may collect redundant data (e.g., may collect the same personal data for a particular individual more than once), and may store data and/or redundant data in a plurality of different locations (e.g., on one or more different servers, in one or more different databases, etc.). In this way, a particular organization may store personal data in a plurality of different locations which may include one or more known and/or unknown locations. As such, complying with particular privacy and security policies related to personal data (e.g., such as responding to one or more requests by data subjects related to their personal data) may be particularly difficult (e.g., in terms of cost, time, etc.). Accordingly, utilizing and maintaining a centralized data repository for PII may enable the system to more quickly and accurately respond to data subject access requests and other requests related to collected, stored, and processed personal data. In particular embodiments, the centralized data repository may include one or more third party data repositories (e.g., one or more third party data repositories maintained on behalf of a particular entity that collects, stores, and/or processes personal data).

In various embodiments, a third party data repository system is configured to facilitate the receipt and centralized storage of personal data for each of a plurality of respective data subjects. In particular embodiments, the system may be configured to: (1) receive personal data associated with a particular data subject (e.g., a copy of the data, a link to a location of where the data is stored, etc.); and (2) store the personal data in a suitable data format (e.g., a data model, a reference table, etc.) for later retrieval. In other embodiments, the system may be configured to receive an indication that personal data has been collected regarding a particular data subject (e.g., collected by a first party system, a software application utilized by a particular entity, etc.).

In particular embodiments, the third party data repository system is configured to: (1) receive an indication that a first party system (e.g., entity) has collected and/or processed a piece of personal data for a data subject; (2) determine a location in which the first party system has stored the piece of personal data; (3) optionally digitally store (e.g., in computer memory) a copy of the piece of personal data and associate, in memory, the piece of personal data with the data subject; and (4) optionally digitally store an indication of the storage location utilized by the first party system for the piece of personal data. In particular embodiments, the system is configured to provide a centralized database, for each particular data subject (e.g., each particular data subject about whom a first party system collects or has collected personally identifiable information), of any personal data processed and/or collected by a particular entity.

In particular embodiments, a third party data repository system is configured to interface with a consent receipt management system (e.g., such as the consent receipt management system described below). In particular embodiments, the system may, for example: (1) receive an indication of a consent receipt having an associated unique subject identifier and one or more receipt definitions (e.g., such as any suitable definition described herein); (2) identify, based at least in part on the one or more receipt definitions, one or more pieces of repository data associated with the consent receipt (e.g., one or more data elements or pieces of personal data for which the consent receipt provides consent to process; a storage location of the one or more data elements for which the consent receipt provides consent to process; etc.); (3) digitally store the unique subject identifier in one or more suitable data stores; and (4) digitally associate the unique subject identifier with the one or more pieces of repository data. In particular embodiments, the system is configured to store the personal data provided as part of the consent receipt in association with the unique subject identifier.

In particular embodiments, the system is configured to, for each stored unique subject identifier: (1) receive an indication that new personal data has been provided by or collected from a data subject associated with the unique subject identifier (e.g., provided to an entity or organization that collects and/or processes personal data); and (2) in response to receiving the indication, storing the new personal data (e.g., or storing an indication of a storage location of the new personal data by the entity) in association with the unique subject identifier. In this way, as an entity collects additional data for a particular unique data subject (e.g., having a unique subject identifier, hash, etc.), the third party data repository system is configured to maintain a centralized database of data collected, stored, and or processed for each unique data subject (e.g., indexed by unique subject identifier). The system may then, in response to receiving a data subject access request from a particular data subject, fulfill the request substantially automatically (e.g., by providing a copy of the personal data, deleting the personal data, indicating to the entity what personal data needs to be deleted from their system and where it is located, etc.). The system may, for example, automatically fulfill the request by: (1) identifying the unique subject identifier associated with the unique data subject making the request; and (2) retrieving any information associated with the unique data subject based on the unique subject identifier.

Exemplary Centralized Data Repository System Architecture

Figure 36:
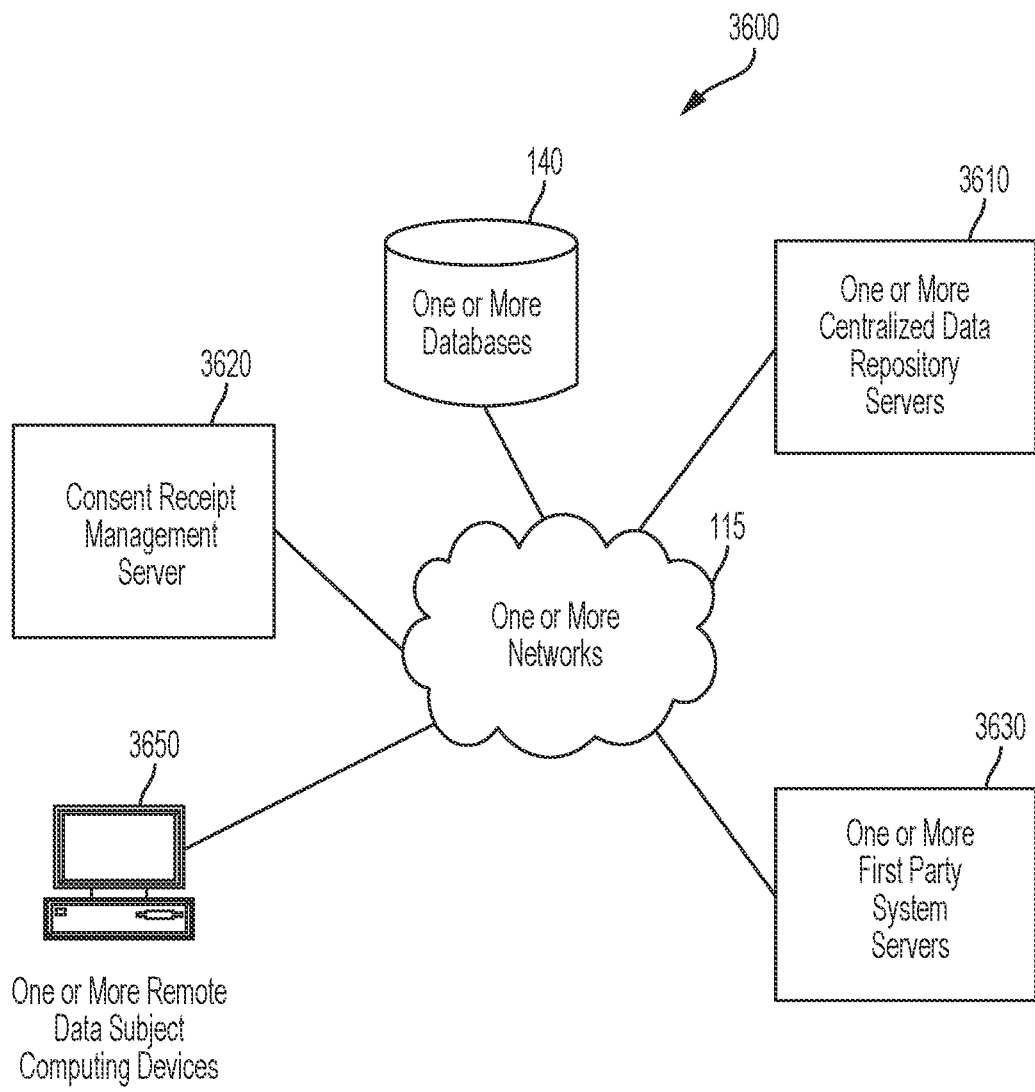
FIG. 36 depicts a schematic diagram of a centralized data repository system according to particular embodiments of the present system.

FIG. 36 is a block diagram of a centralized data repository system 3600 according to a particular embodiment. In various embodiments, the centralized data repository system 3600 is part of a privacy compliance system (also referred to as a privacy management system), or other system, which may, for example, be associated with a particular organization and be configured to aid in compliance with one or more legal or industry regulations related to the collection and storage of personal data. In various other embodiments, the centralized data repository system 3600 is a stand-alone system that is configured to interface with one or more first party data management or other systems for the purpose of maintaining a centralized data repository of personal data collected, stored, and/or processed by each of the one or more first party data systems.

As may be understood from FIG. 36, the centralized data repository system 3600 includes one or more computer networks 115, One or More Centralized Data Repository Servers 3610, a Consent Receipt Management Server 3620, One or More First Party System Servers 3630, One or More Databases 140 or other data structures, and one or more remote data subject computing devices 3650 (e.g., a desktop computer, laptop computer, tablet computer, smartphone, etc.). Although in the embodiment shown in FIG. 36, the One or More Centralized Data Repository Servers 3610, Consent Receipt Management Server 3620, One or More First Party System Servers 3630, One or More Databases 140 or other data structures, and one or more remote data subject computing devices 3650 are shown as separate servers, it should be understood that in other embodiments, one or more of these servers and/or computing devices may comprise a single server, a plurality of servers, one or more cloud-based servers, or any other suitable configuration.

In particular embodiments, the One or More Centralized Data Repository Servers 3610 may be configured to interface with the One or More First Party System Servers 3630 to receive any of the indications or personal data (e.g., for storage) described herein. The One or More Centralized Data Repository Servers 3610 and One or More First Party System Servers 3630 may, for example, interface via a suitable application programming interface, direct connection, etc. In a particular embodiment, the One or More Centralized Data Repository Servers 3610 comprise the Consent Receipt Management Server 3620.

In a particular example, a data subject may provide one or more pieces of personal data via the One or More Remote Data Subject Computing Devices 3650 to the One or More First Party System Servers 3630. The data subject may, for example, complete a webform on a website hosted on the One or More First Party System Servers 3630. The system may then, in response to receiving the one or more pieces of personal data at the One or More First Party System Servers 3630, transmit an indication to the One or More Centralized Data Repository Servers 3610 that the One or More First Party System Servers 3630 have collected, stored, and/or processed the one or more pieces of personal data. In response to receiving the indication, the One or More Centralized Data Repository Servers 3610 may then store the one or more pieces of personal data (e.g., a copy of the data, an indication of the storage location of the personal data in the One or More First Party System Servers 3630, etc.) in a centralized data storage location (e.g., in One or More Databases 140, on the One or More Centralized Data Repository Servers 3610, etc.).

Centralized Data Repository Module

Various functionality of the centralized data repository system 3600 may be implemented via a Centralized Data Repository Module 3700. The system, when executing certain steps of the Centralized Data Repository Module, may be configured to generate, a central repository of personal data on behalf of an entity, and populate the central repository with personal data as the entity collects, stores and/or processes the personal data. In particular embodiments, the system is configured to index the personal data within the central repository by data subject.

Figure 37:
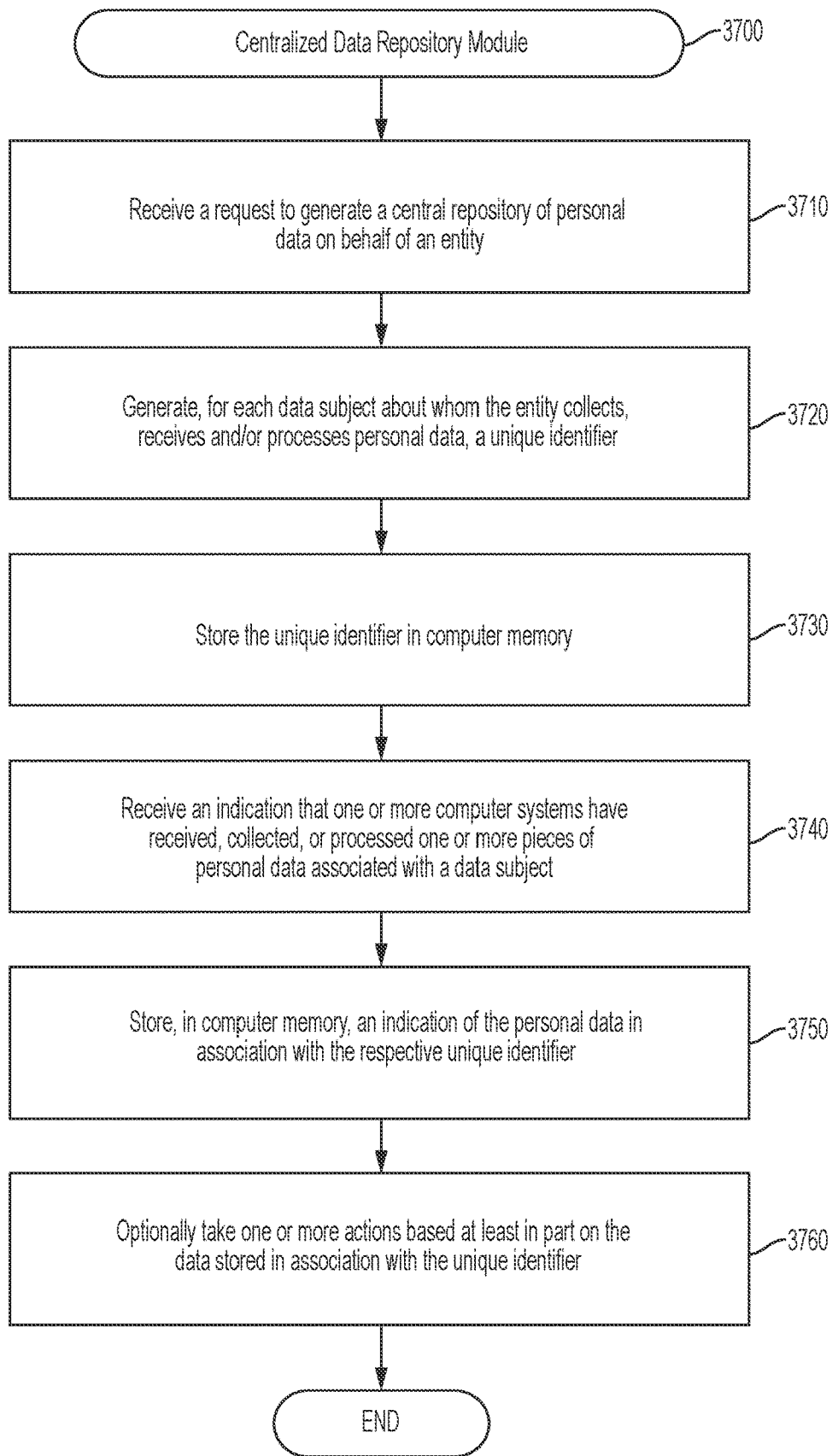
FIG. 37 is a centralized data repository module according to various embodiments, which may, for example, be executed by the centralized data repository system of FIG. 36.

FIG. 37 depicts a Centralized Data Repository Module 3700 according to a particular embodiment. The system, when executing the Centralized Data Repository Module 3700, begins, at Step 3710, by receiving a request to generate a central repository of personal data on behalf of an entity. In particular embodiments, the system is a third-party system that receives a request from the entity to generate and maintain a central repository (e.g., third party repository) of personal data that the entity collects, stores, and or processes.

In particular embodiments, the system, in response to receiving the request, is configured to generate the central repository by: (1) designating at least a portion of one or more data stores for the storage of the personal data, information about the data subjects about whom the personal data is collected, etc.; (2) initiating a connection between the central repository and one or more data systems operated by the entity (e.g., one or more first party systems); (3) etc.

Continuing to Step 3720, the system is configured to generate, for each data subject about whom the entity collects, receives, and/or processes personal data, a unique identifier. The system may, for example: (1) receive an indication that a first party system has collected, stored, and/or processed a piece of personal data; (2) identify a data subject associated with the piece of personal data; (3) determine whether the central repository system is currently storing data associated with the data subject; and (4) in response to determining that the central repository system is not currently storing data associated with the data subject (e.g., because the data subject is a new data subject), generating the unique identifier. In various embodiments, the system is configured to assign a unique identifier for each data subject about whom the first party system has previously collected, stored, and/or processed personal data.

In particular embodiments, the unique identifier may include any unique identifier such as, for example: (1) any of the one or more pieces of personal data collected, stored, and/or processed by the system (e.g., name, first name, last name, full name, address, phone number, e-mail address, etc.); (2) a unique string or hash comprising any suitable number of numerals, letters, or combination thereof; and/or (3) any other identifier that is sufficiently unique to distinguish between a first and second data subject for the purpose of subsequent data retrieval.

In particular embodiments, the system is configured to assign a permanent identifier to each particular data subject. In other embodiments, the system is configured to assign one or more temporary unique identifiers to the same data subject.

In particular embodiments, the unique identifier may be based at least in part on the unique receipt key and/or unique subject identifier discussed below with respect to the consent receipt management system. As may be understood in light of this disclosure, when receiving consent form a data subject to process, collect, and at least store one or more particular types of personal data associated with the data subject, the system is configured to generate a unique ID to memorialize the consent and provide authorization for the system to collect the subject's data. In any embodiment described herein, the system may be configured to utilize any unique ID generated for the purposes of tracking data subject consent as a unique identifier in the context of the central repository system described herein.

In particular embodiments, the system is configured to continue to Step 3730, and store the unique identifier in computer memory. In particular embodiments, the system is configured to store the unique identifier in an encrypted manner. In various embodiments, the system is configured to store the unique identifier in any suitable location (e.g., the one or more databases 140 described above).

In particular embodiments, the system is configured to store the unique identifier as a particular file structure such as, for example, a particular folder structure in which the system is configured to store one or more pieces of personal data (e.g., or pointers to one or more pieces of personal data) associated with the unique identifier (e.g., the data subject associated with the unique identifier). In other embodiments, the system is configured to store the unique identifier in any other suitable manner (e.g., in a suitable data table, etc.).

Returning to Step 3740, the system is configured to receive an indication that one or more computer systems have received, collected or processed one or more pieces of personal data associated with a data subject. In particular embodiments, the one or more computer systems include any suitable computer system associated with a particular entity. In other embodiments, the one or more computer systems comprise one or more software applications, data stores, databases, etc. that collect, process, and/or store data (e.g., personally identifiable data) on behalf of the entity (e.g., organization). In particular embodiments, the system is configured to receive the indication through integration with the one or more computer systems. In a particular example, the system may provide a software application for installation on a system device that is configured to transmit the indication in response to the system receiving, collecting, and/or processing one or more pieces of personal data.

In particular embodiments, the system may receive the indication in response to: (1) a first party system, data store, software application, etc. receiving, collecting, storing, and or processing a piece of data that includes personally identifying information; (2) a user registering for an account with a particular entity (e.g., an online account, employee account, social media account, e-mail account, etc.); (3) a company storing information about one or more data subjects (e.g., employee information, customer information, potential customer information, etc.; and/or (4) any other suitable indication that a first entity or any computer system or software on the first entity's behalf has collected, stored, and/or processed a piece of data that includes or may include personally identifiable information.

As a particular example, the system may receive the indication in response to a user submitting a webform via a website operated by the first entity. The webform may include, for example, one or more fields that include the user's e-mail address, billing address, shipping address, and payment information for the purposes of collected payment data to complete a checkout process on an e-commerce website. In this example, because the information submitted via the webform contains personal data (e.g., personally identifiable data) the system, in response to receiving an indication that the user has submitted the at least partially completed webform, may be configured to receive the indication described above with respect to Step 3740.

In various embodiments, a first party privacy management system or other system (e.g., privacy management system, marketing system, employee records database management system, etc.) may be configured to transmit an indication to the central repository system in response to collecting, receiving, or processing one or more pieces of personal data personal data.

In some embodiments, the indication may include, for example: (1) an indication of the type of personal data collected; (2) a purpose for which the personal data was collected; (3) a storage location of the personal data by the first party system; and/or (4) any other suitable information related to the one or more pieces of personal data or the handling of the personal data by the first party system. In particular embodiments, the system is configured to receive the indication via an application programming interface, a software application stored locally on a computing device within a network that makes up the first party system, or in any other suitable manner.

Continuing to Step 3750, the central repository system is configured to store, in computer memory, an indication of the personal data in association with the respective unique identifier. In various embodiments, the central repository system comprises a component of a first party system for the centralized storage of personal data collected by one or more various distributed computing systems (e.g., and software applications) operated by a particular entity for the purpose of collecting, storing, and/or processing personal data. In other embodiments, the central repository system is a third-party data repository system that is separate from the one or more first party systems described above. In particular embodiments, for example, a third-party data repository system may be configured to maintain a central repository of personal data for a plurality of different entities.

In particular embodiments, the central repository system is configured to store a copy of the personal data (e.g., store a digital copy of the personal data in computer memory associated with the central repository system). In still other embodiments, the central repository system is configured to store an indication of a storage location of the personal data within the first party system. For example, the system may be configured to store an indication of a physical location of a particular storage location (e.g., a physical location of a particular computer server or other data store) and an indication of a location of the personal data in memory on that particular storage location (e.g., a particular path or filename of the personal data, a particular location in a spreadsheet, CSV file, or other suitable document, etc.).

In various embodiments, the system may be configured to confirm receipt of valid consent to collect, store, and/or process personal data from the data subject prior to storing the indication of the personal data in association with the respective unique identifier. In such embodiments, the system may be configured to integrate with (e.g., interface with) a consent receipt management system (e.g., such as the consent receipt management system described more fully below). In such embodiments, the system may be configured to: (1) receive the indication that the first party system has collected, stored, and/or processed a piece of personal data; (2) identify, based at least in part on the piece of personal data, a data subject associated with the piece of personal data; (3) determine, based at least in part on one or more consent receipts received from the data subject(e.g., one or more valid receipt keys associated with the data subject), and one or more pieces of information associated with the piece of personal data, whether the data subject has provided valid consent to collect, store, and/or process the piece of personal data; (4) in response to determining that the data subject has provided valid consent, storing the piece of personal data in any manner described herein; and (5) in response to determining that the data subject has not provided valid consent, deleting the piece of personal data (e.g., not store the piece of personal data).

In particular embodiments, in response to determining that the data subject has not provided valid consent, the system may be further configured to: (1) automatically determine where the data subject's personal data is stored (e.g., by the first party system); and (2) in response to determining the location of the data (which may be on multiple computing systems), automatically facilitate the deletion of the data subject's personal data from the various systems (e.g., by automatically assigning a plurality of tasks to delete data across multiple business systems to effectively delete the data subject's personal data from the systems). In particular embodiments, the step of facilitating the deletion may comprise, for example: (1) overwriting the data in memory; (2) marking the data for overwrite; (2) marking the data as free (e.g., and deleting a directory entry associated with the data); and/or (3) any other suitable technique for deleting the personal data.

Next, at optional step 3760, the system is configured to take one or more actions based at least in part on the data stored in association with the unique identifier. In particular embodiments, the one or more actions may include, for example, responding to a data subject access request initiated by a data subject (e.g., or other individual on the data subject's behalf) associated with the unique identifier. In various embodiments, the system is configured to identify the unique identifier associated with the data subject making the data subject access request based on information submitted as part of the request.

Consent Receipt Management Systems

In particular embodiments, any entity (e.g., organization, company, etc.) that collects, stores, processes, etc. personal data may require one or more of: (1) consent from a data subject from whom the personal data is collected and/or processed; and/or (2) a lawful basis for the collection and/or processing of the personal data. In various embodiments, the entity may be required to, for example: (1) demonstrate that a data subject has freely given specific, informed, and unambiguous indication of the data subject's agreement to the processing of his or her personal data (e.g., in the form of a statement or clear affirmative action); (2) demonstrate that the entity received consent from a data subject in a manner clearly distinguishable from other matters (e.g., in an intelligible and easily accessible form, using clear and plain language, etc.); (3) enable a data subject to withdraw consent as easily as the data subject can give consent; (4) separate a data subject's consent from performance under any contract unless such processing is necessary for performance under the contract; etc.

In various embodiments, a consent receipt management system may be implemented in the context of any suitable privacy management system that is configured to ensure compliance with one or more legal or industry standards related to the collection and/or storage of private information (e.g., such as personal data). Various privacy and security policies (e.g., such as the European Union's General Data Protection Regulation, and other such policies) may provide data subjects (e.g., individuals, organizations, or other entities) with certain rights related to the data subject's personal data that is collected, stored, or otherwise processed by an organization. These rights may include, for example: (1) a right to erasure of the data subject's personal data (e.g., in cases where no legal basis applies to the processing and/or collection of the personal data; (2) a right to withdraw consent to the processing and/or collection of their personal data; (3) a right to receive the personal data concerning the data subject, which he or she has provided to an entity (e.g., organization), in a structured, commonly used and machine-readable format; and/or (4) any other right which may be afforded to the data subject under any applicable legal and/or industry policy.

In particular embodiments, the consent receipt management system is configured to: (1) enable an entity to demonstrate that valid consent has been obtained for each particular data subject for whom the entity collects and/or processes personal data; and (2) enable one or more data subjects to exercise one or more rights described herein.

The system may, for example, be configured to track data on behalf of an entity that collects and/or processes persona data related to: (1) who consented to the processing or collection of personal data (e.g., the data subject themselves or a person legally entitled to consent on their behalf such as a parent, guardian, etc.); (2) when the consent was given (e.g., a date and time); (3) what information was provided to the consenter at the time of consent (e.g., a privacy policy, what personal data would be collected following the provision of the consent, for what purpose that personal data would be collected, etc.); (4) how consent was received (e.g., one or more copies of a data capture form, webform, etc. via which consent was provided by the consenter); (5) when consent was withdrawn (e.g., a date and time of consent withdrawal if the consenter withdraws consent); and/or (6) any other suitable data related to receipt or withdrawal of consent.

In further embodiments, the system may be configured to provide data subjects with a centralized interface that is configured to: (1) provide information regarding each of one or more valid consents that the data subject has provided to one or more entities related to the collection and/or processing of their personal data; (2) provide one or more periodic reminders regarding the data subject's right to withdraw previously given consent (e.g., every 6 months in the case of communications data and metadata, etc.); (3) provide a withdrawal mechanism for the withdrawal of one or more previously provided valid consents (e.g., in a format that is substantially similar to a format in which the valid consent was given by the data subject); (4) refresh consent when appropriate (e.g., the system may be configured to elicit updated consent in cases where particular previously validly consented to processing is used for a new purpose, a particular amount of time has elapsed since consent was given, etc.).

In particular embodiments, the system is configured to manage one or more consent receipts between a data subject and an entity. In various embodiments, a consent receipt may include a record (e.g., a data record stored in memory and associated with the data subject) of consent, for example, as a transactional agreement where the data subject is already identified or identifiable as part of the data processing that results from the provided consent. In any embodiment described herein, the system may be configured to generate a consent receipt in response to a data subject providing valid consent. In some embodiments, the system is configured to determine whether one or more conditions for valid consent have been met prior to generating the consent receipt.

Exemplary Consent Receipt Data Flow

Figure 38:
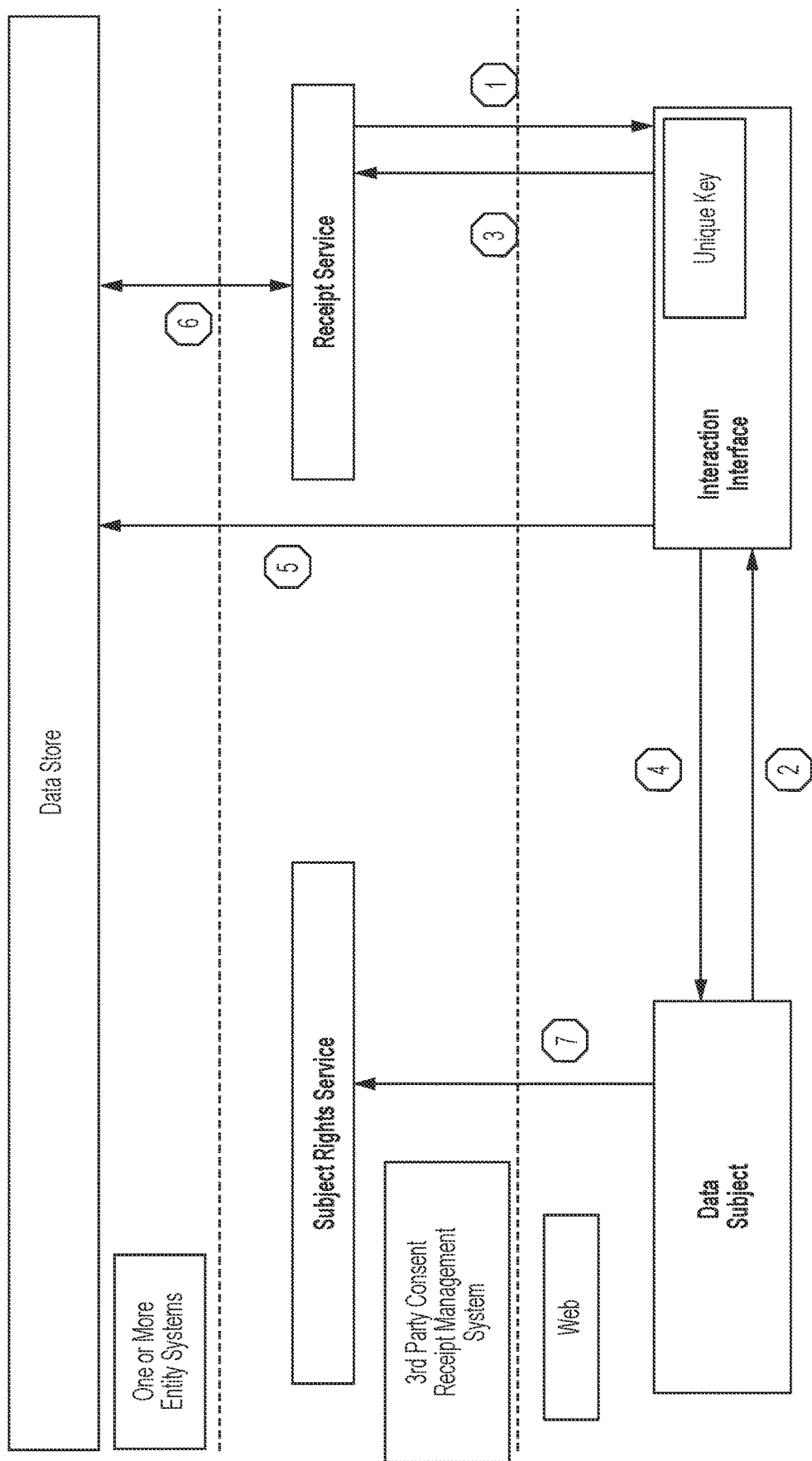
FIG. 38 depicts a schematic diagram of a consent receipt management system according to particular embodiments.

FIG. 38 depicts an exemplary data flow that a consent receipt management system may utilize in the recordation and management of one or more consent receipts. In particular embodiments, a third party consent receipt management system may be configured to manage one or more consent receipts for a particular entity. As may be understood from this figure, a data subject may access an interaction interface (e.g., via the web) for interacting with a particular entity (e.g., one or more entity systems). The interaction interface (e.g., user interface) may include, for example, a suitable website, web form, user interface etc. The interaction interface may be provided by the entity. Using the interaction interface, a data subject may initiate a transaction with the entity that requires the data subject to provide valid consent (e.g., because the transaction includes the processing of personal data by the entity). The transaction may include, for example: (1) accessing the entity's website; (2) signing up for a user account with the entity; (3) signing up for a mailing list with the entity; (4) a free trial sign up; (5) product registration; and/or (6) any other suitable transaction that may result in collection and/or processing personal data, by the entity, about the data subject.

As may be understood from this disclosure, any particular transaction may record and/or require one or more valid consents from the data subject. For example, the system may require a particular data subject to provide consent for each particular type of personal data that will be collected as part of the transaction. The system may, in various embodiments, be configured to prompt the data subject to provide valid consent, for example, by: (1) displaying, via the interaction interface, one or more pieces of information regarding the consent (e.g., what personal data will be collected, how it will be used, etc.); and (2) prompt the data subject to provide the consent.

In response to the data subject (e.g., or the entity) initiating the transaction, the system may be configured to: (1) generate a unique receipt key (e.g., unique receipt ID); (2) associate the unique receipt key with the data subject (e.g., a unique subject identifier), the entity, and the transaction; and (3) electronically store (e.g., in computer memory) the unique receipt key. The system may further store a unique user ID (e.g., unique subject identifier) associated with the data subject (e.g., a hashed user ID, a unique user ID provided by the data subject, unique ID based on a piece of personal data such as an e-mail address, etc.).

In a particular embodiment, the unique consent receipt key is generated by a third party consent receipt management system. The system may then be configured to associate the unique consent receipt key with the interaction interface, and further configured to associate the unique consent receipt key with a unique transaction ID generated as a result of a data subject transaction initiated via the interaction interface.

In particular embodiments, the unique consent receipt key may be associated with one or more receipt definitions, which may include, for example: (1) the unique transaction ID; (2) an identity of one or more controllers and/or representatives of the entity that is engaging in the transaction with the data subject (e.g., and contact information for the one or more controllers); (3) one or more links to a privacy policy associated with the transaction at the time that consent was given; (4) a listing of one or more data types for which consent to process was provided (e.g., email, MAC address, name, phone number, browsing history, etc.); (5) one or more methods used to collect data for which consent to process was provided (e.g., using one or more cookies, receiving the personal data from the data subject directly, etc.); (6) a description of a service (e.g., a service provided as part of the transaction such as a free trial, user account, etc.); (7) one or more purposes of the processing (e.g., for marketing purposes, to facilitate contact with the data subject, etc.); (8) a jurisdiction (e.g., the European Union, United States, etc.); (9) a legal basis for the collection of personal data (e.g., consent); (10) a type of consent provided by the data subject (e.g. unambiguous, explicit, etc.); (11) one or more categories or identities of other entities to whom the personal data may be transferred; (12) one or more bases of a transfer to a third party entity (e.g., adequacy, binding corporate rules, etc.); (13) a retention period for the personal data (e.g., how long the personal data will be stored); (14) a withdrawal mechanism (e.g., a link to a withdrawal mechanism); (15) a timestamp (e.g., date and time); (16) a unique identifier for the receipt; and/or (17) any other suitable information. FIG. 39 depicts an exemplary consent definition summary for a particular transaction (e.g., free trial signup).

In response to receiving valid consent from the data subject, the system is configured to transmit the unique transaction ID and the unique consent receipt key back to the third party consent receipt management system for processing and/or storage. In other embodiments, the system is configured to transmit the transaction ID to a data store associated with one or more entity systems (e.g., for a particular entity on behalf of whom the third party consent receipt management system is obtaining and managing validly received consent). In further embodiments, the system is configured to transmit the unique transaction ID, the unique consent receipt key, and any other suitable information related to the validly given consent to the centralized data repository system described above for use in determining whether to store particular data and/or for assigning a unique identifier to a particular data subject for centralized data repository management purposes.

The system may be further configured to transmit a consent receipt to the data subject which may include, for example: (1) the unique transaction ID; (2) the unique consent receipt key; and/or (3) any other suitable data related to the validly provided consent. In some embodiments, the system is configured to transmit a consent receipt in any suitable format (e.g., JSON, HTML, e-mail, text, cookie, etc.). In particular embodiments, the receipt transmitted to the data subject may include a link to a subject rights portal via which the data subject may, for example: (1) view one or more provided valid consents; (2) withdraw consent; (3) etc.

Exemplary Data Subject Consent Receipt User Experience

FIGS. 40 and 41 depict exemplary screen displays that a data subject may encounter when providing consent to the processing of personal data. As shown in FIG. 40, a data subject (e.g., John Doe) may provide particular personal data (e.g., first and last name, email, company, job title, phone number, etc.) when signing up for a free trial with a particular entity via a trial signup interface 4000. As may be understood in light of this disclosure, the free trial may constitute a transaction between the data subject (e.g., user) and a particular entity providing the free trial. In various embodiments, the data subject (e.g., user) may encounter the interface shown in FIG. 40 in response to accessing a website associated with the particular entity for the free trial (e.g., a sign up page).

In particular embodiments, the interface 4000 is configured to enable the user (e.g., data subject) to provide the information required to sign up for the free trial. As shown in FIG. 40, the interface further includes a listing of particular things that the data subject is consenting to (e.g., the processing of first name, last name, work email, company, job title, and phone number) as well as one or more purposes for the processing of such data (e.g., marketing information). The interface further includes a link to a Privacy Policy that governs the use of the information.

In various embodiments, in response to the user (e.g., data subject) submitting the webform shown in FIG. 40, the system is configured to generate a consent receipt that memorializes the user's provision of the consent (e.g., by virtue of the user submitting the form). FIG. 41 depicts an exemplary consent receipt 4100 in the form of a message transmitted to the data subject (e.g., via e-mail). As shown in this figure, the consent receipt includes, for example: (1) a receipt number (e.g., a hash, key, or other unique identifier); (2) what information was processed as a result of the user's consent (e.g., first and last name, email, company, job title, phone number, etc.); (3) one or more purposes of the processing (e.g., marketing information); (4) information regarding withdrawal of consent; (5) a link to withdraw consent; and (6) a timestamp at which the system received the consent (e.g., a time at which the user submitted the form in FIG. 40). In other embodiments, the consent receipt transmitted to the user may include any other suitable information.

FIG. 42 depicts an exemplary log of consent receipts 4200 for a particular transaction (e.g., the free trial signup described above). As shown in this figure, the system is configured to maintain a database of consent receipts that includes, for example, a timestamp of each receipt, a unique key associated with each receipt, a customer ID associated with each receipt (e.g., the customer's e-mail address), etc. In particular embodiments, the centralized data repository system described above may be configured to cross-reference the database of consent receipts (e.g., or maintain the database) in response to receiving the indication that a first party system has received, stored, and/or processed personal data (e.g., via the free trial signup interface) in order to confirm that the data subject has provided valid consent prior to storing the indication of the personal data.

Exemplary Transaction Creation User Experience

FIGS. 43-54 depict exemplary user interfaces via which a user (e.g., a controller or other individual associated with a particular entity) may create a new transaction for which the system is configured to generate a new interaction interface (e.g., interface via which the system is configured to elicit and receive consent for the collection and/or processing of personal data from a data subject under the new transaction.

Figure 43:
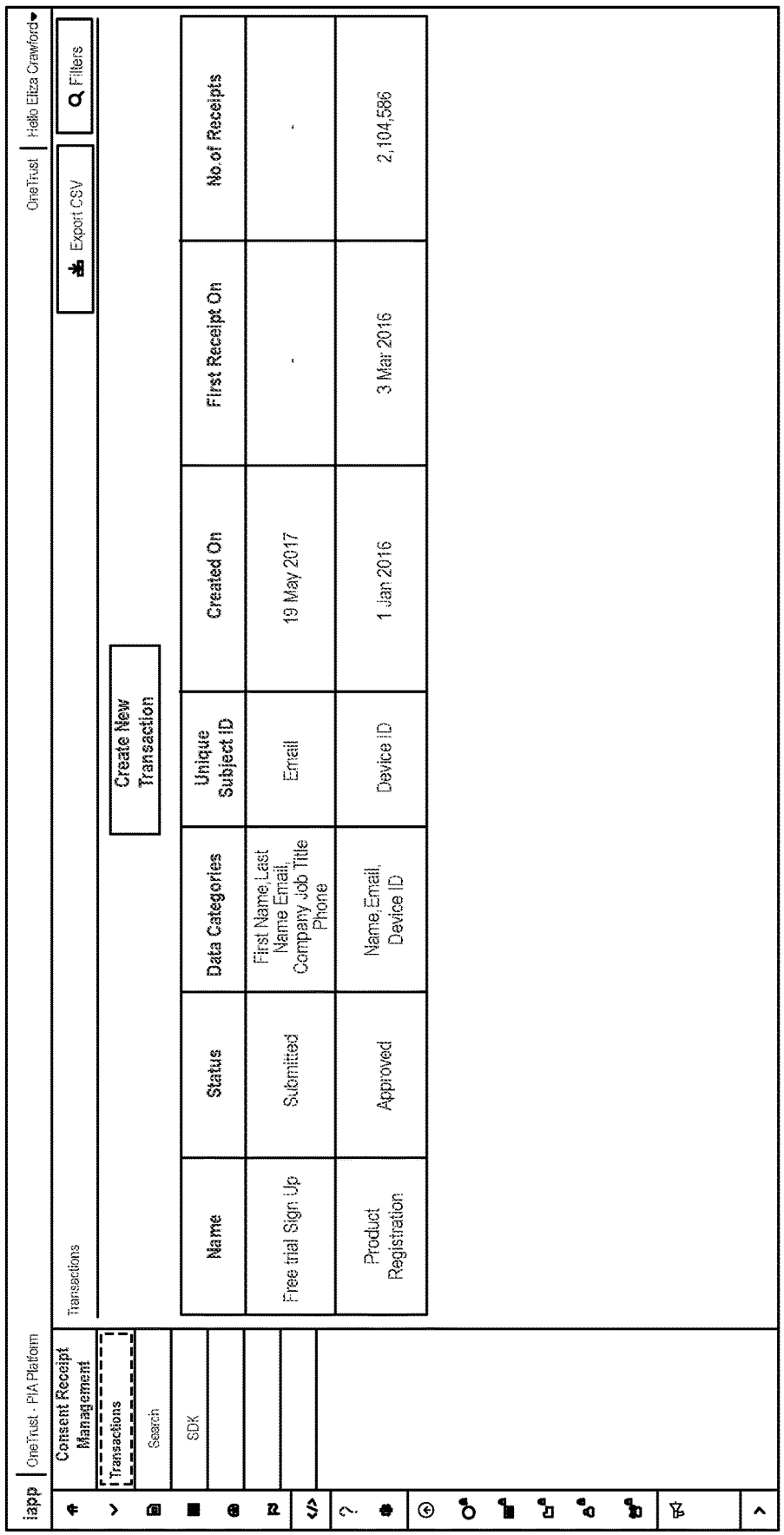

As shown in FIG. 43, the system is configured to display a dashboard of existing transactions 4300 that are associated with a particular entity. In the example shown in this figure, the dashboard includes, for example: (1) a name of each transaction; (2) a status of each transaction; (2) one or more data categories collected as part of each transaction; (3) a unique subject ID used as part of the transaction (e.g., email, device ID, etc.); (4) a creation date of each transaction; (5) a date of first consent receipt under each transaction; and (6) a total number of receipts received for each transaction. The dashboard further includes a Create New Transaction button, which a user may select in order to create a new transaction.

As may be understood in light of this disclosure, in various embodiments, the centralized data repository system described above may limit storage of personal data on behalf of a particular entity to specific personal data for which the particular entity has received consent from particular data subjects. Based on the exemplary dashboard of existing transactions shown in FIG. 43, for example, the system may be configured to not store any personal data collected, and/or processed other than in response to an indication that the data was collected through the free trial signup or product registration transaction.

Figure 44:
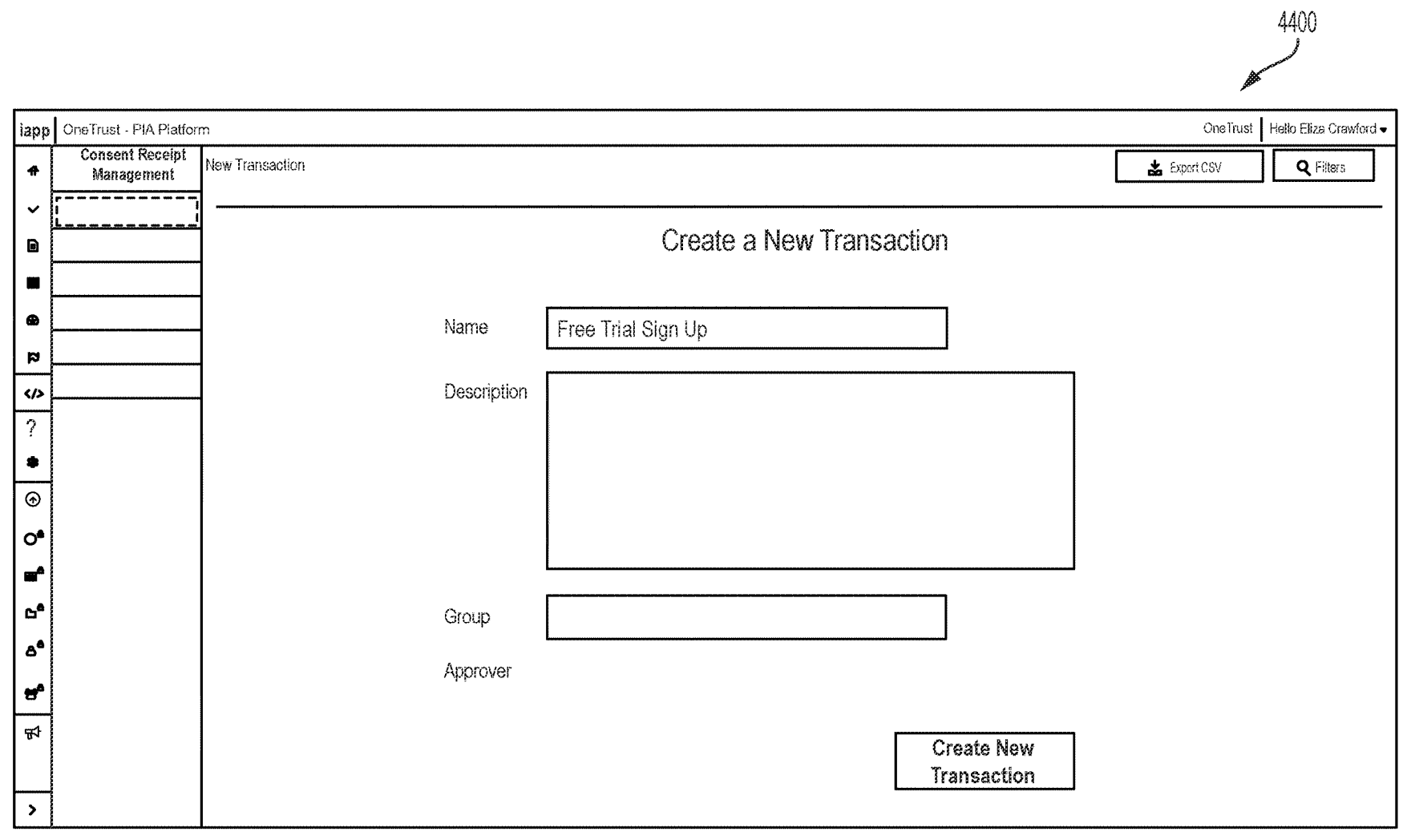

FIG. 44 depicts an interface 4400 for creating a new transaction, which a user may access, for example, by selecting the Create New Transaction button shown in FIG. 43. As may be understood from this figure, when creating a new transaction, the user may enter, via one or more text entry forms, a name of the transaction, a description of the transaction, a group associated with the transaction, and/or any other suitable information related to the new transaction.

Figure 45:
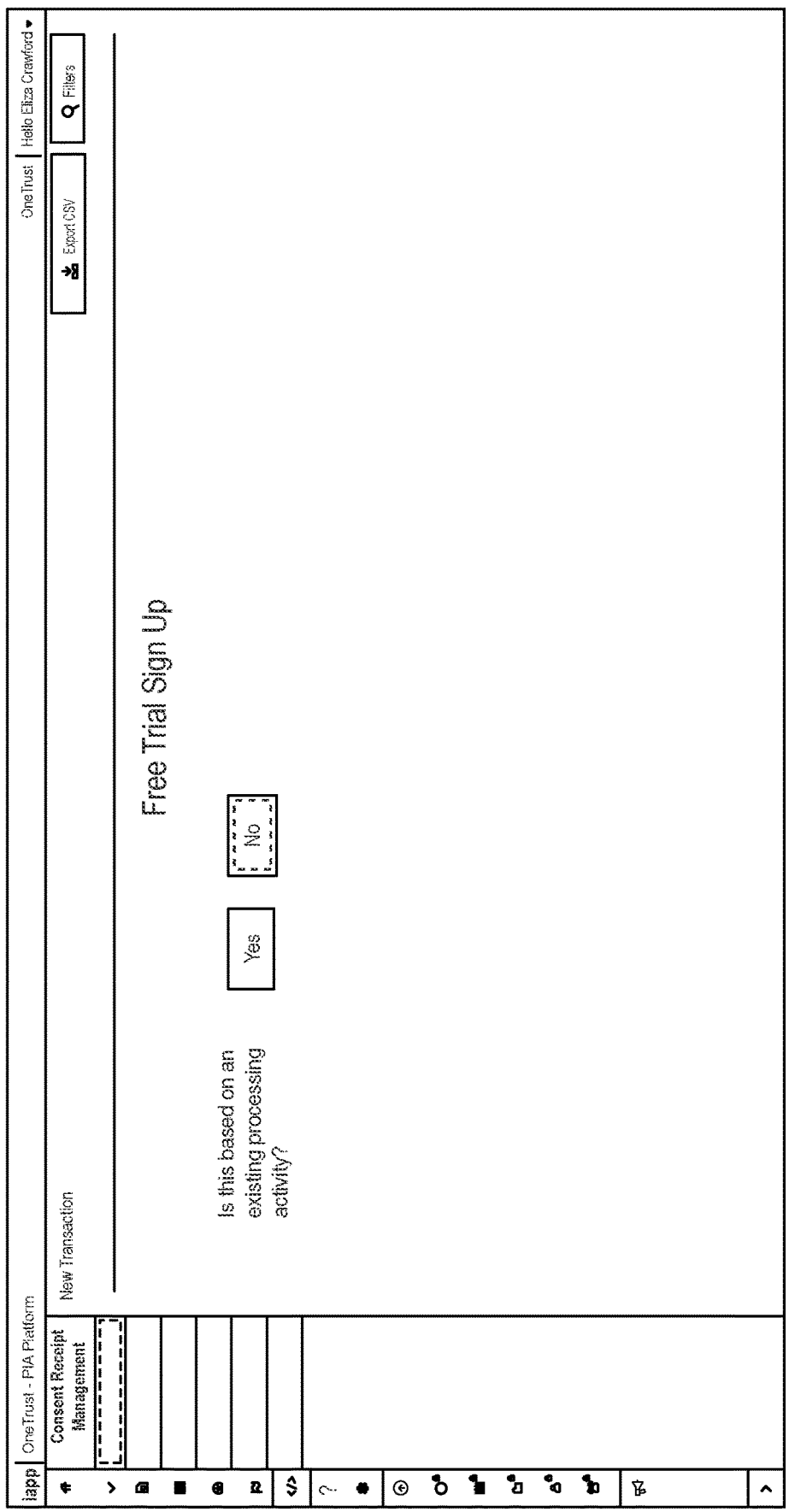

Continuing to FIG. 45, the system may be configured to prompt the user to select whether the new transaction is based on an existing processing activity. An existing processing activity may include, for example, any other suitable transaction or any other activity that involves the collection and/or processing of personal data. In response to the user selecting that the new transaction is not related to an existing processing activity (e.g., as shown in FIG. 45), the system may be configured to prompt the user, via one or more additional interfaces, to provide information regarding the new transaction.

FIGS. 47-54 depict exemplary user interfaces via which the user may provide additional information regarding the new transaction. In various embodiments, the system may be configured to prompt the user to provide the information via free-form text entry, via one or more drop down menus, by selecting one or more predefined selections, or in any suitable manner. In some embodiments, the system is configured to prompt the user to provide one or more standardized pieces of information regarding the new transaction. In other embodiments, the system is configured to enable a particular entity (e.g., organization, company, etc.) to customize one or more questions or prompts that the system displays to a user creating a new transaction.

As shown in FIG. 46, the system may, for example, prompt the user, via the user interface, to: (1) describe a process or service that the consent under the transaction relates to; (2) provide a public URL where consent is or will be collected; (3) provide information regarding how consent is being collected (e.g., via a website, application, device, paper form, etc.); (4) provide information regarding one or more data elements that will be processed based on the consent provided by the data subject (e.g., what particular personal data will be collected); and (5) provide information regarding what data elements are processed by one or more background checks (e.g., credit check and/or criminal history).

Figure 47:
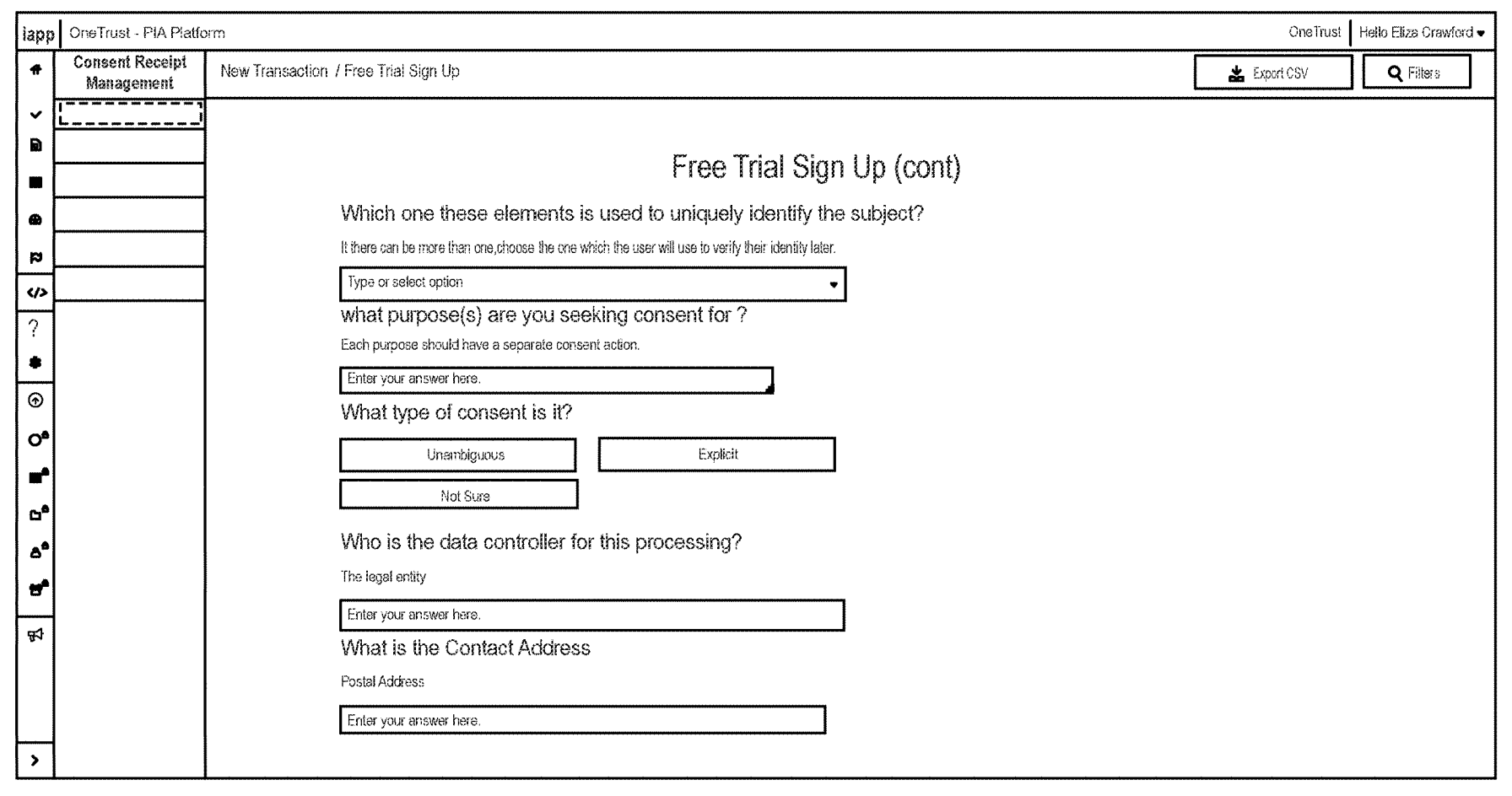

Continuing to FIG. 47, the system may be configured to prompt the user to provide data related to, for example: (1) one or more elements that will be used to uniquely identify a data subject; (2) a purpose for seeking consent; (3) what type of consent is sought (e.g., unambiguous, explicit, not sure, etc.); (4) who is the data controller in charge of the processing of the personal data (e.g., the legal entity responsible); (5) a contact address (e.g., for the data controller; (6) etc.

Figure 48:
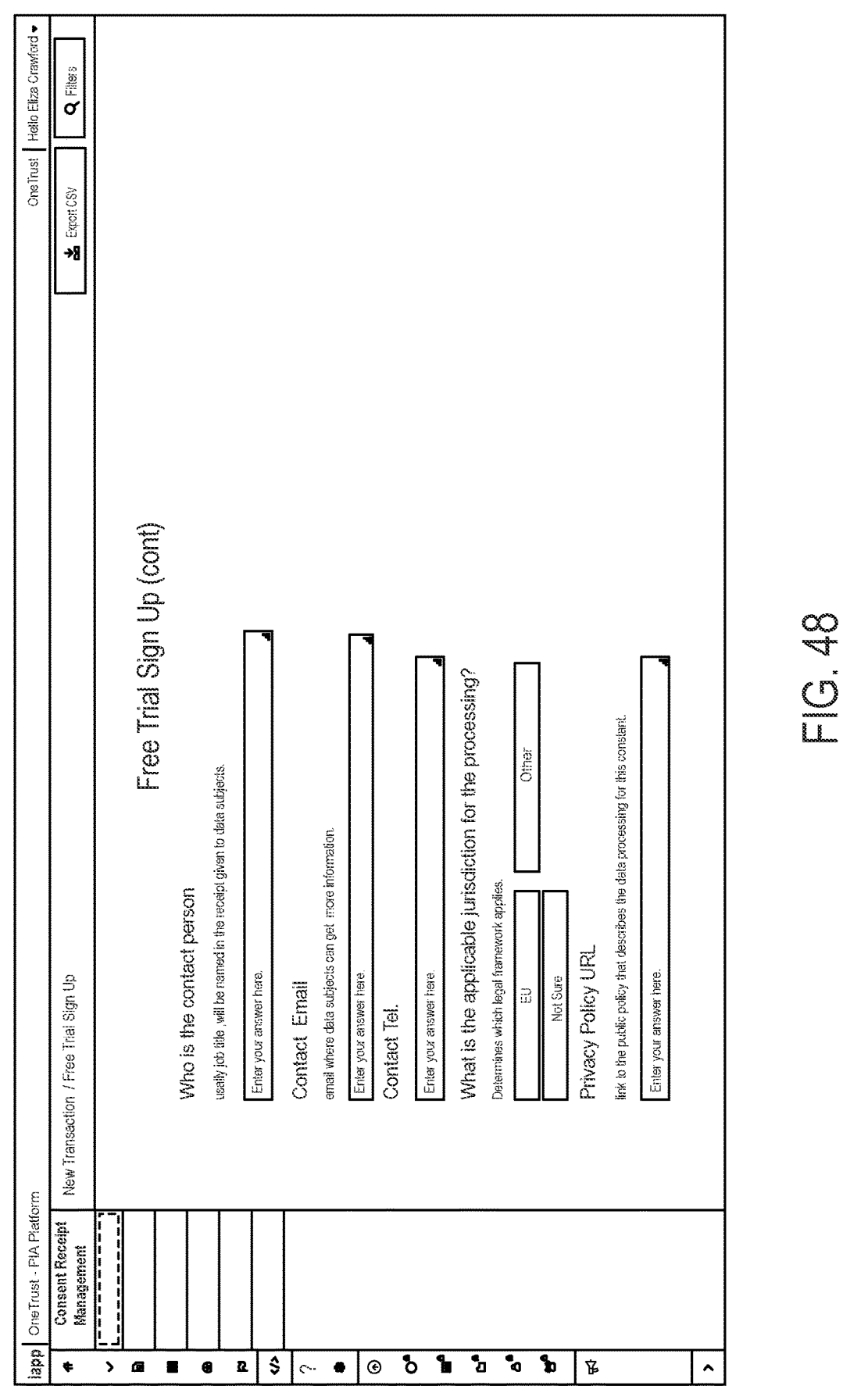

As shown in FIG. 48, the system may be further configured to prompt the user to provide data regarding, for example: (1) who the contact person is for the transaction (e.g., a job title, name, etc. of the contact person); (2) a contact email (e.g., an email address that a data subject can contact to get more information about the transaction, consent, etc.); (3) a contact telephone number (e.g., a telephone number that a data subject can contact to get more information about the transaction, consent, etc.); (4) an applicable jurisdiction for the processing (e.g., European Union, United States, Other, etc.), which may include one or more jurisdictions; (5) a URL of a privacy policy associated with the transaction; (6) etc.

Figure 50:
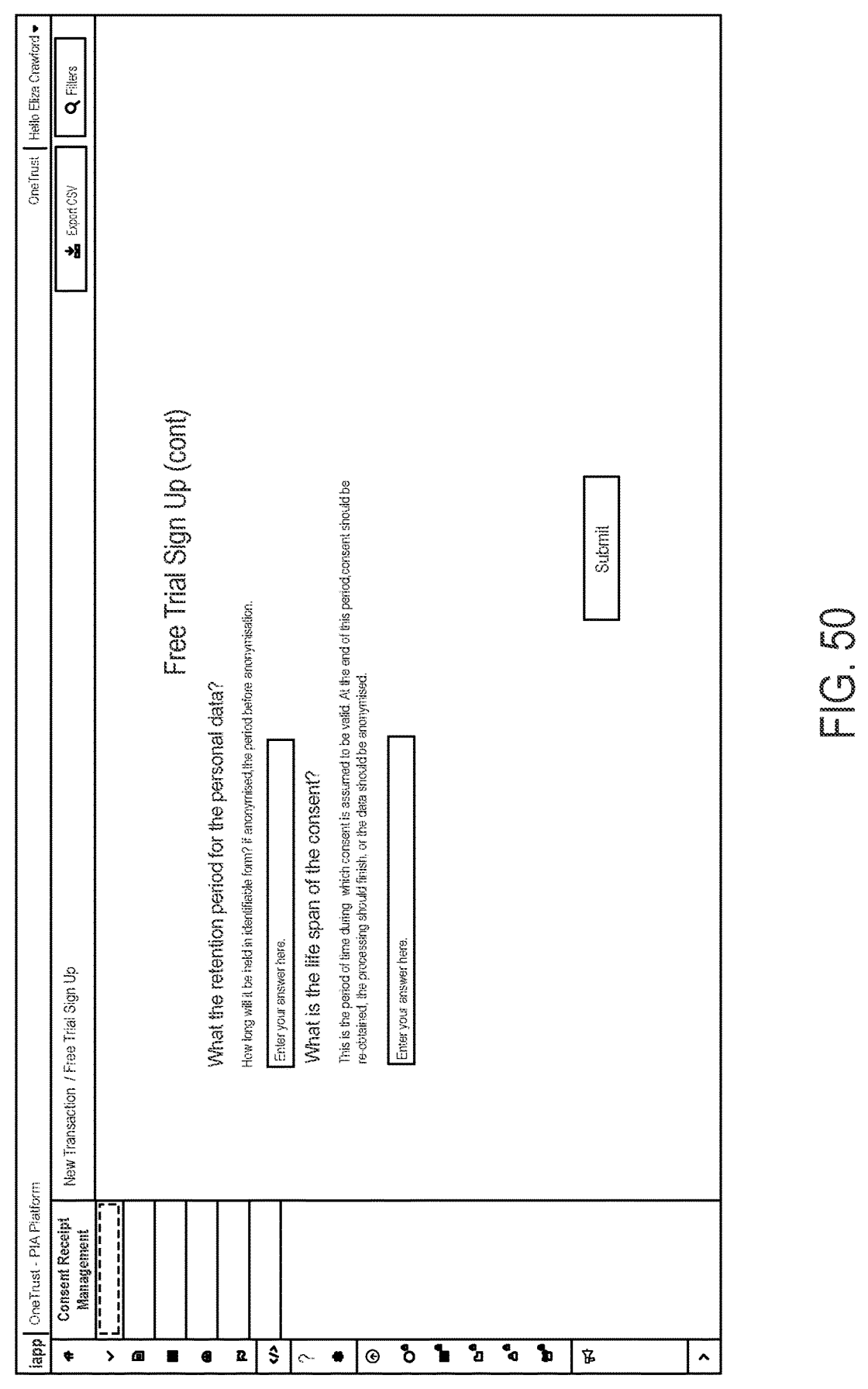

Next, as shown in FIG. 49, the system may be further configured to prompt the user to provide data regarding: (1) whether the personal data will be shared with one or more third parties; (2) a name of the one or more third parties; (3) whether the processing of the personal data will involve a transfer of the personal data outside of the original jurisdiction; (4) a listing of one or more destination countries, regions, or other jurisdictions that will be involved in any international transfer; (5) a process for a data subject to withdraw consent; (6) a URL for the withdrawal mechanism; (7) etc. FIG. 50 depicts a user interface that includes additional data prompts for the user to respond to regarding the new transaction. As shown in FIG. 50, the system may be further configured to prompt the user to provide data regarding, for example: (1) what the retention period is for the personal data (e.g., how long the personal data will be stored in identifiable form, a period before anonymization of the personal data, etc.); and/or (2) a life span of the consent (e.g., a period of time during which the consent is assumed to be valid).

Figure 51:
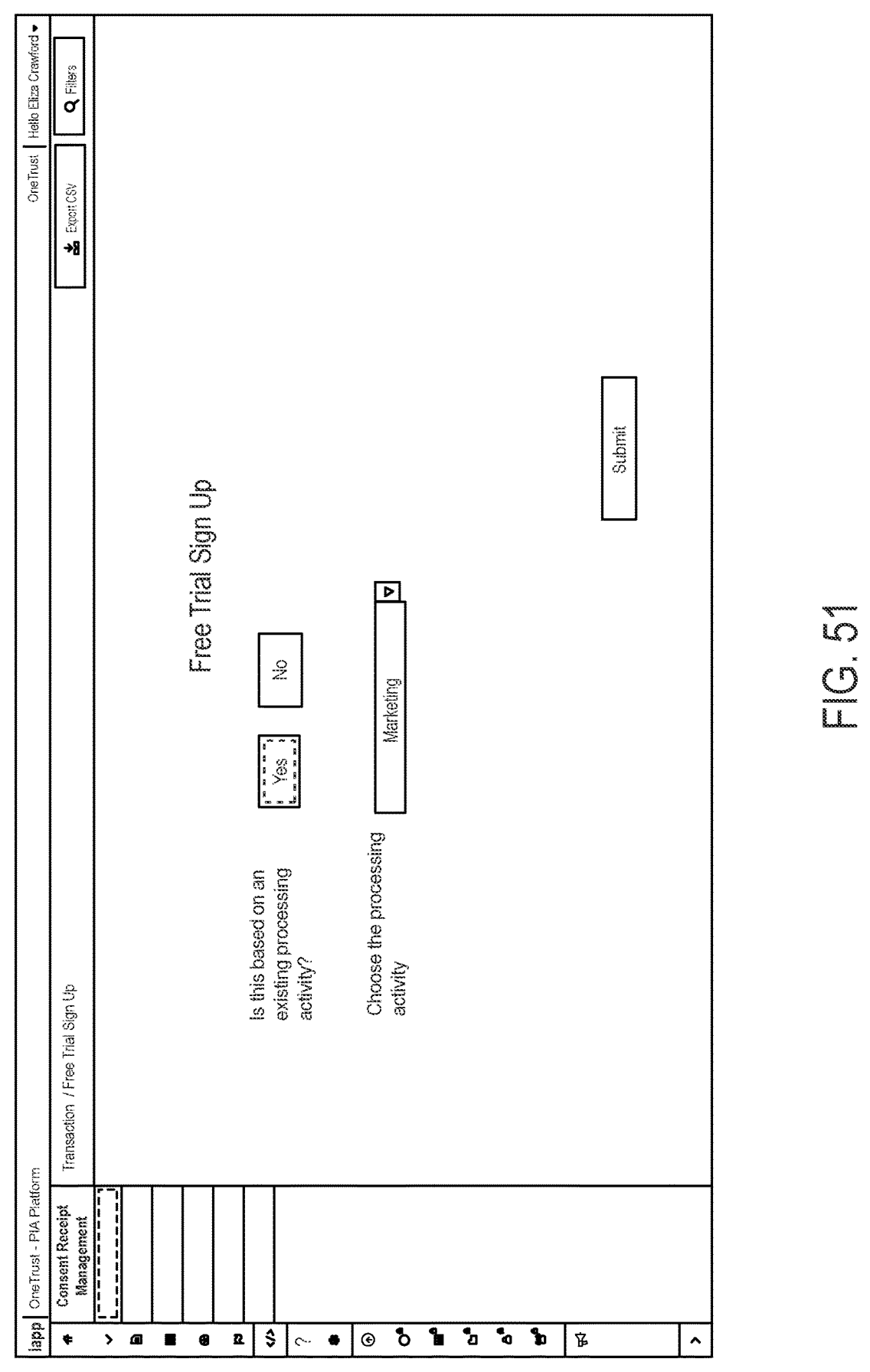

FIG. 51 shows an exemplary user interface for selecting a processing activity in response to the user indicating that the new transaction is based on an existing processing activity. The user may, for example, use a drop down menu to select a suitable existing processing activity. In particular embodiments, the system is configured to populate the drop down menu with one or more processing activities from a data model associated with the processing activity. The system may then be configured to substantially automatically populate one or more responses to the questions described above based at least in part on the data model (e.g., automatically include particular data elements collected as part of the processing activity, etc.).

Figure 52:
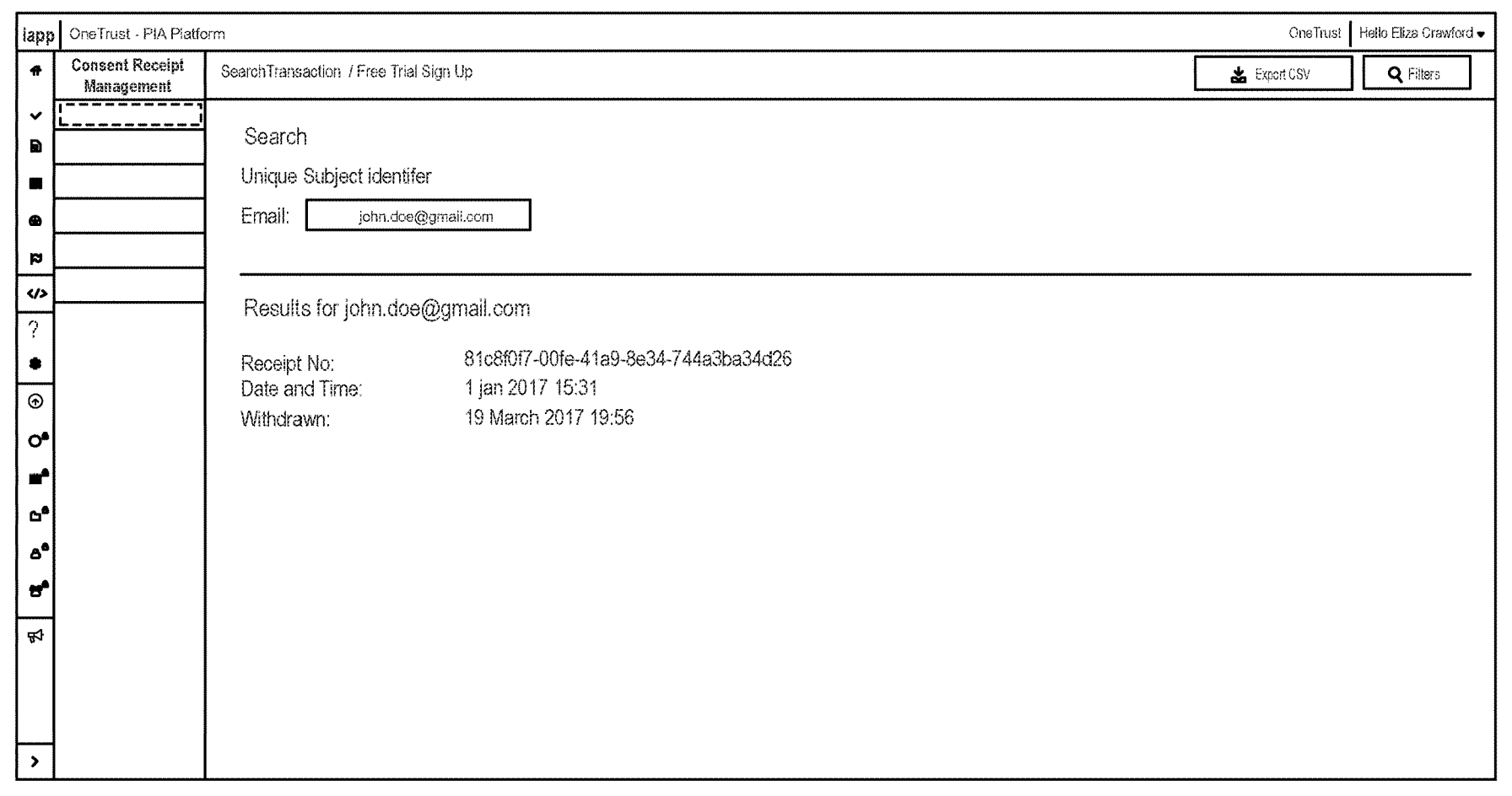

In particular embodiments, the system is further configured to enable a controller (e.g., or other user on behalf of the entity) to search for one or more consent receipts received for a particular data subject (e.g., via a unique subject identifier). FIG. 52 depicts a search for a unique subject identifier that includes an e-mail address. As shown in this figure, the unique subject identifier (e.g., john.doe@gmail.com) has one associated consent receipt having a receipt number, a receipt date and time, and a withdrawal date. FIG. 53 depicts an additional exemplary search results page indicating one or more results for consent receipts associated with the unique subject identifier of john.doe@gmail.com. As shown in this figure, the system may be configured to display a process name (e.g., transaction name), receipt number, consent date, status, withdrawal date, and other suitable information for one or more consent receipts associated with the searched for unique subject identifier.

As may be understood in light of this disclosure, in response to a user creating a new transaction, the system may be configured to generate a web form, web page, piece of computer code, etc. for the collection of consent by a data subject as part of the new transaction. FIG. 54 depicts an exemplary dashboard of consent receipt management implementation code which the system may automatically generate for the implementation of a consent receipt management system for a particular transaction. As shown in this figure, the system displays particular computer code (e.g., in one or more different programming language) that the system has generated. A user may place the generated code on a webpage or other location that the user desires to collect consent.

Repository of Application Privacy Analysis Data

An application privacy analysis system, in various embodiments, is configured to provide a data-storage repository (e.g., one or more servers, databases, etc.) for the storage of application privacy analysis data for one or more particular software applications (e.g., one or more mobile device software applications). In particular embodiments, the application privacy analysis data repository may enable the system to populate one or more data models (e.g., using one or more suitable techniques described above) substantially on-the-fly (e.g., as the system generates, collects, processes, stores, etc. application privacy analysis data regarding a particular application). In this way, in particular embodiments, the system is configured to maintain a substantially up-to-date data model for a plurality of applications (e.g., each particular application for which the system generates, collects, processes, stores, etc. application privacy analysis data). The system may then be configured to substantially automatically respond to one or more data access requests by one or more systems and devices, for example, using the substantially up-to-date data model. In particular embodiments, the system may be configured to respond to the one or more data access requests using any suitable technique described herein.

As may be understood in light of this disclosure, a particular organization may undertake a plurality of different privacy campaigns, processing activities, etc. for which data regarding the collection and storage of personal data or personal information by applications operating on data subject devices or consumer devices may be of use. Application developers may not readily or reliably provide personal data or personal information access and/or collection capability information about their applications. In some embodiments, an application privacy analysis system may analyze applications to determine the personal data and/or personal information collection capabilities of such applications. An application privacy analysis system may also analyze software applications to determine how each application accesses, requests, access to, or otherwise collects any information that may be personal and/or private to a data subject or consumer. For example, an application privacy analysis system may analyze an application to determine the device component access permissions that the application requires or requests, such as permissions to access device hardware (e.g., camera, microphone, receiver, transmitter, etc.) and/or permissions to access device data (contacts, calendar, location, photos, etc.). An application privacy analysis system may also, or instead, analyze an application to determine the device storage, if any, that the application may require and/or request access to (e.g., shared data, application database, key data, device data, etc.). The results of such analysis may be stored in a data repository. Utilizing and maintaining a data repository for application privacy analysis data may enable the system to quickly and accurately respond to requests related to mobile application privacy analysis data. In particular embodiments, the application privacy analysis repository may include one or more third party data repositories (e.g., one or more third party data repositories maintained on behalf of a particular entity that generates, collects, stores, and/or processes application privacy analysis data).

In various embodiments, an application privacy analysis system is configured to facilitate the analysis of applications (e.g., mobile device applications), the generation of application privacy analysis data, and the storage of mobile application privacy analysis data for each of a plurality of applications. In particular embodiments, the system may be configured to: (1) receive or otherwise acquire an application; (2) analyze the application to determine its privacy-related attributes; and (3) store application privacy analysis data in a suitable data format (e.g., a data model, a reference table, etc.) for later retrieval. In particular embodiments, privacy-related attributes may include device component access and/or storage permissions that an application may require or request. Privacy-related attributes may also include recipients of personal data, personal information, and/or other data collected by a software application. Privacy-related attributes may also include specific personal information, types of personal information, and/or any indicators thereof.

In particular embodiments, the system may be configured to statically analyze an application by, for example: (1) loading the application (e.g., acquiring the application software and storing it into a computer memory); (2) determining specific identifying information for the application; (3) determining whether information about the application's privacy-related attributes is available in a database; (4) if information about the application's privacy-related attributes is available in the database, using that information to determine application privacy analysis data for that application; and (5) digitally storing the application privacy analysis data in one or more suitable data stores. In particular embodiments, the system is configured to store the application privacy analysis data associated with a particular application in association with a unique application identifier. The system may store specific identifying information for an application and associate such information with the unique application identifier. The system may include the application's name, publisher, version number, serial code, any other identifying data, or any combination thereof as identifying information for the application. The system may perform searches based on such identifying information, including performing searches using hashing. The system may set and/or transmit a flag or other indicator indicating that the application should be dynamically analyzed. The system may determine to set and/or transmit such a flag based on a failure to locate the application in a database of application privacy analysis data or for any other reason.

Figure 55:
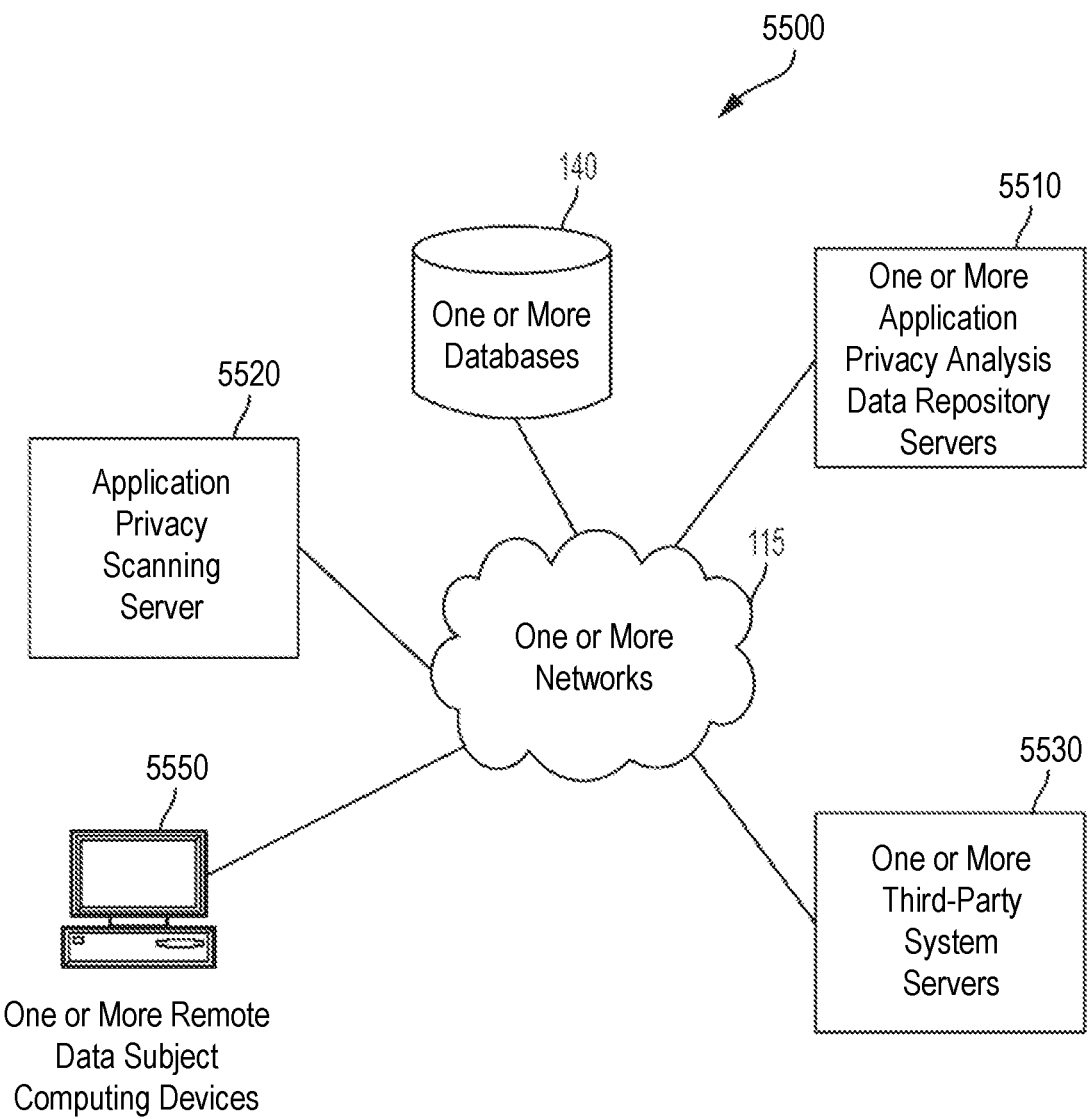
FIG. 55 depicts a schematic diagram of an application privacy analysis system according to particular embodiments of the present system.

In particular embodiments, the system may be configured to dynamically analyze an application by, for example: (1) loading the application (e.g., acquiring the application software and storing it into a computer memory); (2) executing the application and providing, as input to the application, test, or "dummy" data to initiate communications between the application and any other devices or systems; (3) inspecting communications data (e.g., network traffic) exchanged between the application and any other devices or systems; (4) determining the privacy-related attributes and/or characteristics of the inspected communications data to generate application privacy analysis data; and (5) digitally storing the application privacy analysis data in one or more suitable data stores. In particular embodiments, the system is configured to store the application privacy analysis data associated with a particular application in association with a unique application identifier. The system may store specific privacy-related attributes and/or characteristics determined based on dynamic analysis of a particular application and associate such information with the associated unique application identifier. The system may include, as such specific privacy-related attributes and/or characteristics of a dynamically analyzed application, one or more geographic locations (city, county, state, country, zip code, etc.), identities, IP addresses, MAC addresses, and/or other network addresses of other systems and devices with which the application is in communication. Specific privacy-related attributes and/or characteristics determined based on inspected communications may also include one or more types of personal data being sent to other systems and devices with which the application is in communication, as well as any information received from such other systems and devices. Specific privacy-related attributes and/or characteristics determined based on inspected communications may also include one or more types of data elements and/or one or more specific data elements exchanged with other systems and devices with which the application is in communication Exemplary Application Privacy Analysis System Architecture FIG. 55 is a block diagram of an Application Privacy Analysis System 5500 according to a particular embodiment. In various embodiments, the Application Privacy Analysis System 5500 is part of a privacy compliance system (also referred to as a privacy management system), or other system, which may, for example, be associated with a particular organization and be configured to aid in compliance with one or more laws, regulations, or policies related to the collection, transmission, and storage of personal data or personal information. In various other embodiments, the Application Privacy Analysis System 5500 is a stand-alone system that is configured to analyze software applications, such as software applications that are executed on a laptop or desktop computer or on a portable computing device such as a smartphone. Analyzed applications may be applications created by one or more third party application developers, may be provided by one or more application provider servers or other systems, and may be installed on one or more remote devices. The Application Privacy Analysis System 5500 may generate privacy-related information about the capabilities of such applications and may maintain a centralized database of privacy-related application capability information and privacy-related attributes and/or characteristics for such applications.

As may be understood from FIG. 55, the Application Privacy Analysis System 5500 includes One or More Computer Networks 115 (for example, as described herein in regard to FIG. 1), One or More Application Privacy Analysis Data Repository Servers 5510, an Application Privacy Scanning Server 5520, One or More Third Party System Servers 5530, One or More Databases 140 (for example, as described herein in regard to FIG. 1) or other data structures, and One or More Remote Data Subject Computing Devices 5550 (e.g., a smartphone, desktop computer, laptop computer, tablet computer, etc. Although in the embodiment shown in FIG. 55, the One or More Application Privacy Data Repository Servers 5510, Application Privacy Scanning Server 5520, One or More Third Party System Servers 5530, One or More Databases 140 or other data structures, and One or More Remote Data Subject Computing Devices 5550 are shown as separate entities, it should be understood that in other embodiments, one or more of these servers, computing devices, and/or entities may comprise a single server, a plurality of servers, one or more cloud-based servers, or any other suitable configuration.

In particular embodiments, the One or More Application Privacy Analysis Data Repository Servers 5510 may be configured to store information generated by the Application Privacy Scanning Server 5520, for example storing such information at One or More Databases 140. The Application Privacy Scanning Server 5520 may acquire an application from the One or More Third Party System Servers 5530 and may store, process, execute, and/or analyze such an application as described herein to generate privacy-related capability information for the application. The One or More Application Privacy Analysis Data Repository Servers 5510 and the One or More Third Party System Servers 5530 may, for example, interface via a suitable application programming interface (API), direct connection, etc. The Application Privacy Scanning Server 5520 may, alternatively, acquire an application from the One or More Remote Data Subject Computing Devices 5550 and may store, process, execute, and/or analyze such an application as described herein to generate privacy-related capability information for the application. The One or More Application Privacy Analysis Data Repository Servers 5510 and the One or More Remote Data Subject Computing Devices 5550 may, for example, interface via a suitable application programming interface, direct connection, etc. The Application Privacy Scanning Server 5520 may store generated privacy-related capability information for an application for later retrieval, for example, at the One or More Application Privacy Data Repository Servers 5510. The One or More Application Privacy Analysis Data Repository Servers 5510 and the Application Privacy Scanning Server 5520 may, for example, interface via a suitable application programming interface, direct connection, etc. In a particular embodiment, the Application Privacy Scanning Server 5520 may incorporate the One or More Application Privacy Data Repository Servers 5510.

In a particular example, the One or More Remote Data Subject Computing Devices 5550 may provide an application, or an indication of an application, configured on the One or More Remote Data Subject Computing Devices 5550, to the Application Privacy Scanning Server 5520. Alternatively, the Application Privacy Scanning Server 5520 may acquire information regarding an application via other means, such as directly from the One or More Third Party System Servers 5530 that may provide the application, and acquire the application using such information. The system may, upon retrieval or receipt of an application at the Application Privacy Scanning Server 5520, analyze the application to generate privacy-related capability information (e.g., specific privacy-related attributes and/or characteristics) for the application and transmit data representing the privacy-related capability information for the application to the One or More Application Privacy Data Repository Servers 5510. The One or More Application Privacy Analysis Data Repository Servers 5510 may process such data and/or may store such data in a centralized data storage location (e.g., at the One or More Databases 140, the One or More Application Privacy Data Repository Servers 5510, etc.).

Exemplary Application Privacy Analysis System

Figure 56:
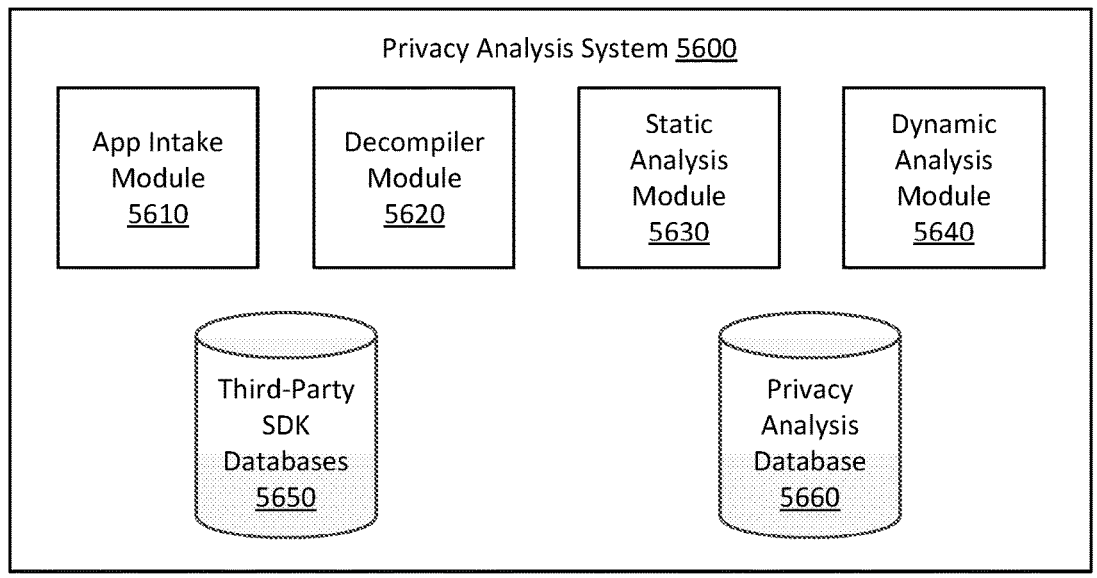
FIG. 56 depicts a schematic diagram of an application privacy analysis system according to particular embodiments of the present system.

FIG. 56 is a block diagram of an exemplary Application Privacy Analysis System 5600 according to a particular embodiment. Note that the functions, modules, and components of the Application Privacy Analysis System 5600 may be implemented in conjunction with, encompassing, or as part of any other disclosed systems and devices, such as the Application Privacy Analysis System 5500. The Application Privacy Analysis System 5600 may be part of a privacy compliance system (also referred to as a privacy management system), or other system, which may, for example, be associated with a particular organization and be configured to aid in compliance with one or more laws, regulations, and/or policies related to the collection, transmission, and storage of personal data and/or personal information. In various other embodiments, the Application Privacy Analysis System 5600 may be a stand-alone system that is configured to analyze applications created by one or more third party application developer and/or provider servers or other systems and installed on one or more remote devices, generate privacy-related information about the capabilities of such applications (e.g., determine privacy-related attributes and/or characteristics of such applications), and maintain a centralized database of privacy-related application capability information.

The Application Privacy Analysis System 5600 may have an App Intake Module 5610 that may load or otherwise prepare a software application (e.g., a mobile device application or other software application) for analysis and/or execution. The Application Privacy Analysis System 5600 may acquire an application from a third-party system that hosts, generates, or otherwise provides the application. The Application Privacy Analysis System 5600 may use identifying information about an application that it obtained from a data subject computing device or a consumer computing device to acquire the application from a third-party system that hosts, generates, or otherwise provides the application. In an alternative embodiment, the Application Privacy Analysis System 5600 may acquire an application from a data subject computing device or a consumer computing device itself.

The Application Privacy Analysis System 5600 may include a Decompiler Module 5620 that may deconstruct an acquired application for analysis. The Decompiler Module 5620 can reduce the application to source code, assembly language, machine code, and/or some other interpretation of the functions of the application, or an approximation thereof. The Application Privacy Analysis System 5600 may have a Static Analysis Module 5630 that may use the output of the Decompiler Module 5620 to perform analysis of the application based on the application code or the approximation of the application code. The Static Analysis Module 5630 scans the application code for various privacy-related attributes and/or characteristics. For example, the Static Analysis Module 5630 may scan the application code to determine whether the application collects, requests, or otherwise attempts to access personal data and/or personal information.

The Static Analysis Module 5630 may also, or instead, scan the application code to determine whether and how the code may use permissions to gain access to one or more device components (e.g., access to a camera, microphone, contacts, calendar, photographs, location, etc.) and device storage (e.g., encrypted storage, unencrypted storage, an application database, key/chain and/or other authentication information (e.g., private key information, public key information, blockchain information, etc.), any storage that may be configured with personal data and/or personal information, storage preferences, etc.). The Static Analysis Module 5630 may also scan the application code to determine whether and how the code may share application-generated data or data subject computing device originated data (e.g., personal information) with other remote and or local entities (e.g., other applications, other systems, web services, etc.). Where any data is shared, the Static Analysis Module 5630 also attempts to determine where such data is being sent. For example, the Static Analysis Module 5630 may determine a geographical destination location, such as a city, county, state, country, zip code, etc. Alternatively, or in the process of determining a geographical destination, the Static Analysis Module 5630 may determine a destination network address, such as an IP addresses, a MAC address, other network address, network identifier, etc. Upon determining a destination network address for data shared by the application, the system may use that network address to determine a geographical location, for example, by using network look-up techniques that associate network addresses with geographical locations.

In various embodiments, the Static Analysis Module 5630 may scan the application code to determine any application programming interface (API) calls that are made by the code. The system may analyze such API calls to determine the mobile application's access to, and use of, various privacy-related attributes and/or characteristics. For example, the Static Analysis Module 5630 may analyze the API calls to determine whether the application collects, requests, or otherwise attempts to access personal data and/or personal information, the permissions the application requests and/or has been granted, the data that the application has access to on the mobile device, the components or hardware which the application has access, etc.

In various embodiments, the Application Privacy Analysis System 5600 may use a determined geographical destination of shared data to determine potentially applicable privacy laws and regulations. For example, the Application Privacy Analysis System 5600 may determine that data is being sent to Europe and may then determine that the GDPR is applicable to this data transfer. In another example, the Application Privacy Analysis System 5600 may determine that data is being sent to California and may then determine that the California Consumer Privacy Act (CCPA) is applicable to this data transfer. The Application Privacy Analysis System 5600 may also, or instead, use a location of the mobile device executing the application to determine applicable laws and regulations. The system, based on a location of the mobile device executing the application and/or a destination of data being transmitted by the application, may take corresponding actions and generated records related to privacy law and regulation compliance as described herein.

In an embodiment, the Application Privacy Analysis System 5600 may have a Dynamic Analysis Module 5640 that may perform analysis of the application as the application executes. The Dynamic Analysis Module 5640 inspects the communications data and metadata (e.g., network traffic) transmitted and received by the application for privacy-related attributes and/or characteristics. For example, the Dynamic Analysis Module 5640 may inspect communications data and metadata originating from the application and/or directed to the application to determine whether this data includes any personal data or personal information. The Dynamic Analysis Module 5640 may also inspect the communications data and metadata to determine whether such data indicates how device storage is accessed and protected (e.g., encrypted storage, unencrypted storage, an application database, key/chain and/or other authentication information (e.g., private key information, public key information, blockchain information, etc.), storage preferences, etc.). The Dynamic Analysis Module 5640 may also inspect the communications data and metadata to determine whether and how the application is sharing application-generated data or data subject computing device originated data with other remote and or local entities (e.g., other applications, other systems, web services, etc.). The Dynamic Analysis Module 5640 may also determine where any shared data is being sent (e.g., a destination geographical location, such as a city, county, state, country, zip code, etc., and/or a network destination, such as an IP addresses, a MAC addresses, other network address, network identifier, etc.). The Dynamic Analysis Module 5640 may also determine whether and how any data elements are being used based on the communications data. To perform this dynamic analysis, the Dynamic Analysis Module 5640 may feed data (e.g., "dummy" data) to the application as it executes the application and analyzes the output of the application using any of various means, such as network and device diagnostic tools, traffic sniffers, traffic analysis tools, etc.

In an embodiment, the Application Privacy Analysis System 5600 may have, or may access, one or more Third-Party Software Development Kit (SDK) Databases 5650 that contain information about known development tools that may have been used to develop the application under analysis. Such Third-Party SDK Databases 5650 may also, or instead, contain information about the application itself. The Application Privacy Analysis System 5600 may determine a source for the SDK, such as a platform, creator, or provider of the SDK (e.g., FACEBOOK, GOOGLE, etc.) Upon determining or obtaining identifying information about the application under analysis, the Application Privacy Analysis System 5600 may use such information to query the Third-Party SDK Databases 5650 for privacy-related information about the application. The Application Privacy Analysis System 5600 may perform such one or more queries during static analysis, dynamic analysis, or both. For example, either or both of the Static Analysis Module 5630 and the Dynamic Analysis Module 5640 may query the Third-Party SDK Databases 5650 for privacy-related information about the application under analysis. In a particular embodiment, the Static Analysis Module 5630 may query the Third-Party SDK Databases 5650 for privacy-related information about the application under analysis and, based upon the results of such one or more queries, the Static Analysis Module 5630 may set a flag or provide some other indication that the Dynamic Analysis Module 5640 should analyze the application.

In an embodiment, the Application Privacy Analysis System 5600 may have, or may access, a Privacy Analysis Database 5660 in which it may store the results of the analysis of the application. The Application Privacy Analysis System 5600 may store all, or any subset of, results of the analyses performed by either or both of the Static Analysis Module 5630 and the Dynamic Analysis Module 5640, any related data, and any representations and indications of such results and data at the Privacy Analysis Database 5660. In a particular embodiment, the Application Privacy Analysis System 5600 generates one or more scores associated with the risk, privacy characteristic, and/or reputation of an application that it has analyzed. In another embodiment, the Application Privacy Analysis System 5600 generates one or more recommendations associated with the risk, privacy characteristic, and/or reputation of an application that it has analyzed. Such scores and recommendations may also be stored at the Privacy Analysis Database 5660.

The system may present a score for an application and may present rankings of multiple scores and respective applications, for example, using a graphical user interface, to allow a user to view the relative privacy assessments of several applications on one interface. The system may highlight or color code such rankings to indicate application privacy capabilities and risk. For example, an application that obtains a high-risk score (e.g., collects and transmits personal data, attempts to modify storage) may be highlighted in bright red and/or listed above lower risk applications, while an application that has a low risk score (e.g., does not access personal data, does not request permission to modify storage) may be highlighted in green and/or listed below higher risk applications.

Exemplary Static Privacy Analysis System

Figure 57:
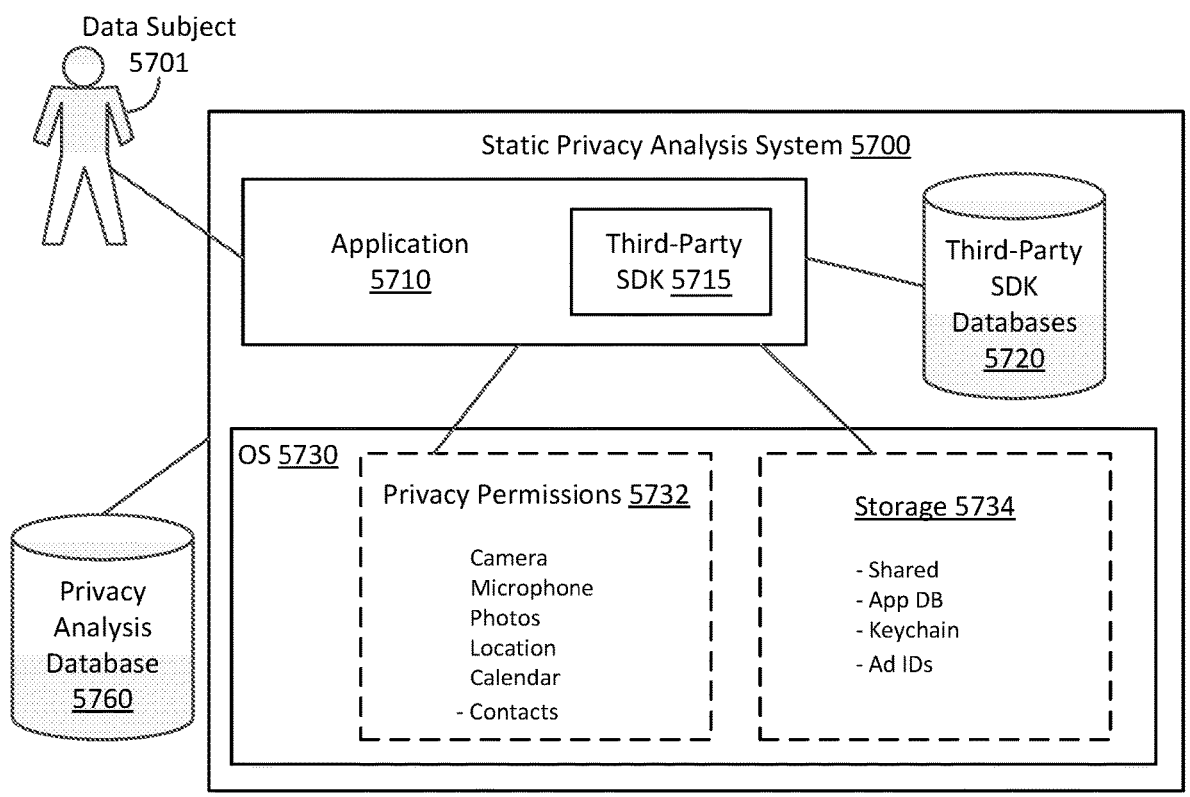
FIG. 57 depicts a schematic diagram of a static application privacy analysis system according to particular embodiments of the present system.

A more detailed static privacy analysis system example will now be described. FIG. 57 is a block diagram of a Static Privacy Analysis System 5700 according to a particular embodiment. Note that the functions, modules, and components of the Static Privacy Analysis System 5700 may be implemented in conjunction with, encompassing, or as part of any other disclosed systems and devices, such as the Application Privacy Analysis System 5500 and the Application Privacy Analysis System 5600. In various embodiments, the Static Privacy Analysis System 5700 is part of a privacy compliance system (also referred to as a privacy management system), or other system, which may, for example, be associated with a particular organization and be configured to aid in compliance with one or more legal or industry regulations related to the collection, transmission, and storage of personal data. In various other embodiments, the Static Privacy Analysis System 5700 is a stand-alone system that is configured to analyze applications created by one or more third party application developer and/or provider servers or other systems and installed on one or more remote devices, generate privacy-related information about the capabilities of such applications, and maintain a centralized database of privacy-related application capability information.

The Static Privacy Analysis System 5700 may analyze an Application 5710, which may be, in an example, a decompiled Application 5710. The decompiled Application 5710 may include application source code, associated assembly language, associated machine code, or any other interpretation of the functions, inputs, and outputs of the application 5710, or any approximation thereof. The Static Privacy Analysis System 5700 may also analyze a Third-Party SDK 5715 used to generate Application 5710. The Static Privacy Analysis System 5700 may determine one or more Third-Party SDKs 5715 used to generate Application 5710 by using identifying information for Application 5710 to query Third-Party SDK Databases 5720, for example, as described herein in regard to other embodiments.

The Static Privacy Analysis System 5700 scans the application 5710 and Third-Party SDK 5715 for various privacy-related functions, attributes, and characteristics. For example, the Static Privacy Analysis System 5700 may determine, based on the decompiled Application 5710, whether the application 5710 references any personal data or personal information. The Static Privacy Analysis System 5700 also determines how application 5710 and Third-Party SDK 5715 interact with an Operating System (OS) 5730. In a particular embodiment, OS 5730 may be any operating system that may be used on a computing device, such as any computing device of any Data Subject 5701. For example, OS 5730 may be an OS of a smartphone, desktop computer, laptop computer, tablet computer, etc.

The Static Privacy Analysis System 5700 scans the application 5710 and Third-Party SDK 5715 for to determine whether and how the application 5710 and Third-Party SDK 5715 may use or access Device Component Privacy Permissions 5732 (e.g., permissions for access to a camera, microphone, photographs, location, calendar, contacts, etc.) and Device Storage 5734 (e.g., shared storage, an application database, key/chain and/or other authentication information (e.g., private key information, public key information, blockchain information, etc.), advertising identifiers and related settings, encrypted storage, unencrypted storage, storage preferences, etc.). The Static Analysis Module 5700 may also scan the application 5710 and Third-Party SDK 5715 to determine whether and how the application may call, or be configured as, an "open into" application that executes within another application (e.g., allowing the application to operate under the permissions of another application). The Static Analysis Module 5700 may also analyze API calls made by the application 5710 and/or Third-Party SDKs 5715 to determine any access to, and use of, various privacy-related attributes and/or characteristics.

In various embodiments, the Static Analysis Module 5700 may also analyze API calls made by the application 5710 and/or Third-Party SDKs 5715, the permissions requested and/or granted to the application 5710 and/or Third-Party SDKs 5715, and any other portions of the application 5710 and/or Third-Party SDKs 5715 to determine whether and to where any data may be transmitted by the application 5710. The system may use this geographical information to determine the applicable laws and regulation and take corresponding actions as described herein.

In a particular embodiment, the Static Privacy Analysis System 5700 may determine, based on the results of the analysis of the application 5710 and Third-Party SDK 5715, that the application requires additional analysis, for example, dynamic privacy analysis. In such an embodiment, the Static Privacy Analysis System 5700 may set a flag or provide some other indication to a privacy analysis system or module that dynamic privacy analysis is needed for the application.

In an embodiment, the Static Privacy Analysis System 5700 may have, or may access, a Privacy Analysis Database 5760 in which it may store the results of the static analysis of the application. The Static Privacy Analysis System 5700 may store all, or any subset of, results of its analysis, data elements used by Application 5710, any related data, and any representations and indications of such results and data at the Privacy Analysis Database 5760. In a particular embodiment, the Static Privacy Analysis System 5700 generates one or more scores associated with the risk, privacy characteristic, and/or reputation of an application that it has analyzed. In another embodiment, the Static Privacy Analysis System 5700 generates one or more recommendations associated with the risk, privacy characteristic, and/or reputation of an application that it has analyzed. Such scores and recommendations may also be stored at the Privacy Analysis Database 5760.

The system may present a score or recommendation for an application based on the analysis performed by the Static Privacy Analysis System 5700, and may present rankings of multiple scores/recommendations and respective applications, for example, using a graphical user interface, to allow a user to view the relative privacy assessments of several applications on one interface. The system may highlight or color code such rankings to indicate application privacy capabilities and risk. For example, an application that obtains a high risk score (e.g., collects and transmits personal data, attempts to modify storage) may be highlighted in bright red and/or listed above lower risk applications, while an application that has a low risk score (e.g., does not access personal data, does not request permission to modify storage) may be highlighted in green and/or listed below higher risk applications.

Exemplary Dynamic Privacy Analysis System

Figure 58:
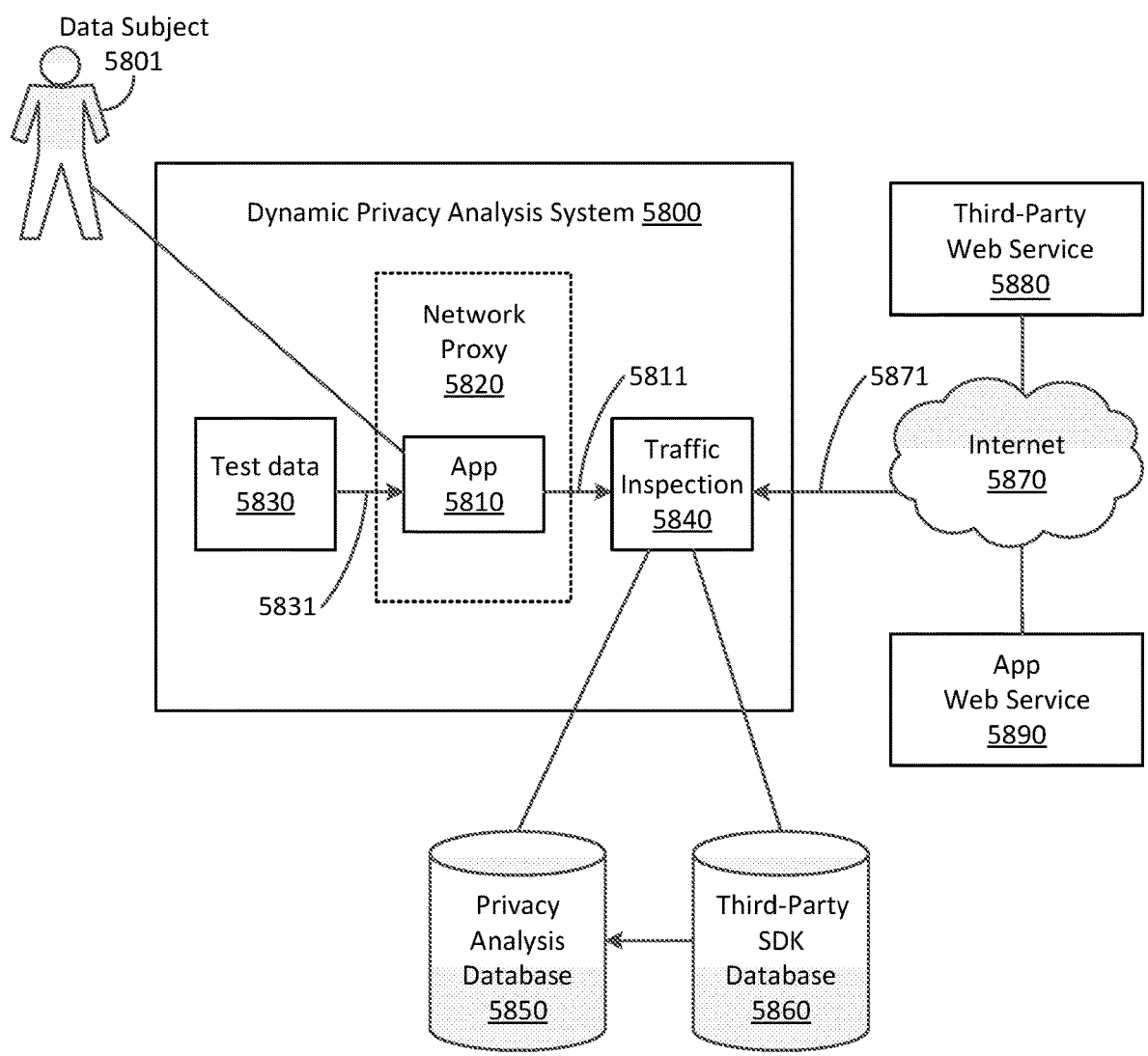
FIG. 58 depicts a schematic diagram of a dynamic application privacy analysis system according to particular embodiments of the present system.

A more detailed dynamic privacy analysis system example will now be described. FIG. 58 is a block diagram of a Dynamic Privacy Analysis System 5800 according to a particular embodiment. Note that the functions, modules, and components of the Dynamic Privacy Analysis System 5800 may be implemented in conjunction with, encompassing, or as part of any other disclosed systems and devices, such as the Application Privacy Analysis System 5500 and the Application Privacy Analysis System 5600. In various embodiments, the Dynamic Privacy Analysis System 5800 is part of a privacy compliance system (also referred to as a privacy management system), or other system, which may, for example, be associated with a particular organization and be configured to aid in compliance with one or more laws, regulations, and/or policies related to the collection, transmission, and storage of personal data. In various other embodiments, the Dynamic Privacy Analysis System 5800 is a stand-alone system that is configured to analyze applications created by one or more third party application developer and/or provider servers or other systems and installed on one or more remote devices, generate privacy-related information about the capabilities of such applications, and maintain a centralized database of privacy-related application capability information.

In an embodiment, the Dynamic Privacy Analysis System 5800 may analyze an Application 5810 by executing the application and providing Test Data 5830 (e.g., "dummy data") as input 5831 to Application 5810. Test Data 5830 may simulate data associated with a data subject, such as Data Subject 5801. Test Data may include any personal data or personal information (e.g., first name and last name, first initial and last name, credit card number, bank account number, other financial account number, social security number, phone number, address, etc.) Application 5810 may be executed using a Network Proxy 5820 and output from the Application 5810 may be inspected using a Traffic Inspection Module 5840. Traffic Inspection Module 5840 may be any network or device diagnostic tool, such as a traffic sniffer, a traffic analysis tool, etc.

The Dynamic Privacy Analysis System 5800 inspects the communications data and metadata (e.g., network traffic) generated as output 5811 by the application 5810 and communications data and metadata 5871 received by, or directed to, the application 5810 for privacy-related data and attributes. For example, the Dynamic Privacy Analysis System 5800 may inspect output 5811 and communications data and metadata 5871 to determine whether this data includes any personal data or personal information. The Dynamic Privacy Analysis System 5800 may further inspect output 5811 and communications data and metadata 5871 to determine whether this data indicates whether and how device component permissions are set on a data subject computing device (e.g., permissions for access to a camera, microphone, contacts, calendar, photographs, location, etc.). The Dynamic Privacy Analysis System 5800 may also inspect the communications data and metadata to determine whether such data indicates how device storage is accessed and protected (e.g., encrypted storage, unencrypted storage, an application database, key/chain and/or other authentication information, storage preferences, etc.).

In a particular embodiment, the Dynamic Privacy Analysis System 5800 may inspect output 5811 and/or communications data and/or metadata 5871, for example being exchanged via Internet 5870, to determine whether and how the application is sharing application-generated data or data subject computing device originated data (e.g., personal data) with other remote and/or local entities (e.g., other applications, other systems, web services, etc.). For example, the Dynamic Privacy Analysis System 5800 may determine whether traffic from the Application 5810 is being sent to and/or received from Third-Party Web Service 5880 and/or being sent to and/or received from Application Web Service 5890. Either or both of the Third-Party Web Service 5880 and the Application Web Service 5890 may be associated with Application 5810. The Dynamic Privacy Analysis System 5800 may also determine where any shared data is being exchanged with the Application 5810 (e.g., a destination geographical location, such as a city, county, state, country, zip code, etc., and/or a network destination, such as an IP addresses, a MAC addresses, other network address, network identifier, etc.). The Dynamic Privacy Analysis System 5800 may also determine whether and how any data elements are being used based on the communications data.

In various embodiments, upon determining a geographical or jurisdictional destination for output 5811 and/or communications data and metadata 5871, the Dynamic Privacy Analysis System 5800 may use this geographical information to determine the applicable laws and regulation and take corresponding actions as described herein.

In a particular embodiment, the Dynamic Privacy Analysis System 5800 scans the application 5810 to determine information that the Dynamic Privacy Analysis System 5800 can use to query a Third-Party SDK Database 5860 to identify any one or more Third-Party SDKs that may have been used to generate the Application 5810. The Dynamic Privacy Analysis System 5800 can then use such SDK-related information to determine how to more effectively analyze communications data and metadata exchanged by the Application 5810. The Dynamic Privacy Analysis System 5800 may also analyze the communications data and metadata exchanged by the Application 5810 to determine whether and how the Application 5810 may call, or be configured as, an "open into" application that executes within another application (e.g., allowing the application to operate under the permissions of another application).

In an embodiment, the Dynamic Privacy Analysis System 5800 may have, or may access, a Privacy Analysis Database 5850 in which it may store the results of the static analysis of the application. The Dynamic Privacy Analysis System 5800 may store all, or any subset of, results of its analysis, data elements used by Application 5810, any related data, and any representations and indications of such results and data in the Privacy Analysis Database 5850. In a particular embodiment, Dynamic Privacy Analysis System 5800 generates one or more scores associated with the risk, privacy characteristic, and/or reputation of an application that it has analyzed. In another embodiment, the Dynamic Privacy Analysis System 5800 generates one or more recommendations associated with the risk, privacy characteristic, and/or reputation of an application that it has analyzed. Such scores and recommendations may also be stored at the Privacy Analysis Database 5850.

The system may present a score or recommendation for an application based on the analysis performed by the Dynamic Privacy Analysis System 5800, and may present rankings of multiple scores/recommendations and respective applications, for example, using a graphical user interface, to allow a user to view the relative privacy assessments of several applications on one interface. The system may highlight or color code such rankings to indicate application privacy capabilities and risk. For example, an application that obtains a high risk score (e.g., collects and transmits personal data, attempts to modify storage) may be highlighted in bright red and/or listed above lower risk applications, while an application that has a low risk score (e.g., does not access personal data, does not request permission to modify storage) may be highlighted in green and/or listed below higher risk applications.

Privacy Analysis Module

Figure 59:
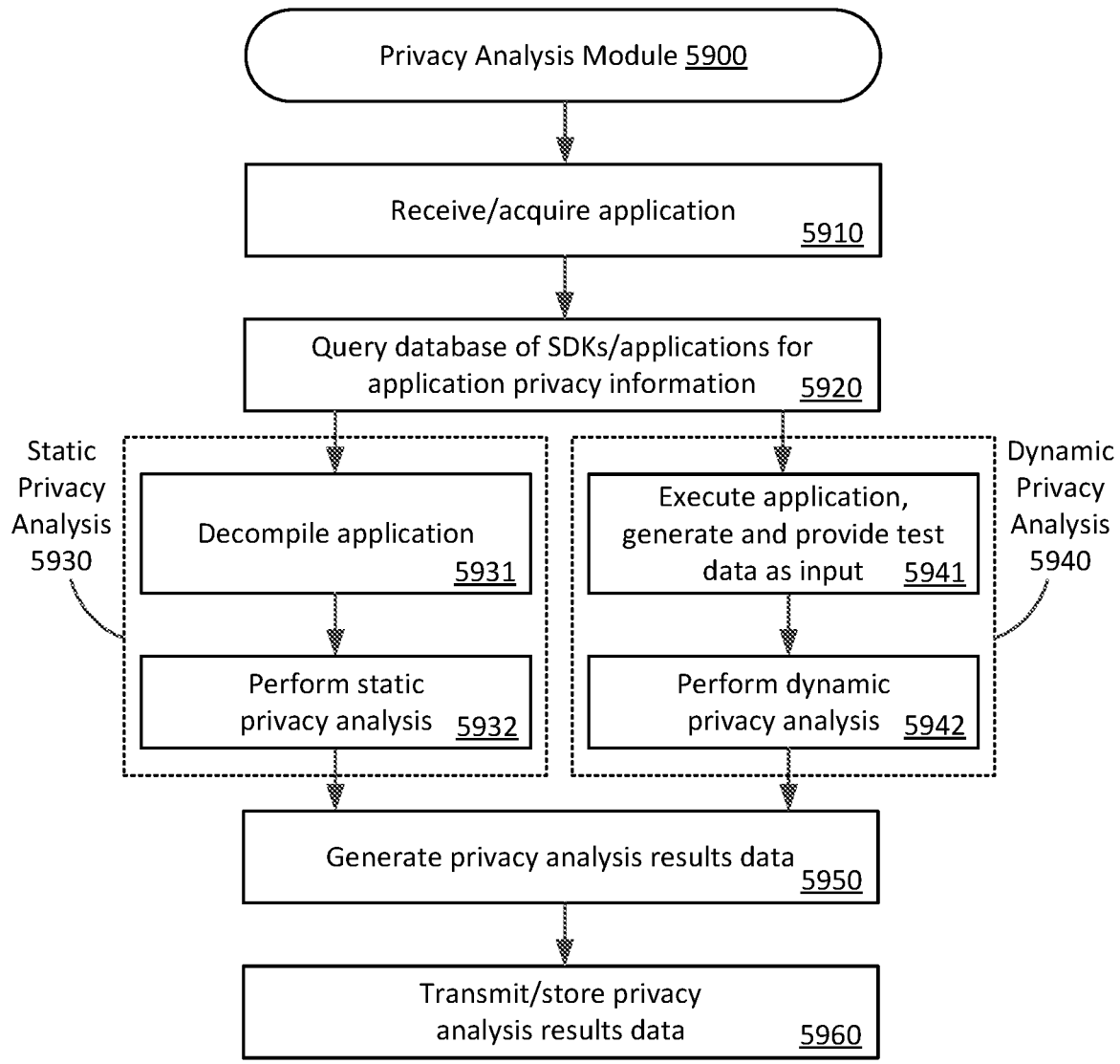
FIG. 59 is a flowchart showing an example of a process performed by a Privacy Analysis Module according to various embodiments.

FIG. 59 depicts a Privacy Analysis Module 5900 according to a particular embodiment. Various functionality of the Application Privacy Analysis System 5500, the Application Privacy Analysis System 5600, the Static Privacy Analysis System 5700, and the Dynamic Privacy Analysis System 5800 may be implemented via a Privacy Analysis Module 5900. The system, when executing certain steps of the Privacy Analysis Module 5900, may be configured to analyze applications created by one or more third party application developer and/or provider servers or other systems and installed on one or more remote devices, generate privacy-related information about the capabilities of such applications, and generate and maintain a centralized database of privacy-related application capability information. In particular embodiments, the system may be configured to index the privacy-related application capability information within the central repository by application function, application developer, application owner, or any other criteria.

A privacy analysis system, when executing the Privacy Analysis Module 5900, begins, at Step 5910, by receiving or acquiring an application (e.g., a mobile device application) for analysis. The Privacy Analysis Module 5900 may request an application from an application developer or provider, or from a data subject computing device, and may receive the application via any means. In particular embodiments, the Privacy Analysis Module 5900 may receive an instruction or request to perform privacy analysis on an application and may responsively acquire or request the application from a third-party application developer or provider system. The Privacy Analysis Module 5900, or any system operating such a module, can use identifying information about an application that it obtained from a data subject computing device or a consumer computing device to acquire the application from the third-party system that hosts, generates, or otherwise provides the application. In an alternative embodiment, the Privacy Analysis Module 5900 may acquire an application from a data subject computing device or a consumer computing device itself.

At Step 5920, the Privacy Analysis Module 5900 may have, or may access, one or more Third-Party SDK Databases that contain information about known development tools that may have been used to develop the application under analysis. Such Third-Party SDK Databases may also, or instead, contain information about the application itself. Upon determining or obtaining identifying information about the application under analysis, for example, at Step 5910, the Privacy Analysis Module 5900 may use such information to query the Third-Party SDK Databases for privacy-related information about the application. The Privacy Analysis Module 5900 may perform such one or more queries prior to, during, or after performing the steps of Static Privacy Analysis 5930, Dynamic Privacy Analysis 5940, or both. For example, before, during, or after performing either or both of Static Privacy Analysis 5930 and Dynamic Privacy Analysis 5940, the Privacy Analysis Module 5900 may query the Third-Party SDK Databases for privacy-related information about the application under analysis. Information obtained at Step 5920 may be used to facilitate either or both of Static Privacy Analysis 5930 and Dynamic Privacy Analysis 5940.

In an embodiment, the Privacy Analysis Module 5900 may perform Static Privacy Analysis 5930, by, at Step 5931, decompiling the application under analysis. The Privacy Analysis Module 5900 may deconstruct the application for analysis by reducing the application to source code, assembly language, machine code, or some other interpretation of the functions of the application, or an approximation thereof. At Step 5932, the Privacy Analysis Module 5900 performs static analysis of the application based on the decompiled application code or the approximation of the decompiled application code. Such static analysis may include the Privacy Analysis Module 5900 scanning the application code for various privacy-related functions and attributes. For example, the Privacy Analysis Module 5900 may scan the application code to determine whether and how the code may reference, access, collect, transmit, receive, and/or manipulate any personal data or personal information. The Privacy Analysis Module 5900 may also scan the application code to determine whether and how the code may use permissions to access device components (e.g., access to a camera, microphone, contacts, calendar, photographs, location, etc.) and device storage (e.g., encrypted storage, unencrypted storage, an application database, key/chain and/or other authentication information, storage preferences, etc.). The Privacy Analysis Module 5900 may also scan the application code to determine whether any API calls are made and how those call interact with the executing device and its associated storage, components, permissions, and any data located therein.

The Privacy Analysis Module 5900 may also scan the application code to determine whether and how the code may share application-generated data or data subject computing device originated data with other remote and or local entities (e.g., other applications, other systems, web services, etc.). Where the Privacy Analysis Module 5900 determines that data is shared, the Privacy Analysis Module 5900 attempts to determine where such data is being sent (e.g., a destination geographical location, such as a city, county, state, country, zip code, etc., and/or a network destination, such as an IP addresses, a MAC addresses, other network address, network identifier, etc.) The Privacy Analysis Module 5900 may use destination geographical information to determine the applicable laws and regulation and take corresponding actions as described herein.

In a particular embodiment, the Privacy Analysis Module 5900 may set a flag or provide some other indication that a dynamic analysis should be performed for the application, for example, based upon the results of the analysis of Step 5932 and/or based on results of queries made to Third-Party SDK Databases for privacy-related information about the application under analysis.

In an embodiment, the Privacy Analysis Module 5900 may perform Dynamic Privacy Analysis 5940, by, at Step 5941, executing the application and providing it test data (e.g., "dummy" input traffic"). The Privacy Analysis Module 5900, at Step 5942, inspects the communications data and metadata (e.g., network traffic) transmitted and received by the application for privacy-related data and attributes (e.g., personal information). For example, the Privacy Analysis Module 5900 may inspect the communications data and metadata to determine whether such data includes any personal data or personal information. The Privacy Analysis Module 5900 may also inspect the communications data and metadata to determine whether this data indicates whether and how device component access permissions are set on a data subject computing device (e.g., permissions for access to a camera, microphone, contacts, calendar, photographs, location, etc.). The Privacy Analysis Module 5900 may also inspect the communications data and metadata to determine whether such data indicates how device storage is accessed and protected (e.g., encrypted storage, unencrypted storage, an application database, key/chain and/or other authentication information, storage preferences, etc.). The Privacy Analysis Module 5900 may also inspect the communications data and metadata to determine whether and how the application is sharing application-generated data or data subject computing device originated data with other remote and or local entities (e.g., other applications, other systems, web services, etc.). The Privacy Analysis Module 5900 may also determine where any shared data is being sent (e.g., a destination geographical location, such as a city, county, state, country, zip code, etc., and/or a network destination, such as an IP addresses, a MAC addresses, other network address, network identifier, etc.). The Privacy Analysis Module 5900 may also determine whether and how any data elements are being used based on the communications data. In performing this dynamic analysis, the Privacy Analysis Module 5900 analyze the output of the application using any of various means, such as network and device diagnostic tools, traffic sniffers, traffic analysis tools, etc.

The Privacy Analysis Module 5900, at Step 5950, may generate privacy analysis data based on one or both of Static Privacy Analysis 5930 and Dynamic Privacy Analysis 5940.

In a particular embodiment, the Privacy Analysis Module 5900 may generate one or more scores associated with the risk, privacy characteristic, and/or reputation of an application that it has analyzed. In another embodiment, the Privacy Analysis Module 5900 may generate one or more recommendations associated with the risk, privacy characteristic, and/or reputation of an application that it has analyzed.

At Step 5960, the Privacy Analysis Module 5900 may store the results of its analysis of the application and any associated data, such as scores and recommendations based on the analysis. The Privacy Analysis Module 5900 may store all, or any subset of, the results of the Static Privacy Analysis 5930 and Dynamic Privacy Analysis 5940, any related data, and any representations and indications of such results and data at a privacy analysis database. Such a privacy analysis database may be any database or other storage device or system, whether local, remote, first-party, third-party, etc.

Further at Step 5960, the system may present a score or recommendation for an application based on the analysis performed by the Privacy Analysis Module 5900, and may present rankings of multiple scores/recommendations and respective applications, for example, using a graphical user interface, to allow a user to view the relative privacy assessments of several applications on one interface. The system may highlight or color code such rankings to indicate application privacy capabilities and risk. For example, an application that obtains a high-risk score (e.g., collects and transmits personal data, attempts to modify storage) may be highlighted in bright red and/or listed above lower risk applications, while an application that has a low-risk score (e.g., does not access personal data, does not request permission to modify storage) may be highlighted in green and/or listed below higher risk applications.

SDK Discovery and Assessment System

To ensure compliance with privacy regulations and/or standards, an entity may take one or more steps to determine the privacy and/or security impact of data and/or software installed on computing devices that the entity may control and/or interact with. For example, an entity may interact with and/or engage in the use of various types of tracking tools (e.g., cookies). Tracking tools may make collect and/or process privacy-related data (e.g., personal data, PII, etc.). Tracking tools may also, or instead, perform functions that have privacy implications, such as tracking a user's activities, location, etc. In various embodiments, the disclosed systems may analyze and assess (e.g., score, categorize, etc.) data and/or applications installed on a mobile device based on various privacy-related criteria and/or security-related criteria. In particular embodiments, the system may identify one or more particular software development kits (SDKs) used to develop a mobile application and apply the disclosed privacy and/or security assessment techniques to the identified one or more SDKs.

In various embodiments, the system may identify one or more software development kits (SDKs) configured on a mobile device and/or used to generate an application configured on the mobile device. Using natural language processing (NLP) artificial intelligence techniques, the system may generate a tokenized name for the SDK that includes tokens representing the vendor of the SDK and various functions performed by applications generated using the SDK. The system may determine scores for one or more such tokens and determine a privacy category or score for the SDK based on the token scores. The security and privacy impact of the particular identified SDK may be assessed based, at least in part, on one or more privacy and security impact determinations (e.g., scores, categorization, etc.) associated with the SDK and/or the SDK vendor.

In various embodiments, the system is configured to generate, access, and/or maintain a database of SDK and vendor information (e.g., an SDK and vendor information database or a third-party SDK database) that may include, but is not limited to: (1) SDK identifying information (e.g., package name); (2) vendor information for one or more SDKs; (3) privacy and/or security information (e.g., assessments, categorizations, scores, etc.) for one or more SDKs; (4) privacy and/or security information (e.g., assessments, categorizations, scores, etc.) for one or more functions of one or more SDKs; and (5) privacy and/or security information (e.g., assessments, categorizations, scores, etc.) for one or more vendors. Once a particular SDK is identified, the system may use this database to generate a privacy and/or security assessment of the identified SDK.

In various embodiments, the system is configured to identify one or more SDKs configured on a mobile device (e.g., Android-based mobile device, iPhone, etc.) by scanning one or more folders (e.g., all folders) on the mobile device for information that may be used to identify an SDK that may be configured on the mobile device. In scanning the mobile device, the system may identify one or more software packages (e.g., one or more software files, one or more collections of software files, individual software files, etc.) configured on the mobile device. In particular embodiments, the system may determine a name associated with one or more packages configured on the mobile device. The system may use regular expression (RegEx) searching techniques to search one or more databases (e.g., an SDK and vendor information database or a third-party SDK database) to cross-reference the names (or any portion of a name) of each such identified package with one or more known SDK packages. If the system determines that the name of an identified package corresponds to one or more known SDK packages, the system may determine that that particular identified package is a valid SDK package. If the system is unable to cross-reference the name of an identified package to one or more known SDK packages, the system may determine that that particular identified package is not a valid SDK package. The system may record this determination in an SDK and vendor information database for future reference.

The system may "tokenize" the name of a particular identified package, for example using NLP. In various embodiments, SDK package names may have a structure such as the following exemplary structure:

<common_term>.<vendor_name>.<functionality>.<functionality>
. . .

where: (1) "common term" may be a term such as "com," "io," "net," etc.; (2) "vendor_name" may identify a vendor with terms such as "FACEBOOK," "GOOGLE," "ADOBE," etc.; and (3) "functionality" may identify particular functionality with terms such as "auth," "ads," "internal," "core," etc. Each package name may have multiple functionality terms (e.g., <common_term>.<vendor_name>.<functionality>. <functionality>) to allow the indication of multiple functionalities associated with a particular SDK package.

The system may use a model to calculate a score for each of the SDK categories with which the particular identified package may be associated using the tokenized name of the package. In various embodiments, the system may remove or ignore the <common_term> portion of the tokenized name in performing the scoring and/or categorization determinations described herein. In particular embodiments, the SDK categories may include categories such as advertisements, analytics, location, utilities, development tools, targeting, functional, etc. The system may identify a respective category for each identified <functionality> term based, at least in part, on a listing of one or more <functionality> terms and a corresponding SDK category for each term in the listing of <functionality> terms. In particular embodiments, such a functionality term categorization table may be stored in a database (e.g., an SDK and vendor information database or a third-party SDK database) and may have been generated for use by the system and/or by a third party as described herein.

In various embodiments, the system may assign a particular identified package to a particular (e.g., privacy) category that is associated with the highest scoring <functionality> term among the <functionality> terms in its tokenized package name. For example, if a particular identified package has functionality terms corresponding to the categories X, Y, and Z having respective SDK category scores of 10, 20 and 30 (e.g., category X has a score of 10, category Y has a score of 20, and category Z has a score of 30), the system will assign the category of Z to the identified package because Z's associated SDK category score is the highest of those associated with the identified package's functionality tokens. The system may also, or instead, assign or otherwise use the determined category score as a privacy risk score and/or a privacy assessment score for the package (e.g., assign a score of 30 to the package) and/or in calculating a privacy risk score and/or a privacy assessment score for the package.

In particular embodiments, the system may also apply weighting factors in the scoring process by adding a weight to key tokens or terms from each category. The system may then assign a particular identified package to a particular (e.g., privacy) category based on the score for the highest scoring weighted category associated with the particular identified package. For example, if a particular identified package has functionality terms corresponding to the categories P, Q, and R, with respective SDK category scores of 10, 20 and 30, but Q is weighted by 30 and the other categories are not, (e.g., category P has a weighted score of 10, category Q has a weighted score of 50, and category R has a weighted score of 30), the system will assign the category of Q to the identified package because Q's weighted SDK category score is the highest of those associated with the identified package's functionality tokens. The system may also, or instead, assign or otherwise use the determined weighted category score as a privacy risk score and/or a privacy assessment score for the package (e.g., assign a score of 50 to the package) and/or in calculating a privacy risk score and/or a privacy assessment score for the package.

In an illustrative example, the system may identify an SDK package with the name "io.segment.analytics.internal." The system may then determine this SDK package name include the <functionality> terms "analytics" and "internal." Based on these identified <functionality> terms and, in particular embodiments, reference to a functionality term categorization table, the system may determine that "analytics" is associated with the Targeting SDK category and "internal" is associated with the Functional SDK category. The system may then further determine (e.g., using a functionality term categorization table) that, within the Targeting SDK category, the term "analytics" is a key (e.g., weighted) token, while within the Functional SDK category, the term "internal" is not a key (e.g., not weighted) token. Therefore, based on this determination, the system may assign the category Targeting and/or the score associated with the Targeting SDK category to this SDK package because the term "analytics" is a key token within the Targeting SDK category (and not assign the classification and/or score associated with the Functional SDK category because the term "internal" is not a key token within the Functional SDK category).

In various embodiments, the system may determine that a category score for a particular identified package is inconclusive. For example, the system may be unable to determine a category associated with a particular identified package because none of the functionality tokens in the tokenized package name have assigned scores (e.g., in a functionality term categorization table or listing). The system may represent an inconclusive score as a null value or other value that the system is configured to recognize as an inconclusive score (e.g., "0," "–1"). In this case, the system may use the <vendor_name> from the tokenized package name to identify a vendor associated with the particular identified package. For example, the system may query a vendor database (e.g., an SDK and vendor information database) using the vendor name token to identify a particular vendor associated with the vendor name token. The system may then determine a category and/or generate a vendor score for the particular identified package based on that vendor information by, in particular embodiments, querying a vendor term categorization table that may be stored on an SDK and vendor information database using the vendor name token. In particular embodiments, the system may access a vendor term categorization table to determine a category for a vendor and/or a vendor score based on a vendor's name and/or other information. A vendor term categorization table may be stored in a database (e.g., an SDK and vendor information database or a third-party SDK database) and may have been generated for use by the system and/or by a third party as described herein.

In various embodiments, the system may determine a category score for a particular SDK as well as a vendor score based on vendor information. The system may then use the vendor score to determine, at least in part, an overall score for the particular identified package. In particular embodiments, the system may determine an overall score for the particular identified package based on a combination of a vendor score and a category score using a formula or algorithm and, in some examples, other available information. In other particular embodiments, the system may determine an overall score for the particular identified package based on only one of a vendor score or a category score. The system may then assign this score as a privacy risk score and/or privacy assessment score to the SDK and/or may use this score to determine a (e.g., privacy) category for the SDK. The system may also, or instead, use this overall score to determine a (e.g., privacy) category for the SDK.

Figure 60:
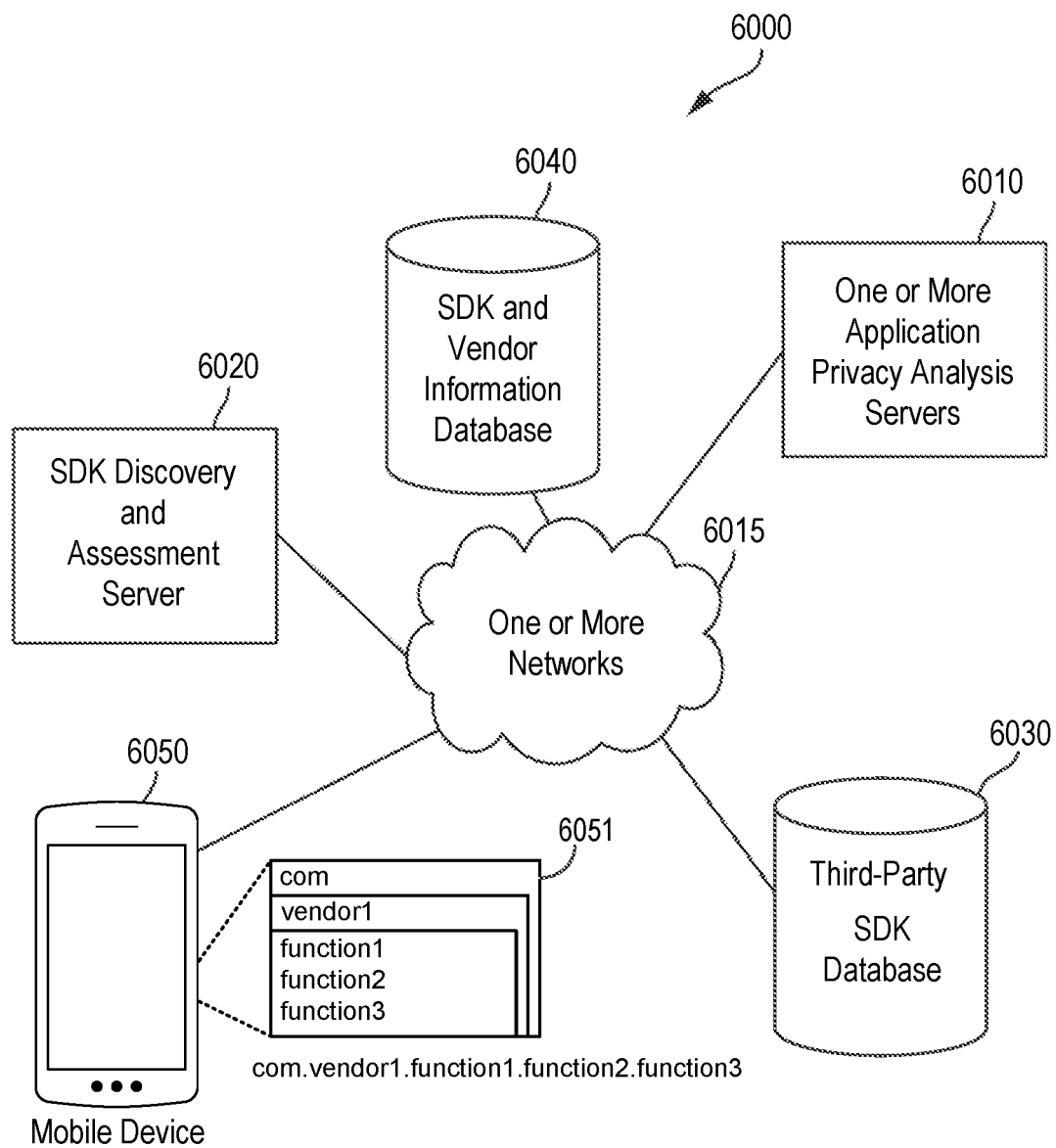
FIG. 60 depicts a schematic diagram of an SDK discovery and assessment system according to various embodiments.

A more detailed SDK discovery and assessment system example will now be described. FIG. 60 depicts an exemplary system 6000 for discovering and assessing one or more SDKs configured on a mobile device. In various embodiments, the SDK discovery and assessment server 6020 may be configured to communicate (e.g., wirelessly and/or using a wired connection) with the mobile device 6050. In particular embodiments, the mobile device 6050 may be an Android-based mobile device, while in other embodiments the mobile device 6050 may be any other type of mobile device using any other operating system software (e.g., iPhone).

The SDK discovery and assessment server 6020 may scan the mobile device 6050 to identify one or more files that may be SDK packages. For example, the SDK discovery and assessment server 6020 may scan each folder configured to store files on the mobile device 6050 to identify the names of each file stored in each such folder. The system may use any means of scanning and/or searching the files on the mobile device 6050, including accessing the mobile device 6050 using an API to perform a filename search or using operating system features configured on the mobile device 6050 to locate and identify files configured on mobile device 6050. In various embodiments, the SDK discovery and assessment server 6020 may undertake SDK package scanning and analysis in response to one or more instructions received from the one or more applications privacy analysis servers 6010, which may be performing one or more privacy analysis functions (e.g., as described herein) related to the mobile device 6050 and/or software configured thereon. In various embodiments, a privacy analysis system (e.g., the privacy analysis system 5600) may integrate one or more of the SDK package scanning and analysis functions disclosed herein. For example, SDK package scanning and analysis functions may be performed as part of, or in coordination with, any of the static analysis functions and/or dynamic analysis functions described above.

The SDK discovery and assessment server 6020 may identify one or more software packages (e.g., one or more software files, one or more collections of software files, individual software files, etc.) configured on the mobile device 6050. In particular embodiments, the system may determine a name associated with one or more packages configured on the mobile device 6050 by evaluating the file structure within which each such package may be stored. For example, as illustrated in FIG. 60, the system may identify a "com" package located in folders 6051 that is associated with "vendor1" and has the functions "function1," "function2," and "function3." The SDK discovery and assessment server 6020 may search (e.g., using RegEx and/or other searching techniques) the SDK and vendor information database 6040 and/or the third-party SDK database 6030 to cross-reference the identified package names (or any portion of the name) with one or more known SDK packages. If the SDK discovery and assessment server 6020 determines that the name of the identified package corresponds to one or more known SDK packages, the system may determine that that particular identified package is a valid SDK package. If the SDK discovery and assessment server 6020 is unable to cross-reference the name of the identified package to one or more known SDK packages, the system may determine that that particular identified package is not a valid SDK package. The system may record this determination in the SDK and vendor information database 6040 and/or provide the information to the one or more applications privacy analysis servers 6010 for future reference.

The SDK discovery and assessment server 6020 may tokenize the name of the identified package using NLP. In this particular example, the identified package name may be tokenized as "com.vendor1.function1.function2.function3," where "com" represents a common system term associated with the package and/or its file system location, "vendor1" is an identifier of the vendor associated with the package, and each of "function1," "function2," and "function3" identify particular functionality of the package.

The SDK discovery and assessment server 6020 may categorize the identified package based on its associated functions by querying a functionality term categorization table to determine a category associated with one or more of the functionality terms in the package's tokenized name. In performing this categorization, the SDK discovery and assessment server 6020 may ignore or remove the common term in the tokenized package name. In various embodiments, the system may use a table (e.g., a functionality term categorization table) to identify the category associated with each functionality term. Such a table may be generated and/or stored at a system such as the SDK and vendor information database 6040 and/or the third-party SDK database 6030. Table 1 shown below is an illustrative example of a functionality term categorization table.

TABLE 1

| Functionality term | Category | Score | Weight | Key term? |
|---|---|---|---|---|
| function1 | Targeting | 10 | 20 | Yes |
| function2 | Functional | 20 | 0 | No |
| function3 | Location | 15 | 5 | Yes |

The SDK discovery and assessment server 6020 may associate the categories associated with each functional term of the tokenize package name with the package. In the current example, the SDK discovery and assessment server 6020 may determine that the "com.vendor1.function1.function2.function3" package is associated with the "Targeting," "Functional," and "Location" categories based on the associations of its functional terms with those categories indicated in a functionality term categorization table. The system may then determine which of the categories associated with the package has a highest associated score. In the current example, the SDK discovery and assessment server 6020 may determine that the "Functional" category associated with the functional term "function2" has the highest score among the categories associated with package. Therefore, the SDK discovery and assessment server 6020 may assign the "Functional" category and/or the score corresponding to the "Functional" category (e.g., 20) to the "com.vendor1.function1.function2.function3" package.

In various embodiments, the system may also, or instead, use one or more weighting factors in the scoring process to determine a score for an identified package. In the current example, the SDK discovery and assessment server 6020 may determine that the "Functional" category associated with the functional term "function2" has the highest score among the categories associated with package but has a weighting of 0, thus giving that category a weighted score of 20. The system may also determine that the "Targeting" category associated with the functional term "function1" has a score of 10 with a weighting of 20, thus giving that category a weighted score of 30. Therefore, because it has the highest weighted score of the associated categories, the SDK discovery and assessment server 6020 may assign the "Targeting" category and/or the weighted score corresponding to the "Targeting" category (e.g., 30) to the "com.vendor1.function1.function2.function3" package.

In various embodiments, the system may also, or instead, determine whether a functionality term within a tokenized package name is a key term in calculating a score for the package. In the current example, the SDK discovery and assessment server 6020 may determine that the "Targeting" category associated with the functional term "function1" and the "Location" category associated with the functional term "function3" are key terms (e.g., as indicated in a functionality term categorization table or listing, such as Table 1). The system may make this determination based on an explicit indicator that a particular categories is a key category (e.g., an indicator that a category is associated with a functionality term that is a key term, as shown in Table 1) or based on implicit information, such as determining that a particular term has non-zero (or positive) weighting factor (also as shown in Table 1). In this particular example, because it has the highest weighted score among the applicable key categories, the SDK discovery and assessment server 6020 may assign the "Targeting" category, the score corresponding to the "Targeting" category, and/or the weighted score corresponding to the "Targeting" category (e.g., 30) to the "com.vendor1.function1.function2.function3" package.

In various embodiments, the SDK discovery and assessment server 6020 may determine that a category score for a particular identified package is inconclusive or may otherwise be unable to determine a category or score for a package. For example, the SDK discovery and assessment server 6020 may determine that there is no particular category associated with the identified package (e.g., none of its functionality terms are associated with a known category) or that there is no score available or determinable for the categories associated with the package (e.g., there are no scores available or determinable for any of its functionality terms). In the current example, if unable to determine a category score for the "com.vendor1.function1.function2.function3" package, the SDK discovery and assessment server 6020 may use the vendor name "vendor1" from the tokenized package name to identify a vendor and/or vendor category associated with the package. In particular embodiments, the SDK discovery and assessment server 6020 may determine the vendor score and/or category by querying a vendor database to access a vendor term categorization table (e.g., by querying the SDK and vendor information database 6040 and/or the third-party SDK database 6030 to access a table such as Table 2) to identify a vendor score and/or category associated with a particular vendor using the vendor name token. The SDK discovery and assessment server 6020 may then determine a score and/or category for the identified package by assigning the vendor score and/or category associated with "vendor1" to the identified package. In particular embodiments, the system may assign the determined category and/or score for "vendor1" as the privacy category and/or score, respectively, for the "com.vendor1.function1.function2.function3" package. A vendor term categorization table may be generated and/or stored in a database (e.g., the SDK and vendor information database 6040 and/or the third-party SDK database 6030) and may have been generated for use by the system and/or by a third party as described herein.

In various embodiments, a particular vendor may be associated with multiple categories, each of which may have a score and/or a weighting as described above in regard to a functionality term categorization table. In such embodiments, the system may determine a vendor categorization and/or vendor score for a particular SDK package by selecting the vendor category and/or score associated with the highest vendor score and/or highest weighted vendor score from among the scores/weighted scores associated with the vendor represented in the vendor token of the particular SDK packages' tokenized name.

TABLE 2

| Vendor term | Category | Score | Weight |
|---|---|---|---|
| vendor1 | Targeting | 10 | 20 |
| vendor1 | Functional | 20 | 0 |
| vendor1 | Location | 25 | 5 |

In various embodiments, the SDK discovery and assessment server 6020 may determine a category score for the "com.vendor1.function1.function2.function3" package as well as a vendor score. The SDK discovery and assessment server 6020 may then use a combination of the vendor score and the category score to determine an overall score for the SDK and/or a (e.g., privacy) category for the SDK. For example, the SDK discovery and assessment server 6020 may determine a weighted category score of 30 and a vendor score of 10 for the package, and then determine an overall score of 40. In particular embodiments, the system may use a formula, algorithm, and/or other available information to determine a privacy risk score and/or a privacy assessment score for a package. In other particular embodiments, the system may determine an overall privacy risk or privacy impact score for a particular package based on only one of a vendor score or a category score by assigning the vendor score or the category score as the privacy risk or privacy impact score for the particular package.

Mobile SDK Package Assessment Module

Figure 61:
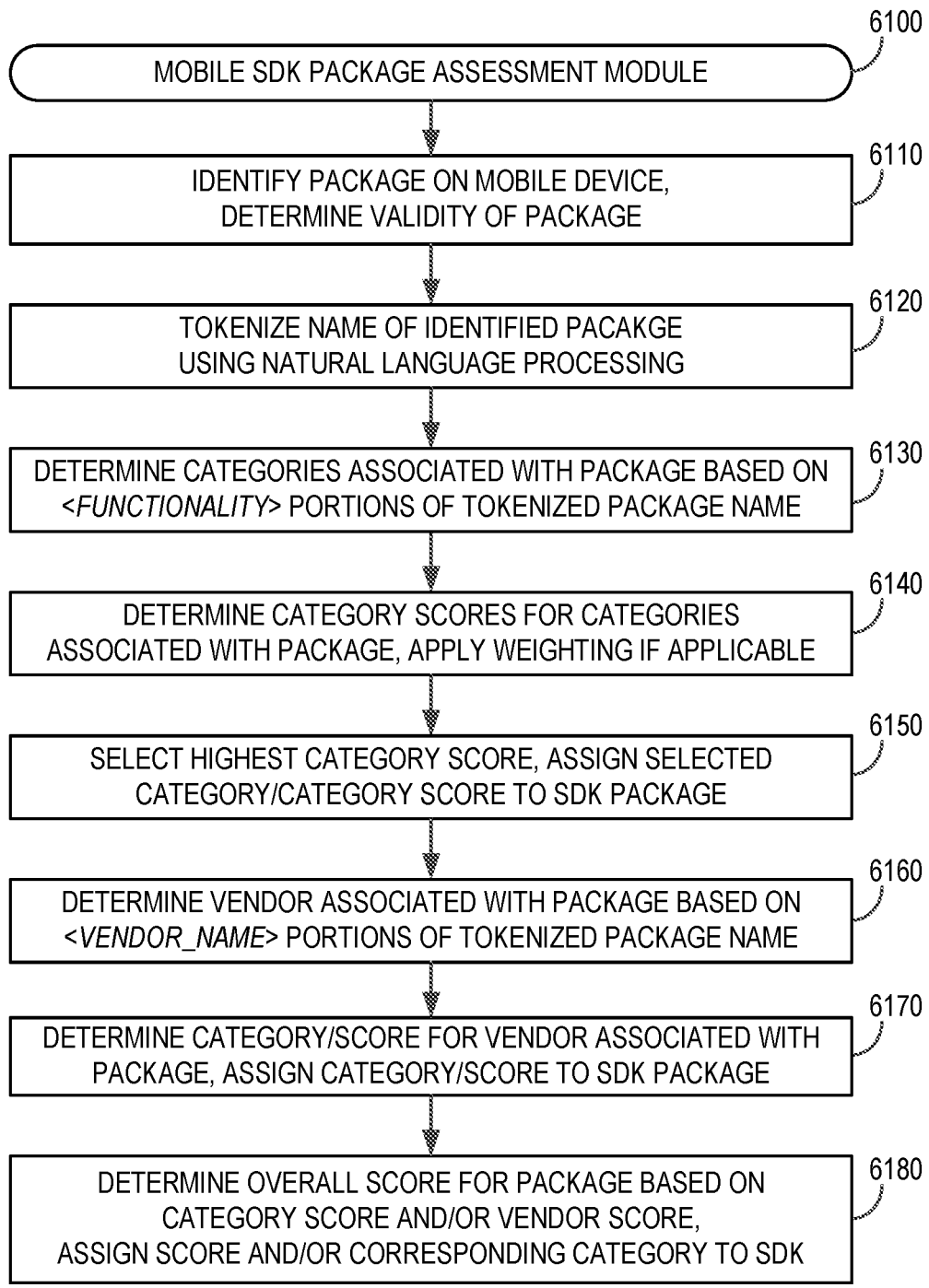
FIG. 61 is a flowchart showing an example of a process performed by a Mobile SDK Package Assessment Module according to various embodiments.

FIG. 61 depicts a Mobile SDK Package Assessment Module 6100 according to various embodiments. In executing the Mobile SDK Assessment Module 6100, the system begins at Step 6110 by identifying a package on a mobile device (e.g., an Android-based mobile device, an iPhone, etc.). The system may identify the package by scanning one or more folders, and/or one or more files contained therein, configured on the mobile device for information (e.g., package name, file name, folder name, etc.) that may be used to identify a package.

The system may use RegEx searching techniques to search one or more databases to cross-reference the name of the identified package with one or more known SDK packages. Each of these one or more databases may be a database of SDK and vendor information that may include SDK identifying information (e.g., package name) and respective vendor information for particular SDK packages. Such databases may also store category and/or vendor scoring information as described herein. If the system determines that the name of the identified package correspond to one or more known SDK packages, the system may determine that that particular identified package is a valid SDK package. If the system is unable to cross-reference the name of the identified package to one or more known SDK packages, the system may determine that that particular identified package is not a valid SDK package.

At Step 6120, the system may tokenize the name of the identified package, for example using NLP, in order to use portions of the name for further assessment. As noted above, the tokenized SDK package name of an identified package may take the form of "<common term>.<vendor_name>.<functionalityX>.<functionalityY>.<functionalityZ>."

Using the <functionality> portion(s) of the package name, at Step 6130 the system may determine one or more categories associated with the identified package. For example, the system may identify a respective category for each identified <functionality> term of the package name based, at least in part, on a listing of one or more <functionality> terms and a corresponding category for each term in the listing of <functionality> terms (e.g., as described above). This listing of functionality terms and corresponding categories may be stored in a table or other data structure in a database of SDK-related information.

At Step 6140, the system may determine a category score for each category associated with the identified package (e.g., as determined as Step 6130), for example as described above using a table or other data structure in a database of SDK-related information. In particular embodiments, the system may apply a weighting factor at Step 6140 to one or more of the category scores, for example, in response to determining that a particular category score is associated with key category or a key <functionality> term in the package name as described above or otherwise determining an applicable weighting factor for the category.

At Step 6150, the system may determine the highest category score from among the scores of the one or more categories associated with the identified package. Where one or more of the category scores is weighted, the system may use the one or more weighted scores to select the highest category score. The system may assign the category associated with the determined highest category score to the identified package. The system may also, or instead, assign the determined highest category score to the identified package.

If the system determines that the category score cannot be determined at Step 6150 (e.g., there is no particular category associated with the particular identified package that has an associated score) or if the category score determined at Step 6150 is otherwise inconclusive, the system may determine and use a vendor score to determine a privacy category, privacy risk score, and/or a privacy assessment score for the package. Alternatively, or in addition, the system may determine that a vendor score is to be used in conjunction with a category score to determine a privacy category, privacy risk score, and/or a privacy assessment score for the package. At Step 6160, the system may use the <vendor_name> from the tokenized package name to identify a vendor associated with the package, for example, by querying a vendor and/or SDK database to determine a vendor associated with the package. At Step 6170, the system may then determine a vendor category and/or score associated with the vendor that may be used in assessing the identified package by querying a vendor and/or SDK database using the determined vendor to access a vendor term categorization table and identify a vendor score and/or category that corresponds to the vendor. For example, the system may assign the category and/or score associated with the vendor to the SDK package.

At Step 6180, the system may determine an overall score (e.g., a privacy risk score and/or a privacy assessment score) for the identified package that reflects the package assessment performed by the system. In particular embodiments, this overall score is based on a category score (e.g., as determined at Step 6150). For example, the system may assign the category score as the overall score. In other particular embodiments, this overall score is based on a vendor score (e.g., as determined at Step 6170). For example, the system may assign the vendor score as the overall score. In still other particular embodiments, this overall score is determined based on a combination of one or more category scores (e.g., as determined at Step 6150), one or more vendor scores (e.g., as determined at Step 6170) and/or other information. For example, the system may use an algorithm or formula to calculate an overall score using one or more category scores and one or more vendor scores. The system may also use other information, a formula, algorithm, and/or various weighting factors to determine the overall score. This overall score may be assigned to an SDK as a privacy risk score and/or privacy assessment score and/or may be used to determine a (e.g., privacy) category for the SDK.

Conclusion

Although embodiments above are described in reference to various privacy assessment systems, it should be understood that various aspects of the system described above may be applicable to other privacy-related systems, or to other types of systems, in general.

While this specification contains many specific embodiment details, these should not be construed as limitations on the scope of any embodiment or of what may be claimed, but rather as descriptions of features that may be specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Many modifications and other embodiments will come to mind to one skilled in the art to which this disclosure pertains having the benefit of the teachings presented in the foregoing descriptions and the associated drawings. Therefore, it is to be understood that the teachings set forth herein are not to be limited to the specific embodiments disclosed and that modifications and other embodiments are intended to be included within the scope of the appended claims. Although specific terms are employed herein, they are used in a generic and descriptive sense only and not for the purposes of limitation.

What is claimed is:

1. A method comprising:
   generating, by computing hardware, a tokenized name for a third-party development tool, the tokenized name comprising a functionality token representing a function of the third-party development tool and a source token indicating a third-party computing system from which the third-party development tool can be obtained, wherein the source token is generated by:
      querying, based on identifying information of the third-party development tool, a database that stores a plurality of third-party identities in correlation with a plurality of respective identifying information of third-party development tools,
      determining, based on a result of querying the database, a third-party identity corresponding to the third-party development tool, and
      generating the source token based on the third-party identity;
   determining, by the computing hardware, a functionality category for the functionality token;
   identifying, by the computing hardware, the third-party computing system from the source token,
   assigning, by the computing hardware, a third-party development tool category to the third-party development tool based on the functionality category and the identification of the third-party computing system; and
   storing, by the computing hardware, the assigned third-party development tool category and linking the assigned third-party development tool category to the third-party development tool.

2. The method of claim 1, wherein the third-party development tool is a software development kit used to generate an application, the application being configured to operate on a mobile device.

3. The method of claim 1, further comprising:
   determining, by the computing hardware, the identifying information of the third-party development tool by scanning at least one of a folder on a mobile device or a file stored on the mobile device.

4. The method of claim 3, wherein scanning the at least one of the folder on the mobile device or the file stored on the mobile device comprises identifying information regarding at least one of a package name, a file name, or a folder name.

5. The method of claim 1, further comprising:
   determining, by the computing hardware, the identifying information for the third-party development tool;
   cross-referencing, by the computing hardware, the identifying information in the database; and
   determining, by the computing hardware, that the third-party development tool is valid in response to successfully cross-referencing the identifying information in the database.

6. The method of claim 1, wherein generating the tokenized name for the third-party development tool comprises using natural language processing.

7. A system comprising:
   a non-transitory computer-readable medium storing instructions; and
   a processing device communicatively coupled to the non-transitory computer-readable medium,
   wherein, the processing device is configured to execute the instructions and thereby perform operations comprising:
   generating, by the processing device, a tokenized name for a third-party development tool, the tokenized name comprising a source token indicating a third-party computing system from which the third-party development tool can be obtained, wherein the source token is generated by:
      querying, based on identifying information of the third-party development tool, a database that stores a plurality of third-party identities in correlation with a plurality of respective identifying information of third-party development tools,
      determining, based on a result of querying the database, a third-party identity corresponding to the third-party development tool, and
      generating the source token based on the third-party identity;

determining, by the processing device, a source category corresponding to a source of the third-party development tool;

identifying, by the processing device, the third-party computing system from the source token;

assigning, by the processing device, a third-party development tool category to the third-party development tool based on the source category and the third-party computing system; and storing, by the processing device, the assigned third-party development tool category and linking the assigned third-party development tool category to the third-party development tool.

8. The system of claim 7, wherein the third-party development tool is a software development kit used to generate an application.

9. The system of claim 7, the operations further comprising:

determining, by the processing device, the identifying information of the third-party development tool by scanning at least one of a folder on a mobile device or a file stored on the mobile device.

10. The system of claim 9, wherein scanning the at least one of the folder on the mobile device or the file stored on the mobile device comprises identifying information regarding at least one of a package name, a file name, or a folder name.

11. The system of claim 7, the operations further comprising:

determining, by the processing device, identifying the information of the third-party development tool;

cross-referencing, by the processing device, the identifying information in the database; and determining, by the processing device, that the third-party development tool is valid in response to successfully cross-referencing the identifying information in the database.

12. The system of claim 7, wherein generating the tokenized name for the third-party development tool comprises using natural language processing.

13. A non-transitory computer-readable medium storing computer-executable instructions that, when executed by processing hardware, configure the processing hardware to perform operations comprising:

generating a tokenized name for a third-party development tool, the tokenized name comprising a functionality token representing a function of the third-party development tool, and a source token indicating a third-party computing system from which the third-party development tool can be obtained, wherein the source token is generated by:

querying, based on identifying information of the third-party development tool, a database that stores a plurality of third-party identities in correlation with a plurality of respective identifying information of third-party development tools, determining, based on a result of querying the database, a third-party identity corresponding to the third-party development tool, and generating the source token based on the third-party identity;

determining a functionality category for the functionality token;

identifying the third-party computing system from the source token;

assigning a third-party development tool category to the third-party development tool based on the functionality category and the identification of the third-party computing system; and storing the assigned third-party development tool category and linking the assigned third-party development tool category to the third-party development tool.

14. The non-transitory computer-readable medium of claim 13, wherein the third-party development tool is a software development kit used to generate an application, the application being configured to operate on a mobile device.

15. The non-transitory computer-readable medium of claim 13, the operations further comprising:

determining the identifying information of the third-party development tool by scanning at least one of a folder on a mobile device or a file stored on the mobile device.

16. The non-transitory computer-readable medium of claim 15, wherein scanning the at least one of the folder on the mobile device or the file stored on the mobile device comprises identifying information regarding at least one of a package name, a file name, or a folder name.

17. The non-transitory computer-readable medium of claim 13, wherein generating the tokenized name for the third-party development tool comprises using natural language processing.

* * * * *